(12) United States Patent
Ohmura et al.

(10) Patent No.: US 7,385,625 B2
(45) Date of Patent: Jun. 10, 2008

(54) IMAGE PHOTOGRAPHY APPARATUS, IMAGE REPRODUCING APPARATUS, IMAGE PHOTOGRAPHY AND REPRODUCING APPARATUS, STEREOGRAPHIC PROJECTOR, JIG FOR IMAGE STEREOSCOPIC VISION, AND PRINTER

(75) Inventors: Hiroshi Ohmura, Saitama (JP); Masashi Takamura, Saitama (JP); Hiroshi Komatsuzaki, Saitama (JP); Ko Aosaki, Saitama (JP); Akihiko Funaki, Saitama (JP); Jin Murayama, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1077 days.

(21) Appl. No.: 10/732,510

(22) Filed: Dec. 11, 2003

(65) Prior Publication Data
US 2004/0130645 A1    Jul. 8, 2004

Related U.S. Application Data

(62) Division of application No. 09/922,911, filed on Aug. 7, 2001, now abandoned, which is a division of application No. 09/304,844, filed on May 5, 1999, now Pat. No. 6,314,248.

(30) Foreign Application Priority Data

May 7, 1998   (JP)   .................. 10-124485
May 15, 1998  (JP)   .................. 10-133801

(51) Int. Cl.
   H04N 13/04   (2006.01)
(52) U.S. Cl. ....................................... 348/51

(58) Field of Classification Search .................. 348/51, 348/52, 60, 61, 47, 42; 396/429, 326, 324; 359/464, 466; 358/302; H04N 13/04
See application file for complete search history.

(56) References Cited

U.S. PATENT DOCUMENTS

| 4,262,301 A | 4/1981 | Erlichman |
| 4,704,119 A * | 11/1987 | Shaw et al. .................. 424/448 |
| 4,836,647 A | 6/1989 | Beard |
| 5,142,357 A | 8/1992 | Lipton et al. |
| 5,727,242 A | 3/1998 | Lo et al. |

(Continued)

FOREIGN PATENT DOCUMENTS

JP        12-4394        5/1989

(Continued)

Primary Examiner—Tung Vo
(74) Attorney, Agent, or Firm—Young & Thompson

(57) ABSTRACT

A liquid crystal display unit has a transmissive liquid crystal plate having a number of pixels arranged on a two-dimensional basis, on which an image is formed, and a light source unit emitting beams of light of a plurality of luminescent colors for irradiating said liquid crystal plate from back. An interface circuit receives an image signal representative of a color image to sequentially form on said liquid crystal plate a plurality of separation images in which the color image is separated in association with the plurality of luminescent colors of said light source unit. The interface circuit causes said light source unit to flash with a luminescent color associated with a separation image formed on said liquid crystal plate in synchronism with a sequential formation of the separation images onto said liquid crystal plate. Beams of light emanated from the light source unit and transmitted through the liquid crystal plate reproduce an image.

37 Claims, 107 Drawing Sheets

U.S. PATENT DOCUMENTS

| | | |
|---|---|---|
| 5,760,827 A | 6/1998 | Faris |
| 5,790,184 A | 8/1998 | Sato et al. |
| 5,937,212 A * | 8/1999 | Kurahashi et al. ............ 396/20 |
| 5,995,986 A * | 11/1999 | Ueda et al. ................. 715/234 |
| 6,177,952 B1 * | 1/2001 | Tabata et al. ................. 348/47 |

FOREIGN PATENT DOCUMENTS

| | | |
|---|---|---|
| JP | 6-83243 | 3/1994 |
| JP | 8-271995 | 10/1996 |

* cited by examiner

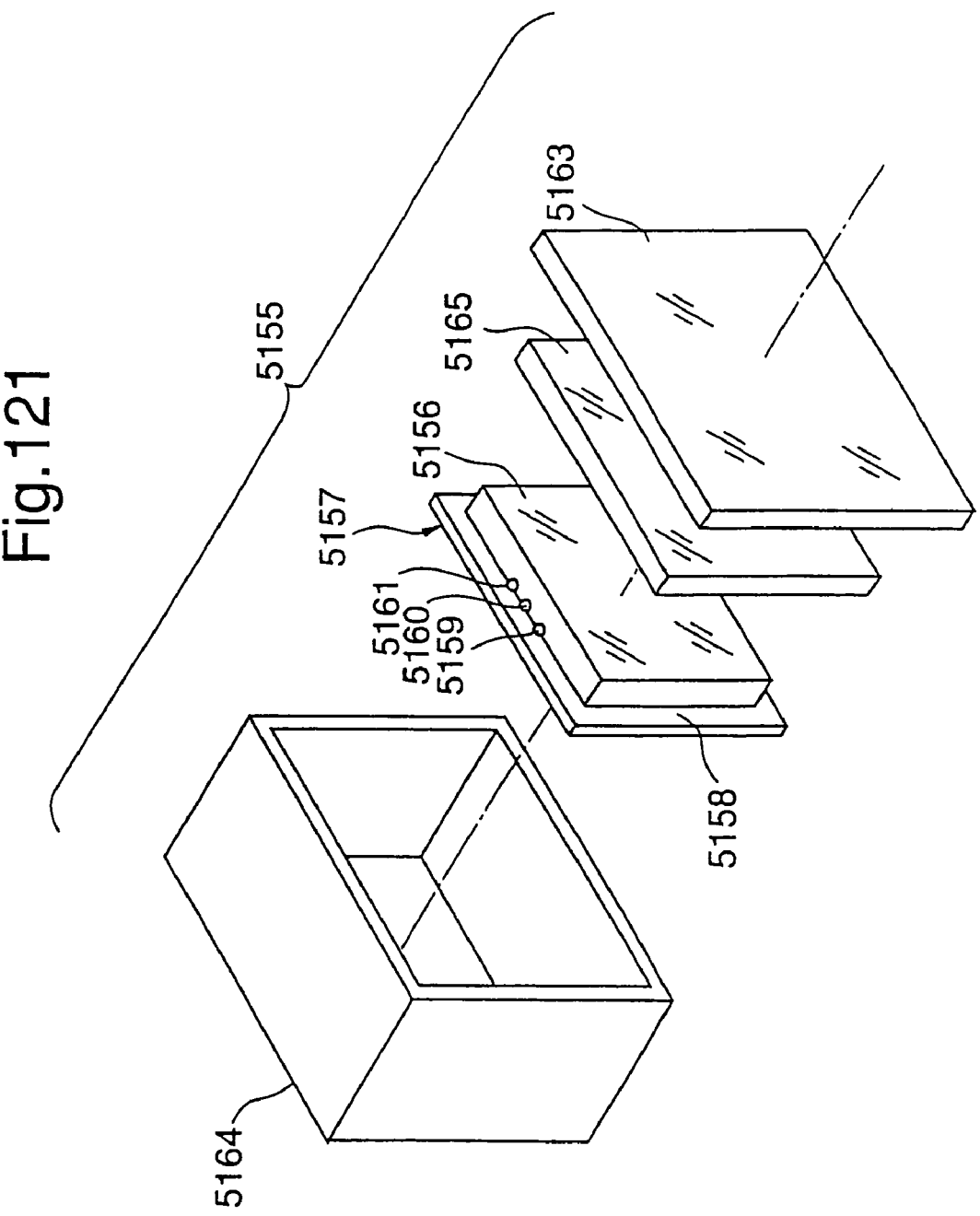

IMAGE PHOTOGRAPHY APPARATUS, IMAGE REPRODUCING APPARATUS, IMAGE PHOTOGRAPHY AND REPRODUCING APPARATUS, STEREOGRAPHIC PROJECTOR, JIG FOR IMAGE STEREOSCOPIC VISION, AND PRINTER

CROSS REFERENCE TO RELATED APPLICATIONS

This is a divisional of application Ser. No. 09/922,911, filed on Aug. 7, 2001 now abandoned, which is a division of application Ser. No. 09/304,844 filed May. 5, 1999, now U.S. Pat. No. 6,314,248, granted Nov. 6, 2001, the entire contents of which are hereby incorporated by reference.

BACKGROUND OF THE INVENTION

1. Field of the Invention

The present invention relates to an image photography apparatus suitable for photography of a three-dimensional image, an image reproducing apparatus suitable for reproduction of a three-dimensional image, an image photography and reproducing apparatus wherein the image photography apparatus and the image reproducing apparatus are formed in a unitary body, a stereographic projector for projecting an image for an image stereoscopic vision on a screen, a jig for image stereoscopic vision for visually recognizing the image projected on the screen in the form of a three-dimensional image, and a printer for printing an image displayed on a liquid crystal panel.

2. Description of the Prior Art

Hitherto, it is known that two still images or dynamic images are photographed through utilizing parallax of right and left eyes, and those images are reproduced to be observed by the respective right and left eyes, so that a three-dimensional image can be obtained.

In the event that such a stereographic photography and reproducing system is constructed, it is considered that an image is reproduced on a screen of a television. However, in the event that an exclusive system is constructed, it is considered that an image is reproduced on a liquid crystal display plate to provide an image stereoscopic vision. Adoption of the liquid crystal display plate make it possible to implement a compactness of a system whereby a portable system can be constructed.

A liquid crystal display plate, which is generally adopted for an image display, is a so-called TFT type of liquid crystal display plate. The TFT type of liquid crystal display plate is so arranged that a large number of pixels, which are arranged as a matrix and are separated into three primary colors of R, G and B, are used to simultaneously generate three images associated with the three primary colors of R, G and B, respectively, so that the images can be observed through illumination from the back of the liquid crystal display plate.

In an equipment provided with a liquid crystal display function for displaying an image on the TFT type of liquid crystal display plate, particularly, for purpose of the portable use, space for the liquid crystal display plate is restricted. According to the TFT type of liquid crystal display plate, the respective pixels for the colors R, G and B are arranged at regular intervals, and thus the substantial number of pixels becomes ⅓ of the total number of pixels. This brings about a defect of poor precision. Further, in view of the characteristics of the TFT type of liquid crystal display plate, it is hard to obtain an excellent resolution. Thus, it is difficult to obtain a fine image to be displayed on the liquid crystal display plate. Accordingly, it will be impossible to read characters written in a fine line, for example. Furthermore, a light source for illuminating the TFT type of liquid crystal display plate is large in power consumption. The TFT type of liquid crystal display plate has such a merit that it is possible to display an image, whereas it has demerits as mentioned above.

Further, hitherto, there is known a so-called liquid crystal projector in which an image is reproduced on a liquid crystal display plate in accordance with image information subjected to a digital image processing, and the liquid crystal display plate is projected onto a screen via a projection lens through irradiation on the liquid crystal display plate from the back thereof.

A liquid crystal display plate, which is generally adopted for an image display, is a so-called TFT type of liquid crystal display plate. The TFT type of liquid crystal display plate is so arranged that a large number of pixels, which are arranged as a matrix and are separated into three primary colors of R, G and B, are used to simultaneously generate three images associated with the three primary colors of R, G and B, respectively, so that the images can be observed through illumination from the back of the liquid crystal display plate.

However, as mentioned above, according to the TFT type of liquid crystal display plate, the respective pixels for the colors R, G and B are arranged at regular intervals, and thus the substantial number of pixels becomes ⅓ of the total number of pixels. This brings about a defect of poor precision. Further, in view of the characteristics of the TFT type of liquid crystal display plate, it is hard to obtain an excellent resolution. Thus, it is difficult to obtain a fine image to be displayed on the liquid crystal display plate. Accordingly, it will be impossible to read characters written in a fine line, for example. Furthermore, a light source for illuminating the TFT type of liquid crystal display plate is large in power consumption. The TFT type of liquid crystal display plate has such a merit that it is possible to display an image, whereas it has demerits as mentioned above.

Further, hitherto, it is known that a three-dimensional image can be obtain by reproducing two still image and dynamic image utilizing a parallax of right and left eyes in such a manner that those images are observed by the right and left eyes. In this case, however, in the event that an image for stereoscopic vision is projected onto a screen, it is a problem as to how a high definition of image for stereoscopic vision is projected.

Furthermore, hitherto, there are on the market various types of printer in which an image photographed by a video camera or a digital still camera, and a full color image such as a print photograph obtained by a general camera, are converted into a digital image signal and printed. Of those types of printer, there is, as disclosed in Japanese Patent Publication Hei. 1-24394, Japanese Patent Application Laid Open Gazette Hei. 6-83243, and Japanese Patent Application Laid Open Gazette Hei. 8-271995, such a type of printer that a photosensitive material is used as a recording material, and while a recording head, in which microscopic emitters sequentially emitting beams of light of three primary colors are incorporated, is scanned throughout a photosensitive surface, a full color image is exposed on the photosensitive surface with the beams emitted from the microscopic emitters. This type of printer can be miniaturized, since power dissipation is small.

In the above-mentioned color printer, in order to obtain an enhanced print free from color drift or shift and fuzziness, there are needed a recording head into which microscopic emitters for emitting beams of light of a suitable quantity of light, and optical means for focussing the beams emitted from the microscopic emitters on a photosensitive surface with great accuracy, etc. are incorporated, and recording head moving means for moving the recording head with great accuracy.

However, optical means, which is capable of being used for focussing of the microscopic emitters incorporated into the recording head, is limited. That is, such an optical means needs a distributed index lens and microscopic lenses formed through molding optical material, which are expensive, and thus cannot be used for an inexpensive printer. Likely, the use of the recording head moving means involves a cost up for the printer, and also hinders miniaturization and weight saving of the printer. Further, a decrease of a moving speed of the recording head involves a problem that a printing time is elongated.

In the event that a portable printer, which can be driven by a battery and the like, is constructed, it is considered that as a monitor for confirming an image to be printed, a liquid crystal display is incorporated into the printer. However, an incorporation of the liquid crystal display involves a problem of a cost up of the printer. Further, the liquid crystal display is large in power dissipation. Accordingly, in the event that the back light and the like is used in order that it is easy to see an image, this involves a problem that the battery is readily wasted.

SUMMARY OF THE INVENTION

In view of the foregoing, it is an object of the present invention to provide a compact image reproducing apparatus capable of observing an enhanced image, an image photography apparatus capable of photographing an image suitable for the image reproduction by the above-mentioned image reproducing apparatus, and an image photography and reproducing apparatus wherein the image photography apparatus and the image reproducing apparatus are formed in a unitary body.

It is another object of the present invention to provide a stereographic projector for projecting a high definition image for stereoscopic vision on a screen and a jig for visually recognizing the image projected on the screen in the form of a three-dimensional image.

It is still another object of the present invention to provide a printer capable of obtaining an enhanced printer in compactness, weight saving, and low cost.

To achieve the above-mentioned objects, the present invention provides an image photography apparatus comprising:

a pair of image taking lenses in right and left;

at least one image receiving device for receiving an image formed by said pair of image taking lenses to generate an image signal representative of a color image;

an image receiving device driving unit for driving said image receiving device to receive the image;

a recording medium driving unit onto which a portable recording medium is detachably loaded for recording image information on the recording medium loaded; and a control unit for controlling both said image receiving device driving unit and said recording medium driving unit to cause said image receiving device driving unit to drive said image receiving device so that image information associated with the image signal generated is recorded on the loaded recording medium.

According to the image photography apparatus of the present invention, there provided a pair of image taking lenses in right and left, and image information representative of an image formed through the image taking lenses is recorded on a portable recording medium. This feature makes it possible to readily obtain a three-dimensional image.

In the image photography apparatus as mentioned above, it is preferable that said control unit controls both said image receiving device driving unit and said recording medium driving unit so as to obtain a three-dimensional still image consisting of a pair of still images formed by said pair of image taking lenses. It is also preferable that said control unit controls both said image receiving device driving unit and said recording medium driving unit so as to obtain a three-dimensional dynamic image consisting of a pair of dynamic images formed by said pair of image taking lenses.

The image photography apparatus according to the present invention is applicable to both a three-dimensional still image and a three-dimensional dynamic image.

In case of an arrangement wherein a three-dimensional dynamic image is obtained, it is preferable that said control unit controls both said image receiving device driving unit and said recording medium driving unit so as to obtain a three-dimensional image which is altered at a speed of 16 frames per second or more.

According to characteristics of human eyes, when an image is sequentially altered at a speed of 16 frames per second or more, it is recognized as a dynamic image.

In the image photography apparatus as mentioned above, it is acceptable that said recording medium driving unit permits only one recording medium to be loaded at a time, and records images formed by said image receiving device on the loaded one recording medium. And alternatively it is acceptable that said recording medium driving unit permits two recording media to be loaded at a time, and records images formed by said image receiving device on the loaded two recording media, respectively.

In the event that only one recording medium is loaded and both the right and left images are recorded onto the loaded recording medium, it is convenient to handle the recording medium. On the other hand, in the event that two recording media are loaded and the right and left images are recorded onto the loaded two recording media, respectively, the respective recording media are used on a common basis among photography and reproducing systems for usual images which are not involved in a three-dimensional image.

Further, to achieve the above-mentioned objects, the present invention provides an image reproducing apparatus comprising:

a liquid crystal display unit having a transmissive liquid crystal plate having a number of pixels arranged on a two-dimensional basis, on which an image is formed, and a light source unit emitting beams of light of a plurality of luminescent colors for irradiating said liquid crystal plate from back;

an interface circuit for receiving an image signal representative of a color image to sequentially form on said liquid crystal plate a plurality of separation images in which the color image is separated in association with the plurality of luminescent colors of said light source unit, said interface circuit causing said light source unit to flash with a luminescent color associated with a separation image formed on said liquid crystal plate in synchronism with a sequential formation of the separation images onto said liquid crystal plate;

a pair of eyepiece window through which a person looks with one's right and left eyes; and an image reproducing optical system for transmitting to said pair of eyepiece window outgoing light carrying the image formed on said liquid crystal plate, the outgoing light being emitted from said liquid crystal display unit.

The use of the interface circuit as mentioned above makes it possible to form an image using the whole pixels of the liquid crystal plate with respect to any image of a plurality of colors (e.g. R, G, B), and thereby forming enhanced color image as compared with the conventional one using the TFT type of liquid crystal plate.

In the image reproducing apparatus as mentioned above, it is preferable that said interface circuit forms on a time division basis on said liquid crystal plate a plurality of separation images consisting of a plurality of left eye use separation images in which left eye use color images are separated and a plurality of right eye use separation images in which right eye use color images are separated, and, said image reproducing optical system has in its optical path a transmission control member to provide such a control that in a timing wherein the left eye use separation images are formed on said liquid crystal plate, the outgoing light emitted from said liquid crystal display unit is transmitted to a left eye use eyepiece window of said pair of eyepiece windows, while the outgoing light is prevented from being transmitted to a right eye use eyepiece window, and in a timing wherein the right eye use separation images are formed on said liquid crystal plate, the outgoing light emitted from said liquid crystal display unit is transmitted to the right eye use eyepiece window, while the outgoing light is prevented from being transmitted to the left eye use eyepiece window.

In this case, it is acceptable that said transmission control member is a pair of liquid crystal shutters associated with said pair of eyepiece windows.

This feature as to separation of an image to the right and left makes it possible to reproduce a three-dimensional image.

In the image reproducing apparatus as mentioned above, it is preferable that when a plurality of separation images consisting of a plurality of separation images constituting a frame of color images for left eye use and a plurality of separation images constituting a frame of color images for right eye use is expressed in form of one group, said interface circuit alters a separation image on said liquid crystal plate at a speed of 16 groups per second or more, and causes said light source unit to flash in synchronism with a sequential formation of the separation images onto said liquid crystal plate so as to generate a pulse light having a luminescent time shorter than a time while a one separation image is formed on said liquid crystal plate.

As mentioned above, it is known that according to characteristics of the human eyes, when an image is sequentially altered at a speed of 16 frames per second or more, it is recognized as a dynamic image. According to the image reproducing apparatus of the present invention, a frame of images (color image) on each of the right and left are further separated into a plurality of separation images, and thus there is a need to alter an image at higher speed. However, as a standard of the altering speed, when a plurality of separation images constituting total two frames of color images of one frame on each of right and left is expressed in the form of one group, the alteration speed is of 16 frames per second or more. This feature makes it possible to form a dynamic image which is smooth in movement.

Further, the light source unit flash so as to generate a pulse light having a luminescent time shorter than a time while a one separation image is formed on said liquid crystal plate. This feature make it possible to suppress a power dissipation.

In an arrangement that an image formed on the liquid crystal plate is separated into the right and the left, it is acceptable that said interface circuit receives a frame of image signals representative of a still color image for left eye use and a frame of image signals representative of still color image for right eye use, and repeatedly forms on said liquid crystal plate a plurality of separation images consisting of a plurality of separation images for left eye use constituting a still color image for left eye use and a plurality of separation images for right eye use constituting a still color image for right eye use.

An arrangement that an image formed on the liquid crystal plate is separated into the right and the left is also applicable to an image reproducing apparatus for reproducing a still color image.

In the image reproducing apparatus as mentioned above, it is preferable that said image reproducing apparatus has two said liquid crystal display units for left eye use and right use, respectively, said interface circuit forms on a time division basis on a liquid crystal plate for left eye use constituting said liquid crystal display unit for left eye use a plurality of left eye use separation images in which left eye use color images are separated, and forms on a time division basis on a liquid crystal plate for right eye use constituting said liquid crystal display unit for right eye use a plurality of right eye use separation images in which right eye use color images are separated, and said image reproducing optical system comprises a left eye use image reproducing optical system in which an outgoing light for left eye emitted from said liquid crystal display unit for left eye is transmitted to a left eye use eyepiece window of said pair of eyepiece windows, and a right eye use image reproducing optical system in which an outgoing light for right eye emitted from said liquid crystal display unit for right eye is transmitted to a right eye use eyepiece window of said pair of eyepiece windows.

In this case, when a three-dimensional image is reproduced, there is a need to prepare two liquid crystal display units. However, there is no need to prepare the liquid crystal shutter, the transmission control member for separating an image to the right and the left, the synchronizing circuit for separation, the driving circuit, etc.

In an arrangement that two liquid crystal display units are provided, it is preferable that when a plurality of separation images constituting a frame of color images provided for one of the left eye and the right eye is expressed in form of one group, said interface circuit alters a separation image on said liquid crystal plate for left eye use and a separation image on said liquid crystal plate for right eye use at a speed of 16 groups per second or more, respectively, and causes each light source unit irradiating an associated liquid crystal plate to flash in synchronism with a sequential formation of the separation images onto the associated liquid crystal plate so as to generate a pulse light having a luminescent time shorter than a time while a one separation image is formed on the associated liquid crystal plate.

In case of an arrangement that two liquid crystal display units are provided, as compared with an arrangement that an image displayed on the liquid crystal plate is separated into the right eye and the left eye, as mentioned above, it is effective, in order to provide an image which looks like altered at the same speed for the human eyes, that an image is altered at half speed on the liquid crystal plate. This feature makes it possible to contribute to cost down or alternatively to provide a dynamic image which is more smooth in movement.

In an arrangement that two liquid crystal display units are provided, it is acceptable that said interface circuit receives a frame of image signals representative of a still color image for left eye use and a frame of image signals representative of still color image for right eye use, and repeatedly forms on said liquid crystal plate for left eye use a plurality of separation images for left eye use constituting a still color image for left eye use and repeatedly forms on said liquid crystal plate for right eye use a plurality of separation images for right eye use constituting a still color image for right eye use.

Also in an arrangement that two liquid crystal display units are provided, in a similar fashion to that of an arrangement that an image displayed on the liquid crystal plate is separated into the right eye and the left on a time division basis, as mentioned above, it is possible to apply the arrangement to an image reproducing apparatus for reproducing a still color image.

Here, in the image reproducing apparatus according to the present invention, it is preferable that said image reproducing apparatus further comprises a recording medium driving unit onto which a portable recording medium is detachably loaded for transmitting an image signal from the loaded recording medium to said interface circuit.

An arrangement that a portable recording medium is loaded to obtain an image signal makes it possible to easily take in an image.

In this case, it is acceptable that said recording medium driving unit permits only one recording medium to be loaded at a time, and said recording medium driving unit receives from the loaded one recording medium both an image signal representative of a color image for left eye and an image signal representative of a color image for right eye, and transmits those image signals to said interface circuit. Or alternatively, it is acceptable that said recording medium driving unit permits two recording media to be loaded at a time, and said recording medium driving unit receives from one of the loaded two recording media an image signal representative of a color image for left eye and from another recording medium an image signal representative of a color image for right eye, and transmits those both image signals to said interface circuit.

In the event that only one recording medium is loaded to take in both images of the right and the left from the loaded recording medium, a single recording medium can be used. Thus it is convenient to handle the recording medium. On the other hand, in the event that two recording media are loaded to obtain the right and left images from the loaded two recording media, respectively, the respective recording media are used on a common basis among recording media used in the usual photography apparatus which are not involved in a three-dimensional image, for example, a digital camera, a video photography apparatus. Thus, it is possible that for example, two digital cameras are used to record the right and left images onto two recording media, respectively, and the two recording media are loaded onto an image reproducing apparatus of type capable of loading two recording media so that a three-dimensional image is reproduced.

In the image reproducing apparatus according to the present invention as mentioned above, it is preferable that said image reproducing apparatus further comprises a receiving unit for receiving radio wave or infrared carrying image information to generate an image signal and to transmit the image signal thus generated to said interface circuit.

In this manner, it is acceptable that the apparatus is arranged in such a manner that an image signal is obtained in the form of radio wave or infrared.

In the image reproducing apparatus according to the present invention as mentioned above, it is preferable that said interface circuit has an operating frequency conversion unit receiving an image signal having a first operating frequency different from a second operating frequency for operating said liquid crystal display unit for converting the image signal into an image signal synchronized with the second operating frequency.

In the event that an image signal and other various type of signals are dealt with, it is generally performed that a predetermined operating frequency of clock is established as a reference clock, a signal of type synchronized with the reference clock is dealt with. As an operating frequency generally adopted, for example, 24.5 MHz, 14 MHz, 12.27 MHz are adopted. However, there is a possibility that the operating frequency optimum to the liquid crystal display unit is not coincident with the operating frequency generally adopted as mentioned above. In view of the foregoing, according to the present invention, the above-referenced interface circuit has the above-referenced operating frequency conversion unit. This feature makes it possible to receive an image signal synchronized with the operating frequency generally adopted, for example, 24.5 MHz, and convert the same to the operating frequency optimum to the liquid crystal display unit to display an image.

In the image reproducing apparatus according to the present invention as mentioned above, it is preferable that said image reproducing apparatus further comprises an image attitude correction circuit for correcting an attitude of an image so that an image provided by light emitted from said light source unit and transmitted through said liquid crystal plate is observed in form of an erect image.

The image attitude correction circuit is incorporated into the interface circuit, or alternatively is located before or after the interface circuit. This image attitude correction circuit serves as a circuit in which for example, an image inverted with respect to the right and left and an image reversed with respect to the top and bottom are formed on the liquid crystal plate by a signal processing, so that an image attitude is corrected in such a manner that those images are finally observed as an erect image for human eyes. The image attitude correction circuit is needed in the event that an image on the liquid crystal plate is observed for the human eyes in the form of a reverse image.

To achieve the above-mentioned objects, the present invention provides an image photography and reproducing apparatus comprising:

a pair of image taking lenses in right and left;

at least one image receiving device for receiving an image formed by said pair of image taking lenses to generate an image signal representative of a color image;

an image receiving device driving unit for driving said image receiving device to receive the image;

a recording medium driving unit onto which a portable recording medium is detachably loaded for recording image information on the recording medium loaded;

a liquid crystal display unit having a transmissive liquid crystal plate having a number of pixels arranged on a two-dimensional basis, on which an image is formed, and a light source unit emitting beams of light of a plurality of luminescent colors for irradiating said liquid crystal plate from back;

an interface circuit for receiving an image signal representative of a color image to sequentially form on said liquid crystal plate a plurality of separation images in which the color image is separated in association with the plurality of luminescent colors of said light source unit, said interface circuit causing said light source unit to flash with a luminescent color associated with a separation image formed on said liquid crystal plate in synchronism with a sequential formation of the separation images onto said liquid crystal plate;

a pair of eyepiece window through which a person looks with one's right and left eyes;

an image reproducing optical system for transmitting to said pair of eyepiece window outgoing light carrying the image formed on said liquid crystal plate, the outgoing light being emitted from said liquid crystal display unit; and a control unit for causing image information associated with the image signal generated from said image receiving device to be recorded on the loaded recording medium, and for causing image signal obtained from the recording medium to be transmitted to said interface circuit.

The image photography and reproducing apparatus of the present invention has both the features of the image photography apparatus of the present invention and the image reproducing apparatus of the present invention. This feature makes it possible to be more convenient to deal with the apparatus as compared with a case where the image photography apparatus and the image reproducing apparatus are separately provided.

Incidentally, with respect to the image photography and reproducing apparatus of c, only a basic structural arrangement of the apparatus is raised. It is noted, however, that the image photography and reproducing apparatus of the image photography and reproducing apparatus includes combinations of all the aspects of the image photography apparatus and all the aspects of the image reproducing apparatus.

As mentioned above, according to the present invention, it is possible to provide an image reproducing apparatus capable of observing a high definition of image, an image photography apparatus capable of photographing an image suitable for an image reproduction by the image photography apparatus, and an image photography and reproducing apparatus of a combination of the image reproducing apparatus and the image photography apparatus.

Further, according to the present invention, provision of a liquid crystal display unit adopting a transmissive matrix drive-type liquid crystal plate, which is improved in compactness, power saving, resolution and responsibility, and an interface circuit suitably driving such a liquid crystal display unit makes it possible to obtain an enhanced image. Further, since this combination makes it possible to implement the enhanced image, it is possible to discriminate and observe not only an image but also fine character information. Furthermore, it is possible to reduce a power dissipation, and thus it is possible to use an image reproducing apparatus in which a battery is a main power source or an image photography and reproducing apparatus without exchange of a battery for a long time.

Still further, according to the present invention, wide choices of an image reproduction optical system may be given, and thus it is possible to obtain a great freedom for selecting a form or type suitable for an object of an image reproducing apparatus or an image photography and reproducing apparatus.

To achieve the above-mentioned objects, the present invention provides a stereographic projector comprising:

a liquid crystal display unit having a transmissive liquid crystal plate having a number of pixels arranged on a two-dimensional basis, on which an image is formed, and a light source unit emitting beams of light of a plurality of luminescent colors for irradiating said liquid crystal plate from back;

an interface circuit for receiving an image signal representative of a color image for left eye use and an image signal representative of a color image for right eye use to sequentially form on said liquid crystal plate a plurality of separation images consisting of a plurality of separation images for left eye use and a plurality of separation images for right eye use wherein each of the color image for left eye use and the color image for right eye is separated in association with the plurality of luminescent colors of said light source unit, said interface circuit causing said light source unit to flash with a luminescent color associated with a separation image formed on said liquid crystal plate in synchronism with a sequential formation of the separation images onto said liquid crystal plate;

a projection optical system for emitting outside light emanated from said light source unit and transmitted through said liquid crystal plate to project an image displayed on said liquid crystal plate onto an external screen; and a timing signal generating circuit for generating a timing signal to discriminate a timing wherein a separation image for left eye use is formed on said liquid crystal plate and a timing wherein a separation image for right eye use is formed on said liquid crystal plate.

According to the above-mentioned stereographic projector of the present invention, beams of light transmitted through the liquid crystal plate is emitted outside, and an image displayed on said liquid crystal plate is projected onto an external screen. And, alternatively, it is acceptable that the stereographic projector has a screen per se.

As a stereographic projector having such an arrangement, there is provided a stereographic projector comprising:

a liquid crystal display unit having a transmissive liquid crystal plate having a number of pixels arranged on a two-dimensional basis, on which an image is formed, and a light source unit emitting beams of light of a plurality of luminescent colors for irradiating said liquid crystal plate from back;

an interface circuit for receiving an image signal representative of a color image for left eye use and an image signal representative of a color image for right eye use to sequentially form on said liquid crystal plate a plurality of separation images consisting of a plurality of separation images for left eye use and a plurality of separation images for right eye use wherein each of the color image for left eye use and the color image for right eye is separated in association with the plurality of luminescent colors of said light source unit, said interface circuit causing said light source unit to flash with a luminescent color associated with a separation image formed on said liquid crystal plate in synchronism with a sequential formation of the separation images onto said liquid crystal plate;

a screen on which light emanated from said light source unit and transmitted through said liquid crystal plate is projected;

a projection optical system for projecting an image displayed on said liquid crystal plate onto said screen; and a timing signal generating circuit for generating a timing signal to discriminate a timing wherein a separation image for left eye use is formed on said liquid crystal plate and a timing wherein a separation image for right eye use is formed on said liquid crystal plate.

Further, it is acceptable that a stereographic projector according to the present invention serves both as a type in which an image is projected onto an external screen and another type having an internal screen per se in which an image is projected onto the internal screen. In this case, there is provided such an arrangement that the stereographic projector further comprises optical path switching means for switching between an optical path for projecting the light emanated from said light source unit and transmitted through said liquid crystal plate to said screen and an optical path for projecting the light emanated from said light source unit and transmitted through said liquid crystal plate to an external screen.

Here, as a typical structural example of the stereographic projector according to the present invention, there is provided such an arrangement that the light source unit of said liquid crystal display unit emits beams of light of three primary colors of red, green and blue, and said interface circuit separates an color image for left eye into three separation images associated with red, green and blue per frame, respectively, and separates an color image for right eye into three separation images associated with red, green and blue per frame, respectively, so that total six separation images per frame are sequentially formed on said liquid crystal plate.

Further, as a typical structural example of the stereographic projector according to the present invention, there is provided such an arrangement that the timing signal generated in said timing signal generating circuit is outputted to the exterior, and an image is visually recognized in the form of a three-dimensional image by an observer who mounts a jig for image stereoscopic vision which will be described later. In this case, it is acceptable that the timing signal generated in said timing signal generating circuit is directly outputted to the exterior in the form of an electric signal, or alternatively it is acceptable that said stereographic projector further comprises a timing signal output circuit for outputting radio wave or infrared carrying the timing signal generated in said timing signal generating circuit.

For example, a form wherein a jig for image stereoscopic vision which will be described later is incorporated into a stereographic projector, or a form including an arrangement corresponding to such a jig for image stereoscopic vision, may be referred to as a stereographic projector. That is, in such a stereographic projector, said stereographic projector further comprises an image transmission control unit disposed between right and left eyes of an observer and said screen for providing based on the timing signal generated in said timing signal generating circuit such a control that in a timing wherein the left eye use separation images are formed on said liquid crystal plate, an image on said screen is transmitted to the left eye of the observer, while an optical path extending to the right eye of the observer is blocked, and in a timing wherein the right eye use separation images are formed on said liquid crystal plate, the image on said screen is transmitted to the right eye of the observer, while an optical path extending to the left eye of the observer is blocked.

It is preferable that said image transmission control unit comprises:

a pair of liquid crystal shutters for left eye use and right eye use, which are controlled in accordance with the timing signal so as to alternately offer a light transmissive state and a light blocking state; and a holding member for holding said pair of liquid crystal shutters, said holding member having mounting means which can be mounted on the observer in such a manner that the liquid crystal shutter for left eye use and the liquid crystal shutter for right eye use are set before the left eye and the right eye of the observer, respectively.

When a jig for image stereoscopic vision is recognized as one which is not integral with a stereographic projector, the present invention provides a jig for image stereoscopic vision comprising:

mounting means to be mounted on an observer in such a manner that said mounting means is located before eyes of the observer; and an image transmission control unit receiving a timing signal to discriminate a timing wherein an image is provided to left eye of the observer and a timing wherein an image is provided to right eye of the observer for providing based on the timing signal generated in said timing signal such a control that in the timing wherein an image is provided to left eye of the observer, a view of left eye of the observer is ensured, while a view of right eye of the observer is blocked, and in the timing wherein an image is provided to right eye of the observer, a view of right eye of the observer is ensured, while a view of left eye of the observer is blocked.

In the jig for image stereoscopic vision as mentioned above, it is preferable that said an image transmission control unit has a liquid crystal shutter for left eye use and the liquid crystal shutter for right eye use, which are set before the left eye and the right eye of the observer, respectively, when the observer mounts said jig, and said liquid crystal shutters for left eye use and right eye use are controlled in accordance with the timing signal so as to alternately offer a light transmissive state and a light blocking state.

In the jig for image stereoscopic vision as mentioned above, it is also preferable that said jig comprises a timing signal receiving unit for receiving radio wave or infrared carrying the timing signal.

The use of the interface circuit regarding the stereoscopic projector as mentioned above makes it possible to form an image using the whole pixels of the liquid crystal plate with respect to any image of a plurality of colors (e.g. R, G, B), and thereby forming enhanced color image as compared with the conventional one using the TFT type of liquid crystal plate.

Further, according to the stereoscopic projector of the present invention, there are provided a timing signal generating circuit for generating a timing signal to discriminate a timing wherein a separation image for left eye use is formed on said liquid crystal plate and a timing wherein a separation image for right eye use is formed on said liquid crystal plate; and image transmission control unit disposed between right and left eyes of an observer and said screen for providing based on the timing signal generated in said timing signal generating circuit such a control that in a timing wherein the left eye use separation images are formed on said liquid crystal plate, an image on said screen is transmitted to the left eye of the observer, while an optical path extending to the right eye of the observer is blocked, and in a timing wherein the right eye use separation images are formed on said liquid crystal plate, the image on said screen is transmitted to the right eye of the observer, while an optical path extending to the left eye of the observer is blocked. This feature makes it possible for an observer to visually recognize an image in the form of a three-dimensional image utilizing the after-image phenomenon of eyes.

That is, the present invention utilize the after-image phenomenon of eyes for recognition of both a color image and a three-dimensional image.

Here, when a timing signal generated the stereographic projector is outputted to the exterior, and the timing signal is received by a jig for image stereographic vision, the timing signal is received through infrared or radio wave. This is convenient since there is no need to provide a code.

In the stereographic projector according to the present invention, it is preferable that when a plurality of separation images consisting of a plurality of separation images constituting a frame of color images for left eye use and a plurality of separation images constituting a frame of color images for right eye use is expressed in form of one group, said interface circuit alters a separation image on said liquid crystal plate at a speed of 16 groups per second or more, and causes said light source unit to flash in synchronism with a sequential formation of the separation images onto said liquid crystal plate so as to generate a pulse light having a luminescent time shorter than a time while a one separation image is formed on said liquid crystal plate.

It is known that according to characteristics of the human eyes, when an image is sequentially altered at a speed of 16 frames per second or more, it is recognized as a dynamic image. According to the image reproducing apparatus of the present invention, a frame of images (color image) on each of the right and left are further separated into a plurality of separation images, and thus there is a need to alter an image at higher speed. However, as a standard of the altering speed, when a plurality of separation images constituting total two frames of color images of one frame on each of right and left is expressed in the form of one group, the alteration speed is of 16 frames per second or more. This feature makes it possible to form a dynamic image which is smooth in movement.

Further, the light source unit flash so as to generate a pulse light having a luminescent time shorter than a time while a one separation image is formed on said liquid crystal plate. This feature make it possible to suppress a power dissipation.

In the stereographic projector according to the present invention as mentioned above, it is acceptable that said interface circuit receives a frame of image signals representative of a still color image for left eye use and a frame of image signals representative of still color image for right eye use, and repeatedly forms on said liquid crystal plate a plurality of separation images consisting of a plurality of separation images for left eye use constituting a still color image for left eye use and a plurality of separation images for right eye use constituting a still color image for right eye use.

The present invention is applicable to a stereographic projector for reproducing a three-dimensional still color image.

In the stereographic projector according to the present invention as mentioned above, it is preferable that said stereographic projector further comprises a recording medium driving unit onto which a portable recording medium is detachably loaded for transmitting an image signal from the loaded recording medium to said interface circuit.

An arrangement that a portable recording medium is loaded to obtain an image signal makes it possible to easily take in an image.

In this case, it is acceptable that said recording medium driving unit permits only one recording medium to be loaded at a time, and said recording medium driving unit receives from the loaded one recording medium both an image signal representative of a color image for left eye and an image signal representative of a color image for right eye, and transmits those image signals to said interface circuit. Alternatively it is acceptable that said recording medium driving unit permits two recording media to be loaded at a time, and said recording medium driving unit receives from one of the loaded two recording media an image signal representative of a color image for left eye and from another recording medium an image signal representative of a color image for right eye, and transmits those both image signals to said interface circuit.

In the event that only one recording medium is loaded to take in both images of the right and the left from the loaded recording medium, a single recording medium can be used. Thus it is convenient to handle the recording medium. On the other hand, in the event that two recording media are loaded to obtain the right and left images from the loaded two recording media, respectively, the respective recording media are used on a common basis among recording media used in the usual photography apparatus which are not involved in a three-dimensional image, for example, a digital camera, a video photography apparatus. Thus, it is possible that for example, two digital cameras are used to record the right and left images onto two recording media, respectively, and the two recording media are loaded onto an image reproducing apparatus of type capable of loading two recording media so that a three-dimensional image is reproduced.

In the stereographic projector according to the present invention, it is preferable that said stereographic projector further comprises a receiving unit for receiving radio wave or infrared carrying image information to generate an image signal and to transmit the image signal thus generated to said interface circuit.

In the stereographic projector according to the present invention, it is preferable that said interface circuit has an operating frequency conversion unit receiving an image signal having a first operating frequency different from a second operating frequency for operating said liquid crystal display unit for converting the image signal into an image signal synchronized with the second operating frequency.

In the stereographic projector according to the present invention, it is preferable that said stereographic projector further comprises an image attitude correction means for correcting an attitude of an image so that an image provided by light emitted from said light source unit and transmitted through said liquid crystal plate is observed in form of an erect image.

The image attitude correction means is incorporated into the interface circuit, or alternatively is located before or after the interface circuit. It is acceptable the image attitude correction means is one in which for example, an image inverted with respect to the right and left and an image reversed with respect to the top and bottom are formed on the liquid crystal plate by a signal processing, so that an image attitude is corrected in such a manner that those images are finally observed as an erect image for human eyes. Alternatively, it is acceptable that the image attitude correction means is incorporated into the imaging optical system to optically correct the image attitude.

As a case where a correction of an image attitude is needed, there are considered, for example, a case where an image on a liquid crystal plate is reversed and projected on a screen in accordance with a projection optical system, and a case where an optical system is switched between an optical path for projecting an image on a screen mounted on a cover member and an optical path in which beams of light are transmitted to the exterior and an image is projecting on an external screen, for example, a wall of a room.

In the stereographic projector according to the present invention, it is preferable that said stereographic projector further comprises an audio output device for outputting voice or audio-signal.

Provision of a stereographic projector capable of outputting an image and a voice as well makes it possible to improve an operational efficiency and thereby having various uses.

In the stereographic projector according to the present invention, it is preferable that said stereographic projector further comprises:

a pair of image taking lenses in right and left; and at least one image receiving device for receiving an image formed by said pair of image taking lenses to generate an image signal representative of a color image.

While it may be considered to arrange a stereographic photography apparatus which is not integrated with a stereographic projector, it is so arranged that a stereographic projector has a stereographic photography function. This feature makes it possible to render coordinated movements of photography and reproduction of a three-dimensional image, and thus it is convenient to deal with the apparatus.

As mentioned above, according to the present invention, an image for stereoscopic vision is projected onto a screen, and it is possible to provide a high definition of three-dimensional image for an observer.

Further, according to the present invention, an image is projected onto a screen. Thus, provision of a plurality of jigs for image stereoscopic vision referred to in the present invention for example makes it possible that a plurality of observers simultaneously observe a three-dimensional image.

Furthermore, according to the present invention, provision of a liquid crystal display unit adopting a transmissive matrix drive-type liquid crystal plate, which is improved in compactness, power saving, resolution and responsibility, and an interface circuit suitably driving such a liquid crystal display unit makes it possible to obtain an enhanced image. Further, since this combination makes it possible to implement the enhanced image, it is possible to discriminate and observe not only an image but also fine character information. Furthermore, it is possible to reduce a power dissipation, and thus it is possible to use an image reproducing apparatus in which a battery is a main power source or an image photography and reproducing apparatus without exchange of a battery for a long time.

Still furthermore, according to the present invention, wide choices of an image reproduction optical system may be given, and thus it is possible to obtain a great freedom for selecting a form or type suitable for an object of an image reproducing apparatus or an image photography and reproducing apparatus.

To achieve the above-mentioned objects, the present invention provides a printer comprising:

An exposing liquid crystal display unit having a transmissive liquid crystal panel having a number of pixels arranged on a two-dimensional basis, on which an image is formed, and a light source unit emitting beams of light of a plurality of luminescent colors for irradiating said liquid crystal panel from back;

an interface circuit for separating an entered color image signal to a plurality of color image signals associated with a plurality of luminescent colors of said light source unit, respectively, to sequentially form on said liquid crystal panel a plurality of separation images associated with the plurality of color image signals, said interface circuit causing said light source unit to flash with a luminescent color associated with a separation image formed on said liquid crystal panel in synchronism with a sequential formation of the separation images onto said liquid crystal panel; and an exposing optical system for magnifying and projecting an image formed on said exposing liquid crystal display unit to provide imaging on a sensitive plane of a sensitive material.

According to the above-mentioned printer, it is possible to obtain an enhanced print.

In the printer according to the present invention as mentioned above, it is preferable that said sensitive material is an instant film unit, and said printer has means for developing the instant film unit and discharging the same. This feature makes it possible to obtain a print promptly.

In the printer according to the present invention as mentioned above, it is preferable that said printer has an observing liquid crystal display unit for observing an image, in addition to said exposing liquid crystal display unit. It is acceptable that said observing liquid crystal display unit is of a same type as said exposing liquid crystal display unit, wherein an observation is performed through an observing optical system. Alternatively, it is also acceptable that said observing liquid crystal display unit is of a different type from said exposing liquid crystal display unit, wherein an observation is performed directly or through an observing optical system. It is preferable that said observing liquid crystal display unit is of a different type from said exposing liquid crystal display unit, and is disposed between a pair of pressing members which press an instant film unit to an exposure position. This feature makes it possible to effectively utilize a space of the printer.

In the printer according to the present invention as mentioned above, it is preferable that said observing optical system comprises a magnifying lens for ejecting from an eyepiece window an image magnified from an image formed on the observing liquid crystal display unit. Here, said magnifying lens is a Galilean optical system, or a Keplerian optical system.

In the printer according to the present invention as mentioned above, it is acceptable that two reflective mirrors are disposed between said liquid crystal display unit and the sensitive plane, and an exposing optical path is shaped as a Z-like. Alternatively, it is also acceptable that a reflective mirror is disposed between said liquid crystal display unit and the sensitive plane, and an exposing optical path is shaped as a L-like. This feature makes it possible to contribute to a compactness of the printer.

In the printer according to the present invention as mentioned above, it is preferable that said interface circuit has an operating frequency conversion unit for converting an inputted image signal into an image signal synchronized with an operating frequency of said exposing liquid crystal display unit. This feature makes it possible to prevent a frequency shift for an image.

In the printer according to the present invention as mentioned above, it is preferable that said interface circuit causes said light source unit to flash with a luminescent time shorter than a time for an image associated with the color image signal. This feature makes it possible to obtain an enhanced full color image.

It is preferable that said interface circuit repeatedly forms a frame of color images on said exposing liquid crystal display unit so that a frame of color images is continuously displayed.

It is preferable that said printer further comprises image attitude correction means for correcting attitude of an image displayed on said exposing liquid crystal display unit so that an image formed on the sensitive material is observed in form of an erect image.

The present invention provides a printer comprising:

An liquid crystal display unit having a transmissive liquid crystal panel having a number of pixels arranged on a two-dimensional basis, on which an image is formed, and a light source unit emitting beams of light of a plurality of luminescent colors for irradiating said liquid crystal panel from back;

an interface circuit for separating an entered color image signal to a plurality of color image signals associated with a plurality of luminescent colors of said light source unit, respectively, to sequentially form on said liquid crystal panel a plurality of separation images associated with the plurality of color image signals, said interface circuit causing said light source unit to flash with a luminescent color associated with a separation image formed on said liquid crystal panel in synchronism with a sequential formation of the separation images onto said liquid crystal panel;

optical path switching means for switching between an exposing optical path for transmitting light of said light source unit transmitted through said liquid crystal panel to a sensitive plane of a sensitive material as a recording material and an observing optical path for transmitting light of said light source unit transmitted through said liquid crystal panel to an external observation window;

an exposing optical system for magnifying and projecting an image formed on said liquid crystal display unit to provide imaging on a sensitive plane of a sensitive material; and an observing optical system for magnifying and projecting an image formed on said liquid crystal display unit onto the observation window through an observing optical path.

The above-mentioned printer makes it possible to form an enhanced color image. Further, it is possible to expose on the sensitive material an image displayed on the liquid crystal display unit, and in addition to perform an image observation.

In the printer according to the present invention as mentioned above, it is preferable that said exposing optical system and said observing optical system are commonly used by a single imaging optical system disposed within an optical path in which the exposing optical path and the observing optical path are partially overlapped, and said imaging optical system is translated, operating together a switching operation of said optical path switching means, between a position in which an image formed on said liquid crystal display unit is imaged on the sensitive plane of the sensitive material and a position in which an image formed on said liquid crystal display unit is imaged on an observing screen provided on the observation window. This feature makes it possible to obtain a suitable image focused both at the time of exposure and observation.

In the printer according to the present invention as mentioned above, it is preferable that said observing optical system is disposed within an optical path in which the exposing optical path and the observing optical path are partially overlapped, and at time of exposure onto the sensitive material said exposing optical system and said observing optical system are used to image an image formed on said liquid crystal display unit on the sensitive plane, and at time of projection of the image onto the observation window with magnification only said observing optical system is used. This feature makes it possible to avoid a process of focus for an optical system.

In the printer according to the present invention as mentioned above, it is preferable that said observation window is an eyepiece window which is used for an observation in a state of eyepiece state, and said observing optical system comprises a magnifying lens for ejecting from an eyepiece window an image magnified from an image formed on the observing liquid crystal display unit. This feature makes it possible to simplify an arrangement of an observing optical path. In this case, it is acceptable that said magnifying lens is a Galilean optical system, or a Keplerian optical system.

It is acceptable that two reflective mirrors are disposed between said liquid crystal display unit and the sensitive plane, and an exposing optical path is shaped as a Z-like. Alternatively, it is acceptable that a reflective mirror is disposed between said liquid crystal display unit and the sensitive plane, and an exposing optical path is shaped as a L-like. This feature makes it possible to contribute to a compactness of the printer.

It is acceptable that said optical path switching means comprises a switching reflecting mirror disposed opposing against said liquid crystal display unit and movable a position in which light of said light source unit transmitted through said liquid crystal panel is reflected toward the exposing optical path and a position in which light of said light source unit transmitted through said liquid crystal panel is reflected toward the observing optical path.

It is acceptable that between said liquid crystal display unit and the sensitive plane said switching reflecting mirror and an exposing reflecting mirror are disposed to form a Z-like shaped exposing optical path, and between said liquid crystal display unit and the observation window said switching reflecting mirror and an observing reflecting mirror are disposed to form a L-like shaped observing optical path.

It is acceptable that said sensitive material is an instant film unit, and said printer has means for developing the instant film unit and discharging the same.

It is acceptable that said interface circuit has an operating frequency conversion unit for converting an inputted image signal into an image signal synchronized with an operating frequency of said exposing liquid crystal display unit.

It is acceptable that said interface circuit causes said light source unit to flash with a luminescent time shorter than a time for an image associated with the color image signal.

It is acceptable that said interface circuit repeatedly forms a frame of color images on said exposing liquid crystal display unit so that a frame of color images is continuously displayed.

It is acceptable that said printer further comprises image attitude correction means for correcting attitude of an image displayed on said exposing liquid crystal display unit so that an image formed on the sensitive material is observed in form of an erect image.

It is acceptable that said image attitude correction means operates or stops in operation working together an switching operation of said optical path switching means.

As mentioned above, according to the present invention, a surface exposure is performed by a liquid crystal display unit capable of displaying an enhanced full color image. Thus, it is possible to provide a printer capable of obtaining an enhanced print quickly with a low cost. Further, by optionally altering an exposing optical system, it is possible to readily select among various exposure magnification factors. Furthermore, since the liquid crystal display unit is little in power dissipation, the liquid crystal display unit is readily applicable to a compact and light portable printer. In the event that the liquid crystal display unit is arranged in such a manner that the liquid crystal display unit is used on a common basis both as an exposing use and an image observing use, it is possible to contribute to a low cost and reduction of a power dissipation.

BRIEF DESCRIPTION OF THE DRAWINGS

FIG. 120 is a sectional view of a printer in which a Galilean optical system is used for a magnifying lens.

FIG. 121 is an exploded perspective view of a liquid crystal display unit according to alternative embodiment.

DETAILED DESCRIPTION OF PREFERRED EMBODIMENTS

Recently, instead of a TFT type liquid crystal plate consisting of pixels which are classified into the three primary colors of R, G and B, there is put to practical use a liquid crystal display unit adopting a scheme in which a liquid crystal plate per se has no coloring matter, the whole pixels are used to form an image, and a color of the image is determined by a color of a back light (for example, "Kopin Corporation 695 Myles Standish Blvd. Taunton, MA02780" a trademark SMARTSLIDE etc.).

The present invention has been made in view of the development of the above-mentioned type of liquid crystal display unit.

Embodiments of the present invention will be described with reference to the accompanying drawings.

Figure 1:
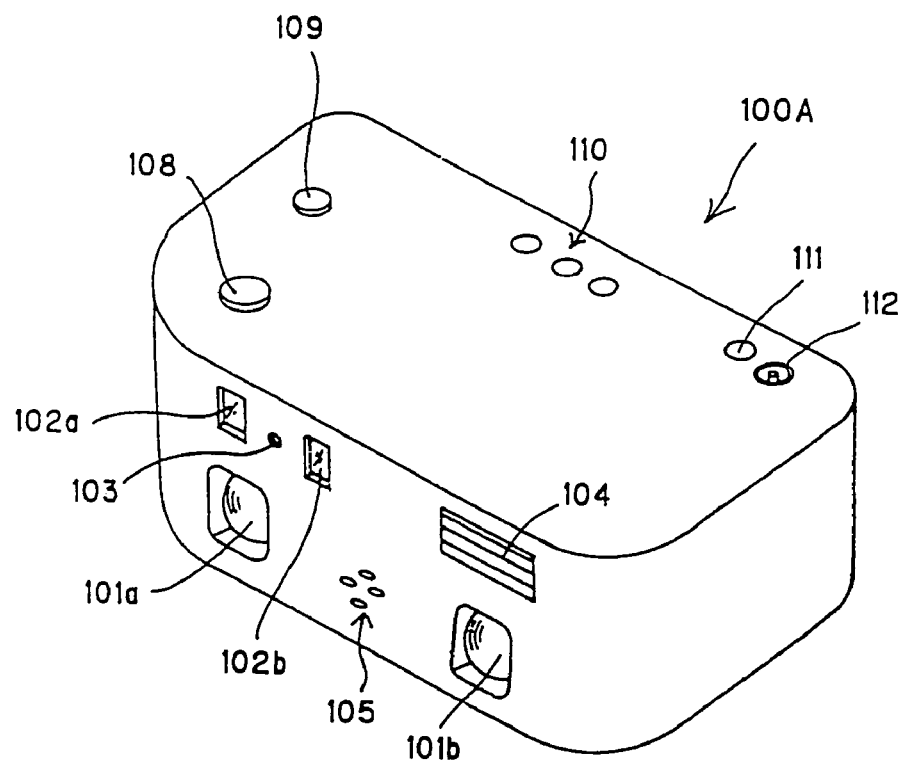
FIG. 1 is a perspective view showing appearance of a first embodiment of an image photography apparatus according to the present invention looking from the front side.
Figure 2:
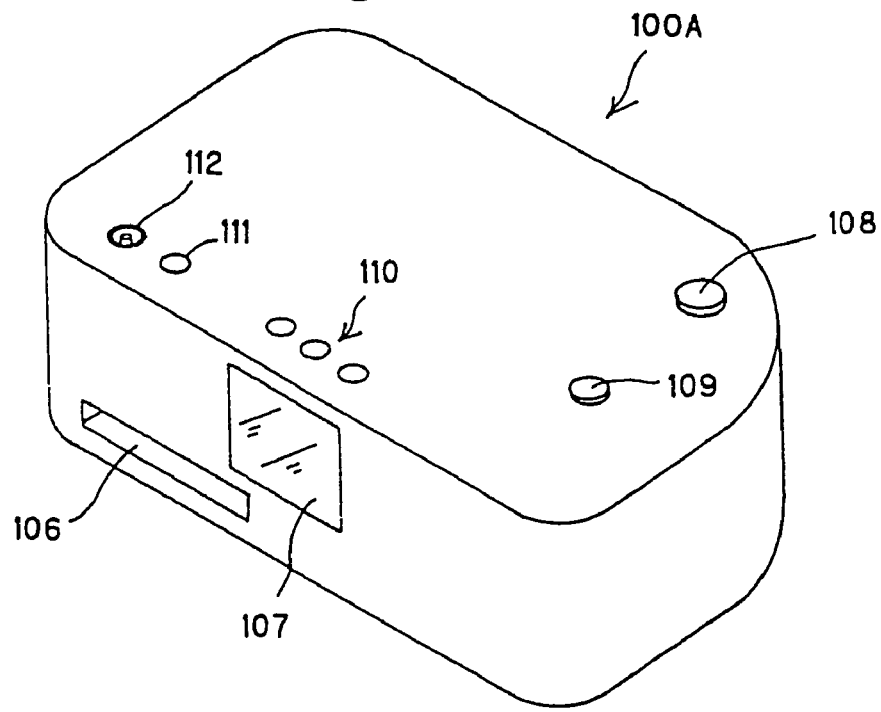
FIG. 2 is a perspective view showing appearance of a first embodiment of an image photography apparatus according to the present invention looking from the back side.
Figure 3:
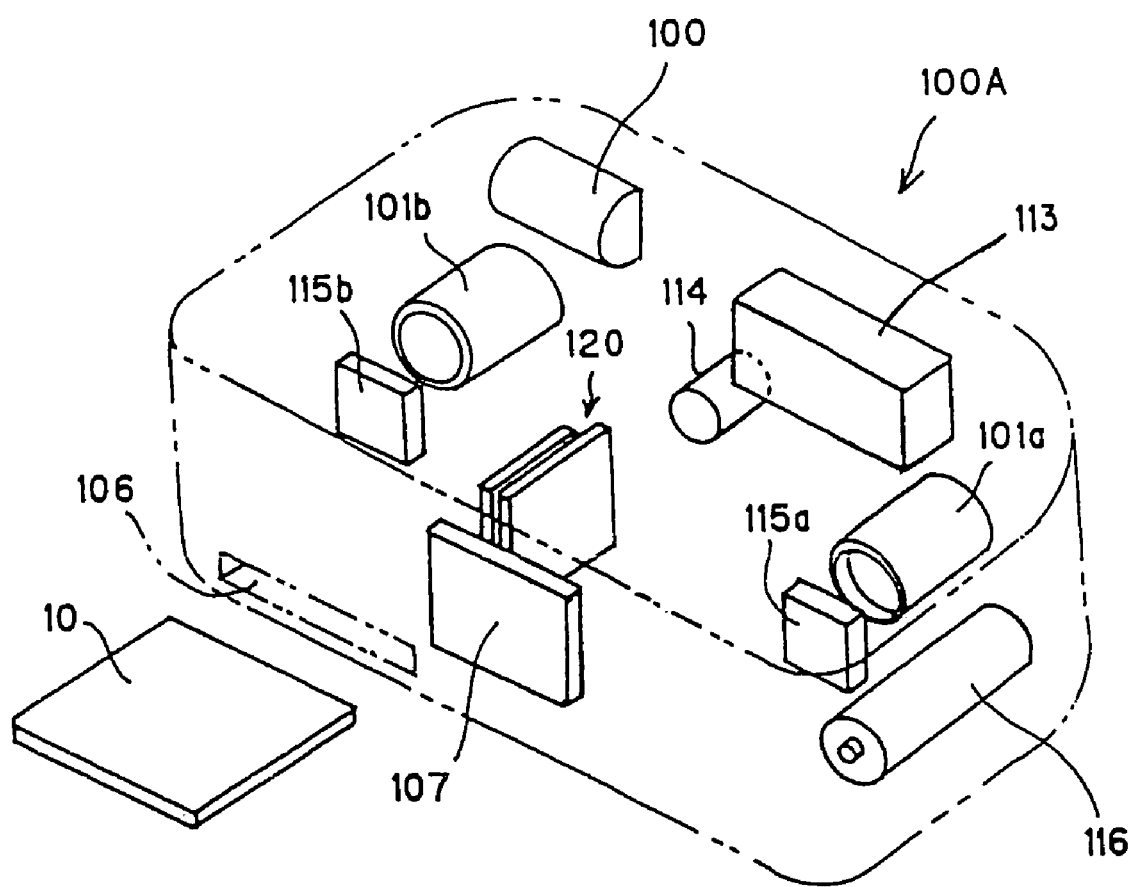
FIG. 3 is a view showing a main internal structure of the first embodiment of the image photography apparatus according to the present invention.
Figure 4:
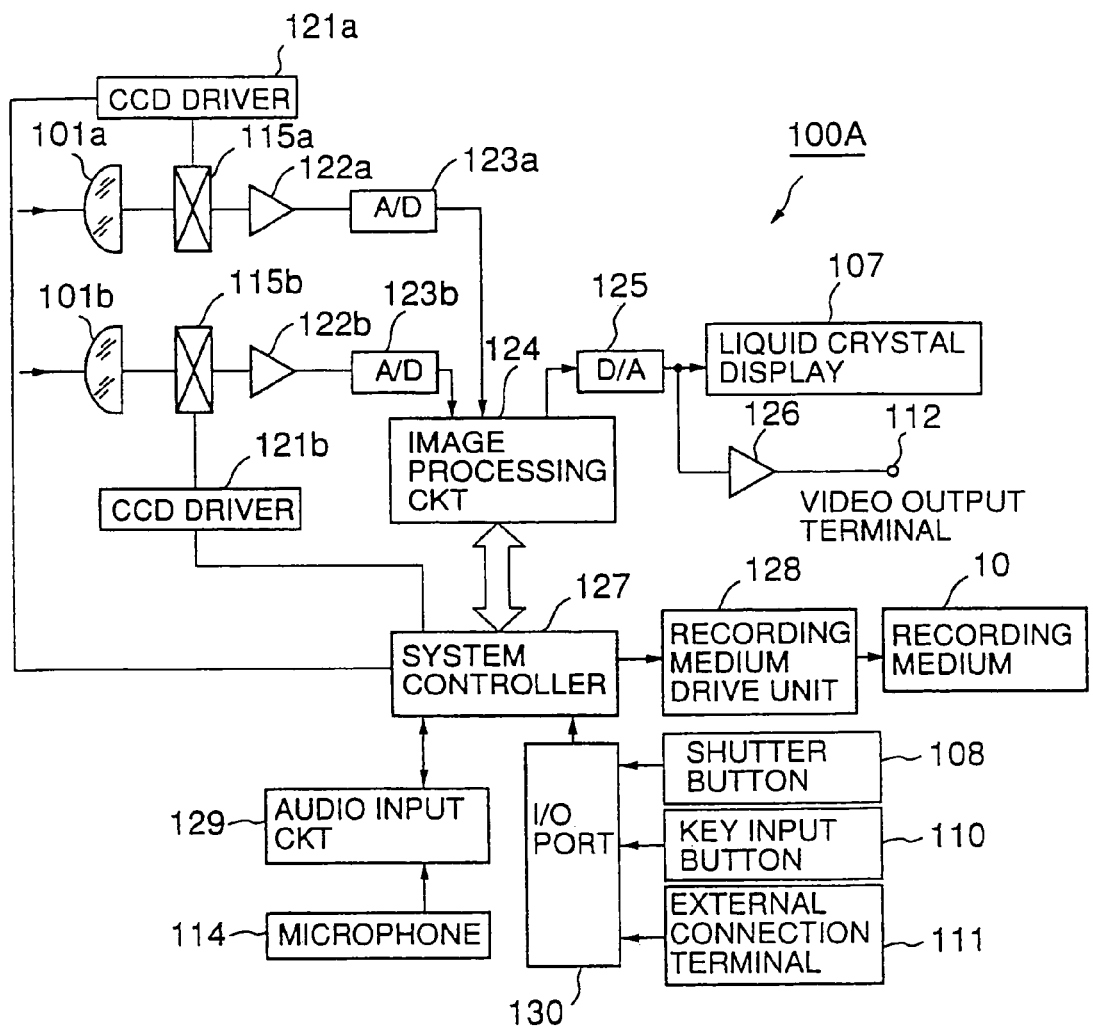
FIG. 4 is a block diagram of a circuit structure of the image photography apparatus shown in FIGS. 1, 2 and 3.

FIG. 1 is a perspective view showing appearance of a first embodiment of an image photography apparatus according to the present invention looking from the front side. FIG. 2 is a perspective view showing appearance of a first embodiment of an image photography apparatus according to the present invention looking from the back side. FIG. 3 is a view showing a main internal structure of the first embodiment of the image photography apparatus according to the present invention. FIG. 3 shows a perspective diagram looking at the same angle as the perspective view of FIG. 2, wherein an outline is shown with a two-dot chain line. FIG. 4 is a block diagram of a circuit structure of the image photography apparatus shown in FIGS. 1, 2 and 3.

An image photography apparatus 100A can be used as a video (dynamic image) photography apparatus and a still (still image) photography apparatus as well through switching by a key operation.

In front of the image photography apparatus 100A, as shown in FIG. 1, there are disposed a pair of image taking lenses 101a and 101b, an AF (Auto Focus) light projecting window 102a and an AF light receiving window 102b for use in a measurement of a distance to a camera subject (not illustrated), an AE window 103 for use in a measurement of a luminance of a camera subject, an electronic flash emitter unit 104, and apertures 105 for picking up voice with an internal microphone.

In back of the image photography apparatus 100A, as shown in FIG. 2, there are disposed a loading opening 106 with which a portable recording medium 10 as shown in FIG. 3 (for example, a floppy disk, a CD-ROM, MD, a flash memory, MO, etc.) is to be loaded, and a liquid crystal display 107. The liquid crystal display 107 is the conventional TFT type liquid crystal display onto which an image of the camera subject is projected while an image quality is not so good. In this case, on the liquid crystal display 107, there may be displayed various types of information such as residual time available for recording (in case of a video photography), the number of frames of a film available for a photography (in case of a still photography), a degree of dissipation of a battery, etc.

Further, on the top of the image photography apparatus 100A, there are disposed a shutter button 108, a power switch 109, a key input button 110, an external connection terminal 111 and a video output terminal 112.

Furthermore, as shown in FIG. 3, inside the image photography apparatus 100A, there are disposed AF and AE unit 113 for focusing and photometry in the internal portion of the AF light projecting window 102a, the AF light receiving window 102b and the AE window 103, and a microphone 114 in the internal portion of the apertures 105. In the back portions of the pair of image taking lenses 101a, 101b, there are disposed CCD image receiving devices 115a and 115b for receiving images formed through the image taking lenses 101a and 101b, respectively. Still furthermore, inside the image photography apparatus 100A, there are disposed circuit blocks 120 comprising various types of circuits for operating the image photography apparatus 100A, and a battery 116. When the power switch 109 turns on, an electric power is supplied from the battery 116 to the circuit blocks 120 and the like. The battery 116 is exchangeable. The circuit blocks 120 comprise various types of circuits which will be described hereinafter in conjunction with FIG. 4.

The CCD image receiving devices 115a and 115b are driven by CCD drivers 121a and 121b shown in FIG. 4 to generate image signals associated with images formed through the image taking lenses 101a and 101b, respectively. The image signals generated in the CCD image receiving devices 115a and 115b are amplified by amplifiers 122a and 122b, and then converted into digital image signals by A/D converters 123a and 123b, respectively. The digital image signals thus converted are fed to an image processing circuit 124. The image processing circuit 124 performs for example, a gray level processing and a filtering processing. One of the image signals subjected to the image processing in the image processing circuit 124 is fed to a D/A converter 125 to be converted into an analog signal. The analog signal thus converted is displayed on a liquid crystal display unit 107, or alternatively outputted via a buffer amplifier 126 from a video output terminal 112. The video output terminal 112 is connected, for example, to a video terminal of a television (not illustrated) so that an image may be displayed on the television. Another of the image signals derived from the image processing circuit 124 is fed to a system controller 127 and then a recording medium driving unit 128 so that image information associated with the image signal is stored in the recording medium 10.

As mentioned above, the image photography apparatus 100A is so arranged that a photographing mode is selectable between the video photography and the still photography in accordance with a button operation of the key input button 110. In the event that the video photography is performed, a recording of image information onto the recording medium 10 is continued while a shutter button 108 is depressed. In the event that the still photography is performed, whenever the shutter button 108 is depressed, total two frames of image information as to right and left frames of images obtained through the CCD image receiving devices 115a and 115b of right and left are recorded on the recording medium 10. In the event that the video photography is performed, in order to obtain a dynamic image smooth in a movement, an image is received in the form of three-dimensional image at speed higher than 1/16 sec per frame (two frames in a case where each of images obtained through the CCD image receiving devices 115a and 115b of right and left is counted as a frame of image) to be recorded on the recording medium 10.

In the event that image information is recorded onto the recording medium 10, it is acceptable that an audio signal picked up by the microphone 114 is converted into a digital audio signal by an audio input circuit 129, and then transmitted to the system controller 127 so that the audio information is stored in the recording medium 10 together with the image information.

As another transmission path of an image signal outputted from the image processing circuit 124, there is a route in which the image signal is transmitted to the system controller 127, and then outputted from an external connection terminal 111 via an I/O port 130 to the exterior. The external connection terminal 111 is connected, for example, to a personal computer (not illustrated) so that an image can be transmitted to the personal computer. This is a similar as to the matter of the audio signal picked up by the microphone 114. That is, it is possible to output from the external connection terminal 111 the audio signal together with the image signal.

Further, it is possible to receive from the external connection terminal 111 the audio signal and the image signal. Specifically, it is possible to receive an image signal and an audio signal transmitted, for example, from the personal computer connected to the external connection terminal 111, record the same on the recording medium 10 via the I/O port 130, the system controller 127 and the recording medium driving unit 128, and transmit the associated image signal to the image processing circuit 124 so that an image is displayed on the liquid crystal display 107 in accordance with the image signal. A flow of the above-mentioned image signal and audio signal is controlled by the system controller 127 upon receipt of an instruction through the button operation of the key input button 110.

Figure 5:
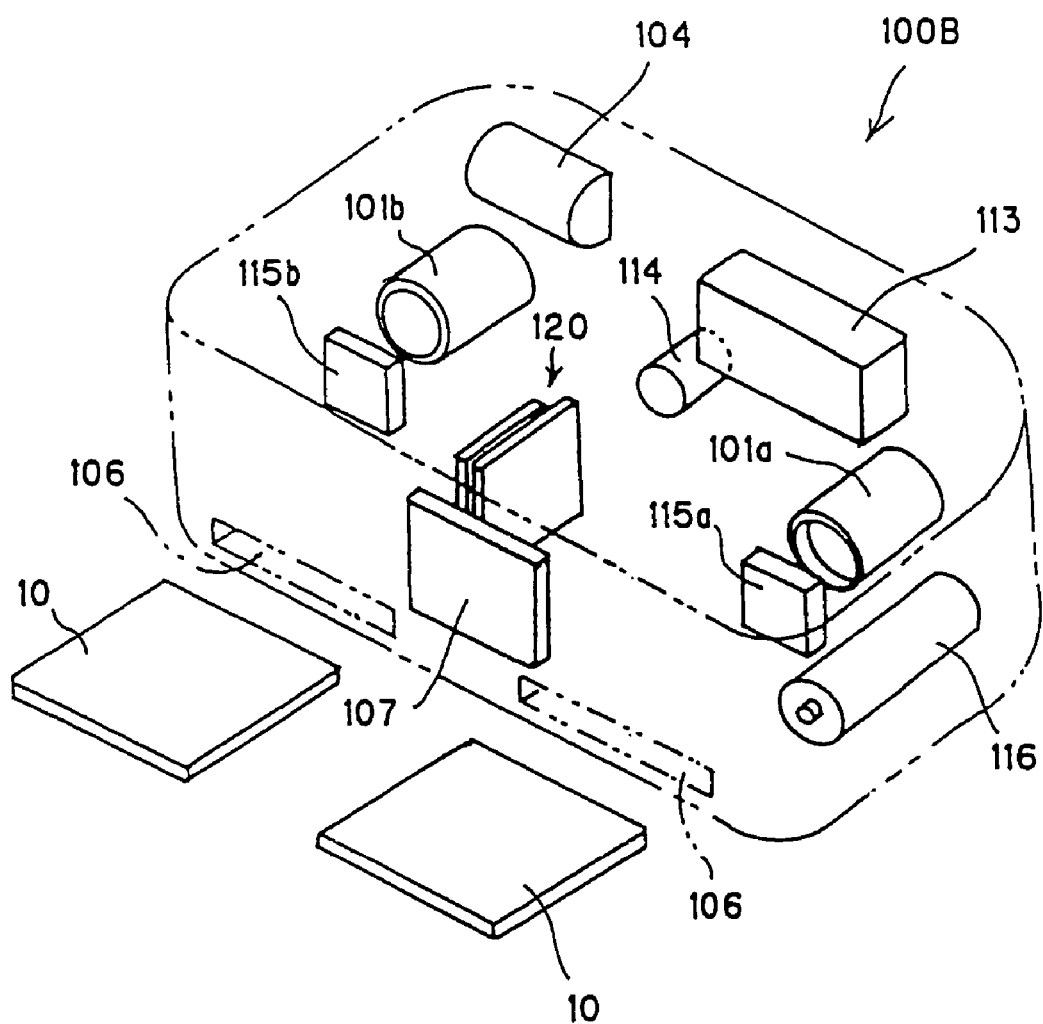
FIG. 5 is a perspective diagram view of a second embodiment of an image photography apparatus according to the present invention.
Figure 6:
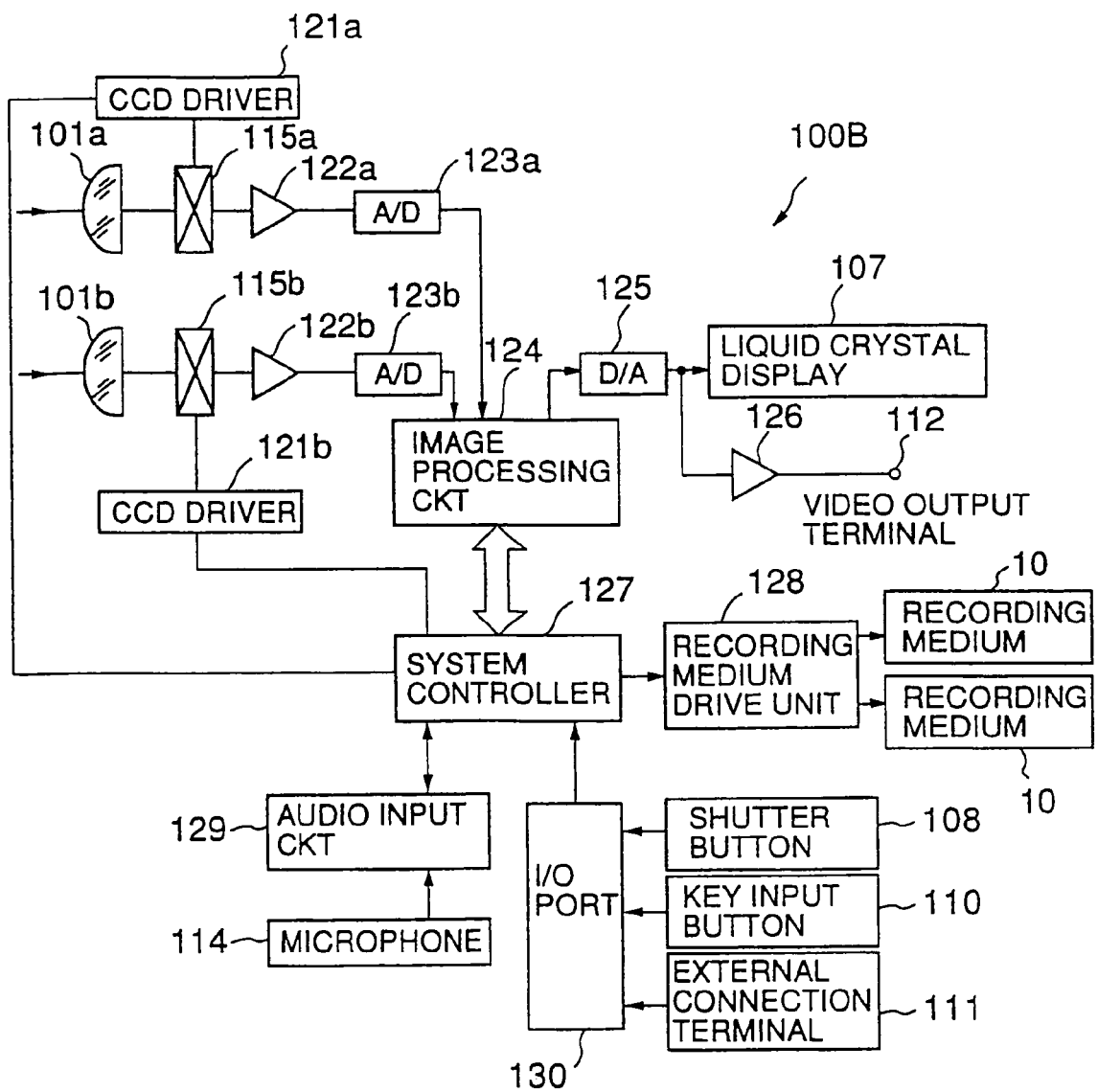
FIG. 6 is a block diagram of a circuit structure of the image photography apparatus shown in FIG. 5.

FIG. 5 is a perspective diagram view of a second embodiment of an image photography apparatus according to the present invention. FIG. 6 is a block diagram of a circuit structure of the image photography apparatus shown in FIG. 5. Hereinafter, there will be described a different point from the first embodiment shown in FIGS. 1-4.

In back of the image photography apparatus 100B, as shown in FIG. 5, there are disposed two loading openings 106 with each of which the portable recording medium 10 as shown in FIG. 3 is to be loaded. On the loaded two recording media 10, there are recorded pieces of image information associated with the image signals obtained by the CCD image receiving devices 115a and 115b, respectively. That is, image information associated with the image signal related to the right eye is recorded onto one of the recording media, and image information associated with the image signal related to the left eye is recorded onto another recording medium. This is a similar as to the matter of image signals received via the external connection terminal 111. Both the image signal related to the right eye and the image signal related to the left eye are received, and pieces of image information as to the image signal related to the right eye and the image signal related to the left eye are separately recorded on the associated recording media, respectively.

With respect to the two recording media 10 to be loaded, they are standardized in a recording format also among recording media onto which images are recorded in the photography apparatuses for the usual video image or the usual still image, other than the photography apparatus for the three-dimensional image, such as the image photography apparatus 100B as shown in FIGS. 5 and 6, and thus it is possible to reproduce images by loading the recording media onto which images are recorded through photograph by the image photography apparatus 100B onto the usual video reproducing apparatus or the usual still image reproducing apparatus.

Figure 7:
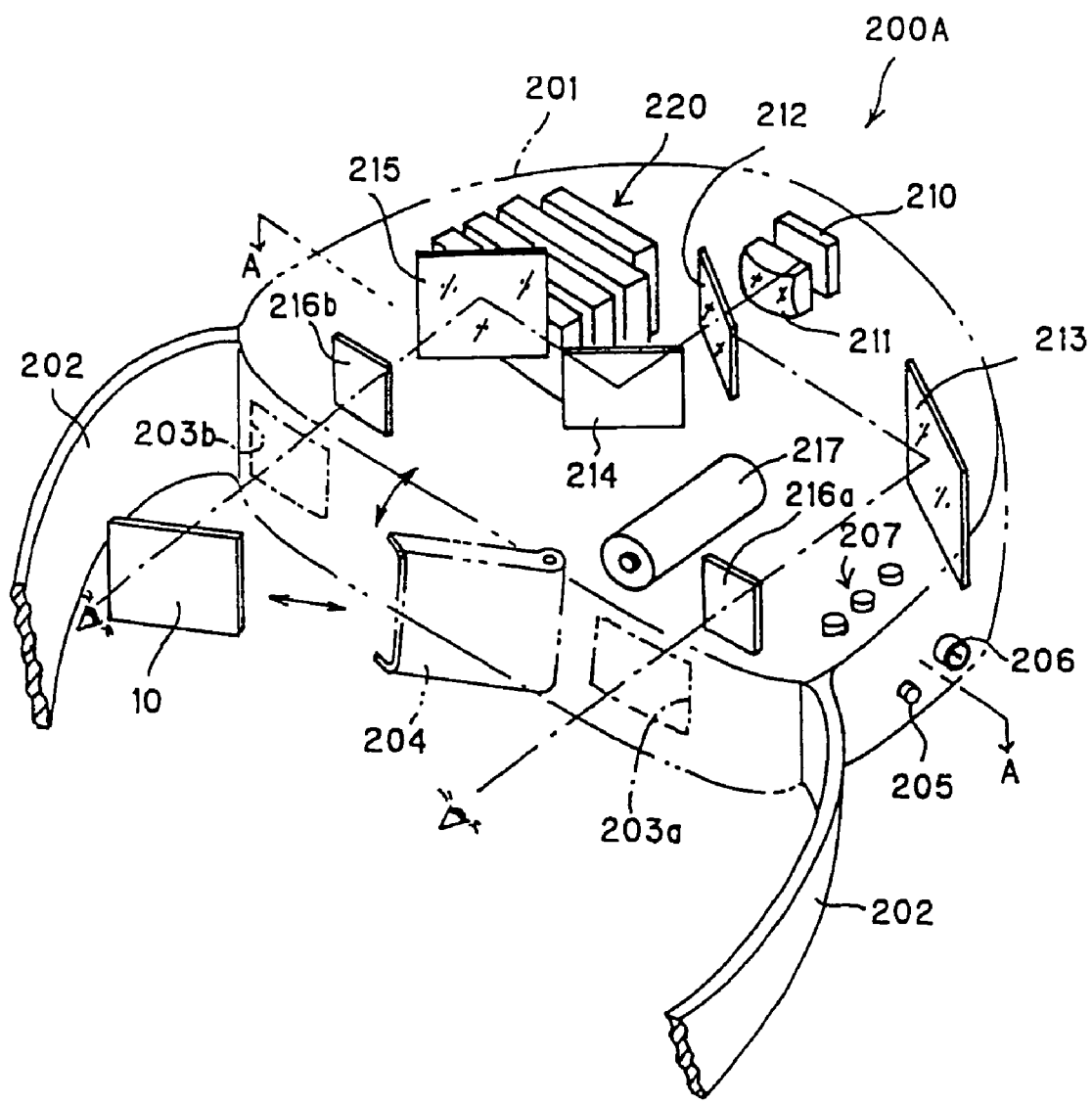
FIG. 7 is a view showing a main internal structure of an image reproducing apparatus according to the present invention.
Figure 8:
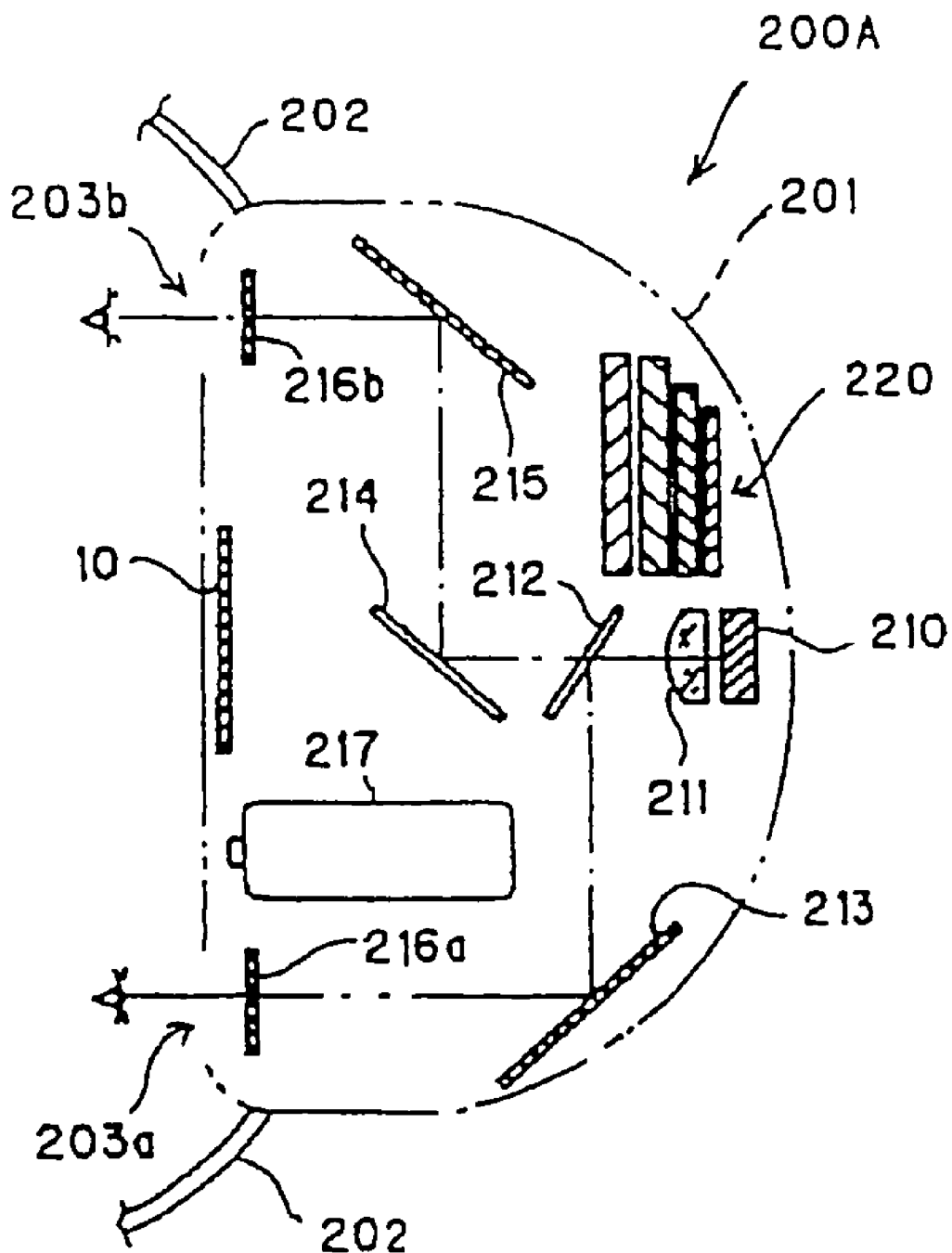
FIG. 8 is a sectional view taken along the line A-A of FIG. 7.
Figure 9:
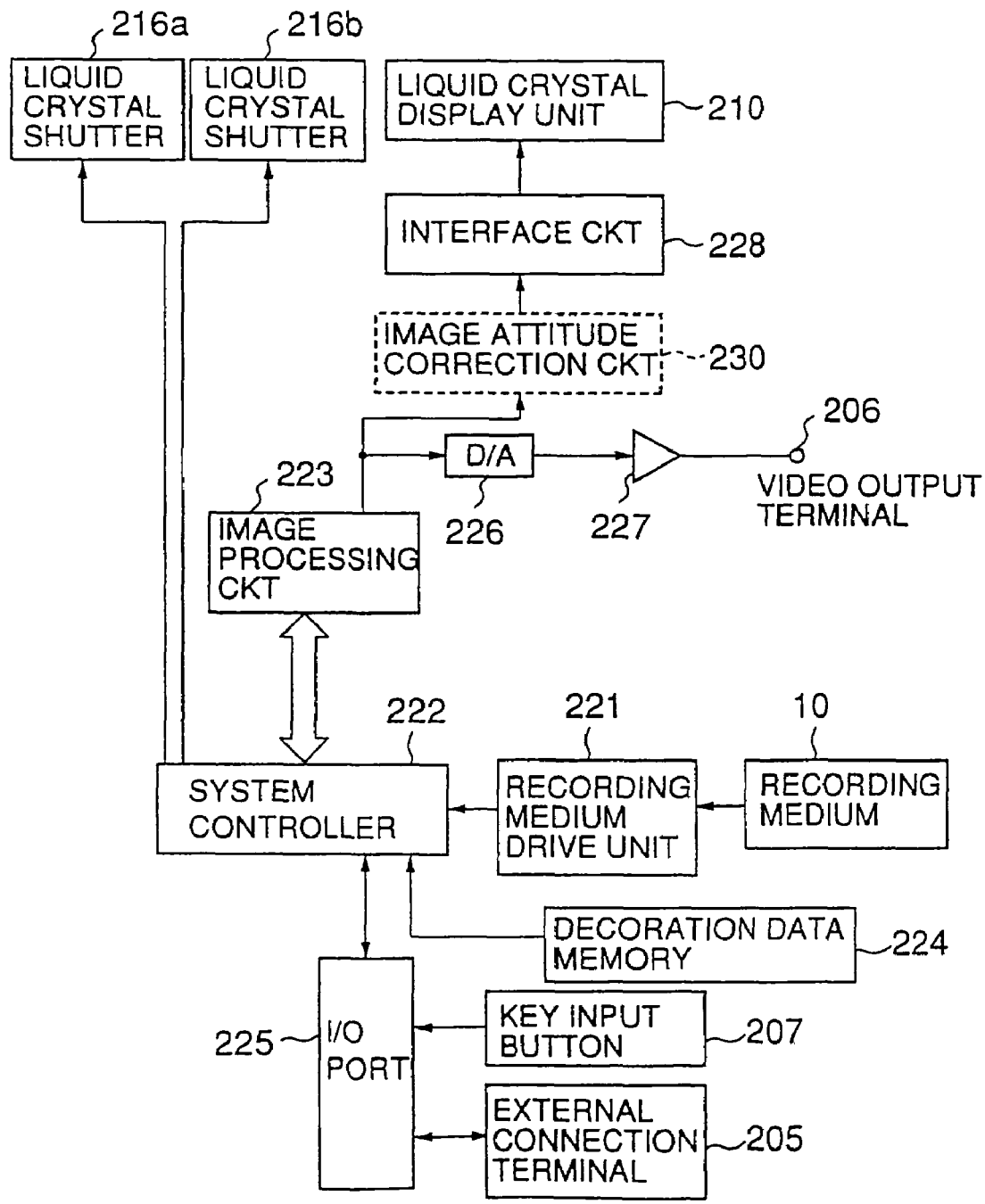
FIG. 9 is a block diagram of a circuit structure of the image reproducing apparatus shown in FIGS. 7 and 8.

FIG. 7 is a view showing a main internal structure of an image reproducing apparatus according to the present invention. FIG. 8 is a sectional view taken along the line A-A of FIG. 7. In FIG. 7, the outline of the cover member is depicted with a two-dot chain line. FIG. 9 is a block diagram of a circuit structure of the image reproducing apparatus shown in FIGS. 7 and 8.

According to an image reproducing apparatus 200A, a belt 202 for fixing the image reproducing apparatus 200A on the head of the human body is mounted on a cover member 201. The belt 202 is loaded on the head in such a manner that a person looks through a pair of eyepiece windows 203a and 203b.

On the cover member 201 of the image reproducing apparatus 200A, there are disposed a recording medium loading chamber cover 204 for loading a portable recording medium 10 (for example, a floppy disk, a CD-ROM, an MD, a flash memory, an MO, etc.), an external connecting terminal 205, a video output terminal 206, and a key input button 107. Inside the cover member 201, there are disposed a liquid crystal display unit 210, a magnifying lens 211, a half mirror 212, three reflecting mirrors 213, 214 and 215, a pair of liquid crystal shutters 216a and 216b, a battery 217 and circuit blocks 220. The battery 217 is for supplying power to the circuit blocks 220, and is exchangeable. The circuit blocks 220 comprise various circuits as shown in FIG. 9 which will be described later.

While the structure of the liquid crystal display unit 210 will be described, the liquid crystal display unit 210 emits a beam of light carrying image information. The beam of light emitted from the liquid crystal display unit 210 passes through the magnifying lens 211 and is split by the half mirror 212. The beam reflected by the half mirror 212 is reflected by the reflecting mirror 213 and reaches the eyepiece window 203a passing through the liquid crystal shutter 216a, and finally be incident onto the right eye.

On the other hand, the beam transmitted through the half mirror 212 is reflected by the reflecting mirror 214 and then reflected by the reflecting mirror 215, and reaches the eyepiece window 203b passing through the liquid crystal shutter 216b, and finally be incident onto the left eye.

According to the present embodiment, as to the right eye, an optical path is turned by the half mirror 212 and the reflecting mirror 213, and as to the left eye, an optical path is turned by the two reflecting mirrors 214 and 215. Thus, by forming the erect image on a liquid crystal plate 2101 (cf. FIGS. 11 to 14), it is possible for an observer to observe the image in the form of erect image.

Next, there will be described a circuit structure shown in FIG. 9.

On the portable type of recording medium 10 shown in FIGS. 7 and 8, there is recorded image information representative of a color image associated with the both eyes. The image information is read in the form of electric image signal from the recording medium 10 by a recording medium driving unit 221. The image information read in the form of electric image signal is transmitted via a system controller 222 to an image processing circuit 223. The system controller 222 controls a flow of signals to be transmitted inside the image reproducing apparatus and an operating timing of the respective units of the image reproducing apparatus.

The image processing circuit 223 generates a synthetic image by synthesizing and editing an image signal obtained from the recording medium 10 and image signals entered through several image input means which will be described hereinafter.

A decoration data memory 224 stores therein beforehand image information for decorating an image, for example, image information as to various types of characters and various types of patterns (templates). From the decoration data memory 224, characters, templates and the like are read in the form of an electric image signal, and the electric image signal thus read is transmitted via the system controller 222 to the image processing circuit 223.

The key input button 207, which is also shown in FIG. 7, is for inputting various types of instruction and data to the image reproducing apparatus through a button operation. The key input button 207 is connected to the system controller 222 via an I/O port 225 for mediating various types of data entered from the exterior. An operation of the key input button 207 determines entry of the image information. It is possible to input through the key input button 207 a character message and the like to be superimposed on an image. When a character message is inputted through the key input button 207, a signal representative of the character message is also inputted to the image processing circuit 223, so that it is compounded as a part of an image. Here, it is assumed that the signal representative of the character message is also included in the image signal without distinction from other image signal.

The external connecting terminal 205 is a terminal for connecting to, for example, a personal computer, so that various types of instruction and images can be entered from the personal computer side. The external connecting terminal 205 is also connected via the I/O port 225 to the system controller 222. The image signal, which has been subjected to composition and edition in the image processing circuit 223 as the need arises, is converted into an analog image signal by a D/A converter 226, in one of the processes, and then outputted to the exterior via a buffer amplifier 227 and the video output terminal 206 which is shown in FIG. 7, too. The video output terminal 206 may be connected with, for example, a video terminal of a television, so that an image is displayed on a screen of the television. In this case, only image signal for either one of the right eye use and the left eye use is outputted.

As another process for the image signal outputted from the image processing circuit 223, there exists a path, which is inherent in the present invention, passing through an interface 228, wherein an image is formed on a liquid crystal plate 2101 (cf. FIG. 11 to FIG. 14) of the liquid crystal display unit 210 and a three-dimensional image is provided for an observer who looks through the eyepiece windows. The image reproducing apparatus provides such a control that in a timing wherein an image for the left eye is formed on the liquid crystal plate 2101, the liquid crystal shutter 216b for the left eye is opened, while the liquid crystal shutter 216a for the right eye is closed, and in a timing wherein an image for the right eye is formed on the liquid crystal plate 2101, the liquid crystal shutter 216a for the right eye is opened, while the liquid crystal shutter 216b for the left eye is closed. Details will be described later.

According to the present embodiment, an image attitude correction circuit 230 is provided between the image processing circuit 223 and the interface 228. The image attitude correction circuit 230 has a function of converting an image signal transmitted from the signal processing circuit 223 to an image signal representative of an image which is reversed in right and left, top and bottom.

It is noted, however, that the image attitude correction circuit 230 is shown in FIG. 9 for the purpose of an explanation of an alternative embodiment which will be described later. According to the first embodiment shown in FIGS. 7 and 8, when an erect image is formed on the liquid crystal plate, an image may be observed for an observer in the form of erect image. Thus, in case of the first embodiment shown in FIGS. 7 and 8, there is no need to provide the image attitude correction circuit 230.

Figure 10:
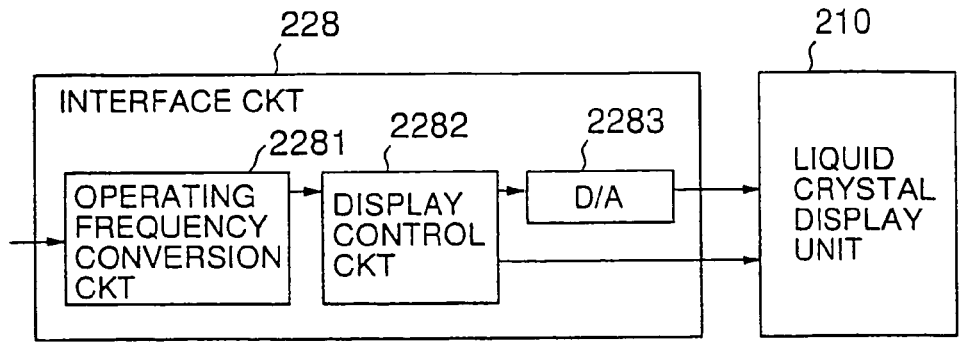
FIG. 10 is a circuit block diagram of an internal structure of an interface circuit.

FIG. 10 is a circuit block diagram of an internal structure of the interface circuit 228.

The interface circuit 228 comprises an operating frequency conversion circuit 2281, a display control circuit 2282 and a D/A converter 2283. Details will be described later.

Figure 11:
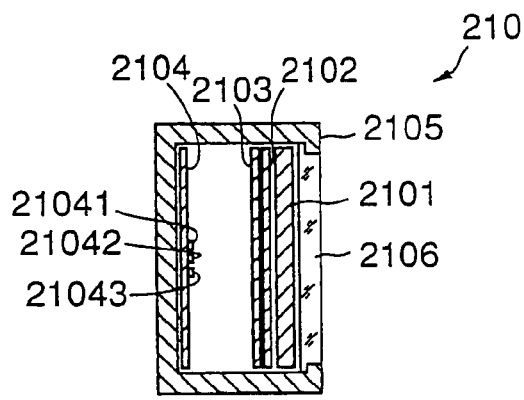
FIG. 11 is a sectional view of a liquid crystal display unit according to one embodiment.
Figure 12:
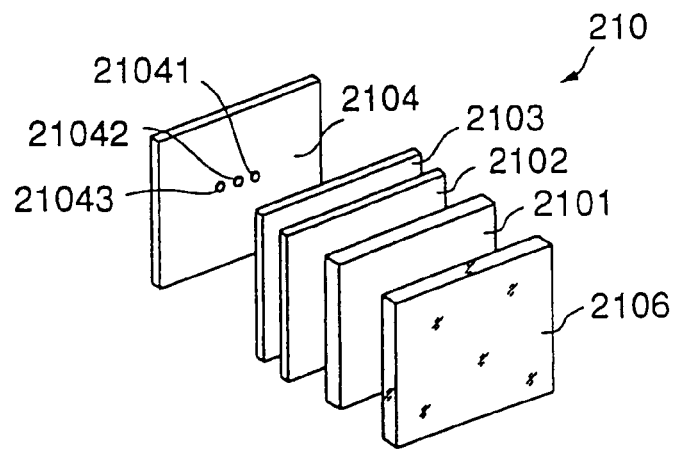
FIG. 12 is an exploded perspective view of a liquid crystal display unit according to one embodiment.

FIG. 11 is a sectional view of a liquid crystal display unit according to one embodiment. FIG. 12 is an exploded perspective view of the liquid crystal display unit according to one embodiment. It is noted that in FIG. 12 there is shown no cover member.

The liquid crystal display unit 210 comprises a transmissive matrix drive-type liquid crystal plate 2101, a diffusing plate 2102, a light amplifying plate 2103, and a circuit substrate 2104, which are arranged in the named order inside a cover member 2105. A transparent protection cover 2106 is fixed at the front of the liquid crystal plate 2101. On the circuit substrate 2104, there are mounted LED's 21041, 21042 and 21043 which emit beams of light of red (R), green(G) and blue(B), respectively.

On the liquid crystal plate 2101, a number of pixels (for example, length 240 pixels×breadth 320 pixels=total 76,800 pixels) are arranged on a two-dimensional basis. The crystal plate 2101 is not involved in color elements red (R), green(G) and blue(B) per se. Temporarily, the whole pixels of the liquid crystal plate 2101 are used to form one image. And, a beam of light, which transmits through the crystal plate 2101 and the protection cover 1106 as well, according as any of three LED's 21041, 21042 and 21043 is turned on, offers an image of the associated color.

Figure 13:
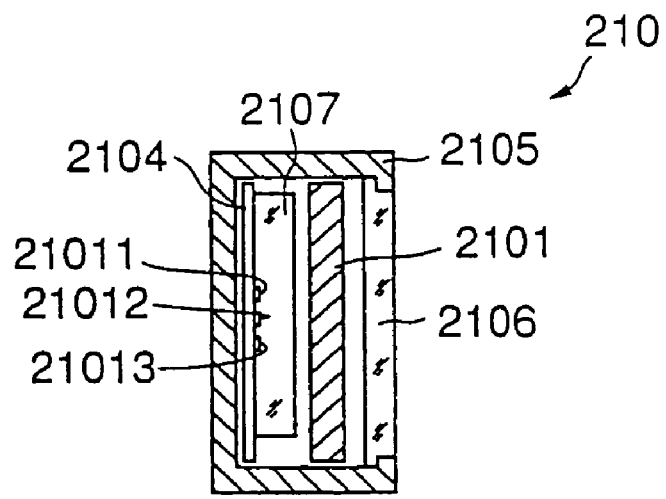
FIG. 13 is a sectional view of a liquid crystal display unit according to an alternative embodiment.
Figure 14:
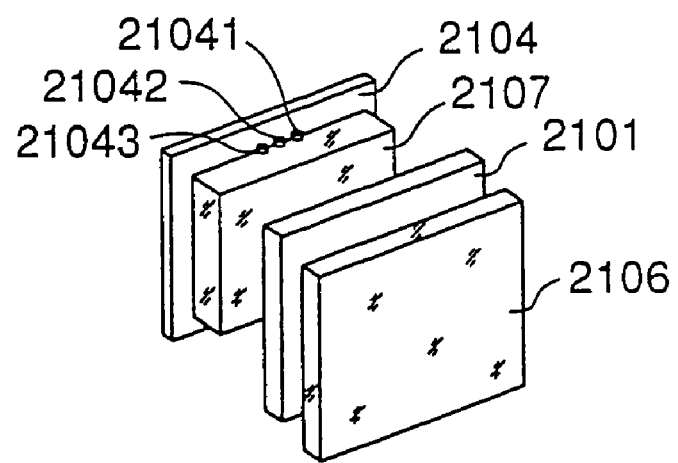
FIG. 14 is an exploded perspective view of a liquid crystal display unit according to an alternative embodiment excepting a cover member.

FIG. 13 is a sectional view of a liquid crystal display unit according to an alternative embodiment. FIG. 14 is an exploded perspective view of a liquid crystal display unit according to an alternative embodiment excepting a cover member.

Inside a cover member 2105 in the front of which a transparent protection cover 2106 is fixed, there are arranged a liquid crystal plate 2101 which is the same type of liquid crystal plate shown in the liquid crystal display unit shown in FIGS. 11 and 12, a diffusing plate 2107, and a circuit substrate 2104 on which LED's 21041, 21042 and 21043 for three colors R, G and R are mounted. The mounting positions of the LED's 21041, 21042 and 21043 on the circuit substrate 2104 are different from those of the LED's on the circuit substrate of the liquid crystal display unit shown in FIGS. 11 and 12. As shown in FIG. 14, the LED's 21041, 21042 and 21043 are mounted on the upper edge of the circuit substrate 2104 in a direction to illuminate the diffusing plate 2107.

When any one of the LED's 21041, 21042 and 21043 turns on, the emitted light is temporarily incident onto the diffusing plate 2107, and then evenly diffused within the diffusing plate 2107 to irradiate the liquid crystal plate 2101 from the back.

It is acceptable that the liquid crystal display unit 210 shown in FIGS. 7, 8 and 9 in the form of a block has a structure as shown in FIGS. 13 and 14.

Figure 15:
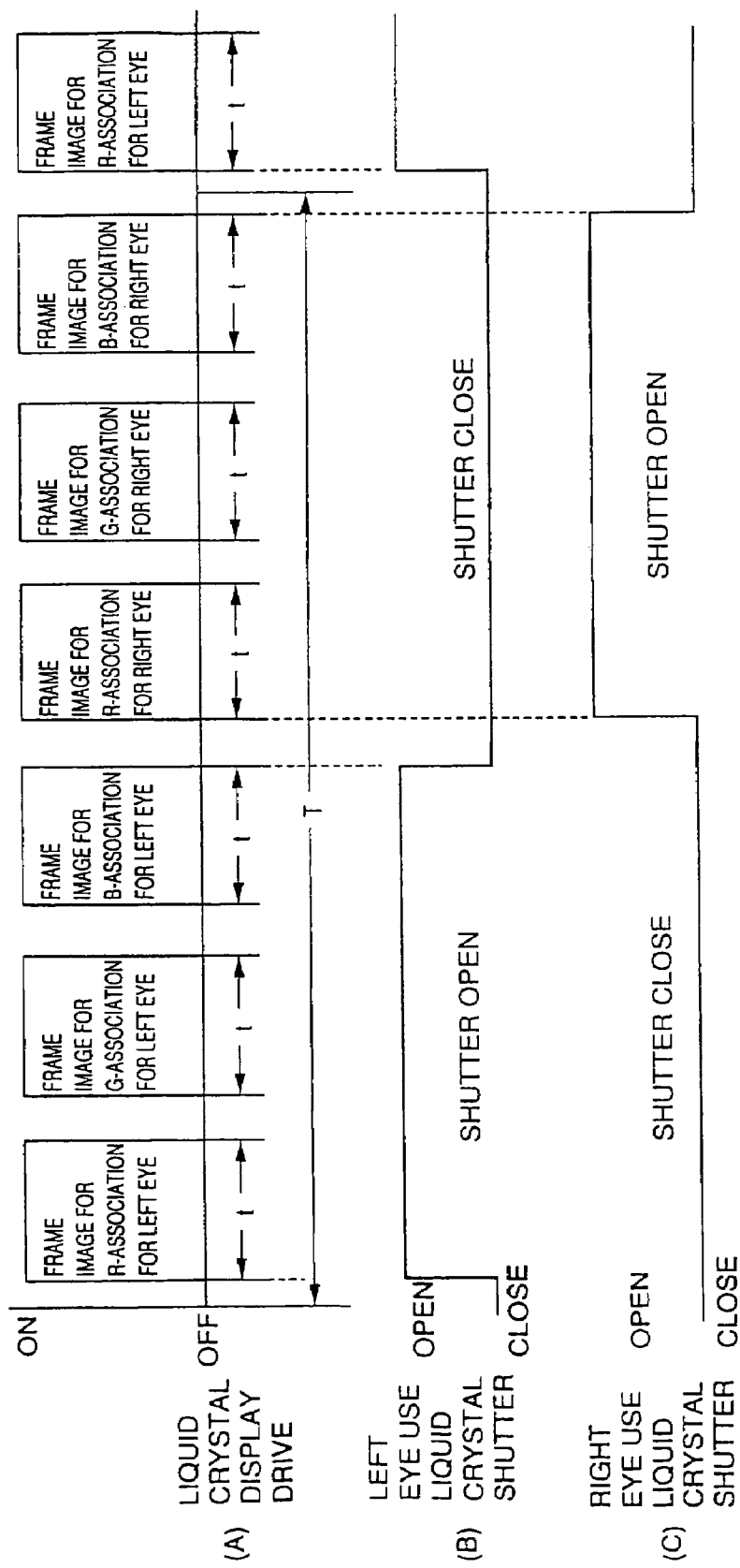
FIG. 15 is a time chart for an example of a sequence for forming an image on a liquid crystal plate constituting a liquid crystal display unit.

FIG. 15 is a time chart for an example of a sequence for forming an image on the liquid crystal plate 2101 constituting the liquid crystal display unit 210.

Part (A) of FIG. 15 shows a timing for an image formation on the liquid crystal plate 2101, and parts (B) and (C) of FIG. 15 show, respectively, open and close timings of left eye use liquid crystal shutter 216b and right eye use liquid crystal shutter 216a. The display control circuit 2102 of the interface circuit 210 shown in FIG. 10 performs an image formation on the liquid crystal plate 2101. The system controller 222 shown in FIG. 9 generates timing signals for open and close timing of left eye use liquid crystal shutter 216a and right eye use liquid crystal shutter 216b.

Here, a color image as to each of left eye and right eye is separated into frame images, which are associated with colors of R, G and B, respectively, and as shown in FIG. 15, on a time division basis, on the liquid crystal plate 2101, first, a frame image associated with color of R for the left eye is formed, secondly, a frame image associated with color of G for the left eye is formed, thirdly, a frame image associated with color of B for the left eye is formed, and then frame images for the right eye are formed in a similar fashion to that of the left eye as mentioned above. Those processes are alternately repeated.

While FIG. 15 fails to illustrate it, regardless of the left eye use or the right eye use, there is provided such a control that in synchronism with the formation of the respective frame images onto the liquid crystal plate, the LED 21041 for color R pulse-turns on in a timing wherein the frame image for R-association is formed, the LED 21042 for color G pulse-turns on in a timing wherein the frame image for G-association is formed, and the LED 21043 for color B pulse-turns on in a timing wherein the frame image for B-association is formed. Thus, the liquid crystal display unit 210 may sequentially emit light beams of colors R, G, B, R, G, . . . carrying image information on a time division basis.

On the other hand, with respect to the left eye use liquid crystal shutter 216b and the right eye use liquid crystal shutter 216a, regardless of any color of frame image of R, G, B, as shown in parts (B) and (C) of FIG. 15, there is provided such a control that in a timing that a frame image for left eye is formed on the liquid crystal plate 2101, the left eye use liquid crystal shutter 201 offers an open state (a state that the liquid crystal shutter is transmittable in light) and the right eye use liquid crystal shutter 216a offers a close state (a state that the liquid crystal shutter shuts off light), and in a similar fashion to that of the above, in a timing that a frame image for right eye is formed on the liquid crystal plate 2101, the right eye use liquid crystal shutter 216a offers an open state and the left eye use liquid crystal shutter 216b offers a close state.

Thus, images of colors R, G, B are sequentially incident onto the right eye and the left eye alternately, so that a color image is formed on both the eyes of an observer owing to the after-image phenomenon. Further, since an image incident onto the left eye and an image incident onto the right eye are independent of one another, preparation of only images, which are different by the correspondence of parallax between the right eye and left eye, makes it possible for the observer to recognize a three-dimensional color image.

Assuming that a total six frame images of three frame images of colors R, G, B constituting a frame of color image for the left eye and three frame images of colors R, G, B constituting a frame of color image for the right eye are expressed in the form of one group, a period T (cf. FIG. 15) of time in which six frame images constituting the one group are formed on the liquid crystal plate 2101 is set up to be not more than $\frac{1}{16}$ sec. The reason why this is to do so is that an establishment of the longer period than $\frac{1}{16}$ sec causes a person's eye to recognize intermission of light and flicker, and thus in case of a dynamic image a smooth movement of the image is hindered.

The pulse width of each of the light emitting pulses of the LED's 21041, 21042 and 21043 for colors R, G and R is shorter than a time t during which each of the frame images for colors R, G and R is formed on the liquid crystal plate 2101. It is also preferable to use a further shorter pulse width within a range permitted in view of for example luminance of an image arriving at a person's eye. This makes it possible to reduce a power dissipation, and particularly, it is more preferable for a stereographic projector which incorporates a battery therein.

Figure 16:
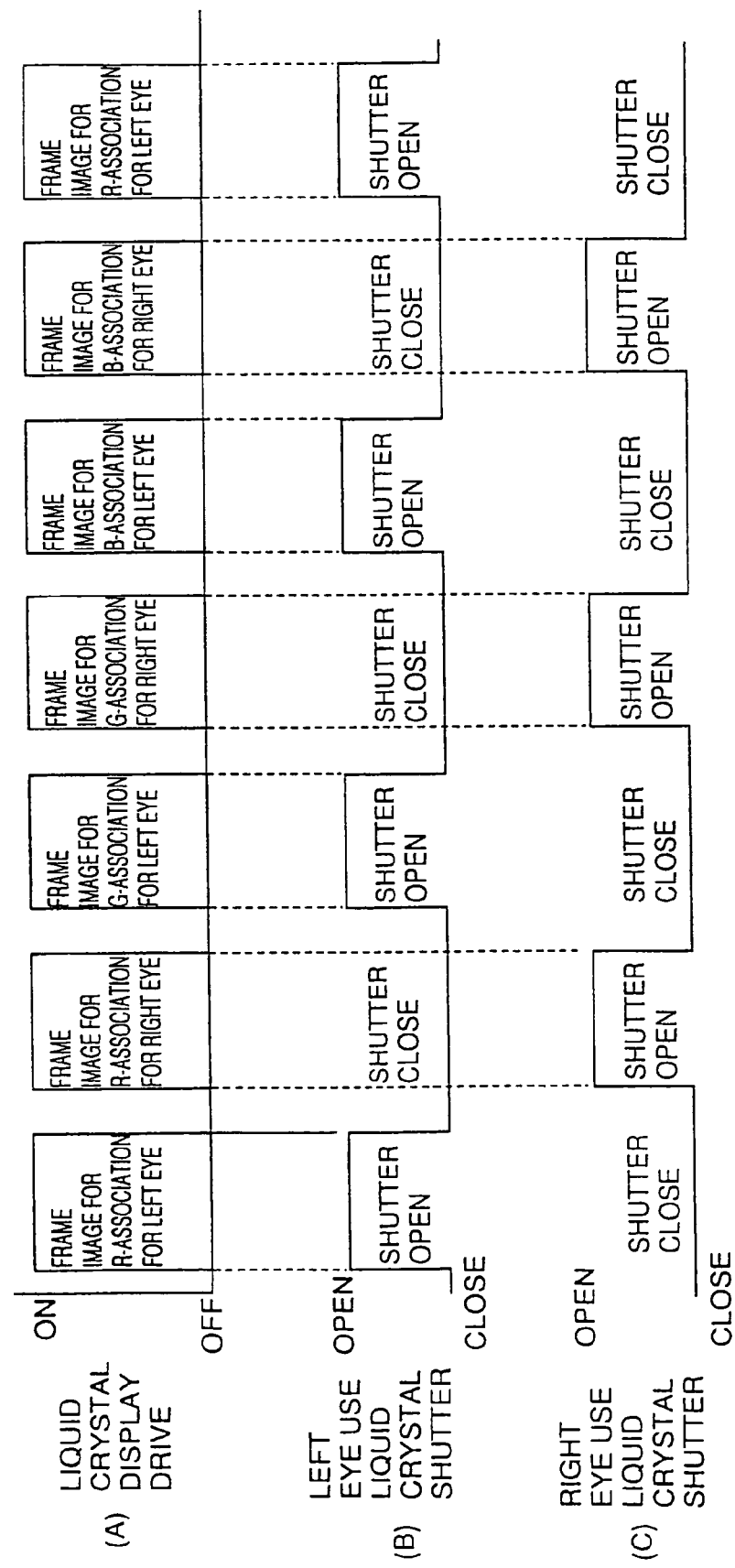
FIG. 16 is a time chart for an alternative example of a sequence for forming an image on a liquid crystal plate constituting a liquid crystal display unit.

FIG. 16 is a time chart for an alternative example of a sequence for forming an image on the liquid crystal plate 2101 constituting the liquid crystal display unit 210.

In a similar fashion to that of FIG. 15, part (A) of FIG. 16 shows a timing for an image formation on the liquid crystal plate 2101, and parts (B) and (C) of FIG. 16 show, respectively, open and close timings of left eye use liquid crystal shutter 216b and right eye use liquid crystal shutter 216a.

Here, subsequent to the formation of the frame image for R-association for the left eye, the frame image for R-association for the right eye is formed, then the frame image for G-association for the left eye, the frame image for G-association for the right eye, the frame image for B-association for the left eye, and the frame image for B-association for the right eye are formed on the liquid crystal plate 2101 in the named order. The liquid crystal shutters 216a and 216b also alternately open and close in synchronism with a formation of every frame image.

It is acceptable that images are formed on the liquid crystal plate 2101 in the sequence as shown in part (A) of FIG. 16, and the liquid crystal shutters 216a and 216b are controlled in open and close operations in synchronism with the image formation, as shown in parts (B) and (C) of FIG. 16.

Incidentally, while the above explanation has been made supposing a dynamic image, this is the similar as to the matter of the formation of a still image. In case of the still image, only a frame of color image exists on each of the right eye and the left eye. Such a frame of color image for each eye is separated into three frame images associated with R, G, B of colors, and total 6 frame images are recursively formed on the liquid crystal plate 2101. This makes it possible to continuously provide a three-dimensional still color image for an observer.

While the above explanation says that the formation of the frame image and the turn-on and off of the LED's are performed in the order of R, G, B, R, G . . . , the order is not restricted to this order.

Figure 17:
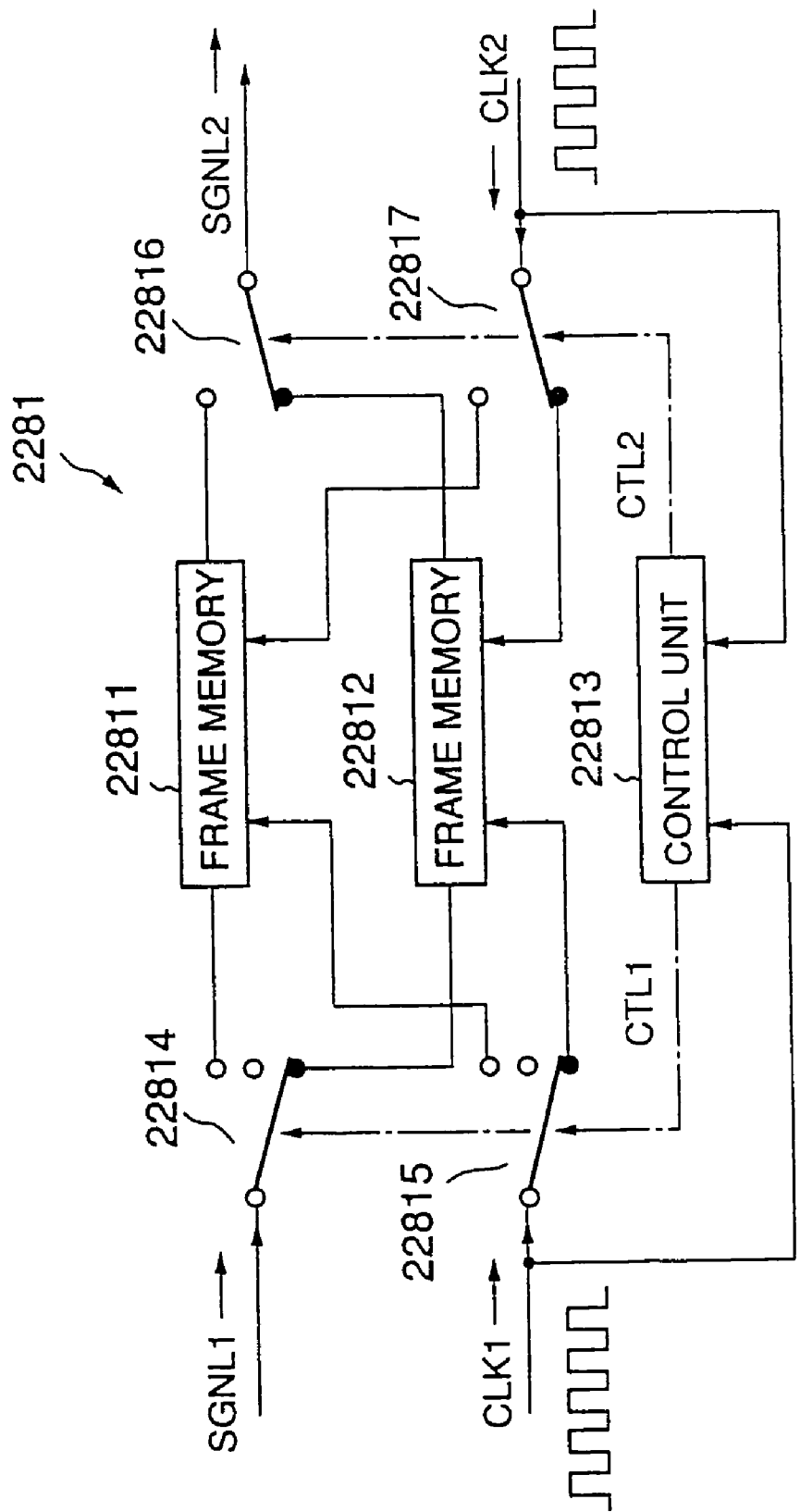
FIG. 17 is a block diagram of an operating frequency conversion circuit constituting the interface circuit shown in FIG. 10.

FIG. 17 is a block diagram of an operating frequency conversion circuit 2281 constituting the interface circuit 228 shown in FIG. 10.

The operating frequency conversion circuit 2281 comprises two frame memories 22811 and 22812, a control unit 22813, and four switch circuits 22814, 22815, 22816 and 22817.

A digital image signal SGNL1 representative of a color image is transmitted from the image processing circuit 223 shown in FIG. 9 to the interface circuit 228 in synchronism with a first operating frequency of clock CLK1, so that the digital image signal SGNL1 is fed to the operating frequency conversion circuit 2281 shown in FIG. 17. The image signal SGNL1 is alternately stored in the frame memories 2281 and 2282 every frame in synchronism with the clock CLK1 in such a manner that a certain frame of image signal is stored in the frame memory 2281, the subsequent frame of image signal is stored in the frame memory 2282, and the further subsequent frame of image signal is stored in the frame memory 2281. The control unit 22813 monitors the clock CLK1 and switches the two switches 22814 and 22815 on an interlocking basis whenever a frame of image signal SGNL1 has been stored in one of the frame memories.

This is the similar as to the matter of reading out of image signals from the frame memories 22811 and 22812. In this case, when a frame of image signal has been read out from one of the frame memories in synchronism with a second operating frequency of clock CLK2, the two switches 22816 and 22817 are switched so that an image signal is read out from another frame memory in synchronism with the clock CLK2. Switching of the switches 22816 and 22817 is performed by the control unit 22813 which monitors the clock CLK2.

Here, the image signal read out in synchronism with the clock CLK2 is referred to as an image signal SGNL2.

In the event that frequencies of the clocks CLK1 and CLK2 are equal to one another, for example, in such a situation that the image signal SGNL1 is already stored in the frame memory 22811 and the subsequent frame of image signal SGNL1 is stored in the frame memory 22812, it is effective that the image signal SGNL2 is read out from the frame memory 22811 while the an image signal is stored in the frame memory 22812, and the read out of the image signal SGNL2 from the frame memory 22812 is started in a timing that the image signal SGNL1 has been completely stored in the frame memory 22812 and the subsequent frame of image signal SGNL1 is initiated in storage into the frame memory 22811. However, in the event that frequencies of the clocks CLK1 and CLK2 are not equal to one another, it is difficult to expect the operation in the above-mentioned timing. Accordingly, in such a case, a conversion from the image signal SGNL1 synchronized with the clock CLK1 to the image signal SGNL2 synchronized with the clock CLK2 is carried out by means of performing storage and read out of image signals in the manner set forth below.

In the event that the frequency of the clock CLK1 is higher than that of the clock CLK2, there may happen such a situation that even when it reaches a timing that a frame of image signal SGNL1 is stored in each of the frame memories 22811 and 22812 and the subsequent frame of image signal SGNL1 is to be transmitted, reading out for the frame memories 22811 and 22812 is not yet completed. The control unit 22813 monitors both the clock CLK1 and the clock CLK2, so that such a situation can be identified. Each of the two switches 22814 and 22815 has a neutral point which is not connected to any of the two frame memories 22811 and 22812. When it reaches the above-mentioned situation, the control unit 22813 switches the switches 22814 and 22815 to the neutral points, respectively, so as to provide such a control that the image signal SGNL1 is inhibited from being stored in any of the frame memories 22811 and 22812, until either one of the frame memories 22811 and 22812 is vacant through completion of a read out operation. When either one of the frame memories 22811 and 22812 becomes vacant, the switches 22814 and 22815 are switched to the side of the frame memory which becomes vacant, so that a storage operation to the vacant frame memory is initiated from the top of the subsequent frame.

On the other hand, in the event that the frequency of the clock CLK2 is higher than that of the clock CLK1, there may happen such a situation that at the time when reading out of image signal from one of the frame memories 22811 and 22812 is completed, a storage of image signal into another frame memory is not yet completed. This situation is detected by the control unit 22813 which monitors both the clock CLK1 and the clock CLK2. When such a situation occurs, the control unit 22813 does not switch the switches 22816 and 22817. That is, at the read out end, the same frame of image signal is read out again from the same frame memory. At the time point that the same frame of image signal has been completely read out again from the same frame memory, if the subsequent frame of image signal SGNL1 has been completely stored in another frame memory, the switches 22816 and 22817 are switched to read out the new frame of image signal.

In this manner, according to the operating frequency conversion circuit 2281 of the interface circuit 228 shown in FIG. 10, the operating frequency is converted from the frequency of the clock CLK1 to the frequency of the clock CLK2.

The image signal SGNL2, which has been subjected to the conversion of the operating frequency by the operating frequency conversion circuit 2281, is fed to the display control circuit 2282 of the interface circuit 228 shown in FIG. 10. The display control circuit 2282 resolves each frame of a color image into three frames of three primary colors of R, G, B on each frame for the right and left eyes, and then sequentially outputs the same.

The image signals each representative of a frame for each color, which are sequentially outputted from the display control circuit 2282, are converted into analog image signals by the D/A converter 2283 and then fed to the liquid crystal plate 2101 (cf. FIGS. 11 to 14) of the liquid crystal display unit 210. The display control circuit 2282 also transmits control signals for controlling turn-on and off of the LED's 21041, 21042 and 21043 to the LED's 21041, 21042 and 21043 of the liquid crystal display unit 210.

When these image signals and control signals are applied to the liquid crystal display unit 210, the liquid crystal display unit 210 operates in a way as described referring to FIG. 15 or FIG. 16.

It is acceptable that the recording medium 10 to be loaded onto the image reproducing apparatus 200A shown in FIGS. 7 to 9 is a recording medium on which an image obtained by a photography using the image photography apparatus 100A explained referring to FIGS. 1 to 4 is recorded. However, the recording medium 10 is not restricted to such a recording medium as mentioned above. It is acceptable that a photography is performed using a stereographic photography apparatus of such a type that an image utilizing parallax of the right and left is projected onto a photographic film of a usual silver salt type, alternatively a photography is performed using two usual cameras, and an image formed on the silver salt type photographic film is read by a scanner and the like to record image information on a recording medium, so that the recording medium thus obtained is loaded onto the image reproducing apparatus for reproduction of a three-dimensional image.

Further, it is acceptable that one of two recording media on which images are recorded by photography using the image photography apparatus 100B adapted to load two recording media thereonto, as shown in FIGS. 5 and 6, is loaded onto the image reproducing apparatus 200A shown in FIGS. 7 to 9 for reproduction of an image. But, in this case, a three-dimensional image is not reproduced, and the image reproducing apparatus shown in FIGS. 7 to 9 is controlled in such a manner that the same image is provided for the right and left eyes. This is the similar as to the matter of a recording that an image is recorded on a recording medium through performing a photography using another image recording apparatus, for example, a monocular video photography apparatus or still photography apparatus, alternatively an image is recorded on a recording medium through performing a photography using for example, a usual monocular camera in which a silver salt type of photographic film is loaded for a photography. When the recording medium thus provided is loaded onto the image reproducing apparatus shown in FIGS. 7 to 9 to perform an image reproduction, the same image, but not a three-dimensional image, is provided for the right and left eyes.

Incidentally, this is the same as to the matter of the embodiments which will be described hereinafter.

Figure 18:
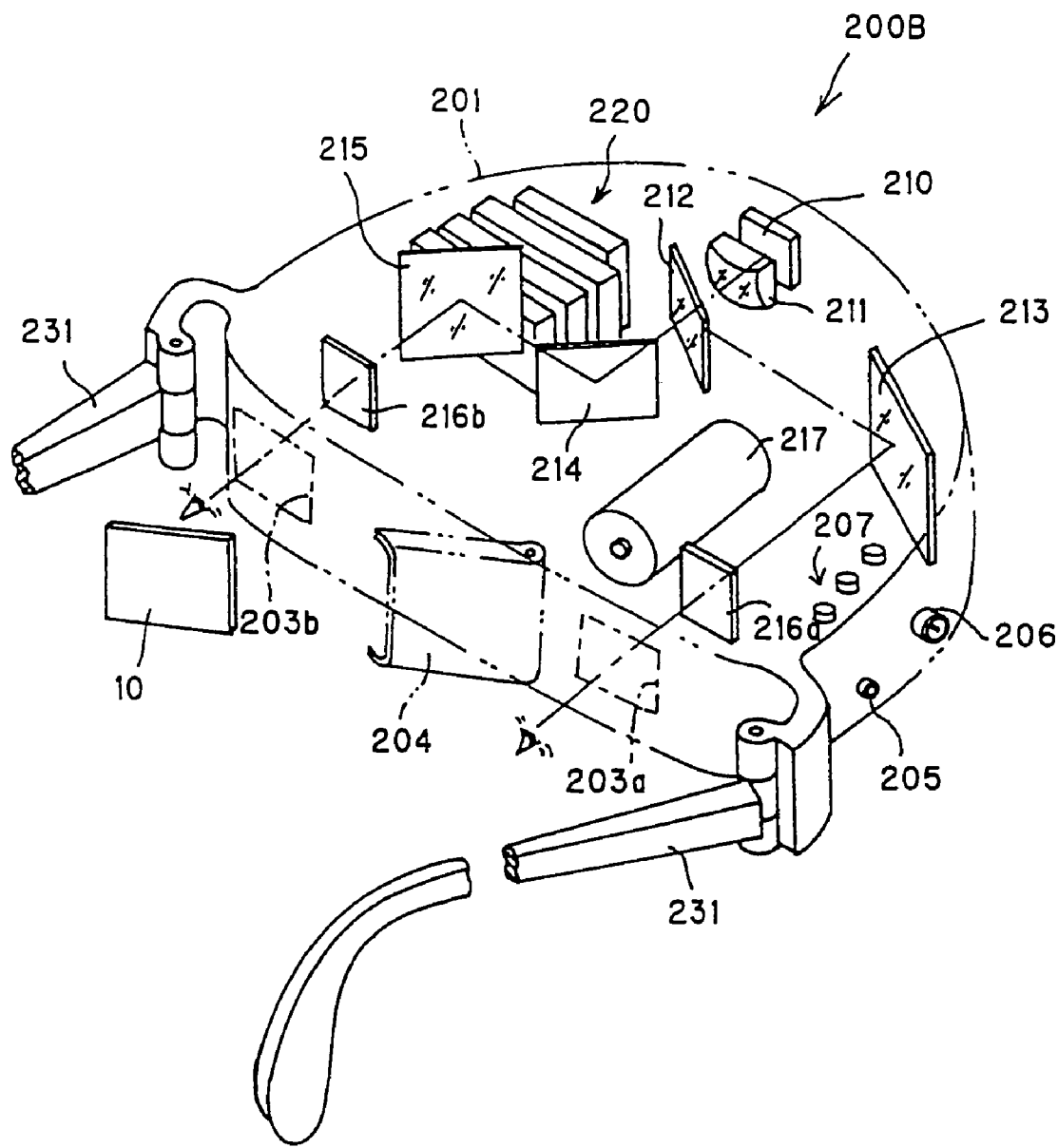
FIG. 18 is a typical illustration showing a main internal structure of a second embodiment of an image reproducing apparatus according to the present invention.

FIG. 18 is a typical illustration showing a main internal structure of a second embodiment of an image reproducing apparatus according to the present invention.

A different point of the image reproducing apparatus 200B shown in FIG. 18 from the first embodiment shown in FIGS. 7 to 9 resides in the point that while the first embodiment is provided with the belt 202 for mounting on the head, the embodiment shown in FIG. 18 are provided with mounting tools 231 for mounting by putting those on the ears like spectacles.

The image reproducing apparatus according to the present invention can be miniaturized and weight-saved in such a degree that the image reproducing apparatus can be mounted putting it on the ears.

Figure 19:
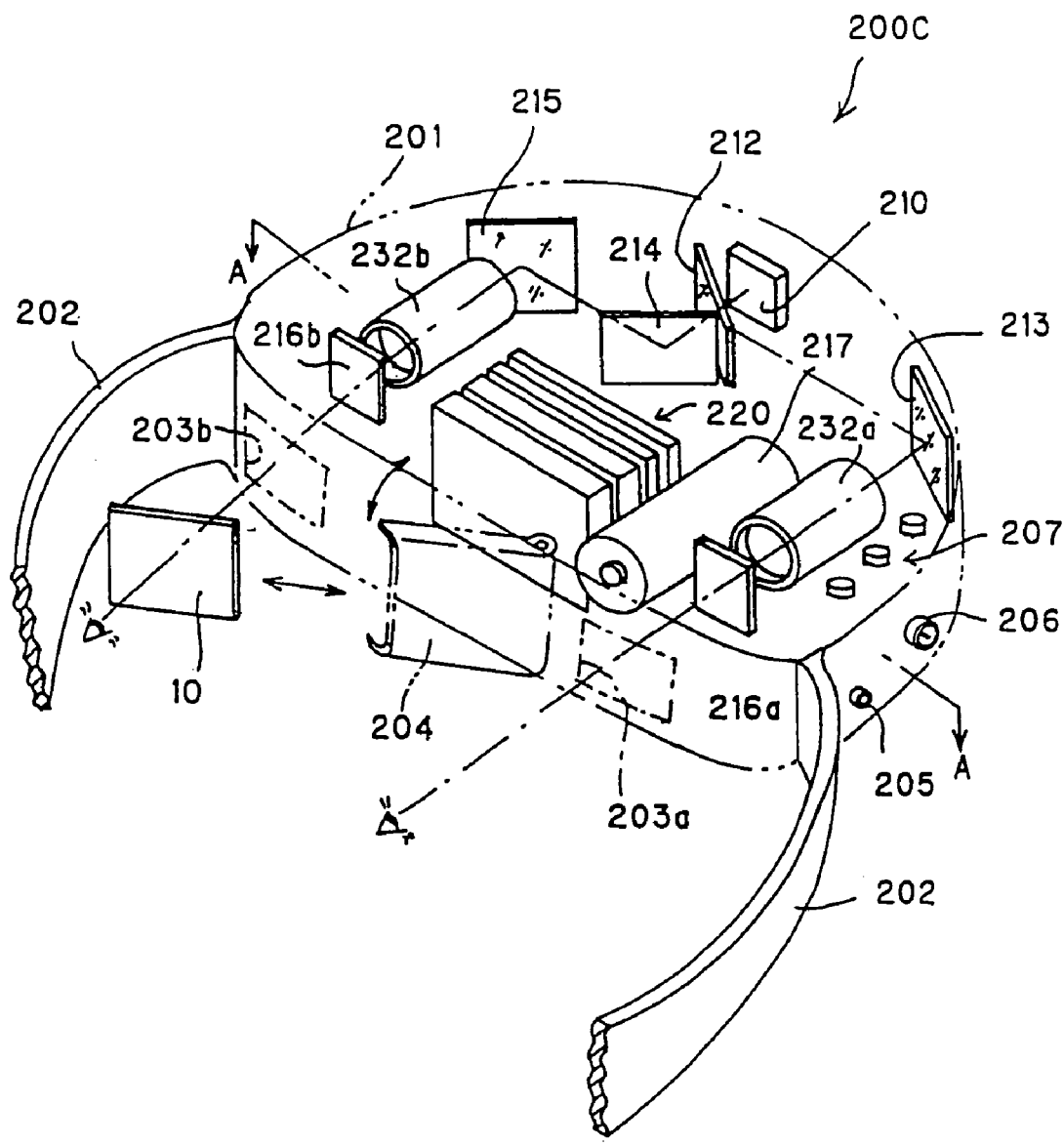
FIG. 19 is a typical illustration showing a main internal structure of a third embodiment of an image reproducing apparatus according to the present invention.
Figure 20:
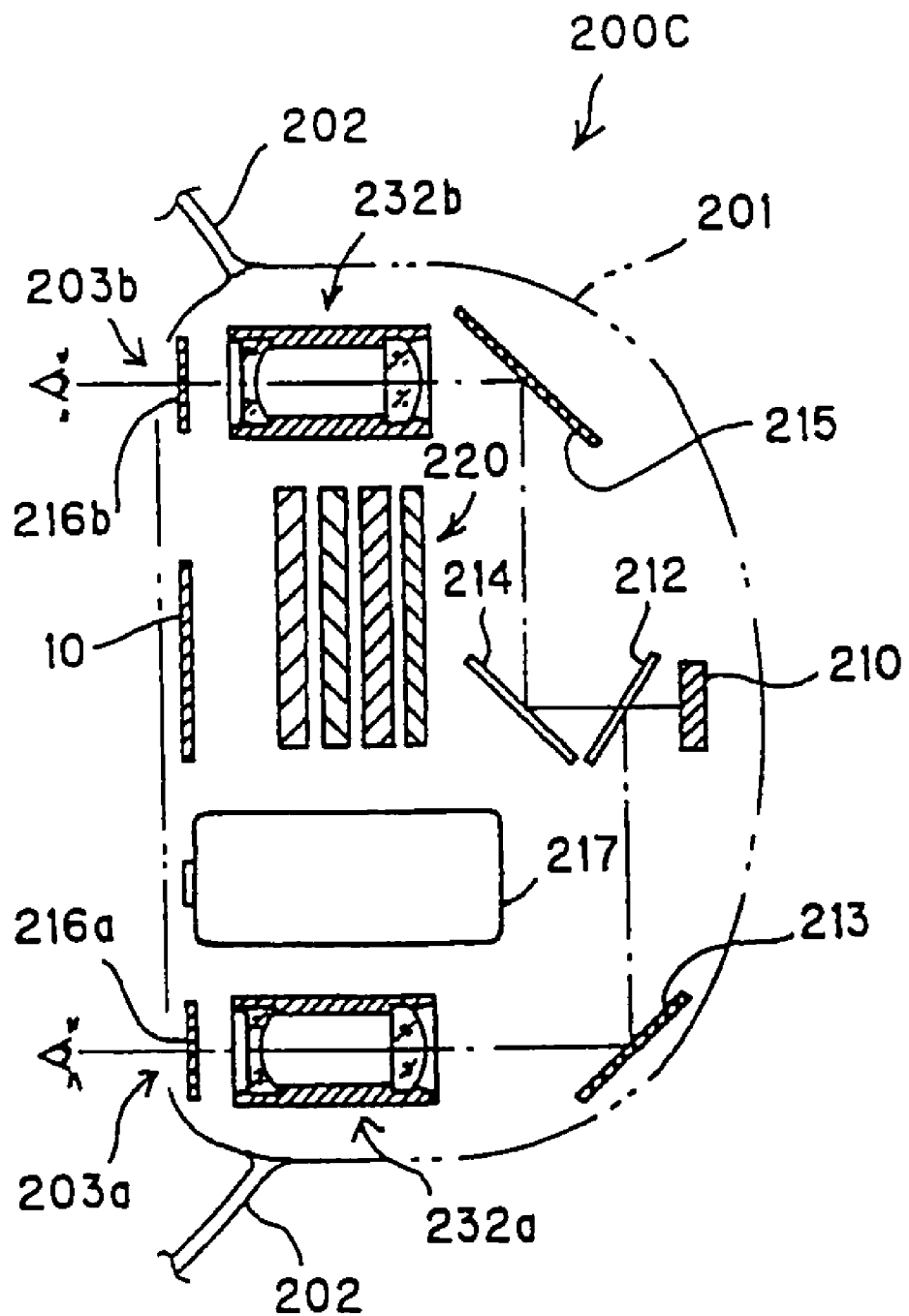
FIG. 20 shows a sectional view taken along the line A-A of FIG. 19.

FIG. 19 is a typical illustration showing a main internal structure of a third embodiment of an image reproducing apparatus according to the present invention. FIG. 20 shows a sectional view taken along the line A-A of FIG. 19. Different points of the third embodiment from the first embodiment shown in FIGS. 7 to 9 will be described hereinafter.

Here, instead of the magnifying lens 211 shown in FIGS. 7 to 9, a pair of Galilean magnifying lenses 232a and 232b having the same property are disposed at the right and the left.

Adoption of the Galilean magnifying lenses 232a and 232b makes it possible to extend freedom of design and arrangement as compared with the magnifying lens 211 of a magnifying glass type shown in FIGS. 7 to 9 and also to provide greater magnifying ratio. Further, according to the use of the Galilean magnifying lenses 232a and 232b, it is possible to obtain an erect image. Thus, also in the third embodiment, there is no need to provide the image attitude correction circuit 230 shown in FIG. 9.

With respect to other point, an image reproducing apparatus 200C shown in FIGS. 19 and 20 is different from the image reproducing apparatus 200A shown in FIGS. 17 and 18 in an arrangement position of the circuit blocks 220. However, it relates to an alteration in layout caused by adoption of the Galilean magnifying lenses 232a and 232b, and such a difference is not essential.

Figure 21:
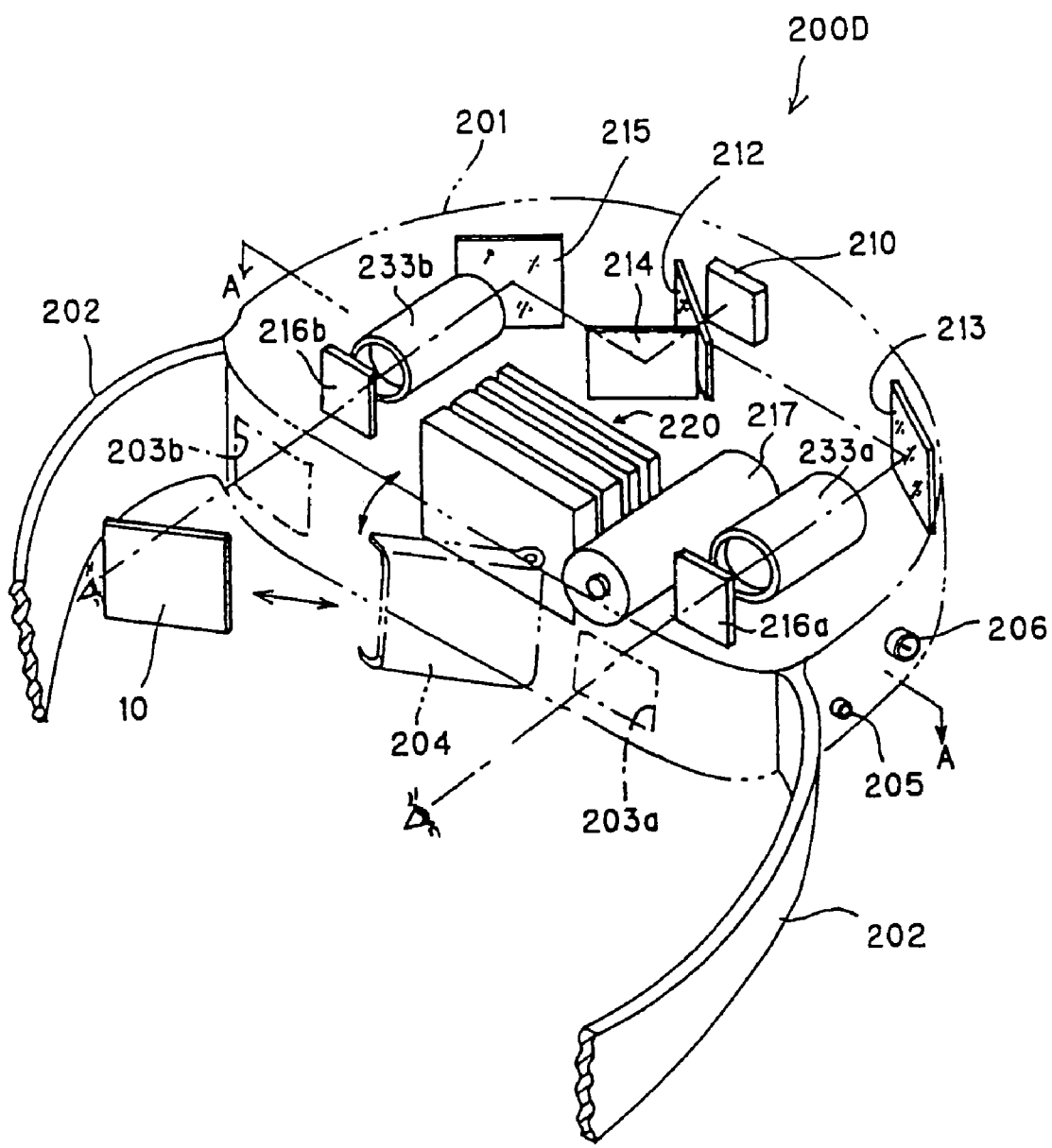
FIG. 21 is a typical illustration showing a main internal structure of a fourth embodiment of an image reproducing apparatus according to the present invention.
Figure 22:
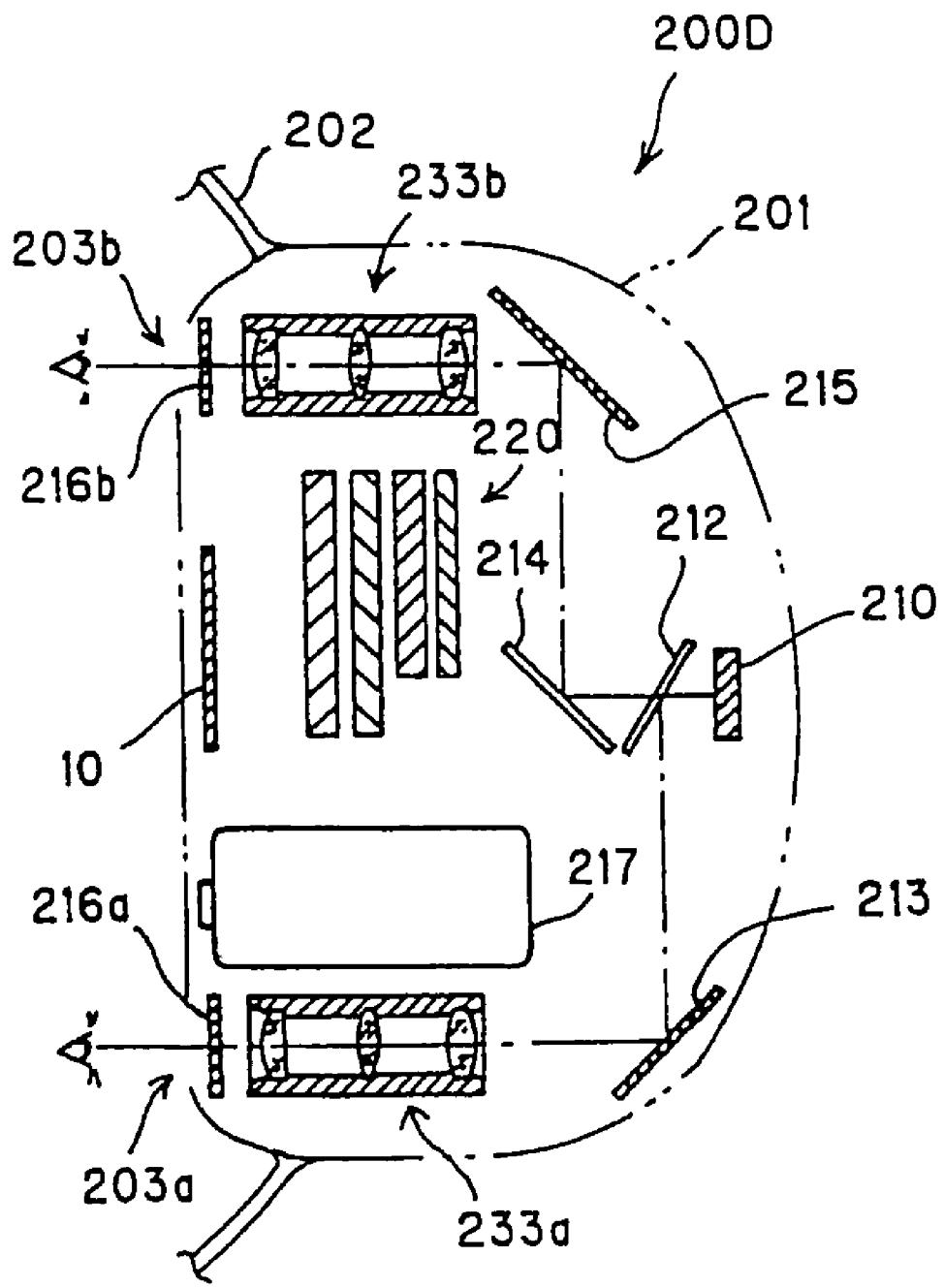
FIG. 22 shows a sectional view taken along the line A-A of FIG. 21.

FIG. 21 is a typical illustration showing a main internal structure of a fourth embodiment of an image reproducing apparatus according to the present invention. FIG. 22 shows a sectional view taken along the line A-A of FIG. 21. Different points of the fourth embodiment from the third embodiment shown in FIGS. 19 to 20 will be described hereinafter.

Here, instead of the Galilean magnifying lenses 232a and 232b shown in FIGS. 19 and 20, a pair of Keplerian magnifying lenses 233a and 233b is disposed. Adoption of the Keplerian magnifying lenses makes it possible to extend freedom of design and arrangement, and as compared with adoption of the Galilean magnifying lenses, the same magnification can be attained with more compactness.

However, adoption of the Keplerian magnifying lenses involves a reverse image. Thus, there is a need to provide the image attitude correction circuit 230 shown in FIG. 9 so that an image, which is reversed in top and bottom, and right and left, is formed on the liquid crystal plate 2101 (cf. FIGS. 11 to 14). Thus, it is possible for an observer to observe the image in the form of erect image. Incidentally, even in the event that the Keplerian magnifying lenses is adopted, it is acceptable that an erect image is provided for an observer by devising the optical system without provision of the image attitude correction circuit 230.

Figure 23:
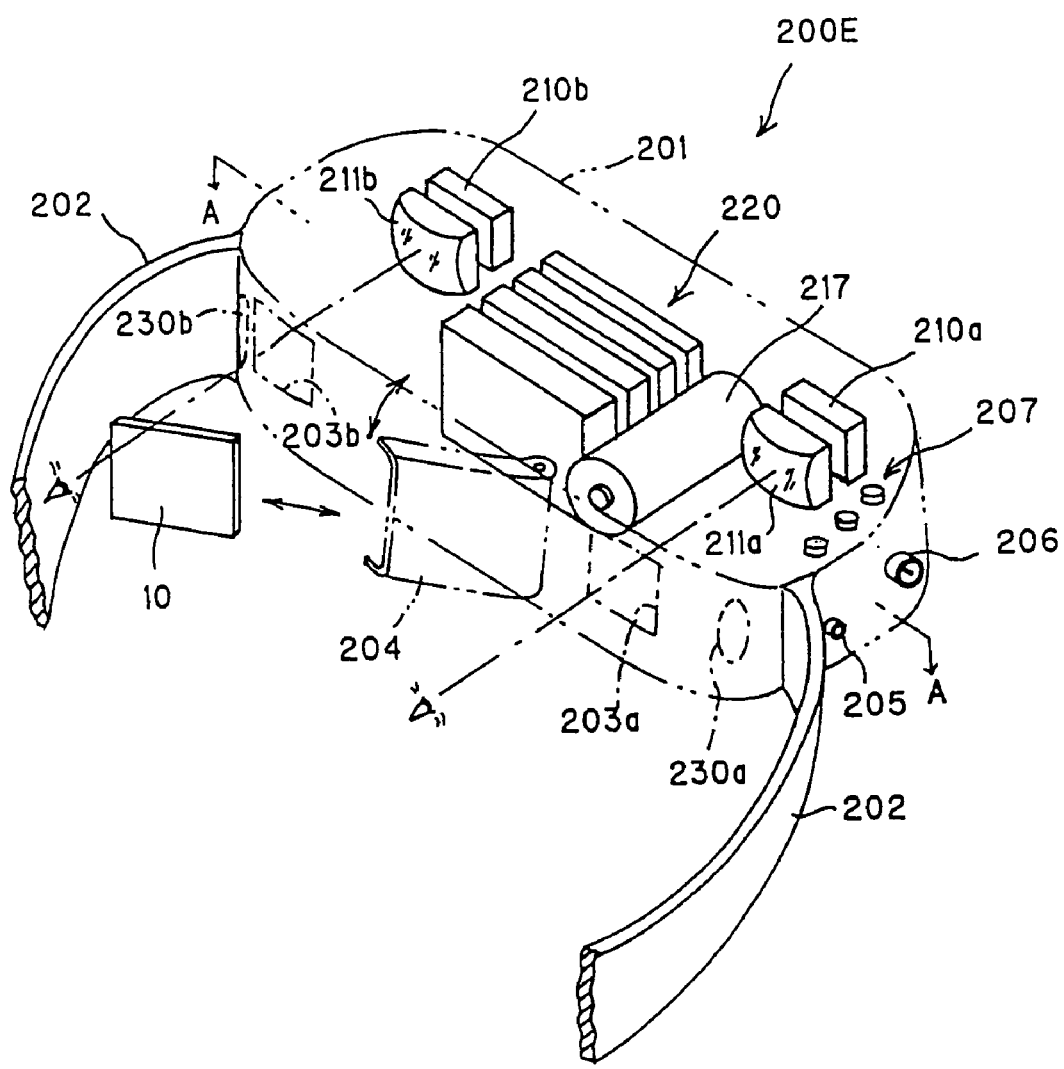
FIG. 23 is a typical illustration showing a main internal structure of a fifth embodiment of an image reproducing apparatus according to the present invention.
Figure 24:
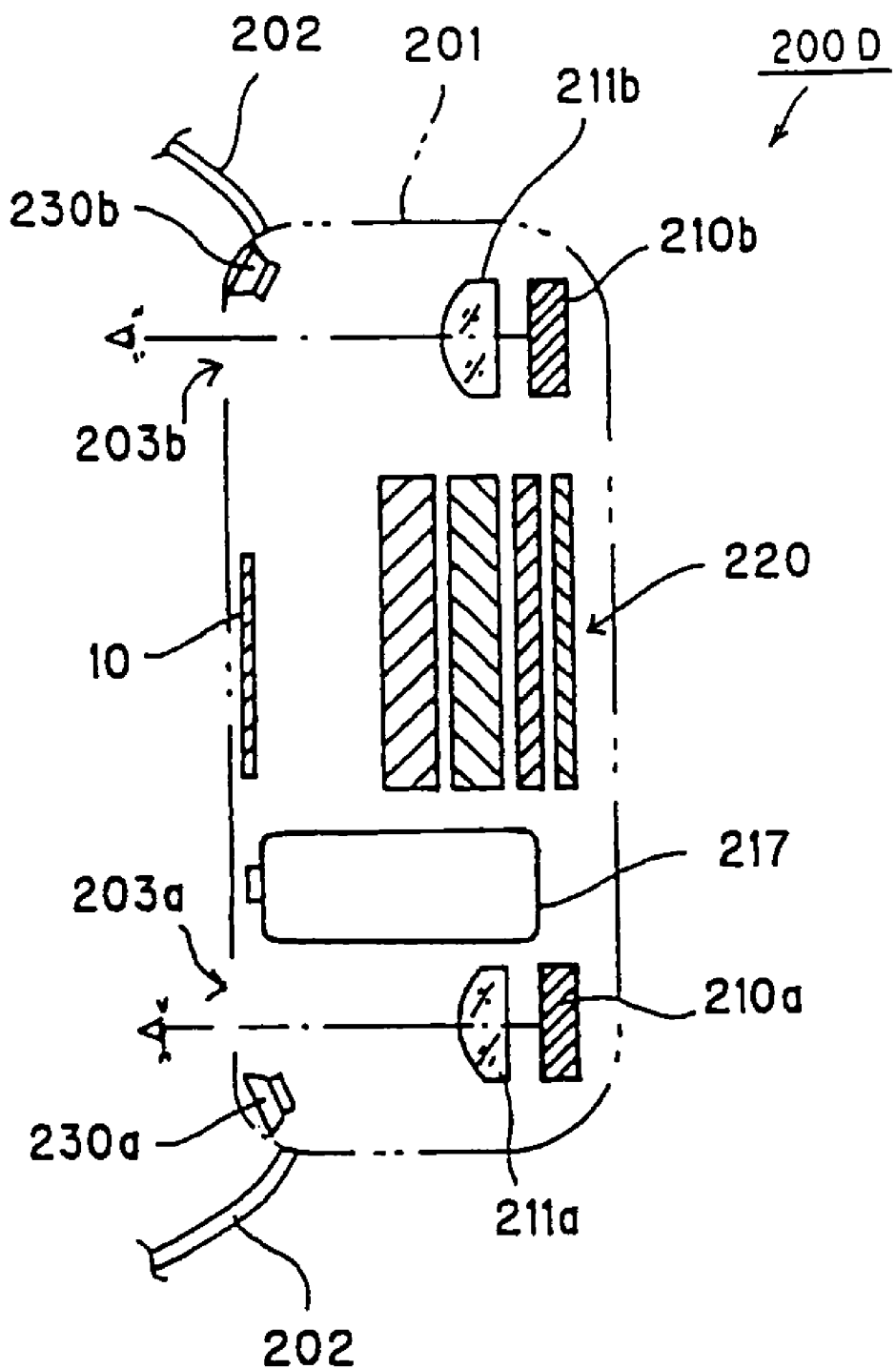
FIG. 24 shows a sectional view taken along the line A-A of FIG. 23.
Figure 25:
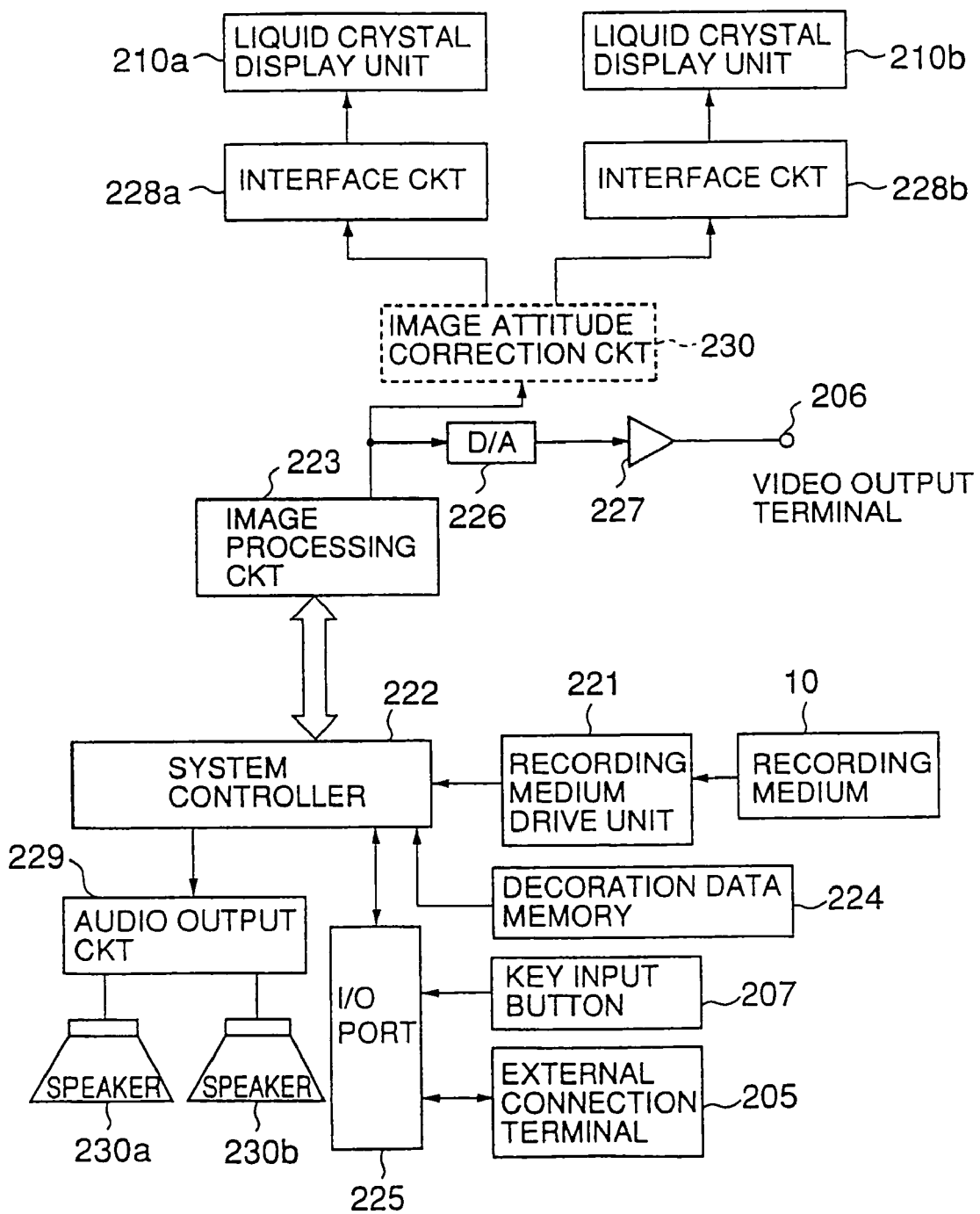
FIG. 25 is a block diagram of a circuit structure of the image reproducing apparatus shown in FIGS. 23 and 24.

FIG. 23 is a typical illustration showing a main internal structure of a fifth embodiment of an image reproducing apparatus according to the present invention. FIG. 24 shows a sectional view taken along the line A-A of FIG. 23. FIG. 25 is a block diagram of a circuit structure of the image reproducing apparatus shown in FIGS. 23 and 24. Different points of the fifth embodiment from the first embodiment shown in FIGS. 7 to 9 will be described hereinafter.

The image photography apparatus 100A shown in FIGS. 7 to 9 is provided with the single liquid crystal display unit 210 onto which frame images for right eye use and the left eye use are sequentially formed, and the two liquid crystal shutters 216a and 216b are used to distribute the images to the right eye and the left eye on a time division basis. On the other hand, an image reproducing apparatus 200E shown in FIGS. 23 to 25 is provided with two liquid crystal display units, that is, a liquid crystal display unit 210a for the right eye and a liquid crystal display unit 210b for the left eye.

Each of the liquid crystal display units 210a and 210b is the same as the liquid crystal display unit 210 in the first embodiment shown in FIGS. 7 to 9 (cf. FIGS. 11-14).

In association with the use of two liquid crystal display units, the image reproducing apparatus 200E shown in FIGS. 23 to 25 is provided with two magnifying lenses, that is, a magnifying lens 211a and a magnifying lens 211b. And the half mirror 212, and the three reflecting mirrors 213, 214 and 215, which are provided on the image reproducing apparatus 200A shown in FIGS. 7 to 9, are removed since they are unnecessary. Further, the liquid crystal shutters 216a and 216b, which are provided on the image reproducing apparatus 200A shown in FIGS. 7 to 9, are also removed since they are unnecessary.

On the other hand, the image reproducing apparatus 200E shown in FIGS. 23 to 25 is provided with two small speakers 230a and 230b, and an audio output circuit 229 as shown in FIG. 25. That is, the image reproducing apparatus 200E deals with an audio signal as well. Thus, for example, the recording medium 10 is permitted to record audio information together with image information, and also it is permitted to receive from the external output terminal 205 an image signal and an audio signal as well.

An audio signal obtained by reading audio information from the recording medium 10, or an audio signal transmitted from, for example, a personal computer (not illustrated) through the external output terminal 205, is transmitted to the audio output circuit 229 in which the audio signal is converted into an analog signal through a D/A conversion, and is distributed to the speakers 230a and 230b of the right and the left so that a stereo sound is generated.

It is noted that the image attitude correction circuit 230 is shown in FIG. 25 for the purpose of an explanation of an alternative embodiment which will be described later. According to the image reproducing apparatus 200E shown in FIGS. 23 to 24, when images are formed on the liquid crystal display units 210a and 210b, the images may be observed for an observer in the form of erect image. Thus, in case of this embodiment shown in FIGS. 23 to 25, there is no need to provide the image attitude correction circuit 230.

Figure 26:
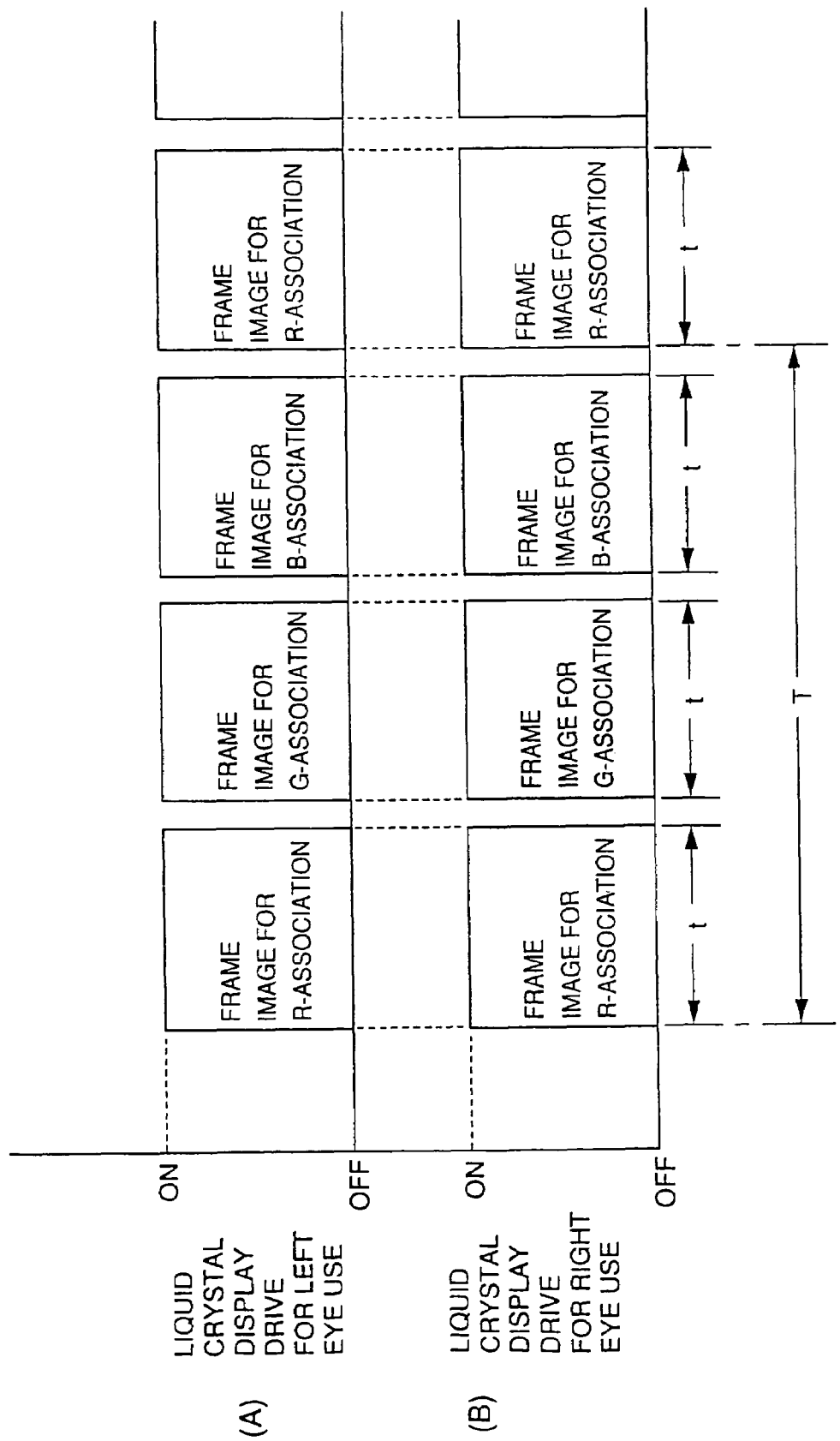
FIG. 26 is a time chart useful for understanding timing of an image formation onto the respective liquid crystal plates of two liquid crystal display units.

FIG. 26 is a time chart useful for understanding timing of an image formation onto the respective liquid crystal plates of two liquid crystal display units 210a and 210b. Part (A) of FIG. 26 shows a timing for an image formation on a liquid crystal plate of a liquid crystal display unit for the left eye use, and part (B) of FIG. 26 shows a timing for an image formation on a liquid crystal plate of a liquid crystal display unit for the right eye use.

Color images for right and left are read from the recording medium 10. Each color image thus read out is separated into three frame images of R, G, B of colors, and the R-association frame image, the G-association frame image and the B-association frame image are sequentially formed on the associated liquid crystal plate in the named order. These image formations are performed simultaneously on the right and left liquid crystal plates. The LED's, which constitute the liquid crystal display units of the right and left, sequentially pulse-turn on in the order of R, G, B in synchronism with formations of the frame images on the liquid crystal plates.

Assuming that three frame images of colors R, G, B constituting a frame of color image for the left eye or the right eye are expressed in the form of one group, a period T (cf. FIG. 26) of time in which three frame images constituting the one group are formed on the liquid crystal plate is set up to be not more than 1/16 sec. That is, as it will be understood when compared with FIG. 15, it is effective that an image is renewed at the half of the image renewal speed in the arrangement in which only one liquid crystal display unit is used to distribute images to the right and the left. And thus it is possible to reduce the operating speed of the circuit by the correspondence and thereby contributing to the cost down, or alternatively, it is possible to form a dynamic image of more smooth movement when the operating speed for the circuit is given with the same speed in the arrangement in which only one liquid crystal display unit is used.

The pulse width of each of the light emitting pulses of the LED's for colors R, G and R is shorter than a time t during which each of the frame images for colors R, G and R is formed on the liquid crystal plate. Further, there is set up a further shorter pulse width within a range permitted in view of luminance of an image. This makes it possible to reduce a power dissipation.

Incidentally, while the above explanation as to FIG. 26 has been made supposing a dynamic image, this is the similar as to the matter of the formation of a still image. In case of the still image, only a frame of color image exists on each of the right eye and the left eye. Such a frame of color image for each eye is separated into three frame images associated with R, G, B of colors, and total 6 frame images are recursively formed on the liquid crystal plates. This makes it possible to continuously provide a three-dimensional still color image for an observer.

Figure 27:
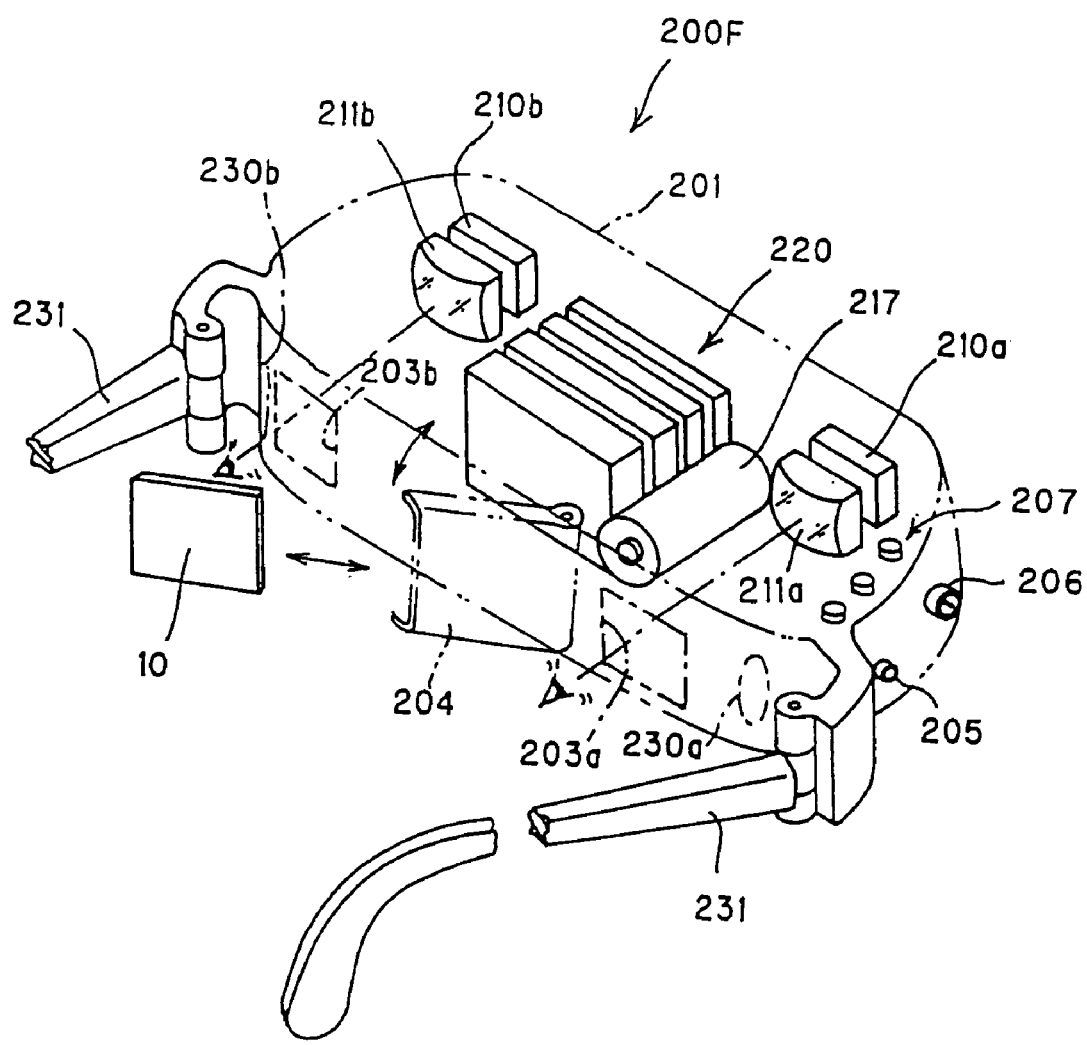
FIG. 27 is a typical illustration showing a main internal structure of a sixth embodiment of an image reproducing apparatus according to the present invention.

FIG. 27 is a typical illustration showing a main internal structure of a sixth embodiment of an image reproducing apparatus according to the present invention.

A different point of the image reproducing apparatus 200F shown in FIG. 27 from the image reproducing apparatus E shown in FIGS. 23 and 24 resides in the point that while the apparatus shown in FIGS. 23 and 24 is provided with the belt 202 for mounting on the head, the apparatus shown in FIG. 27 is provided with mounting tools 231 for mounting by putting those on the ears like spectacles.

The image reproducing apparatus of type having two liquid crystal display units can be also miniaturized and weight-saved in such a degree that the image reproducing apparatus can be mounted putting it on the ears.

Figure 28:
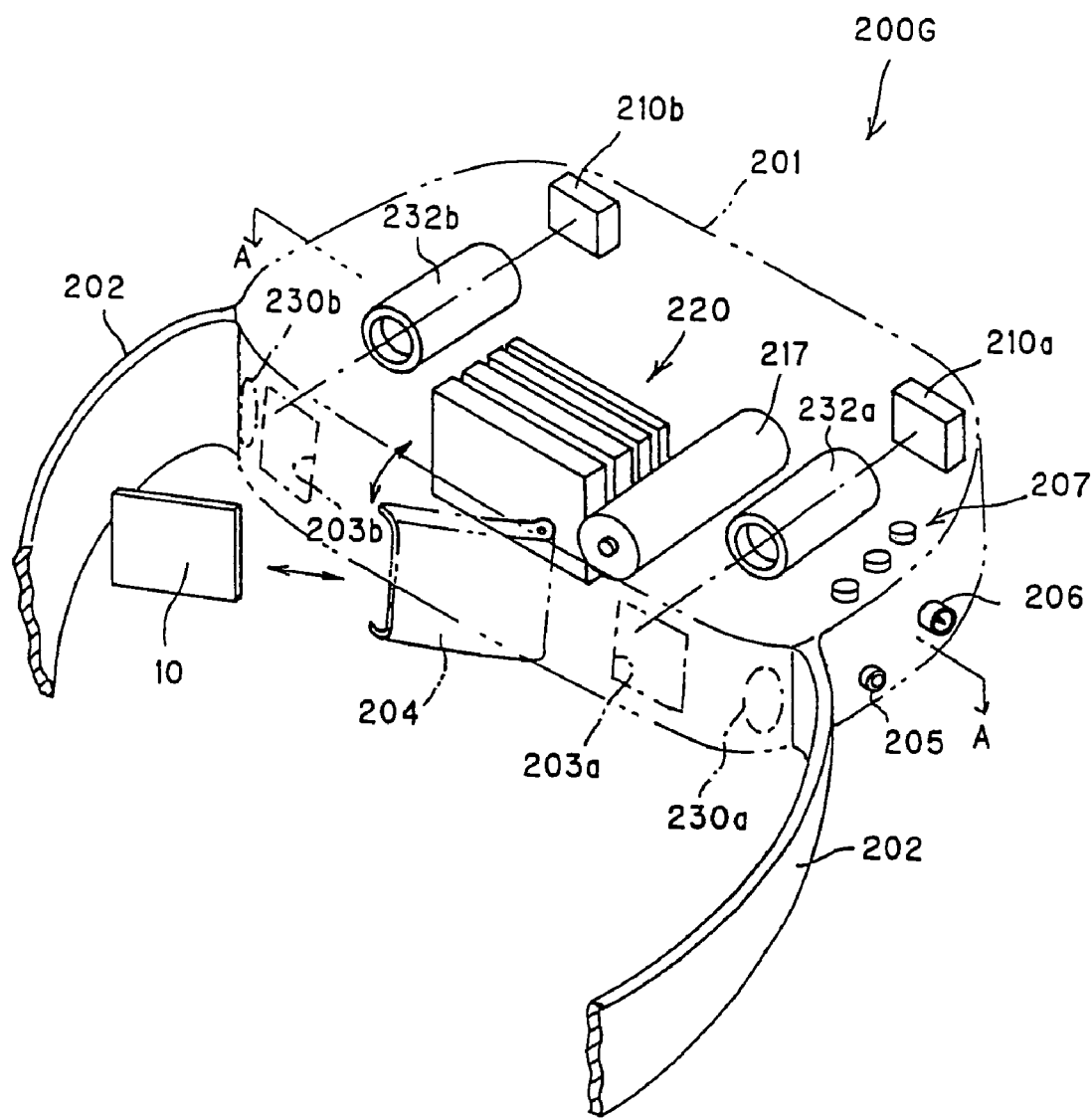
FIG. 28 is a typical illustration showing a main internal structure of a seventh embodiment of an image reproducing apparatus according to the present invention.
Figure 29:
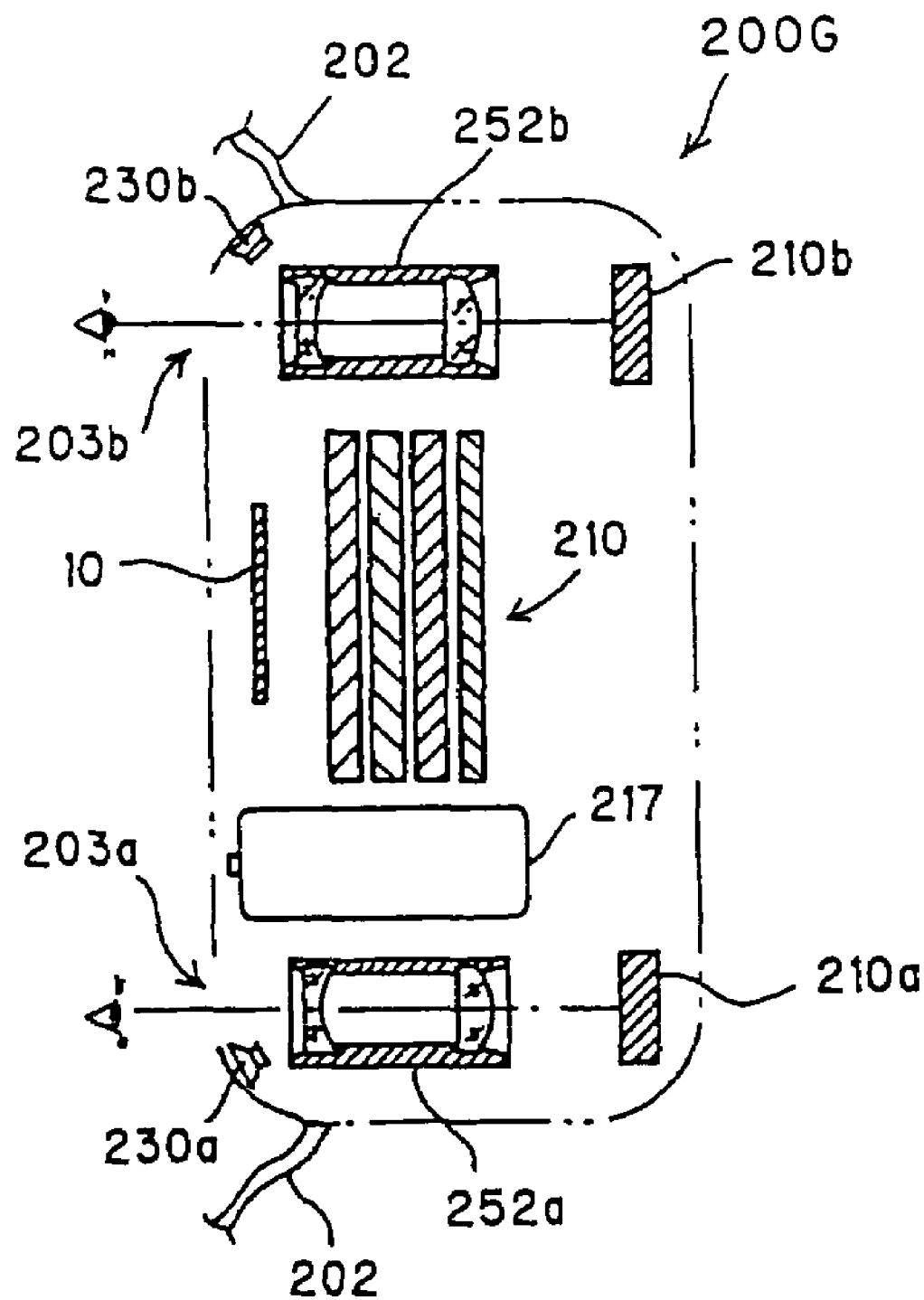
FIG. 29 shows a sectional view taken along the line A-A of FIG. 28.

FIG. 28 is a typical illustration showing a main internal structure of a seventh embodiment of an image reproducing apparatus according to the present invention. FIG. 29 shows a sectional view taken along the line A-A of FIG. 28. Different points of the seventh embodiment from the fifth embodiment shown in FIGS. 23 and 24 will be described hereinafter.

Here, instead of the magnifying lenses 211a and 211b of the magnifying glass type in the image reproducing apparatus E shown in FIGS. 23 and 24, a pair of Galilean magnifying lenses 232a and 232b having the same property are disposed at the right and the left.

As mentioned above, adoption of the Galilean magnifying lenses 232a and 232b makes it possible to extend freedom of design and arrangement and also to provide greater magnifying ratio. Further, according to the use of the Galilean magnifying lenses 232a and 232b, it is possible to obtain an erect image. Thus, also in the embodiment shown in FIGS. 28 and 29, there is no need to provide the image attitude correction circuit 230 shown in FIG. 25.

Figure 30:
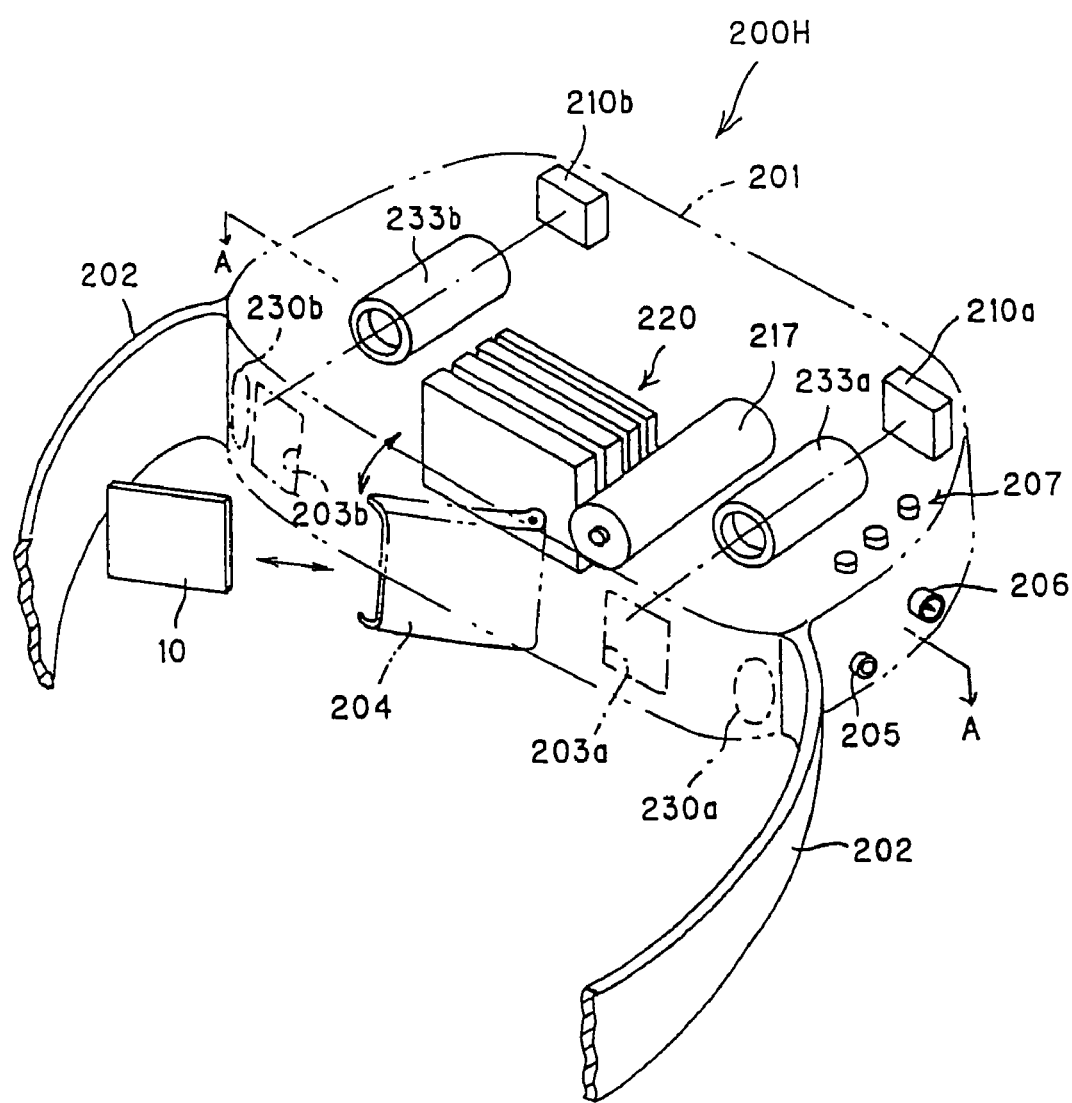
FIG. 30 is a typical illustration showing a main internal structure of an eighth embodiment of an image reproducing apparatus according to the present invention.
Figure 31:
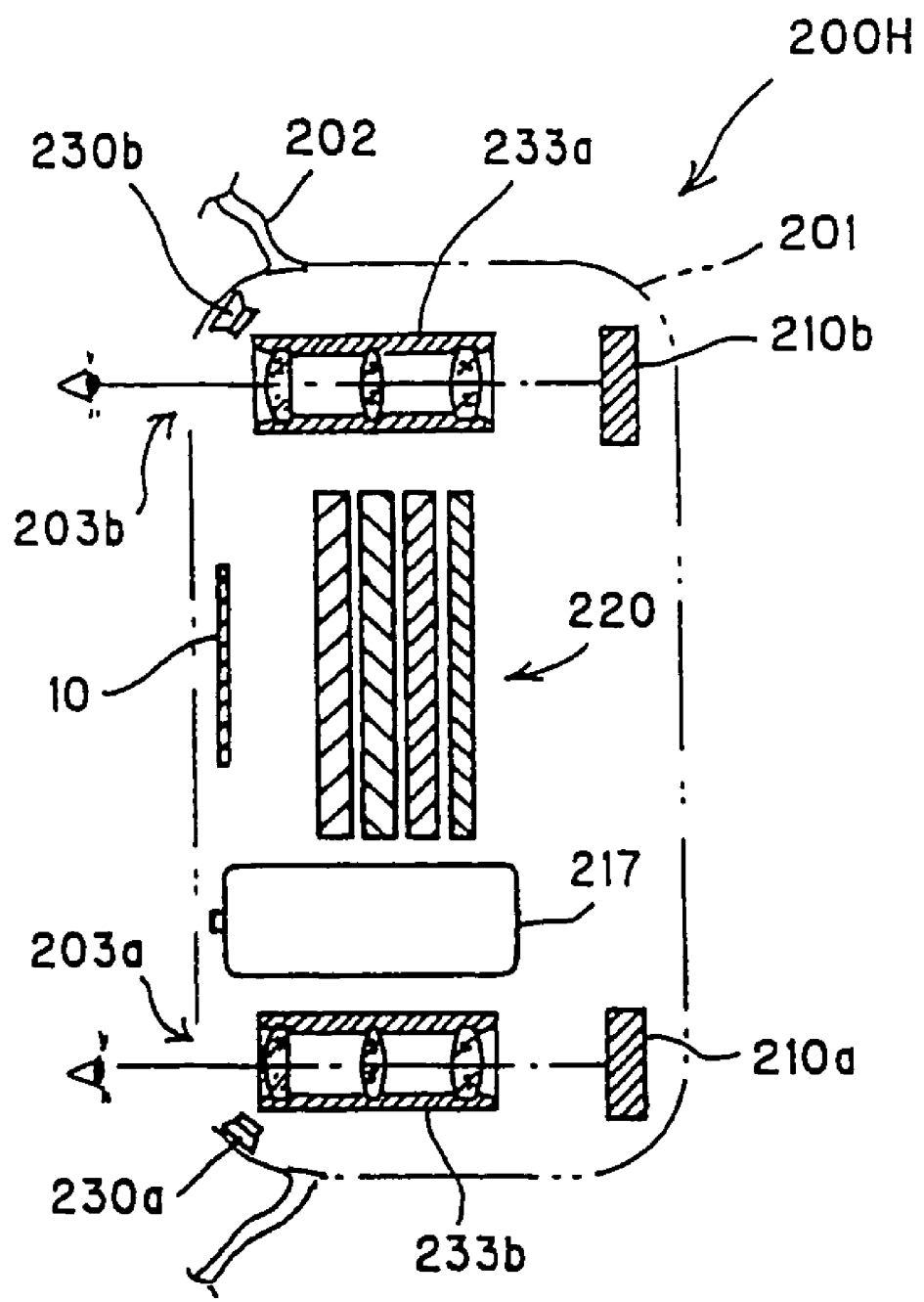
FIG. 31 shows a sectional view taken along the line A-A of FIG. 30.

FIG. 30 is a typical illustration showing a main internal structure of an eighth embodiment of an image reproducing apparatus according to the present invention. FIG. 31 shows a sectional view taken along the line A-A of FIG. 30. Different points of the eighth embodiment from the seventh embodiment shown in FIGS. 28 and 29 will be described hereinafter.

Here, instead of the Galilean magnifying lenses 232a and 232b shown in FIGS. 28 and 29, a pair of Keplerian magnifying lenses 233a and 233b is disposed. Adoption of the Keplerian magnifying lenses makes it possible to extend freedom of design and arrangement, and as compared with adoption of the Galilean magnifying lenses, the same magnification can be attained with more compactness. However, adoption of the Keplerian magnifying lenses involves a reverse image. Thus, there is a need to provide the image attitude correction circuit 230 shown in FIG. 25 so that images, which are reversed in top and bottom, and right and left, are formed on the liquid crystal plates of the right and the left, respectively. Incidentally, even in the event that the Keplerian magnifying lenses is adopted, it is acceptable that an erect image is provided for an observer by devising the optical system without provision of the image attitude correction circuit 230.

Figure 32:
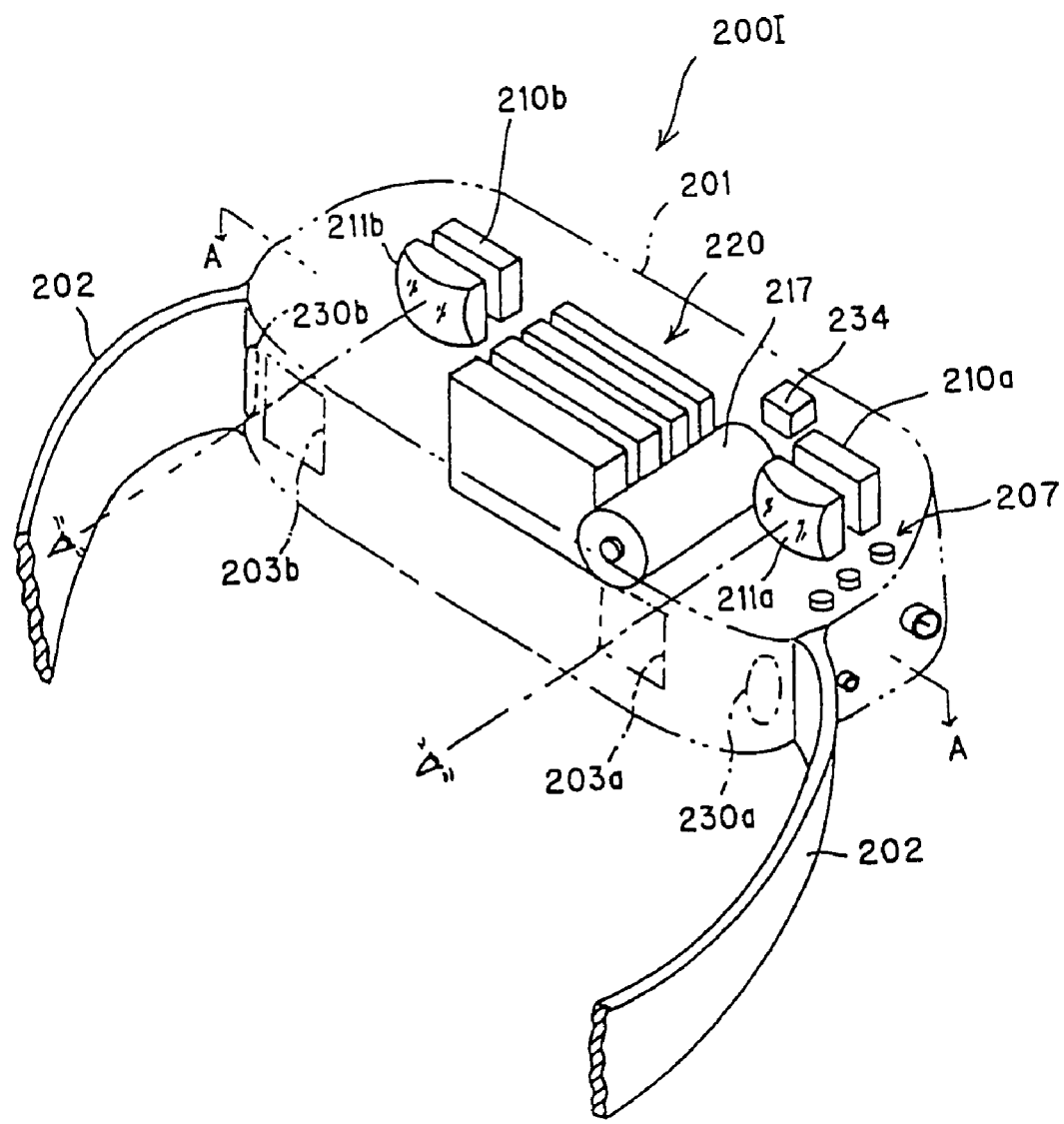
FIG. 32 is a typical illustration showing a main internal structure of a ninth embodiment of an image reproducing apparatus according to the present invention.
Figure 33:
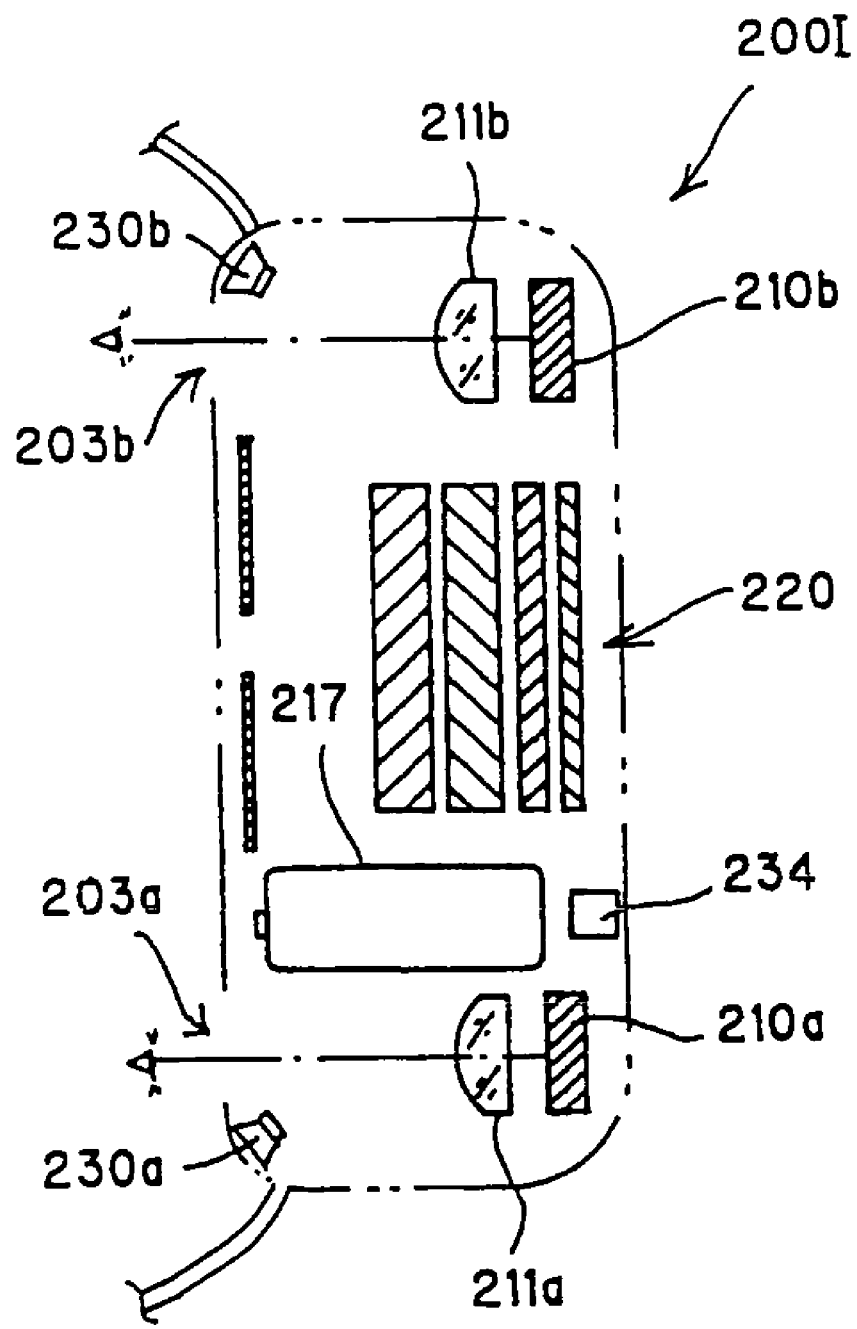
FIG. 33 shows a sectional view taken along the line A-A of FIG. 32.
Figure 34:
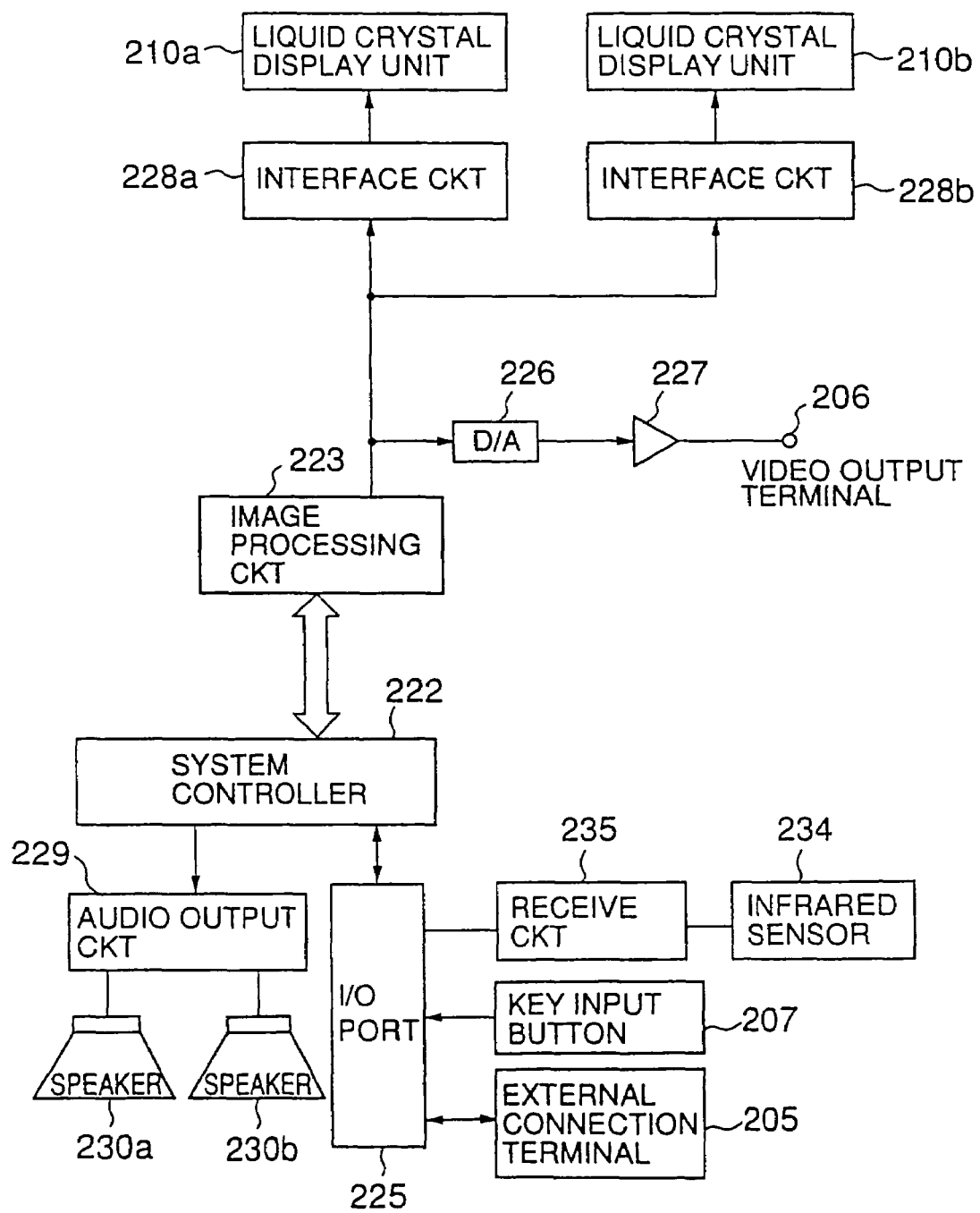
FIG. 34 is a block diagram of a circuit structure of the image reproducing apparatus shown in FIGS. 32 and 33.

FIG. 32 is a typical illustration showing a main internal structure of a ninth embodiment of an image reproducing apparatus according to the present invention. FIG. 33 shows a sectional view taken along the line A-A of FIG. 32. FIG. 34 is a block diagram of a circuit structure of the image reproducing apparatus shown in FIGS. 32 and 33. Different points of the ninth embodiment from the fifth embodiment shown in FIGS. 23 to 25 will be described hereinafter.

An image reproducing apparatus 200I shown in FIGS. 32 to 34 is not provided with an arrangement in which the recording medium 10 is loaded to read out therefrom image information so as to obtain an image signal. Instead the image reproducing apparatus 200I is provided with an infrared sensor 234 for receiving infrared carrying image information and a receiving circuit (cf. FIG. 34). That is, the image reproducing apparatus 200I is provided with an arrangement in which image information transmitted in the form of infrared is picked up to generate image signals, and images for the right and left eyes are formed on the liquid crystal display unit 210a and 210b for the right and left eyes in accordance with the image signals thus generated, respectively.

In this manner, there is no need to always provide an image reproducing apparatus of the present invention with an arrangement in which a recording medium is loaded.

The ninth embodiment is the same as the fifth embodiment shown in FIGS. 23 to 25 but an arrangement that infrared is detected to obtain an image signal, instead of obtaining an image signal from the recording medium.

Figure 35:
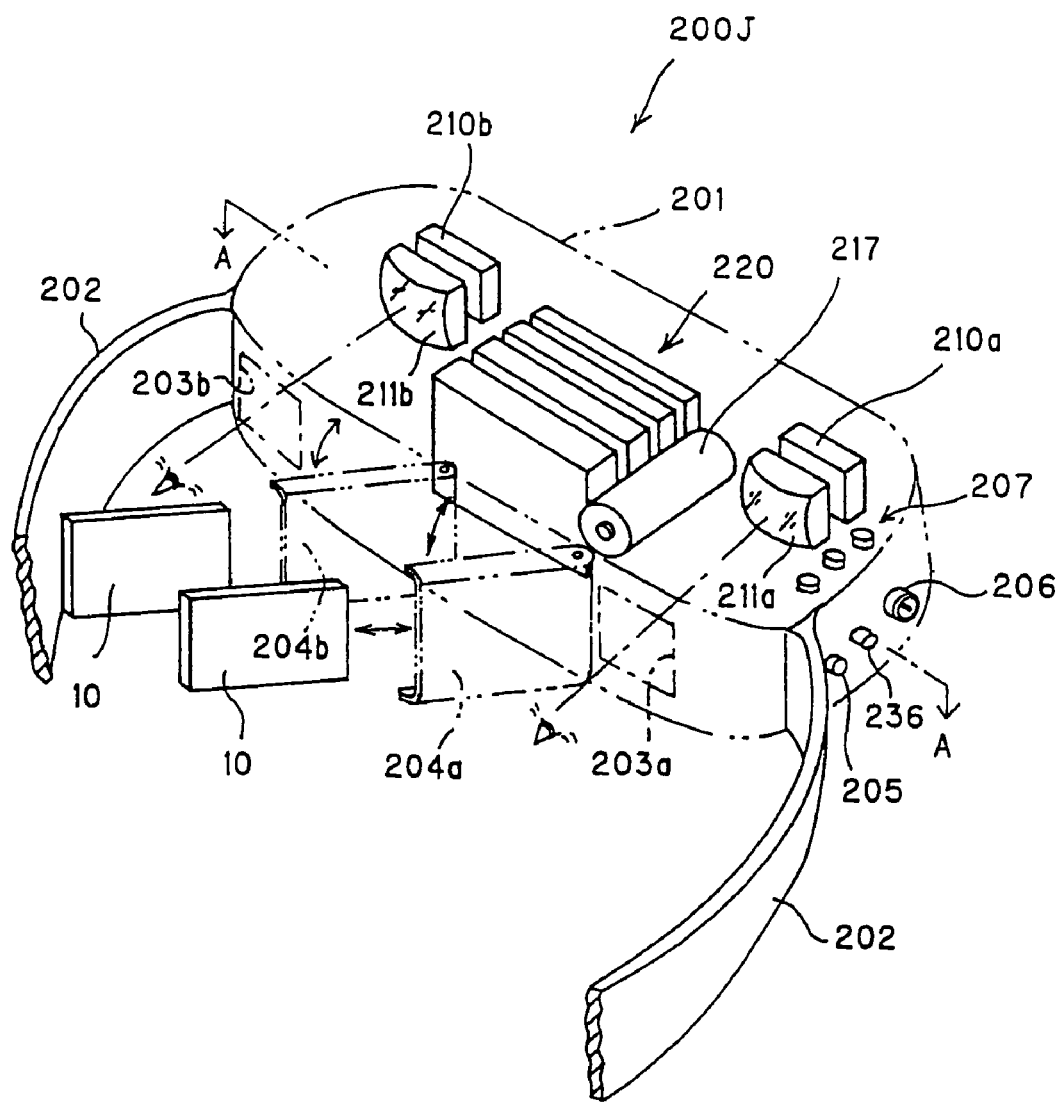
FIG. 35 is a typical illustration showing a main internal structure of a tenth embodiment of an image reproducing apparatus according to the present invention.
Figure 36:
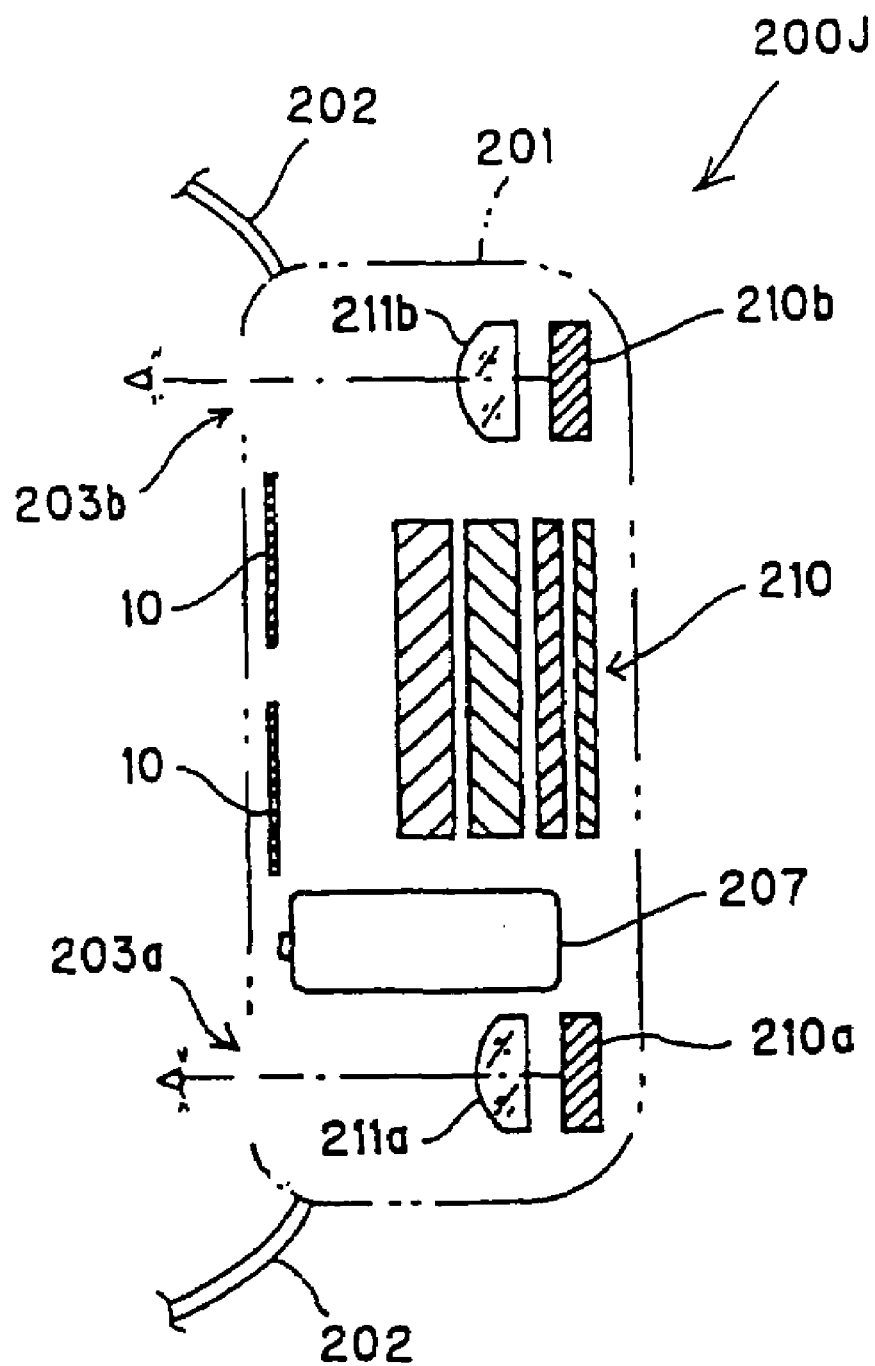
FIG. 36 shows a sectional view taken along the line A-A of FIG. 35.
Figure 37:
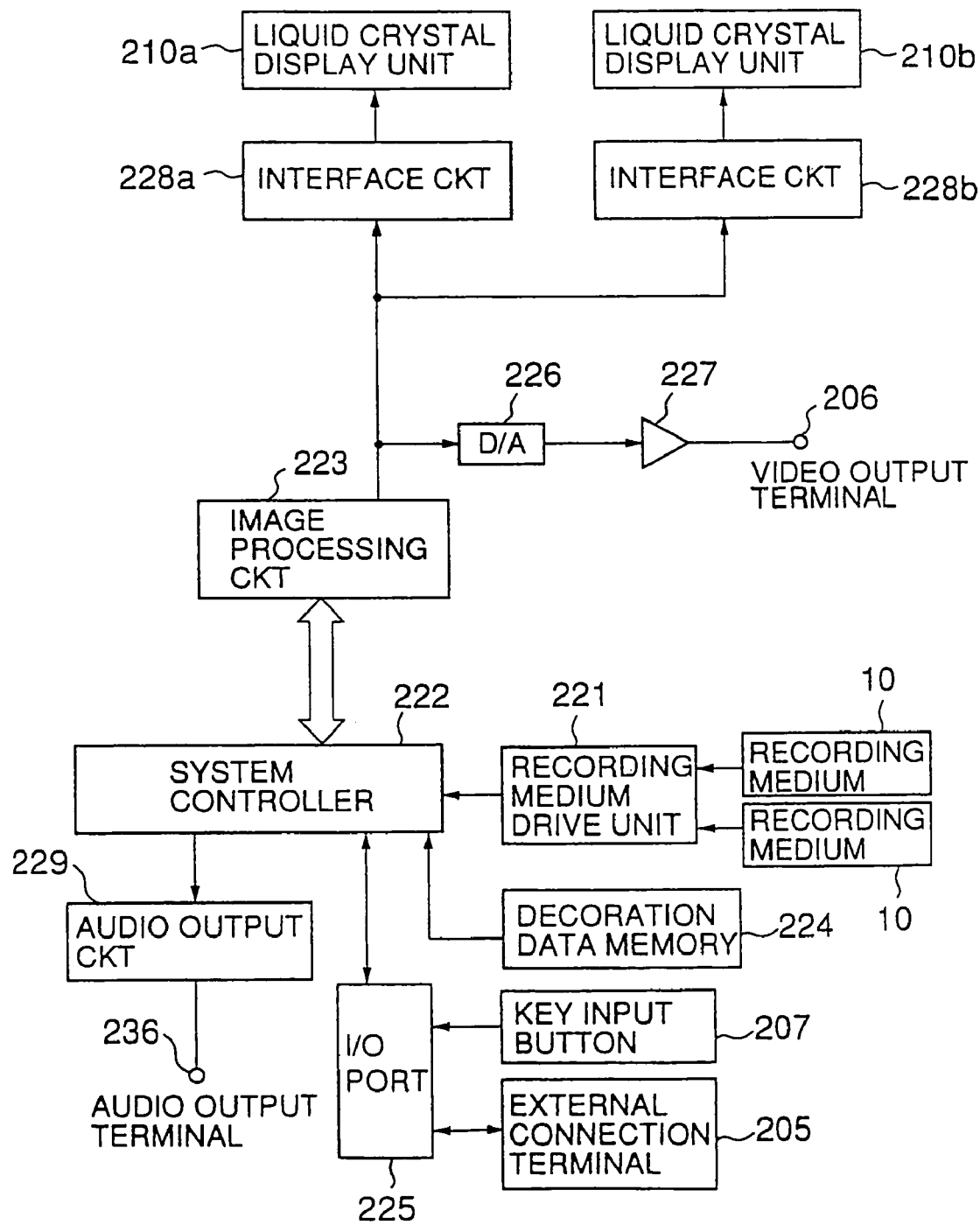
FIG. 37 is a block diagram of a circuit structure of the image reproducing apparatus shown in FIGS. 35 and 36.

FIG. 35 is a typical illustration showing a main internal structure of a tenth embodiment of an image reproducing apparatus according to the present invention. FIG. 36 shows a sectional view taken along the line A-A of FIG. 35. FIG. 37 is a block diagram of a circuit structure of the image reproducing apparatus shown in FIGS. 35 and 36. Different points of the tenth embodiment from the fifth embodiment shown in FIGS. 23 to 25 will be described hereinafter.

An image reproducing apparatus 200J shown in FIGS. 35 to 37 is provided with an arrangement that two recording media 10 are loaded and accessed. Specifically, as shown in FIG. 35, there are provided two recording medium loading chamber covers 204a and 204b. A recording medium drive unit 221 shown in FIG. 37 drives the loaded two recording media 10.

Further, the image reproducing apparatus 200J shown in FIGS. 35 to 37 is not provided with a speaker. Instead the image reproducing apparatus 200J is provided with an audio output terminal 236 for outputting an audio signal to the exterior.

One of the loaded two recording media 10 stores therein color image information for the right eye, and another recording medium 10 stores therein color image information for the left eye. These pieces of image information are read out in the form of image signal by the recording medium drive unit 221 so that images for the right and left eyes are formed on the liquid crystal display unit 210a for the right eye and the liquid crystal display unit 210b for the left eye, respectively.

Further, these recording media 10 stores therein audio information also. These pieces of audio information are read out in the form of audio signal by the recording medium drive unit 221 and outputted from an audio output terminal 236 to the exterior, so that the audio information is generated in the form of large sound through an acoustic equipment (not illustrated) having a large speaker.

With respect to other portions, they are similar to that of the fifth embodiment shown in FIGS. 23 to 25.

Figure 38:
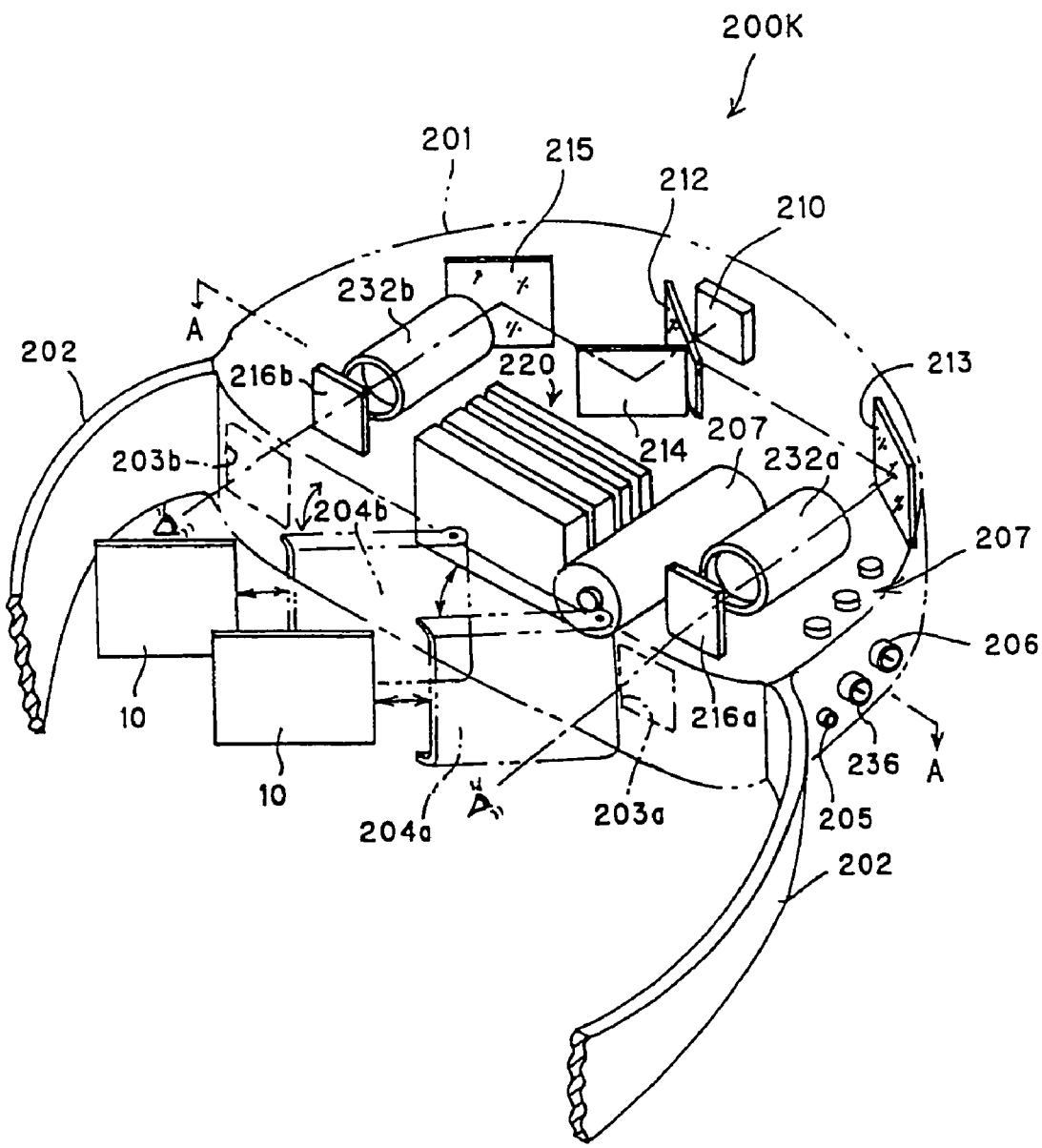
FIG. 38 is a typical illustration showing a main internal structure of an eleventh embodiment of an image reproducing apparatus according to of the present invention.

FIG. 38 is a typical illustration showing a main internal structure of an eleventh embodiment of an image reproducing apparatus according to of the present invention.

Figure 39:
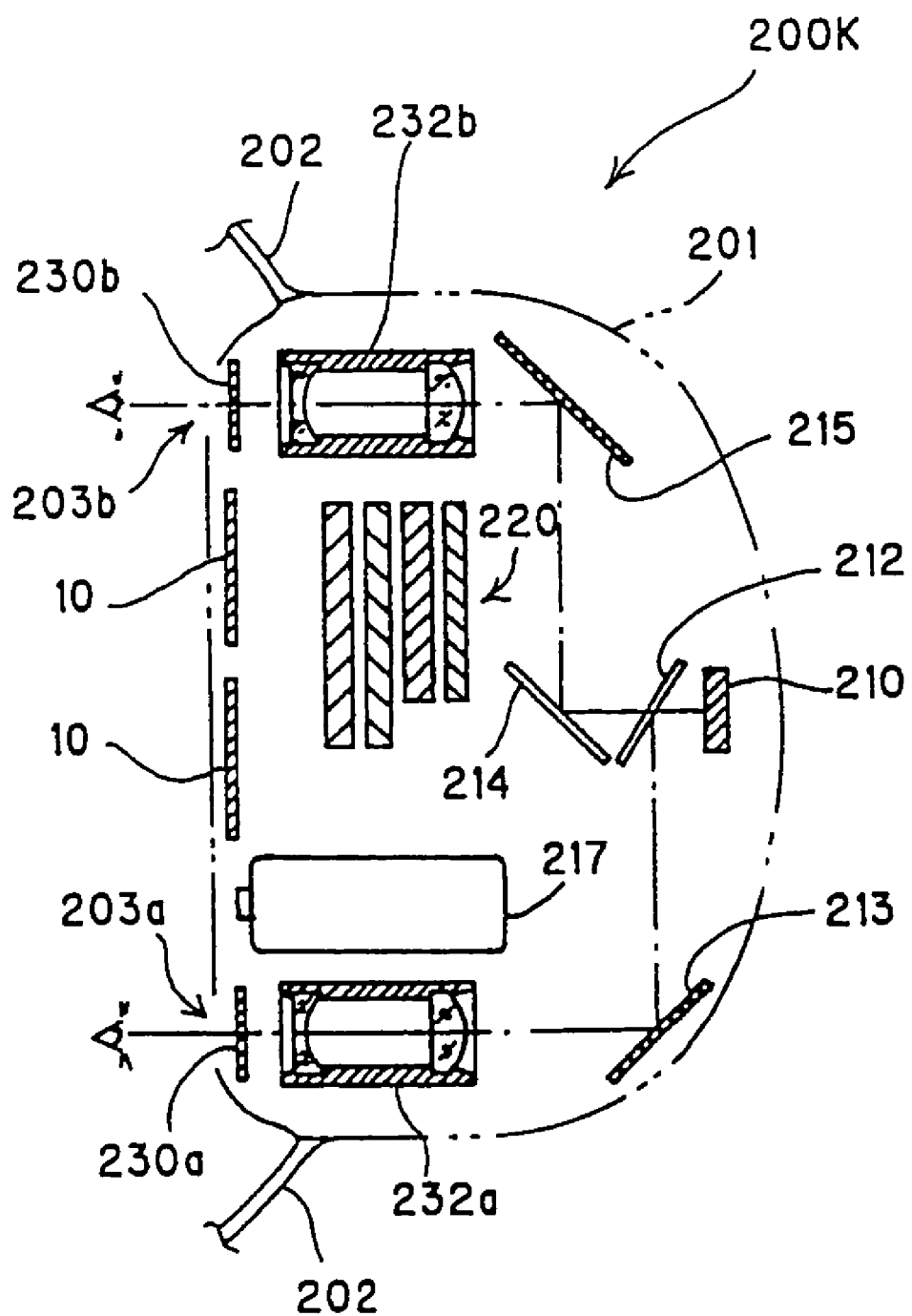
FIG. 39 shows a sectional view taken along the line A-A of FIG. 38.

FIG. 39 shows a sectional view taken along the line A-A of FIG. 38.

The eleventh embodiment of an image reproducing apparatus has a single liquid crystal display unit 210, similar to the first embodiment shown in FIGS. 7 to 9, wherein images are alternately applied to the right and left eyes by two liquid crystal shutters 216a and 216b. Different points of the eleventh embodiment from the first embodiment shown in FIGS. 7 to 8 will be described hereinafter.

An image reproducing apparatus 200K shown in FIGS. 38 to 39 is provided, in a similar fashion to that of the image reproducing apparatus 200J shown in FIGS. 35 to 37, with an arrangement that two recording media 10 are loaded and accessed. Specifically, as shown in FIG. 38, there are provided two recording medium loading chamber covers 204a and 204b. Images based on image signals obtained through reading out from the respective recording media are formed on the single liquid crystal display unit 210 on a time sequence basis. Further, according to the eleventh embodiment, as shown in FIG. 38, there is provided an audio output terminal 236. Audio information recorded on the recording media is read out in the form of audio signal, and outputted from the audio output terminal 236 to the exterior so that sound emanates from an external speaker (not illustrated).

Furthermore, according to the eleventh embodiment shown in FIGS. 38 and 39, there is provided a pair of Galilean magnifying lenses 232a and 232b.

As will be seen from the above, an image reproducing apparatus according to the present invention can be implemented by various combinations of elements.

Figure 40:
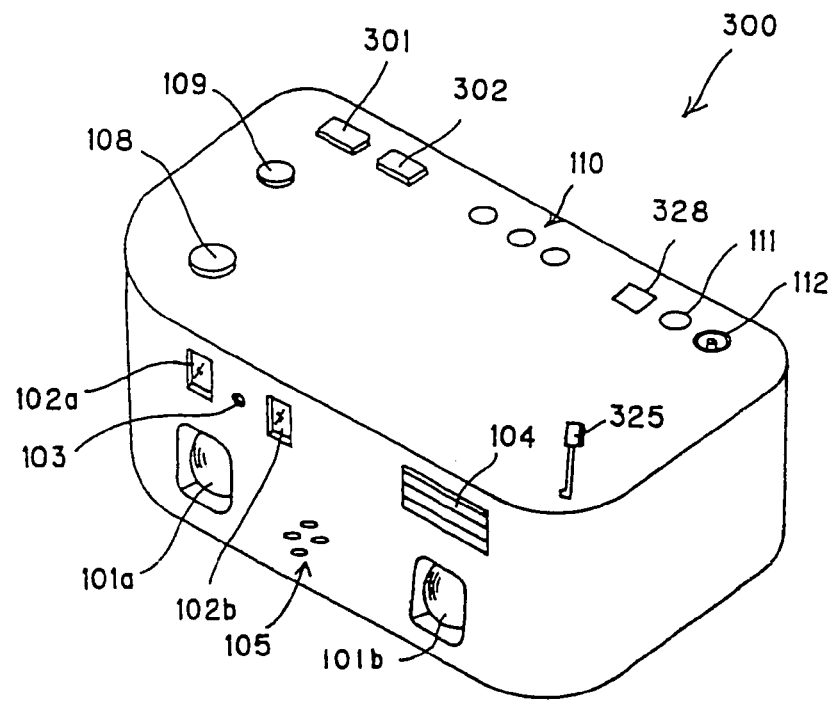
FIG. 40 is a perspective view showing appearance of an image photographic and reproducing apparatus according to an embodiment of the present invention looking from the front side.
Figure 41:
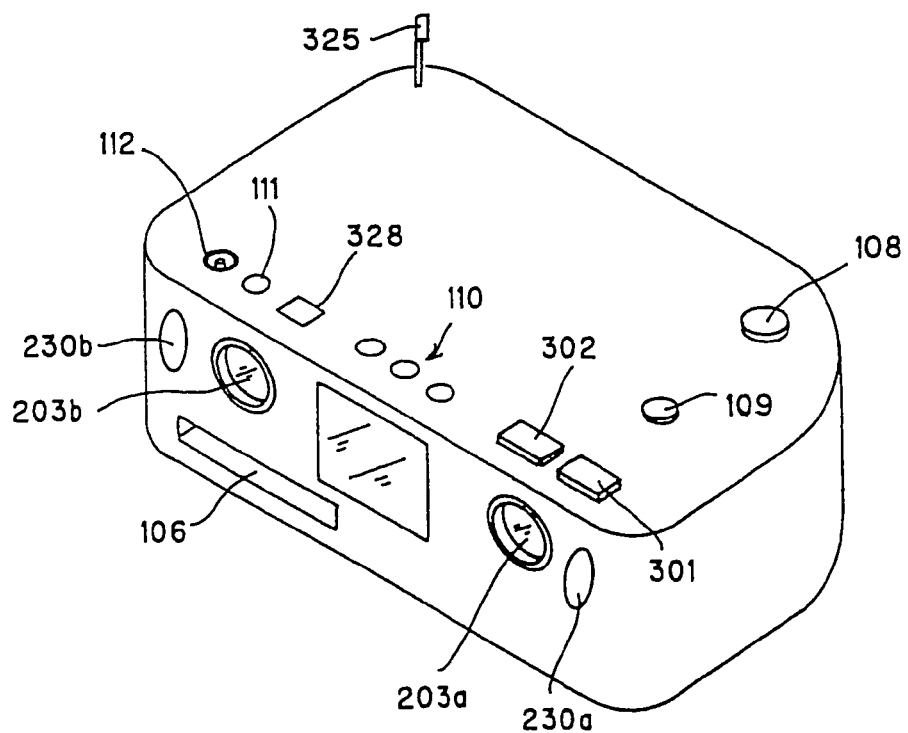
FIG. 41 is a perspective view showing appearance of an image photographic and reproducing apparatus according to an embodiment of the present invention looking from the back side.
Figure 42:
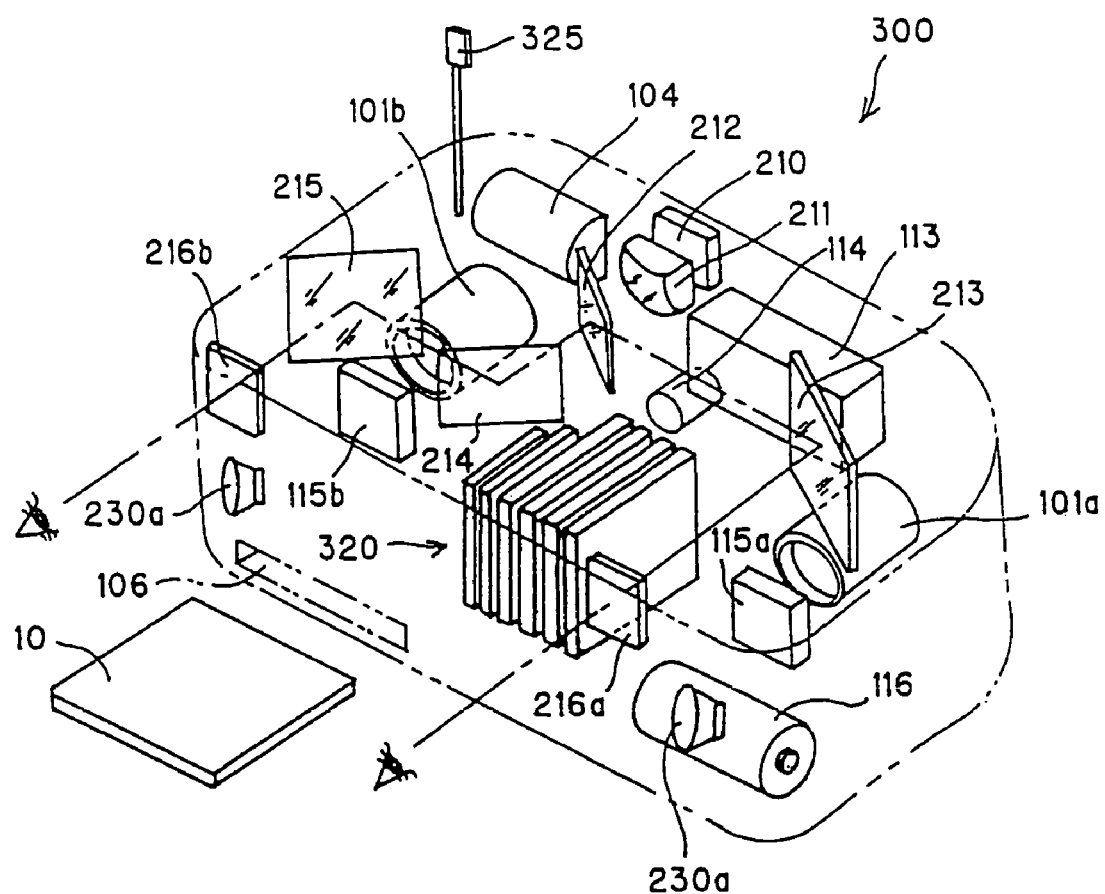
FIG. 42 is a view showing a main internal structure of the image photographic and reproducing apparatus according to the present embodiment.
Figure 43:
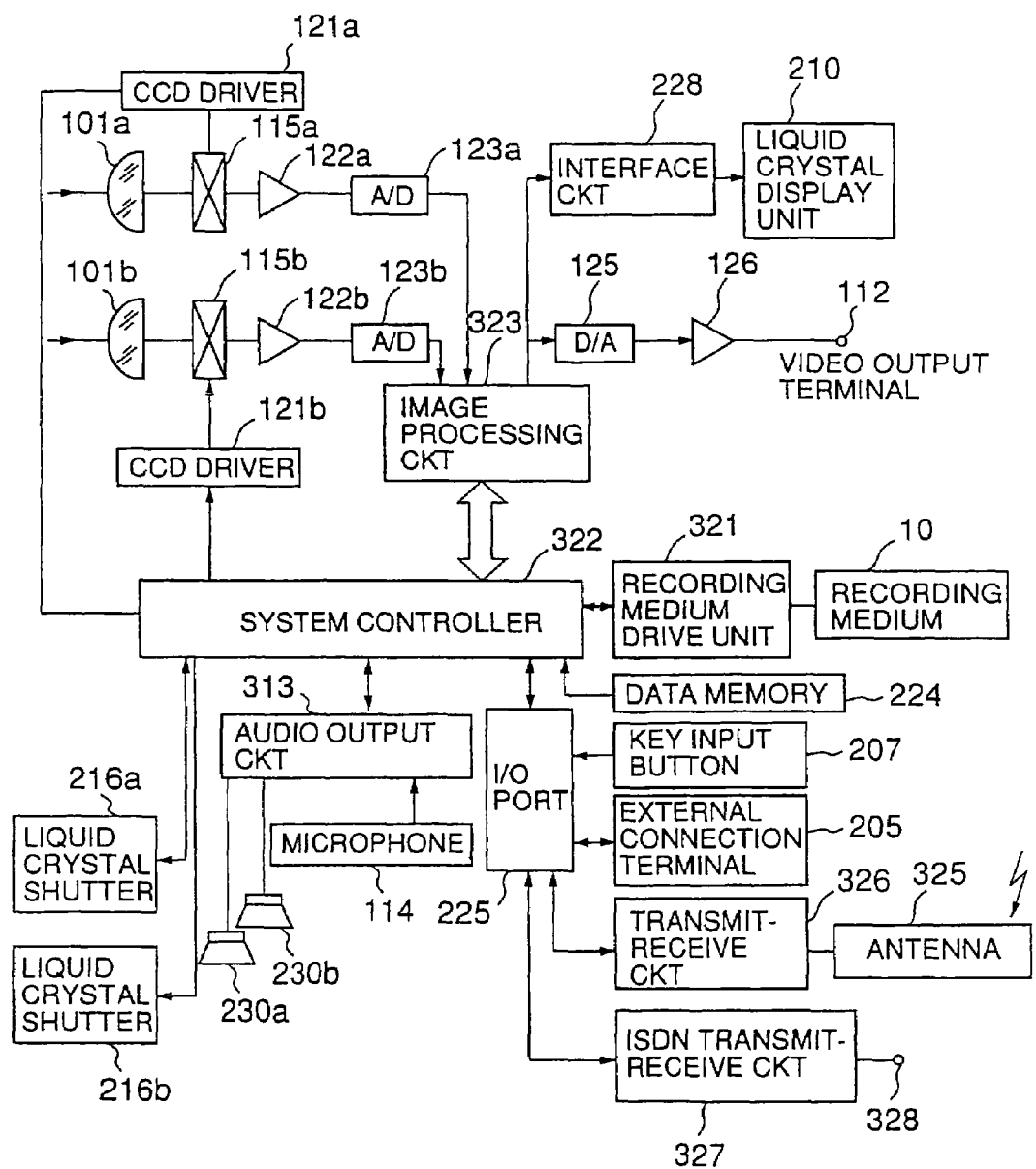
FIG. 43 is a block diagram of a circuit structure of the image photography apparatus shown in FIGS. 40, 41 and 42.

FIG. 40 is a perspective view showing appearance of an image photographic and reproducing apparatus according to an embodiment of the present invention looking from the front side. FIG. 41 is a perspective view showing appearance of an image photographic and reproducing apparatus according to an embodiment of the present invention looking from the back side. FIG. 42 is a view showing a main internal structure of the image photographic and reproducing apparatus according to the present embodiment. FIG. 43 is a block diagram of a circuit structure of the image photography apparatus shown in FIGS. 40, 41 and 42.

An image photographic and reproducing apparatus 300 is similar to the combination of the first embodiment of the image photography apparatus shown in FIGS. 1 to 4 and the first embodiment of the image reproducing apparatus shown in FIGS. 7 to 9. Hereinafter, there will be described points different from such a simple combination.

Difference between the image photographic and reproducing apparatus 300 shown in FIGS. 40 and 41 and the image photography apparatus 100A shown in FIGS. 1 and 2 in appearance resides in the points that the image photographic and reproducing apparatus 300 is provided with an antenna 325, a telephone connection terminal 328, a pair of eyepiece windows 203a and 203b, a pair of speakers 230a and 230, a photographic mode selection button 301, and a reproducing mode selection button 302, and that the liquid crystal display 107 of TFT type shown in FIG. 2 is omitted.

Further, circuit blocks 320 shown in FIG. 42 include both circuit blocks for photography and circuit blocks for reproduction.

According to the circuit structure shown in FIG. 43, a recording medium drive unit 321 serves as both the recording medium drive unit 128 for storing image information into the recording medium 10, as shown in FIG. 4, and the recording medium drive unit 221 for reading out image information from the recording medium 10 to obtain an image signal, as shown in FIG. 9. Likely, a system controller 322 serves as both the system controller 127 shown in FIG. 4 and the system controller 222 shown in FIG. 9. And an image processing circuit 323 serves as both the image processing circuit 124 shown in FIG. 4 and the image processing circuit 223 shown in FIG. 9. The circuit structure shown in FIG. 43 includes an audio input and output circuit 313. The audio input and output circuit 313 introduces to the inside an audio signal picked up by a microphone 114 or enables speakers 230a and 230b with audio signals transmitted from the inside. Further, the circuit structure shown in FIG. 43 includes a transmit-receive circuit 326 for transmitting and receiving radio waves representative of image and voice via an antenna 325, and an ISDN transmit-receive circuit 327 for transmitting and receiving signals representative of image and voice via a telephone line (not illustrated) connected to the telephone connection terminal 328. Thus, according to the image photographic and reproducing apparatus 300, it is possible to output an image obtained through the image taking lens 101a and 101b via a radio wave or a telephone line to the exterior, and also upon receipt of a radio wave carrying image information and a signal carrying image information transmitted via a telephone line, it is possible to form an image on the liquid crystal display unit 210.

With respect to other arrangements, they are the same as the combinations of the first embodiment of the image photography apparatus shown in FIGS. 1 to 3 and the first embodiment of the image reproducing apparatus shown in FIGS. 7 to 9. Redundant description will be omitted.

Incidentally, with respect to the image photographic and reproducing apparatus, only one embodiment is shown as described above. It is noted, however, that various embodiments of the image photographic and reproducing apparatus can be considered by the combination of an optional embodiment of the image photography apparatus of the present invention and an optional embodiment of the image reproducing apparatus of the present invention.

In the above embodiment of the image photographic and reproducing apparatus, the image photographic and reproducing apparatus is formed in a united body of the image photography apparatus and the image reproducing apparatus of the present invention. It is acceptable, however, to provide a system in which the image photography apparatus and the image reproducing apparatus are separated in a pair.

Figure 44:
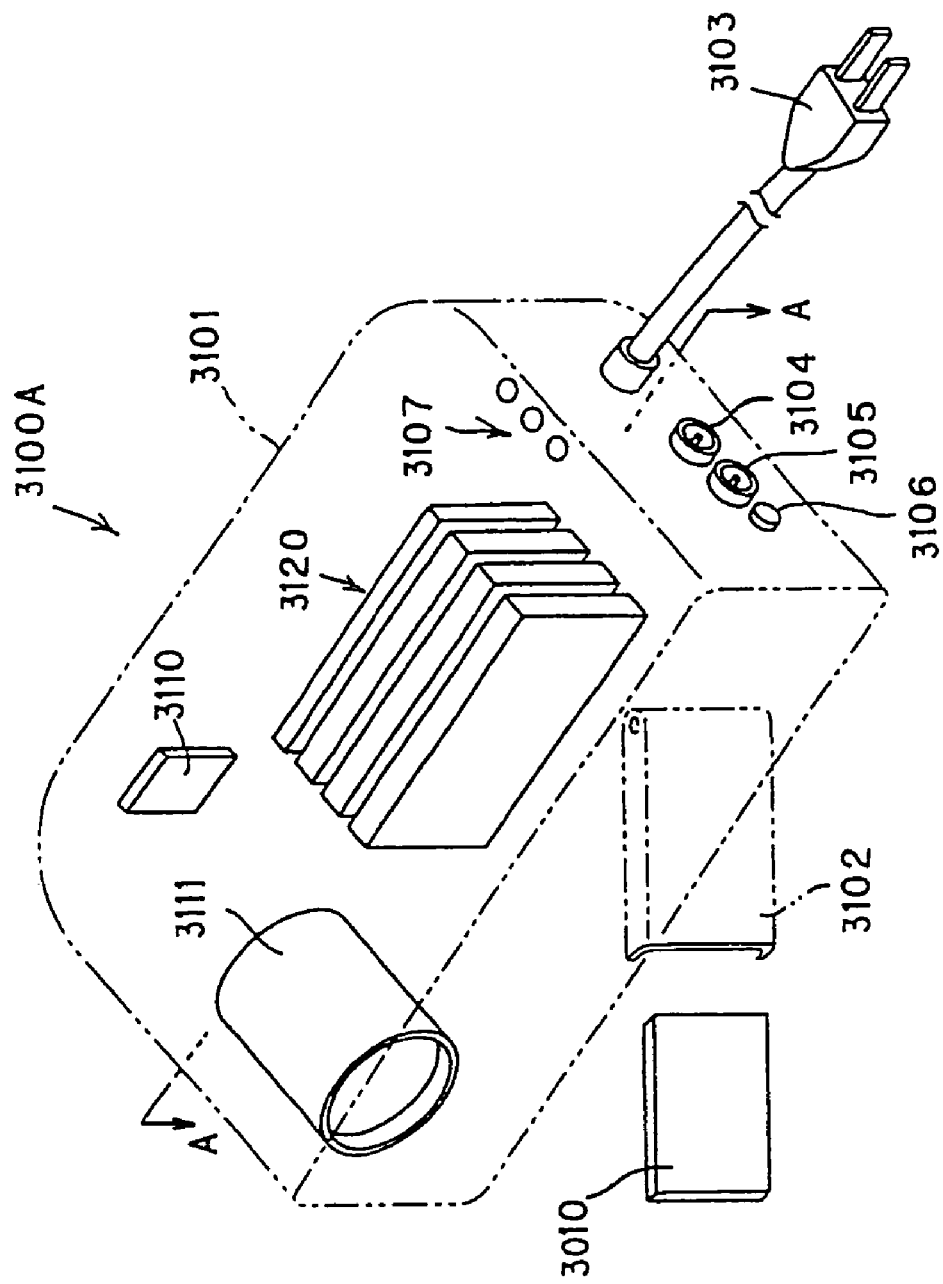
FIG. 44 is a typical illustration showing a main internal structure of a first embodiment of a stereographic projector according to the present invention.
Figure 45:
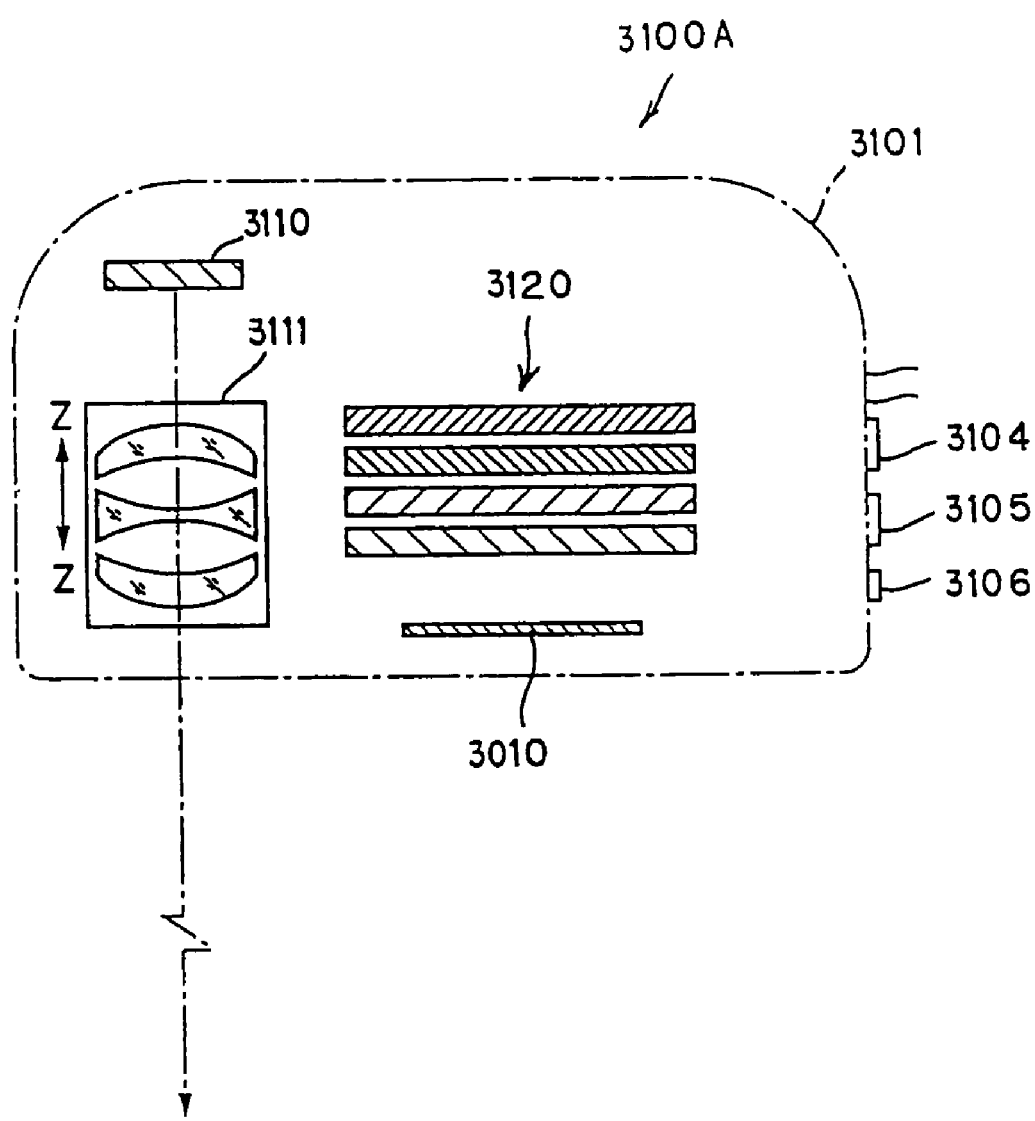
FIG. 45 shows a sectional view taken along the line A-A of FIG. 44.

FIG. 44 is a typical illustration showing a main internal structure of a stereographic projector according to a first embodiment of the present invention. FIG. 45 shows a sectional view taken along the line A-A of FIG. 44. In FIG. 44, an outline of a cover member is shown with a two-dot chain line.

Figure 48:
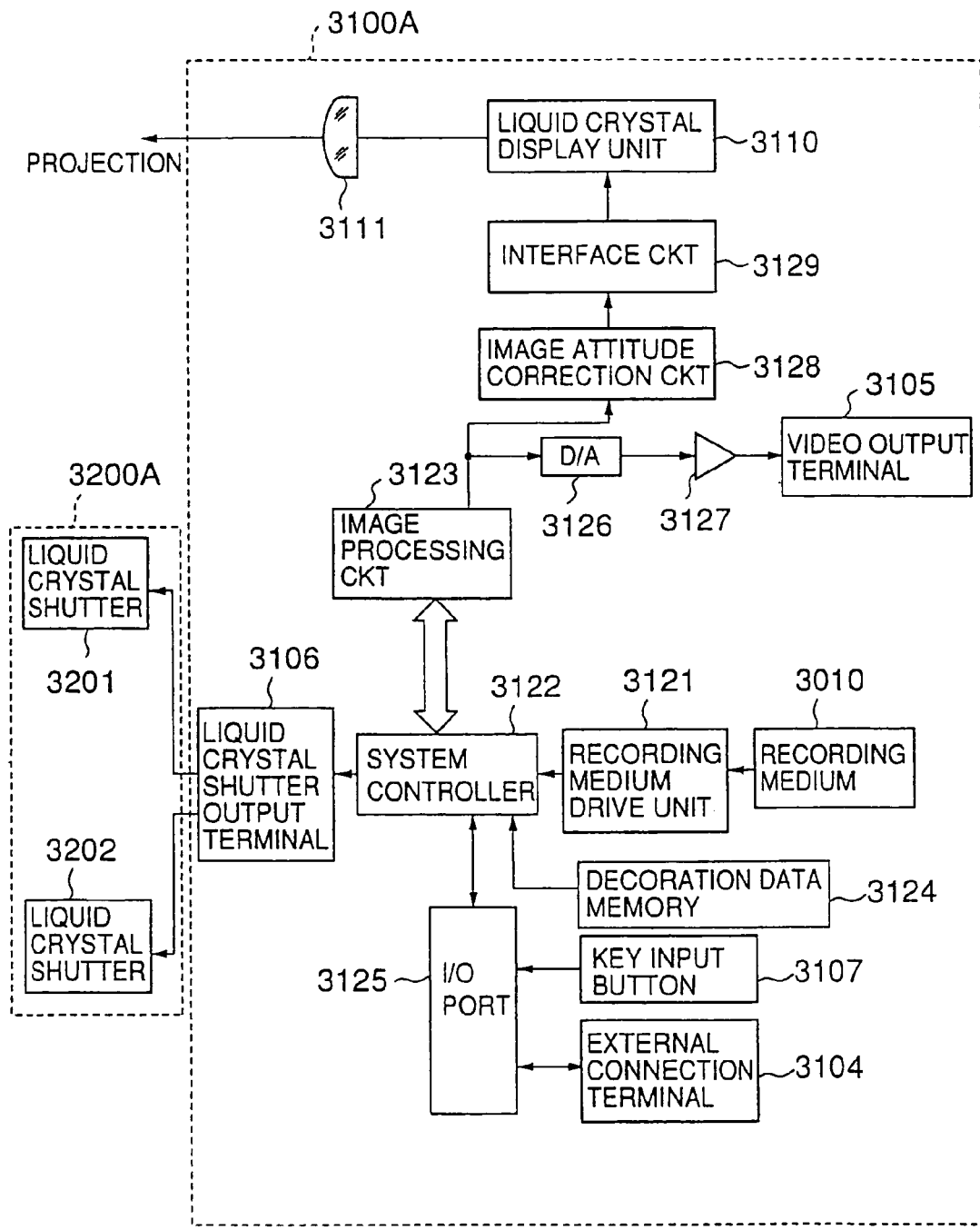
FIG. 48 is a block diagram of a circuit structure of the stereographic projector shown in FIGS. 44 and 45 and the jig for an image stereoscopic vision shown in FIG. 46.

On a cover member 3101 of a stereographic projector 3100A, there are disposed or connected a recording medium loading chamber cover 3102 for loading a portable recording medium 3010 (for example, a floppy disk, a CD-ROM, an MD, a flash memory, an MO, etc.), a power source plug 3103 for connecting with a commercial power source, an external connecting terminal 3104, a video output terminal 3105, a liquid crystal shutter output terminal 3106 and a key input button 3107. Inside the cover member 3101, there are disposed a liquid crystal display unit 3110, a projection lens unit 3111 and circuit blocks 3120. The circuit blocks 3120 comprise various circuits as shown in FIG. 48 which will be described later.

The liquid crystal display unit 3110 emits light carrying image information. The light emitted from the liquid crystal display unit 3110 emanates via the projection lens unit 3111 outside the cover member 3101, so that an expanded image is projected onto a screen such as a wall of a room for example, not illustrated. In order to project an image focused onto the screen, the projection lens unit 3111 is slidably movable in arrow z-z directions. A focusing control is performed through moving the projection lens unit 3111 in arrow z-z directions.

Figure 46:
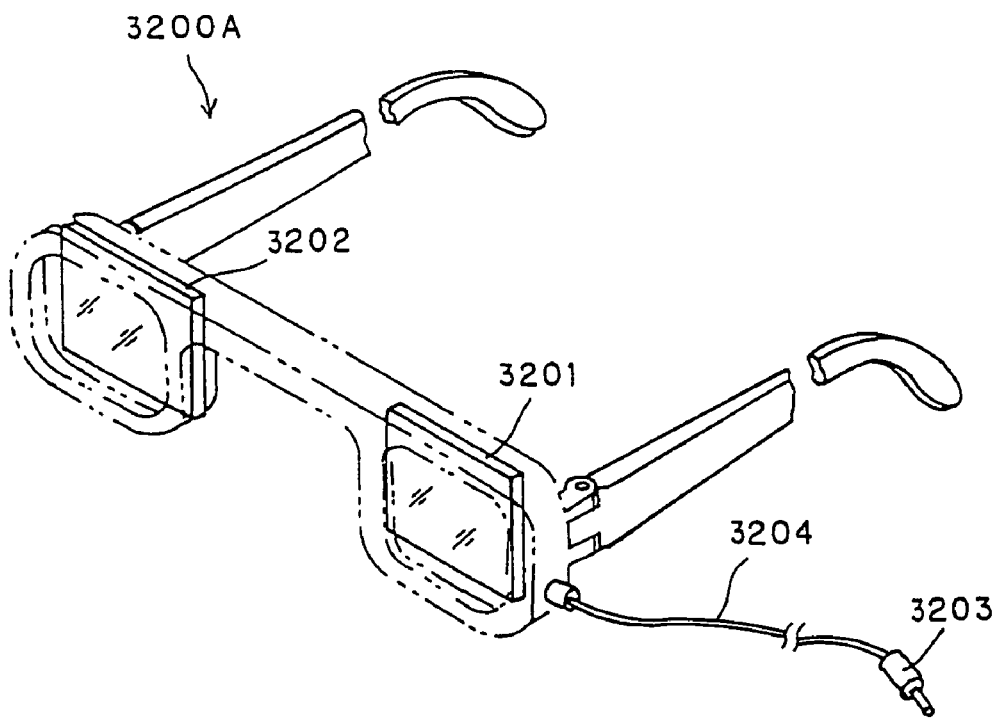
FIG. 46 is a typical perspective view of a first embodiment of a jig for an image stereoscopic vision which is used when an image projected onto a screen is observed.
Figure 47:
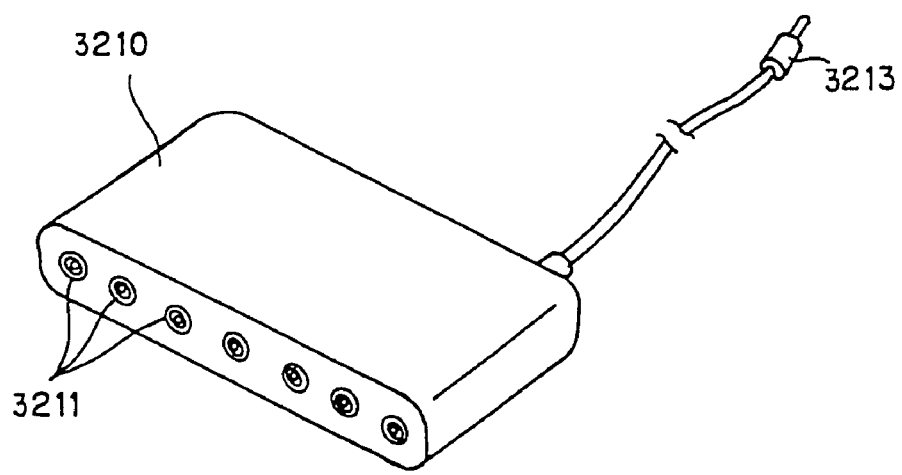
FIG. 47 is a perspective view of a distributor which is used when an image projected onto a screen is simultaneously observed by a plurality of persons.

FIG. 46 is a typical perspective view of a first embodiment of a jig for an image stereoscopic vision which is used when an image projected onto a screen is observed. FIG. 47 is a perspective view of a distributor which is used when an image projected onto a screen is simultaneously observed by a plurality of persons.

An image stereoscopic vision jig 3200A has an arrangement in which in a similar fashion to that of grasses, it is loaded through putting it on an observer's nose and ears.

The image stereoscopic vision jig 3200A is provided with a left eye use liquid crystal shutter 3201 and a right eye use liquid crystal shutter 3202, which are disposed before the left eye and the right eye of the observer when it is loaded. Connected to the image stereoscopic vision jig 3200A is a code 3204 having at the end a plug 3203 which is to be connected to the liquid crystal shutter output terminal 3106 of the stereographic projector 3100A shown in FIGS. 44 and 45.

A distributor 3210 shown in FIG. 44 distributes a signal entered from a plug 3213 of the distributor 3210 to a plurality of terminals 3211. When a plurality of observers simultaneously observe an image on a screen, each observer loads the image stereoscopic vision jig 3200A shown in FIG. 46. Whereas the plug 3213 of the distributor 3210 shown in FIG. 47 is connected to the stereographic projector 3100A shown in FIGS. 44 and 45, and the plug 3203 of the image stereoscopic vision jig 3200A loaded on each observer is inserted into the associated terminal 3211 of the distributor 3210.

FIG. 48 is a block diagram of a circuit structure of the stereographic projector shown in FIGS. 44 and 45 and the jig for an image stereoscopic vision shown in FIG. 46.

On the portable recording medium 3010, there is recorded image information representative of color images associated with right and left eyes. A recording medium drive unit 3121 reads from the recording medium 3010 the image information in the form of an electric image signal. The electric image signal thus read is transmitted via a system controller 3122 to an image processing circuit 3123. The system controller 3122 controls a flow of signals to be transmitted inside the stereographic projector 3100A and an operational timing of the respective sections of the stereographic projector 3100A, and serves as a timing signal generating circuit referred to in the present invention, too.

The image processing circuit 3123 produces a composite image through composing and editing image signals obtained from the recording medium 3010 and image signals entered through several image input means which will be described later.

A decoration data memory 3124 previously stores therein image information for decorating an image, for example, image information for various characters and various patterns (templates). From the decoration data memory 3124, characters, templates and the like are read in the form of an electric image signal, and the electric image signal thus read is transmitted via the system controller 3122 to the image processing circuit 3123.

The key input button 3107, which is also shown in FIG. 44, is for inputting various types of instruction and data to the stereographic projector 3100A through button operation. The key input button 3107 is connected to the system controller 3122 via an I/O port 3125 for mediating various types of data entered from the exterior. An operation of the key input button 3107 determines entry of the image information. It is possible to input through the key input button 3107 a character message and the like to be superimposed on an image. When a character message is inputted through the key input button 3107, a signal representative of the character message is also inputted to the image processing circuit 3123, so that it is compounded as a part of an image. Here, it is assumed that the signal representative of the character message is also included in the image signal without distinction from other image signal.

The external connecting terminal 3104 is a terminal for connecting to, for example, a personal computer, so that various types of instruction and images can be entered from the personal computer side. The external connecting terminal 3104 is also connected via the I/O port 3125 to the system controller 3122. The image signal, which has been subjected to composition and edition in the image processing circuit 3123 as the need arises, is converted into an analog image signal by a D/A converter 3126, in one of the processes, and then outputted to the exterior via a buffer amplifier 3127 and the video output terminal 3105 which is shown in FIGS. 44 and 45, too. The video output terminal 3105 may be connected with, for example, a video terminal of a television, so that an image is displayed on a screen of the television.

As another process for the image signal outputted from the image processing circuit 3123, there exists a path, which is inherent in the present invention, passing through an image attitude correction circuit 3128 and an interface circuit 3129, wherein an image is formed on a liquid crystal plate 1101 (cf. FIG. 50 to FIG. 53) of the liquid crystal display unit 3110 and a three-dimensional image is provided for an observer putting on the jig for image stereoscopic version as shown in FIG. 46. The system controller 3122 generates a timing signal for switching liquid crystal shutters 3201 and 3202 provided on the image stereoscopic vision jig 3200A in synchronism with a timing in which an image is formed on the liquid crystal display unit 3110. The timing signal thus generated is transferred via a liquid crystal shutter output terminal 3106 to the image stereoscopic vision jig 3200A. upon receipt of the timing signal, the image stereoscopic vision jig 3200A provides such a control that in a timing wherein an image for the left eye is formed on the liquid crystal plate 1101, the liquid crystal shutter 3201 for the left eye is opened, while the liquid crystal shutter 3202 for the right eye is closed, and in a timing wherein an image for the right eye is formed on the liquid crystal plate 1101, the liquid crystal shutter 3202 for the right eye is opened, while the liquid crystal shutter 3201 for the left eye is closed. Details will be described later.

According to the first embodiment of the present invention, the image attitude correction circuit 3128 has a function of converting an image signal transmitted from the signal processing circuit 3123 to an image signal representative of an image which is reversed in top and bottom.

When an image, which is formed on the liquid crystal plate 1101 (cf. FIG. 50 to FIG. 53) of the liquid crystal display unit 3110, is projected onto a screen, for example, a wall of a room, using the stereographic projector 3100A shown in FIG. 44 and FIG. 45, then an image, which is reversed as compared with the image formed on the liquid crystal plate, is projected onto the screen by the effect of the projection lens unit 3111.

For this reason, in order to form on the liquid crystal plate an image which is reversed in top and bottom, the image attitude correction circuit 3128 shown in FIG. 48 is used to convert an image signal transmitted from the signal processing circuit 3123 to an image signal representative of an image which is reversed in top and bottom. Thus, it is possible to provide an erect image for an observer who observes an image projected onto the screen.

Figure 49:
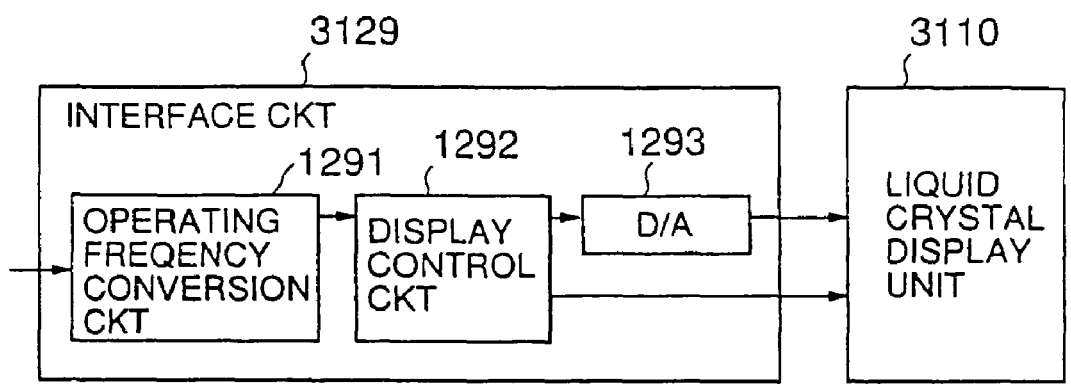
FIG. 49 is a circuit block diagram of an internal structure of an interface circuit.

FIG. 49 is a circuit block diagram of an internal structure of the interface circuit 3129.

The interface circuit 3129 comprises an operating frequency conversion circuit 1291, a display control circuit 1292 and a D/A converter 1293. Details will be described later.

Figure 50:
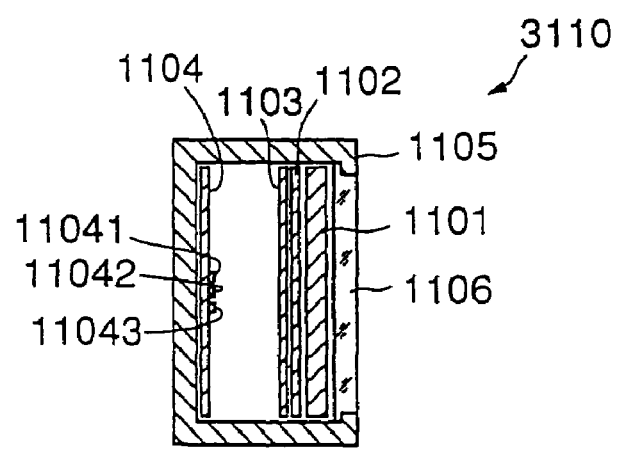
FIG. 50 is a sectional view of a liquid crystal display unit according to one embodiment.
Figure 51:
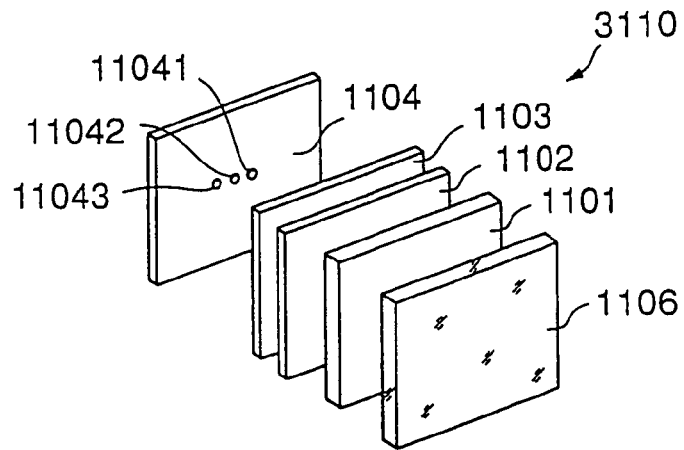
FIG. 51 is an exploded perspective view of a liquid crystal display unit according to one embodiment.

FIG. 50 is a sectional view of a liquid crystal display unit according to one embodiment. FIG. 51 is an exploded perspective view of the liquid crystal display unit according to one embodiment. It is noted that in FIG. 51 there is shown no cover member.

The liquid crystal display unit 3110 comprises a transmissive matrix drive-type liquid crystal plate 1101, a diffusing plate 1102, a light quantity increasing plate 1103, and a circuit substrate 1104, which are arranged in the named order inside a cover member 1105. A transparent protection cover 1106 is fixed at the front of the crystal plate 1101. On the circuit substrate 1104, there are mounted LED's 11041, 11042 and 11043 which emit light of red (R), green(G) and blue(B), respectively.

On the liquid crystal plate 1101, a number of pixels (for example, length 240 pixels×breadth 320 pixels=total 76,800 pixels) are arranged on a two-dimensional basis. The crystal plate 1101 is not involved in color elements red (R), green (G) and blue(B) per se. Temporarily, the whole pixels of the liquid crystal plate 1101 are used to form one image. And, a light, which transmits through the crystal plate 1101 and the protection cover 1106 as well, according as any of three LED's 11041, 11042 and 11043 is turned on, offers an image of the associated color.

Figure 52:
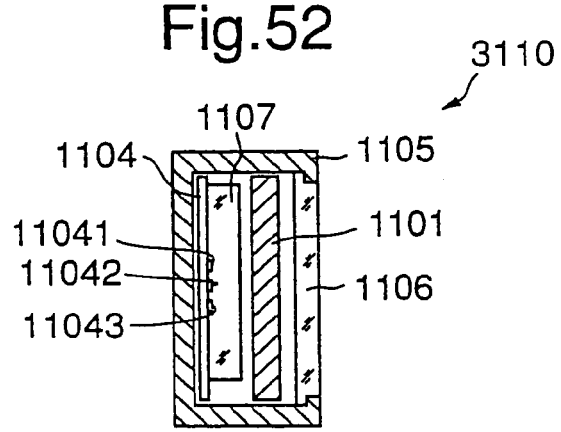
FIG. 52 is a sectional view of a liquid crystal display unit according to an alternative embodiment.
Figure 53:
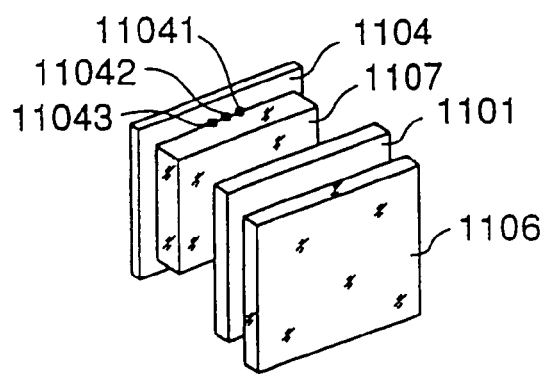
FIG. 53 is an exploded perspective view of a liquid crystal display unit according to an alternative embodiment excepting a cover member.

FIG. 52 is a sectional view of a liquid crystal display unit according to an alternative embodiment. FIG. 53 is an exploded perspective view of a liquid crystal display unit according to an alternative embodiment excepting a cover member.

Inside a cover member 1105 in the front of which a transparent protection cover 1106 is fixed, there are arranged a liquid crystal plate 1101 which is the same type of liquid crystal plate shown in the liquid crystal display unit shown in FIGS. 50 and 51, a diffusing plate 1107, and a circuit substrate 1104 on which LED's 11041, 11042 and 11043 for three colors R, G and R are mounted. The mounting positions of the LED's 11041, 11042 and 11043 on the circuit substrate 1104 are different from those of the LED's on the circuit substrate of the liquid crystal display unit shown in FIGS. 50 and 51. As shown in FIG. 53, the LED's 11041, 11042 and 11043 are mounted on the upper edge of the circuit substrate 1104 in a direction to illuminate the diffusing plate 1107.

When any one of the LED's 11041, 11042 and 11043 turns on, the emitted light is temporarily incident onto the diffusing plate 1107, and then evenly diffused within the diffusing plate 1107 to irradiate the liquid crystal plate 1101 from the back.

It is acceptable that the liquid crystal display unit 3110 shown in FIGS. 44, 45, 48 and 49 in the form of a block has a structure as shown in FIGS. 52 and 53.

Here, as the light source, the LED is exemplarily shown. However, the light source is not restricted to the LED, and it is acceptable to use a light source capable of obtaining a large quantity of emitting light.

Figure 54:
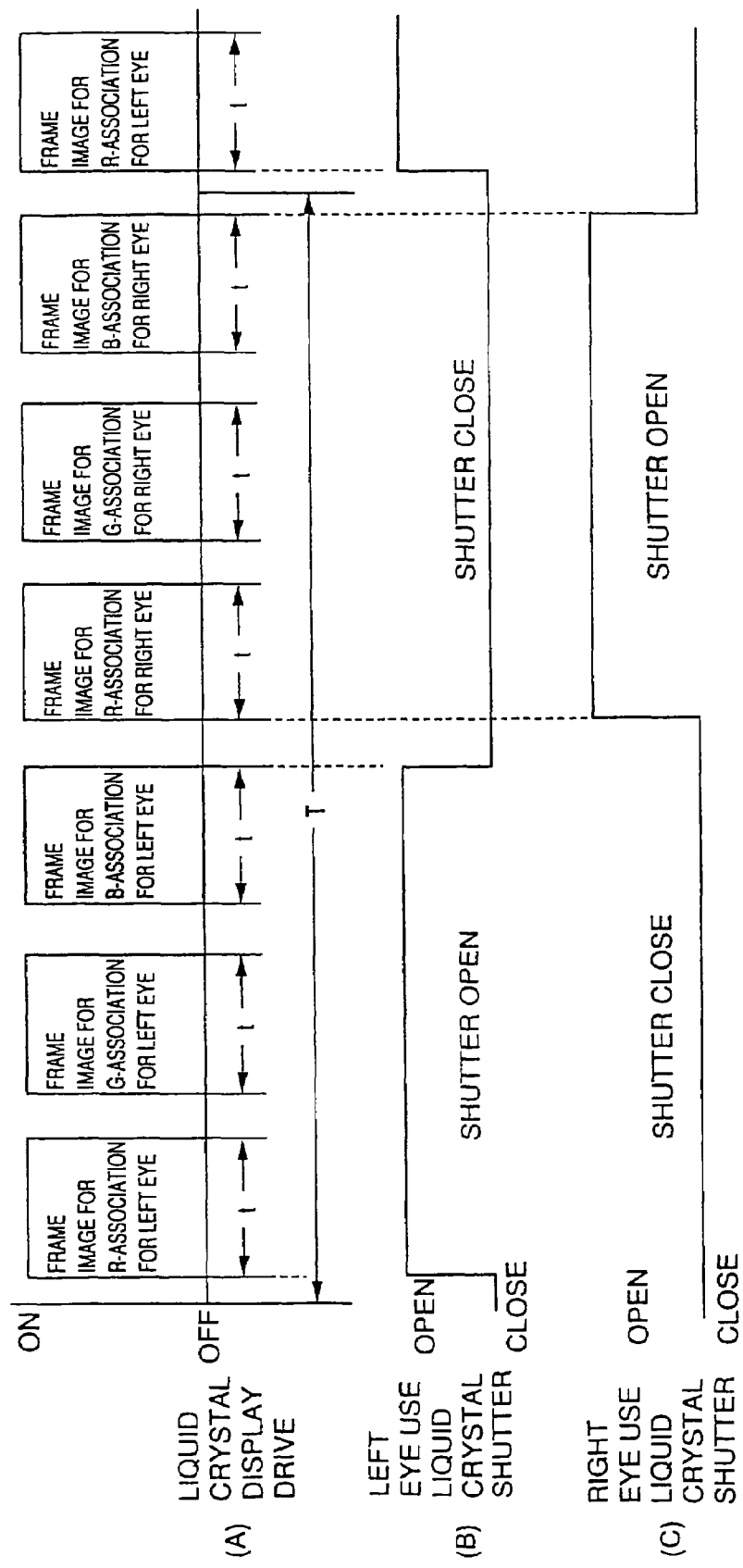
FIG. 54 is a time chart for an example of a sequence for forming an image on a liquid crystal plate constituting a liquid crystal display unit.

FIG. 54 is a time chart for an example of a sequence for forming an image on the liquid crystal plate 1101 constituting the liquid crystal display unit 3110.

Part (A) of FIG. 54 shows a timing for an image formation on the liquid crystal plate 1101, and parts (B) and (C) of FIG. 54 show, respectively, timing signals for open and close timing of left eye use liquid crystal shutter 3201 and right eye use liquid crystal shutter 3202 which are provided on the image stereoscopic vision jig 3200A. The display control circuit 1292 of the interface circuit 3129 shown in FIG. 49 performs an image formation on the liquid crystal plate 1101. The system controller 3122 shown in FIG. 48 generates the timing signals for open and close timing of left eye use liquid crystal shutter 3201 and right eye use liquid crystal shutter 3202.

Here, a color image as to each of left eye and right eye is separated into frame images, which are associated with colors of R, G and B, respectively, and as shown in FIG. 54, on a time division basis, on the liquid crystal plate 1101, first, a frame image associated with color of R for the left eye is formed, secondly, a frame image associated with color of G for the left eye is formed, thirdly, a frame image associated with color of B for the left eye is formed, and then frame images for the right eye are formed in a similar fashion to that of the left eye as mentioned above. Those processes are alternately repeated.

While FIG. 54 fails to illustrate it, regardless of the left eye use or the right eye use, there is provided such a control that in synchronism with the formation of the respective frame images onto the liquid crystal plate, the LED 11041 for color R pulse-turns on in a timing wherein the frame image for R-association is formed, the LED 11042 for color G pulse-turns on in a timing wherein the frame image for G-association is formed, and the LED 11043 for color B pulse-turns on in a timing wherein the frame image for B-association is formed. Thus, the liquid crystal display unit 3110 may sequentially emit light beams of colors R, G, B, R, G, . . . carrying image information on a time division basis.

On the other hand, with respect to the left eye use liquid crystal shutter 3201 and the right eye use liquid crystal shutter 3202, regardless of any color of frame image of R, G, B, as shown in parts (B) and (C) of FIG. 441, there is provided such a control that in a timing that a frame image for left eye is formed on the liquid crystal plate 1101, the left eye use liquid crystal shutter 3201 offers an open state (a state that the liquid crystal shutter is transmittable in light) and the right eye use liquid crystal shutter 3202 offers a close state (a state that the liquid crystal shutter shuts off light), and in a similar fashion to that of the above, in a timing that a frame image for right eye is formed on the liquid crystal plate 1101, the right eye use liquid crystal shutter 3202 offers an open state and the left eye use liquid crystal shutter 3201 offers a close state.

Thus, images of colors R, G, B are sequentially incident onto the right eye and the left eye alternately, so that a color image is formed on both the eyes of an observer owing to the after-image phenomenon. Further, since an image incident onto the left eye and an image incident onto the right eye are independent of one another, preparation of only images, which are different by the correspondence of parallax between the right eye and left eye, makes it possible for the observer to recognize a three-dimensional color image.

Assuming that a total six frame images of three frame images of colors R, G, B constituting a frame of color image for the left eye and three frame images of colors R, G, B constituting a frame of color image for the right eye are expressed in the form of one group, a period T (cf. FIG. 54) of time in which six frame images constituting the one group are formed on the liquid crystal plate 1101 is set up to be not more than $\frac{1}{16}$ sec. The reason why this is to do so is that an establishment of the longer period than $\frac{1}{16}$ sec causes a person's eye to recognize intermission of light and flicker, and thus in case of a dynamic image a smooth movement of the image is hindered.

The pulse width of each of the light emitting pulses of the LED's 11041, 11042 and 11043 for colors R, G and R is shorter than a time t during which each of the frame images for colors R, G and R is formed on the liquid crystal plate 1101. It is also preferable to use a further shorter pulse width within a range permitted in view of for example luminance of an image arriving at a person's eye. This makes it possible to reduce a power dissipation, and particularly, it is more preferable for a stereographic projector which incorporates a battery therein.

Figure 55:
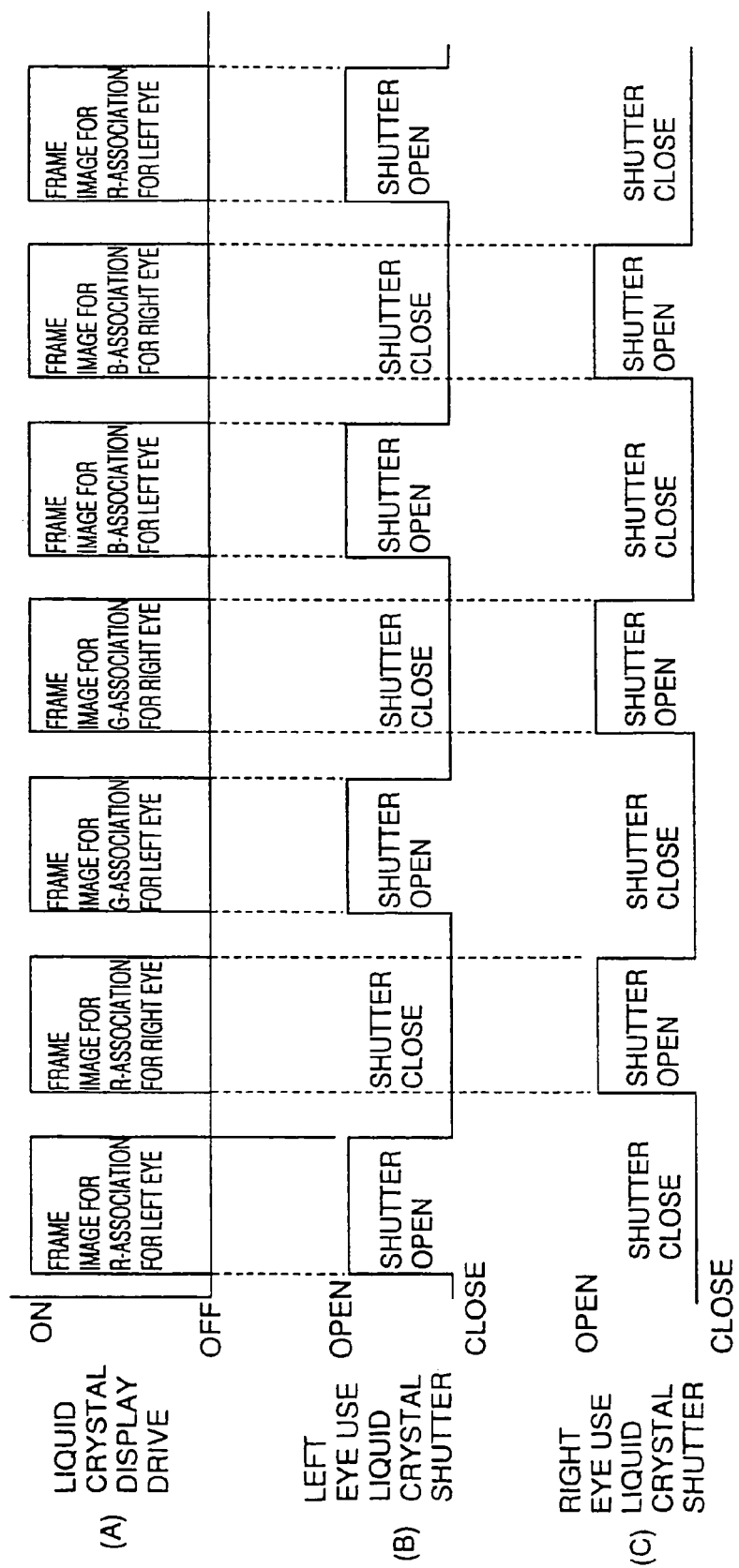
FIG. 55 is a time chart for an alternative example of a sequence for forming an image on a liquid crystal plate constituting a liquid crystal display unit.

FIG. 55 is a time chart for another example of a sequence for forming an image on the liquid crystal plate 1101 constituting the liquid crystal display unit 3110.

In a similar fashion to that of FIG. 54, part (A) of FIG. 55 shows a timing for an image formation on the liquid crystal plate 1101, and parts (B) and (C) of FIG. 55 show, respectively, open and close timings of left eye use liquid crystal shutter 3201 and right eye use liquid crystal shutter 3202.

Here, subsequent to the formation of the frame image for R-association for the left eye, the frame image for R-association for the right eye is formed, then the frame image for G-association for the left eye, the frame image for G-association for the right eye, the frame image for B-association for the left eye, and the frame image for B-association for the right eye are formed on the liquid crystal plate 1101 in the named order. The liquid crystal shutters 3201 and 3202 also alternately open and close in synchronism with a formation of every frame image.

It is acceptable that images are formed on the liquid crystal plate 1101 in the sequence as shown in part (A) of FIG. 55, and the liquid crystal shutters 3201 and 3202 are controlled in open and close operations in synchronism with the image formation, as shown in parts (B) and (C) of FIG. 55.

Incidentally, while the above explanation has been made supposing a dynamic image, this is the similar as to the matter of the formation of a still image. In case of the still image, only a frame of color image exists on each of the right eye and the left eye. Such a frame of color image for each eye is separated into three frame images associated with R, G, B of colors, and total 6 frame images are recursively formed on the liquid crystal plate 2101. This makes it possible to continuously provide a three-dimensional still color image for an observer.

While the above explanation says that the formation of the frame image and the turn-on and off of the LED's are performed in the order of R, G, B, R, G . . . , the order is not restricted to this order.

According to the embodiment shown in FIGS. 44 and 45, the timing signal for controlling the open and close of the liquid crystal shutter 3201 for the left eye and the timing signal for controlling the open and close of the liquid crystal shutter 3202 for the right eye are shown as individual signals. It is acceptable, however, that one of the two kinds of signal is fed to the image stereoscopic vision jig 3200A so that open and close operations of both the liquid crystal shutter 3201 for the left eye and the liquid crystal shutter 3202 for the right eye are controlled in accordance with the fed one signal.

Figure 56:
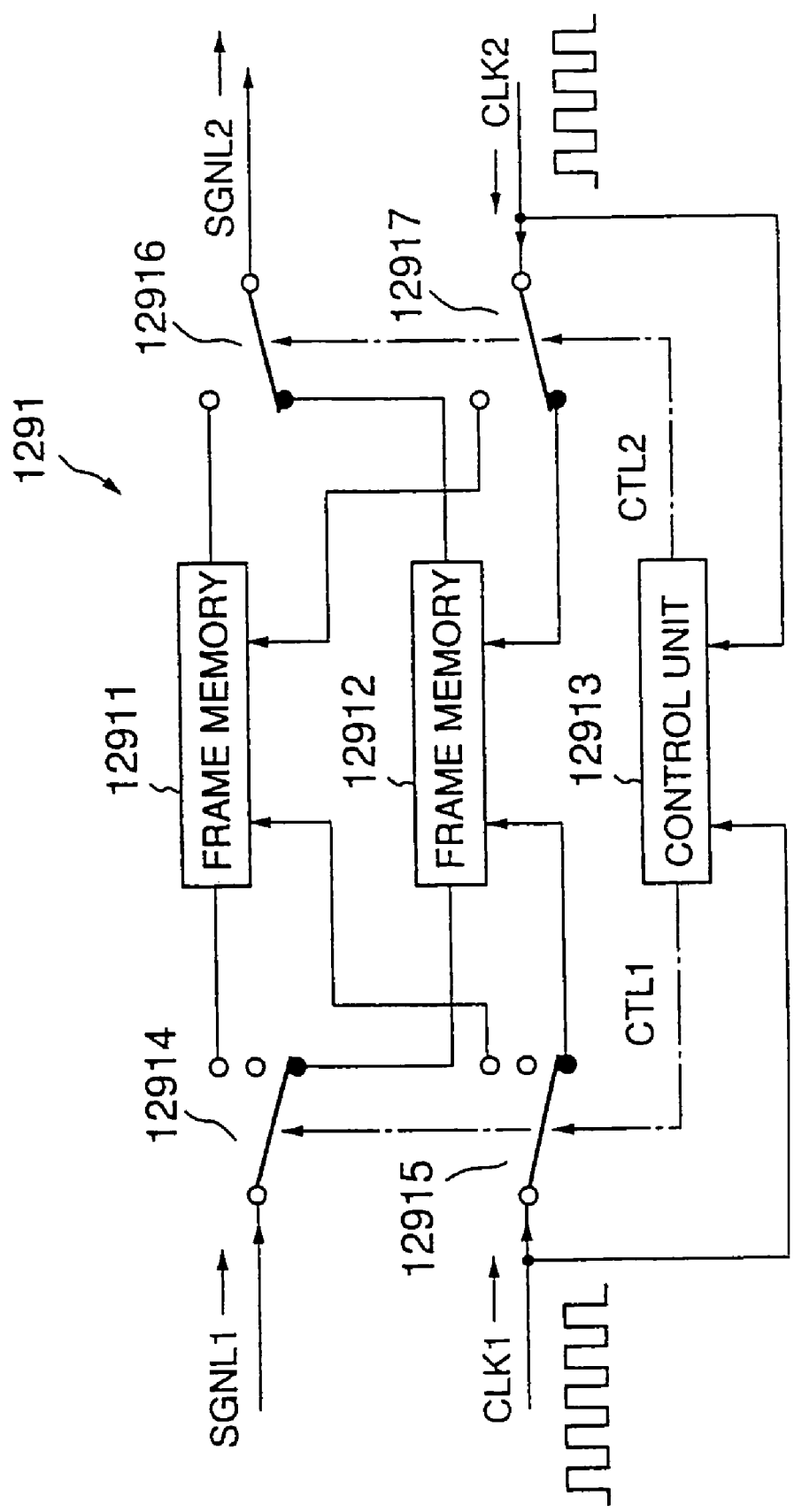
FIG. 56 is a block diagram of an operating frequency conversion circuit constituting the interface circuit shown in FIG. 49.

FIG. 56 is a block diagram of an operating frequency conversion circuit 1291 constituting the interface circuit 3129 shown in FIG. 49.

The operating frequency conversion circuit 3129 comprises two frame memories 12911 and 12912, a control unit 12913, and four switch circuits 12914, 12915, 12916 and 12917.

A digital image signal SGNL1 representative of a color image is transmitted from the image processing circuit 3123 shown in FIG. 48 to the interface circuit 3129 in synchronism with a first operating frequency of clock CLK1, so that the digital image signal SGNL1 is fed to the operating frequency conversion circuit 1291 shown in FIG. 49. The image signal SGNL1 is alternately stored in the frame memories 12911 and 12912 every frame in synchronism with the clock CLK1 in such a manner that a certain frame of image signal is stored in the frame memory 12911, the subsequent frame of image signal is stored in the frame memory 12912, and the further subsequent frame of image signal is stored in the frame memory 12911. The control unit 12913 monitors the clock CLK1 and switches the two switches 12914 and 12915 on an interlocking basis whenever a frame of image signal SGNL1 has been stored in one of the frame memories.

This is the similar as to the matter of reading out of image signals from the frame memories 12911 and 12912. In this case, when a frame of image signal has been read out from one of the frame memories in synchronism with a second operating frequency of clock CLK2, the two switches 12916 and 12917 are switched so that an image signal is read out from another frame memory in synchronism with the clock CLK2. Switching of the switches 12916 and 12917 is performed by the control unit 12913 which monitors the clock CLK2.

Here, the image signal read out in synchronism with the clock CLK2 is referred to as an image signal SGNL2.

In the event that frequencies of the clocks CLK1 and CLK2 are equal to one another, for example, in such a situation that the image signal SGNL1 is already stored in the frame memory 12911 and the subsequent frame of image signal SGNL1 is stored in the frame memory 12912, it is effective that the image signal SGNL2 is read out from the frame memory 12911 while the an image signal is stored in the frame memory 12912, and the read out of the image signal SGNL2 from the frame memory 12912 is started in a timing that the image signal SGNL1 has been completely stored in the frame memory 12912 and the subsequent frame of image signal SGNL1 is initiated in storage into the frame memory 12911. However, in the event that frequencies of the clocks CLK1 and CLK2 are not equal to one another, it is difficult to expect the operation in the above-mentioned timing. Accordingly, in such a case, a conversion from the image signal SGNL1 synchronized with the clock CLK1 to the image signal SGNL2 synchronized with the clock CLK2 is carried out by means of performing storage and read out of image signals in the manner set forth below.

In the event that the frequency of the clock CLK1 is higher than that of the clock CLK2, there may happen such a situation that even when it reaches a timing that a frame of image signal SGNL1 is stored in each of the frame memories 12911 and 12912 and the subsequent frame of image signal SGNL1 is to be transmitted, reading out for the frame memories 12911 and 12912 is not yet completed. The control unit 12913 monitors both the clock CLK1 and the clock CLK2, so that such a situation can be identified. Each of the two switches 12914 and 12915 has a neutral point which is not connected to any of the two frame memories 12911 and 12912. When it reaches the above-mentioned situation, the control unit 12913 switches the switches 12914 and 12915 to the neutral points, respectively, so as to provide such a control that the image signal SGNL1 is inhibited from being stored in any of the frame memories 12911 and 12912, until either one of the frame memories 12911 and 12912 is vacant through completion of a read out operation. When either one of the frame memories 12911 and 12912 becomes vacant, the switches 12914 and 12915 are switched to the side of the frame memory which becomes vacant, so that a storage operation to the vacant frame memory is initiated from the top of the subsequent frame.

On the other hand, in the event that the frequency of the clock CLK2 is higher than that of the clock CLK1, there may happen such a situation that at the time when reading out of image signal from one of the frame memories 12911 and 12912 is completed, a storage of image signal into another frame memory is not yet completed. This situation is detected by the control unit 12913 which monitors both the clock CLK1 and the clock CLK2. When such a situation occurs, the control unit 12913 does not switch the switches 12916 and 12917. That is, at the read out end, the same frame of image signal is read out again from the same frame memory. At the time point that the same frame of image signal has been completely read out again from the same frame memory, if the subsequent frame of image signal SGNL1 has been completely stored in another frame memory, the switches 12916 and 12917 are switched to read out the new frame of image signal.

In this manner, according to the operating frequency conversion circuit 1291 of the interface circuit 3129 shown in FIG. 49, the operating frequency is converted from the frequency of the clock CLK1 to the frequency of the clock CLK2.

The image signal SGNL2, which has been subjected to the conversion of the operating frequency by the operating frequency conversion circuit 291, is fed to the display control circuit 1292 of the interface circuit 3129 shown in FIG. 49. The display control circuit 1292 resolves each frame of a color image into three frames of three primary colors of R, G, B on each frame for the right and left eyes, and then sequentially outputs the same.

The image signals each representative of a frame for each color, which are sequentially outputted from the display control circuit 1292, are converted into analog image signals by the D/A converter 1293 and then fed to the liquid crystal plate 1101 (cf. FIGS. 11 to 14) of the liquid crystal display unit 3110. The display control circuit 1292 also transmits control signals for controlling turn-on and off of the LED's 11041, 11042 and 11043 to the LED's 11041, 11042 and 11043 of the liquid crystal display unit 3110. When these image signals and control signals are applied to the liquid crystal display unit 3110, the liquid crystal display unit 3110 operates in a way as described referring to FIG. 54 or FIG. 55.

It is acceptable that the recording medium 3010 to be loaded onto the stereographic projector 3100A shown in FIGS. 44, 45 and 48 is a recording medium on which an image obtained by a photography using a dedicated stereographic photography apparatus (not illustrated) is recorded. However, the recording medium 3010 is not restricted to such a recording medium as mentioned above. It is acceptable that a photography is performed using a stereographic photography apparatus of such a type that an image utilizing parallax of the right and left is projected onto a photographic film of a usual silver salt type, alternatively a photography is performed using two usual cameras, and an image formed on the silver salt type photographic film is read by a scanner and the like to record image information on a recording medium, so that the recording medium thus obtained is loaded onto the image reproducing apparatus for reproduction of a three-dimensional image.

Further, it is acceptable that an image is recorded on a recording medium through performing a photography using for example, a monocular video photography apparatus or still photography apparatus, alternatively an image is recorded on a recording medium through performing a photography using for example, a usual monocular camera in which a silver salt type of photographic film is loaded for a photography. When the recording medium thus provided is loaded onto the stereographic projector 3100A shown in FIGS. 44 and 45 to perform an image reproduction. In this case, however, a three-dimensional image is not reproduced. Thus, in the stereographic projector 3100A shown in FIGS. 44, 45 and 48, there is provided such a control that the same image is provided for the right and left eyes, even in the event image stereoscopic vision jig 3200A shown in FIG. 46 is mounted.

In the above-mentioned embodiments, the image stereoscopic vision jig 3200A is explained as it is different from the stereographic projector 3100A. It is acceptable to address their combination as a stereographic projector. In this case, it is acceptable to directly couple the image stereoscopic vision jig 3200A with the stereographic projector 3100A by the code 3204 without providing the plug 3203 on the image stereoscopic vision jig 3200A. Further, instead of such a type of image stereoscopic vision jig that it is mounted on an observer as shown in FIG. 46, it is acceptable to provide an installed type of one through which an observer looks to observe a screen.

These points are the similar as to the matter of various embodiments related to the stereographic projector and the image stereoscopic vision jig according to the present invention, which will be described hereinafter.

Figure 57:
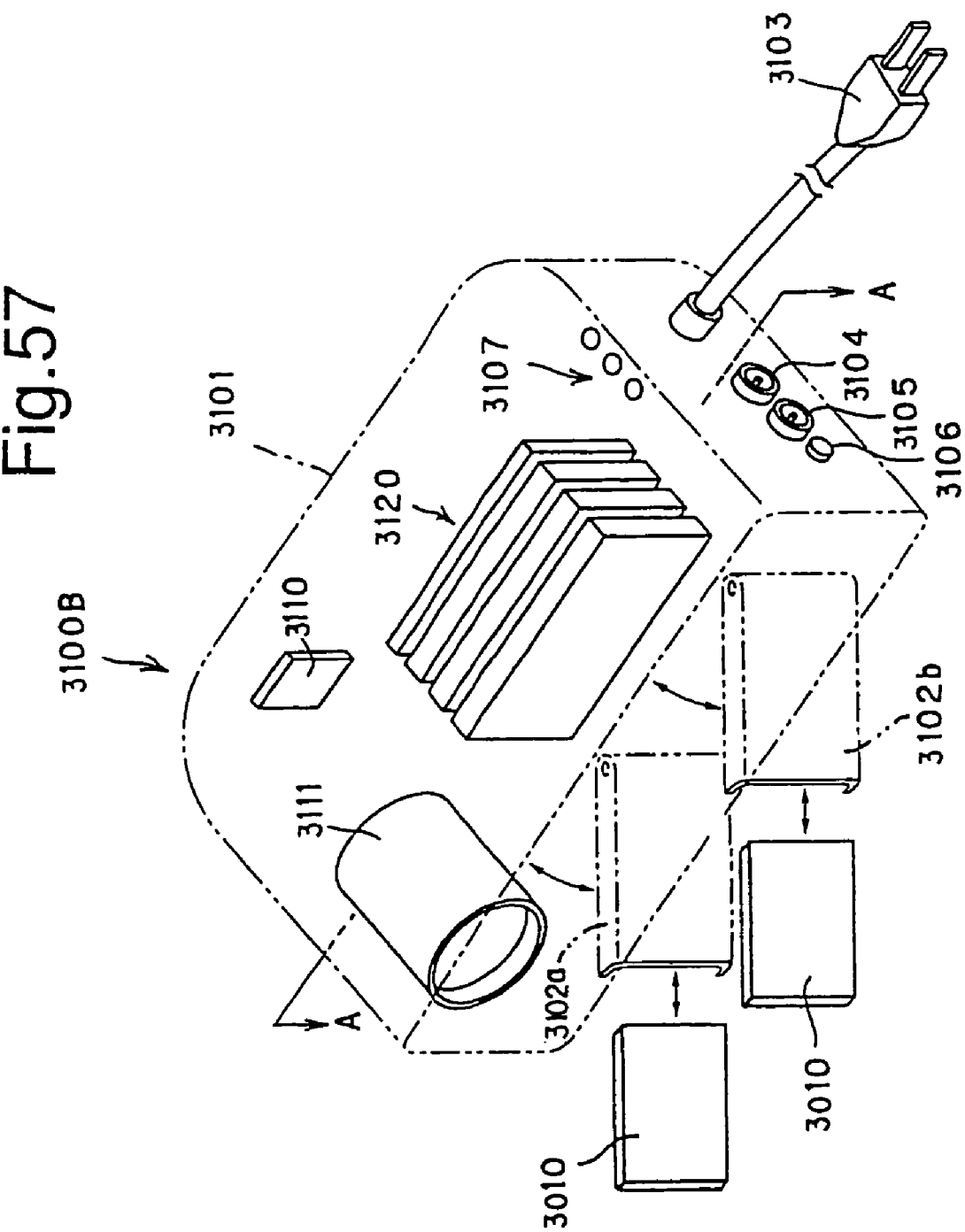
FIG. 57 is a typical illustration showing a main internal structure of a second embodiment of a stereographic projector according to the present invention.
Figure 58:
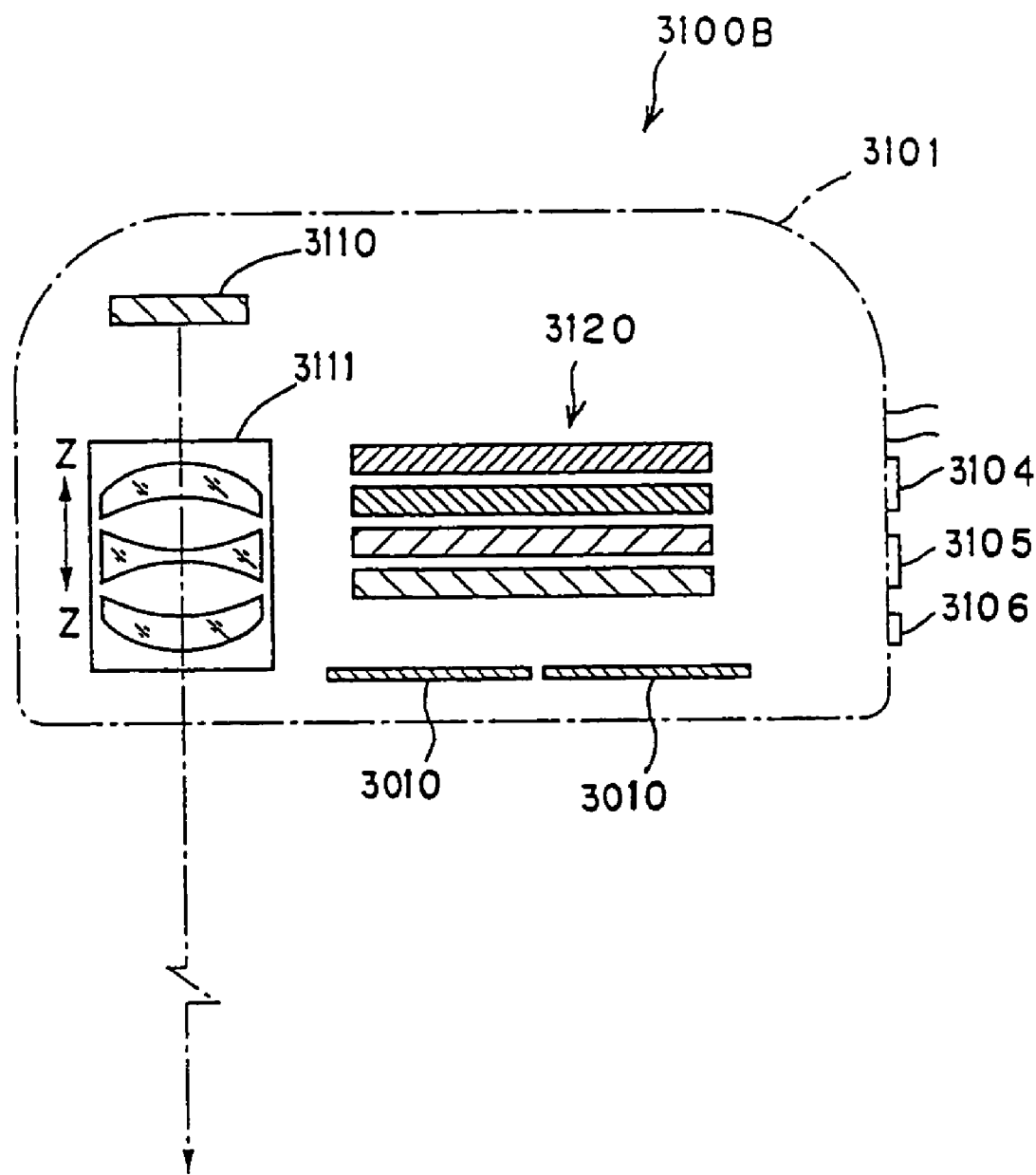
FIG. 58 shows a sectional view taken along the line A-A of FIG. 57.
Figure 59:
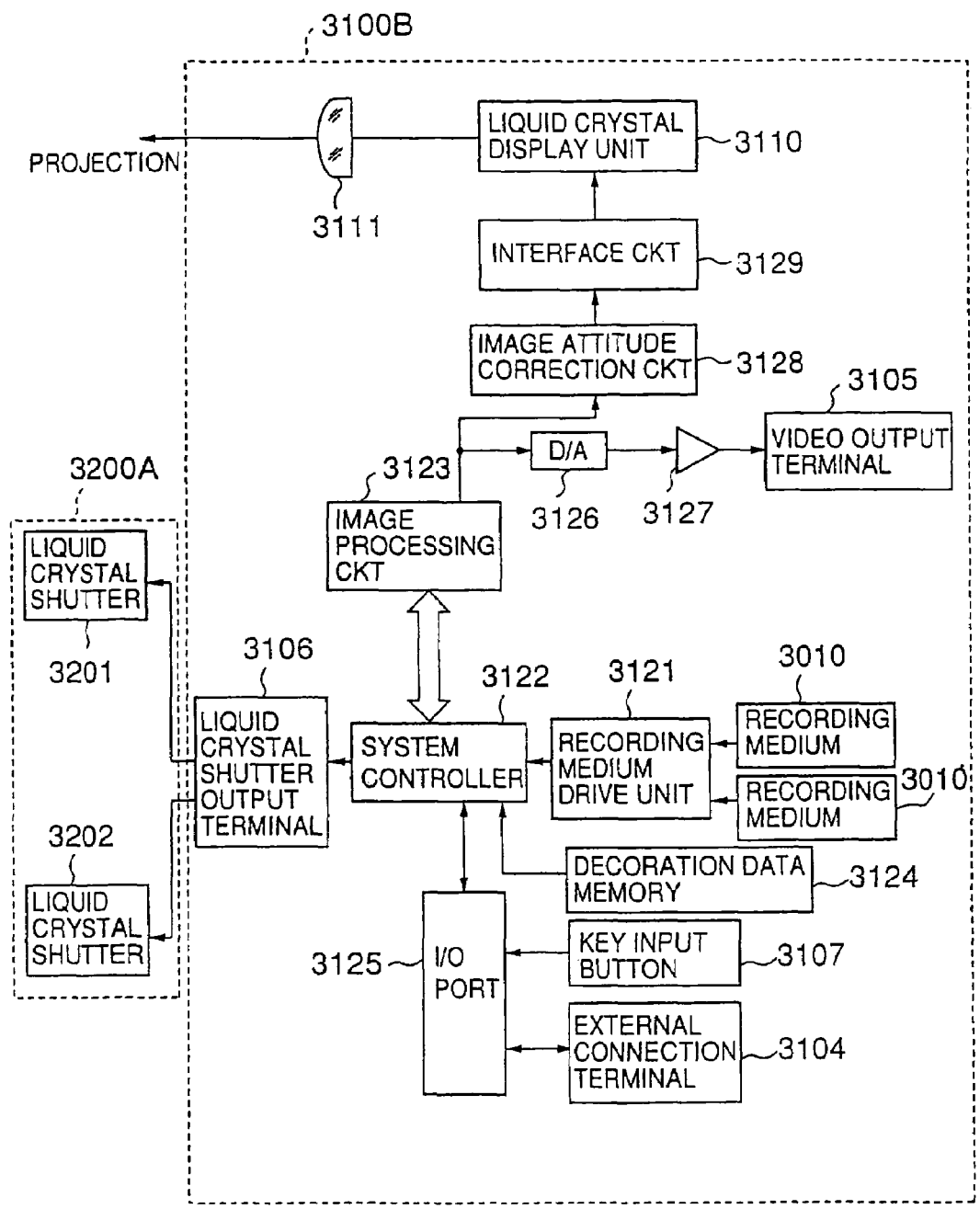
FIG. 59 is a block diagram of a circuit structure of the stereographic projector shown in FIGS. 57 and 58.

FIG. 57 is a typical illustration showing a main internal structure of a second embodiment of a stereographic projector according to the present invention. FIG. 58 shows a sectional view taken along the line A-A of FIG. 57. FIG. 59 is a block diagram of a circuit structure of the stereographic projector shown in FIGS. 57 and 58. Different points of the second embodiment of the stereographic projector according to the present invention will be described hereinafter.

The stereographic projector 3100B shown in FIGS. 57 to 59 is provided with an arrangement that two recording media 10 are loaded and accessed. Specifically, as shown in FIG. 57, there are provided two recording medium loading chamber covers 3102a and 3102b. A recording medium drive unit 3121 shown in FIG. 59 drives the loaded two recording media 3010.

One of the loaded two recording media 3010 stores therein color image information for the right eye, and another recording medium 3010 stores therein color image information for the left eye. These pieces of image information are read out in the form of image signal by the recording medium drive unit 3121.

A liquid crystal display unit forms on a time sequence basis images separated from color images represented by image signals obtained through reading out from the two recording media 3010 (cf. FIGS. 54 and 55).

In this manner, the use of the two recording media 3010 makes it possible to reproduce a three-dimensional image in such a manner that two cameras of a monocular video photography apparatus and a still photography apparatus are used to take a photograph while the two cameras are spaced from one another by the distance corresponding to a parallax of human eyes, each of the obtained images is recorded on the associated recording medium, and the two recording media are loaded onto the stereographic projector 3100B shown in FIGS. 57 to 59 for reproduction of a three-dimensional image. That is, the recording format of the recording media 3010 to be loaded onto the stereographic projector 3100B shown in FIGS. 57 to 59 and the recording format of the recording media to be loaded onto the usual monocular video photography apparatus and still photography apparatus are provided on a common basis, and such two cameras of a monocular video photography apparatus and a still photography apparatus are used to take a photograph without using any especial equipment, so that a three-dimensional image can be reproduced using two recording media which record thereon images obtained through the photograph by those two cameras.

Other structural portions in the second embodiment shown in FIGS. 57 to 59 are the same as the above-mentioned first embodiment.

Figure 60:
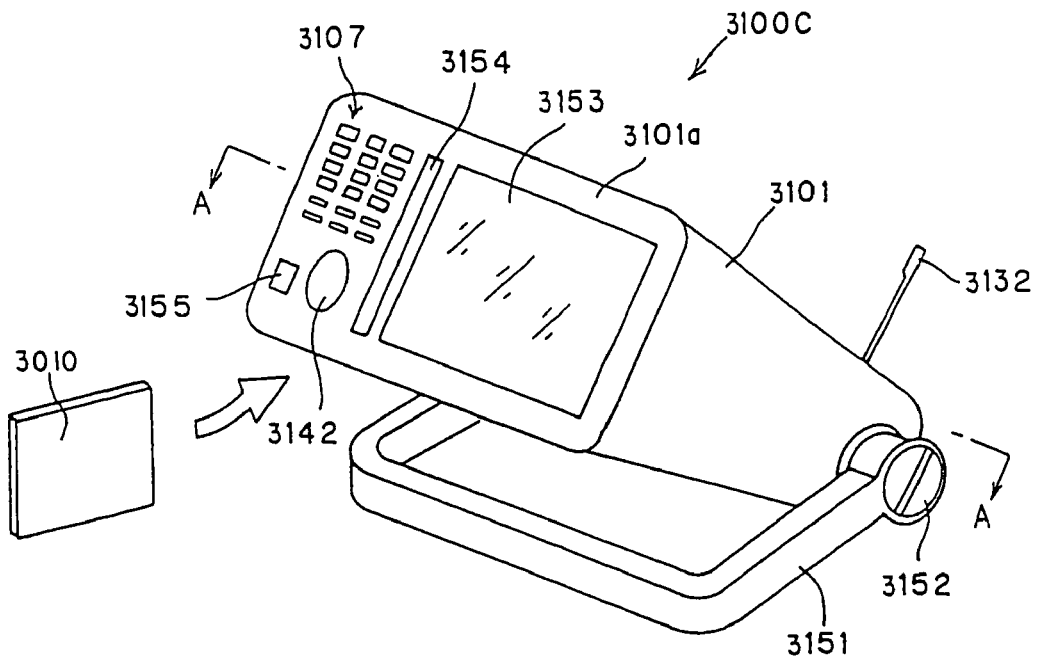
FIG. 60 is a perspective view showing appearance of a third embodiment of a stereographic projector according to the present invention.
Figure 61:
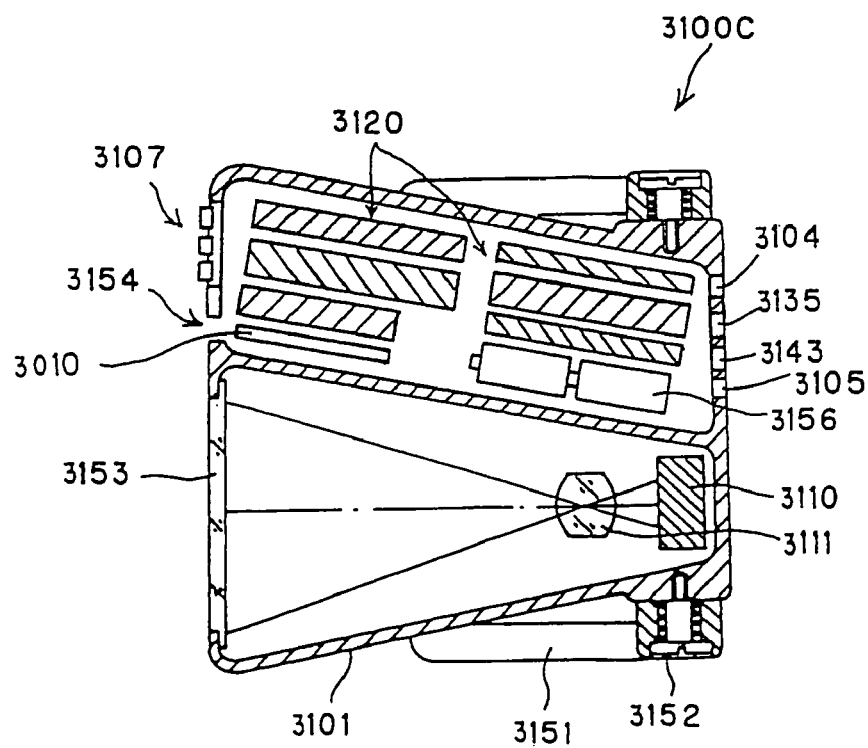
FIG. 61 shows a sectional view taken along the line A-A of FIG. 60.
Figure 62:
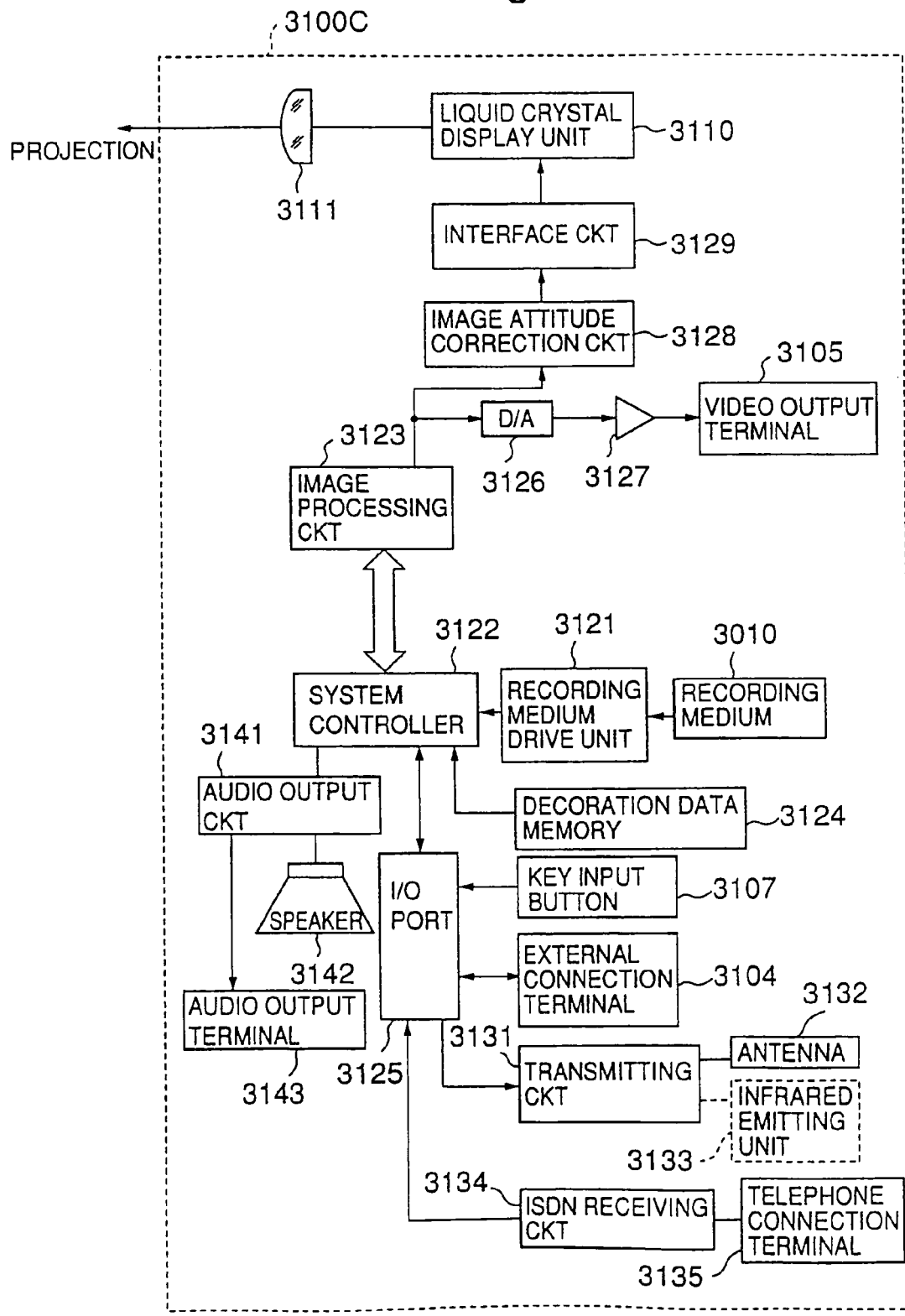
FIG. 62 is a block diagram of a circuit structure of the stereographic projector shown in FIGS. 60 and 61.

FIG. 60 is a perspective view showing appearance of a third embodiment of a stereographic projector according to the present invention. FIG. 61 shows a sectional view taken along the line A-A of FIG. 60. FIG. 62 is a block diagram of a circuit structure of the stereographic projector shown in FIGS. 60 and 61. For the purpose of easy understanding, in those figures, the same parts are denoted by the same reference numbers as those of the figures associated with the first and second embodiments.

FIG. 60 shows a stereographic projector 3100C comprising a cover member 3101 and a supporting member 3151 for supporting the cover member 3101 on a desk. The supporting member 3151 supports the cover member 3101 in such a manner that a supporting angle can be controlled. That is, an angle of elevation of a front 3101a of the cover member 3101 can be arbitrarily adjusted under control of a screw member 3152.

On the front 3101a of the cover member 3101 of the stereographic projector 3100A, there are disposed a screen 3153 onto which an image is projected, a slit 3154 into which a portable recording medium 3010 is detachably inserted, a key input button 3107, a power switch 3155 and a speaker 3142. On the back of the cover member 3101, there is mounted an antenna 3132.

Inside the cover member 3101, as shown in FIG. 61, there are disposed circuit blocks 3120, a liquid crystal display unit 3110, a projection lens unit 3111 and a battery 3156. On the back of the cover member 3101, there are disposed an external connecting terminal 3104, a telephone connection terminal 3135, an audio output terminal 3143 and a video output terminal 3105. The circuit blocks 3120 comprise various circuits as shown in FIG. 62.

The liquid crystal display unit 3110 has a structure as explained referring to FIGS. 50 and 51 or FIGS. 52 and 53. A beam of light emitted from the liquid crystal display unit 3110, which carries image information, is applied via the projection lens unit 3111 to the screen 3153 from the back thereof, so that a focused image is projected onto the screen 3153. In this manner, according to the present embodiment, since the projection lens unit 3111 and the screen 3153 for a back projection type are used, an image projected onto the screen 3153 is observed for an observer in the form of a reversed image in top and bottom, and right and left, as compared with an image formed on the liquid crystal plate 1101 (cf. FIGS. 50 to 53). For this reason, the image attitude correction circuit 3128 shown in FIG. 62 in the circuit block of the third embodiment converts the image signal transmitted from the image processing circuit 3123 into an image signal representative of an image reversed with respect to the top and bottom, and the right and left.

The circuit structure of the stereographic projector shown in FIGS. 60 and 61, as shown in FIG. 62, includes an ISDN receiving circuit 3134 for receiving an image signal fed via a telephone line, as image input means which is not provided on the above-mentioned first and second embodiment (cf. FIGS. 48 and 59), and a telephone connection terminal 3135 shown also in FIG. 61. In association with this arrangement, key input buttons 3107 shown in FIG. 60 in the third embodiment serve also as telephone number input buttons when used for calling via the telephone connection terminal 3135.

The ISDN receiving circuit 3134 receives an image signal fed via a telephone line, and transmits the same via I/O port 3125 and the system controller 3122 to the image processing circuit 3123. The image processing circuit 3123 deals with the image signal thus received in the same way as image signals fed through other image input means.

Further, according to the present embodiment, there is provided a function of receiving an audio signal through the same process as that for the image signal. For example, it is possible to receive through the external connecting terminal 3104 an audio signal transmitted from an external personal computer, or alternatively to take in audio information recorded on the recording medium 3010 in the form of an audio signal. Further it is possible to receive an audio signal transmitted via a telephone line.

Furthermore, according to the present embodiment, as shown in FIG. 62, there are provided an audio output circuit 3141, a speaker 3142 and an audio output terminal 3143. The audio signal obtained in the manner as mentioned above is fed via the system controller 3122 to the audio output circuit 3141 and is converted into an analog audio signal. The audio signal thus converted in the audio output circuit 3141 is generated through the speaker 3142, or outputted through the audio output terminal 3143. The audio signal outputted through the audio output terminal 3143 is fed, for example, to exterior large amplifier and speaker (not illustrated) so as to be generated in the form of large sound.

While the above-mentioned first and second embodiments is provided with the liquid crystal shutter output terminal 3106 (cf. FIGS. 48 and 59) for outputting a timing signals to control open and close of the liquid crystal shutters 3201 and 3202 provided on the image stereoscopic vision jig, the third embodiment is provided with no such a liquid crystal shutter output terminal, instead the third embodiment is provided with a transmitting circuit 3131 and an antenna 3132.

The transmitting circuit 3131 is connected to the I/O port 3125 and the antenna 3132. The timing signals to control open and close of the liquid crystal shutters, which are generated in the system controller 3122, are fed via the I/O port 3125 to the transmitting circuit 3131. Upon receipt of the timing signal, the transmitting circuit 3131 transmits the same through the antenna 3132 in the form of radio wave.

Alternatively, it is acceptable that instead of the antenna 3132, an infrared emitting unit 3133 shown in FIG. 62 with a block depicted by a broken line is provided, and as the transmitting circuit 3131, a transmitting circuit suitable for the infrared emitting unit 3133 is provided, so that infrared carrying timing signals is transmitted through an infrared communication (IRDA).

Figure 63:
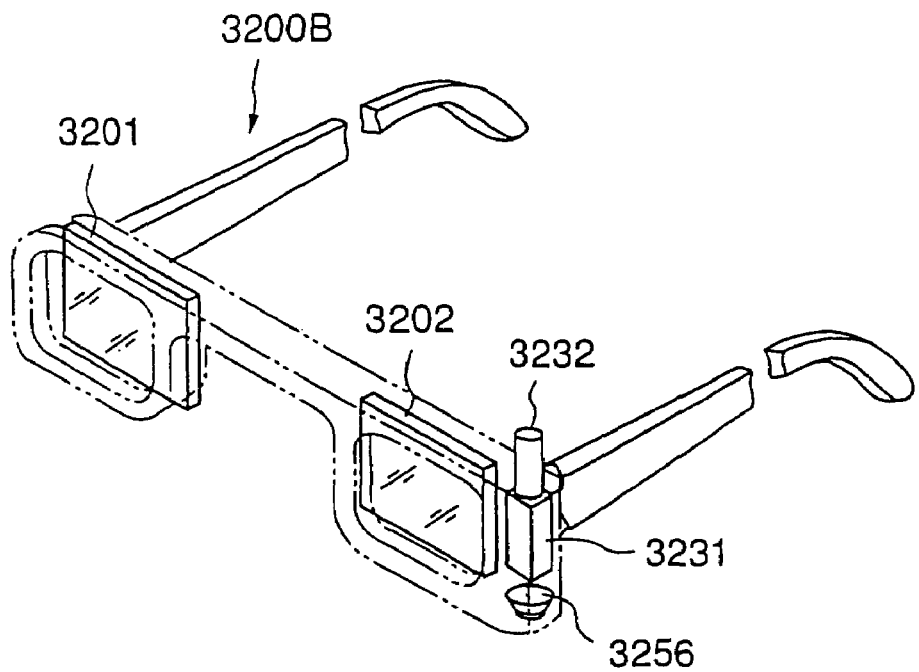
FIG. 63 is a typical illustration of a second embodiment of a jig for an image stereoscopic vision according to the present invention.
Figure 64:
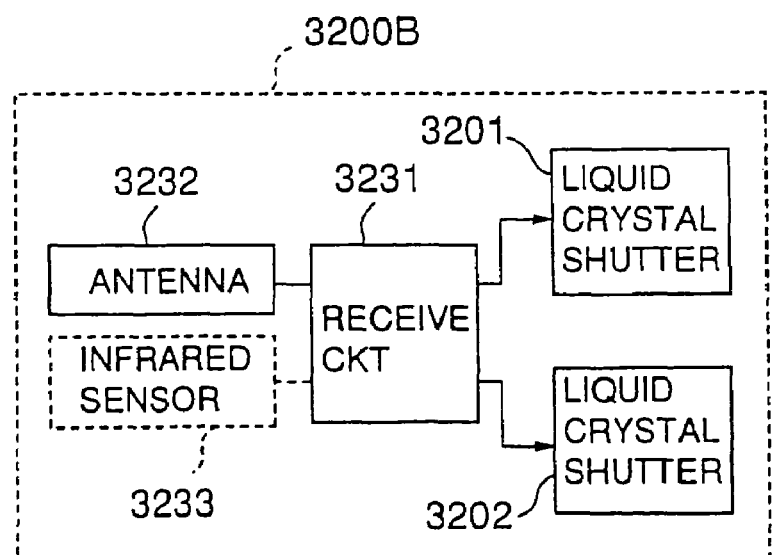
FIG. 64 is a block diagram of a circuit structure of the jig for image stereoscopic vision shown in FIG. 63.

FIG. 63 is a typical illustration of a second embodiment of a jig for an image stereoscopic vision according to the present invention. FIG. 64 is a block diagram of a circuit structure of the jig for image stereoscopic vision shown in FIG. 63. Different points of the second embodiment from the first embodiment shown in FIG. 46 will be explained hereinafter.

An image stereoscopic vision jig 3200B comprises two liquid crystal shutters 3201 and 3202, an antenna 3232, a receiving circuit 3231 connected to the antenna 3232 for receiving a radio wave carrying a timing signal, and a button battery 3256 for driving the receiving circuit 3231. According to the image stereoscopic vision jig 3200B, as shown in FIG. 64, the two liquid crystal shutters 3201 and 3202 are controlled in their open and close in accordance with timing signals obtained by reception of the receiving circuit 3231. The timings of open and close of the two liquid crystal shutters 3201 and 3202 are the same as those explained referring to FIGS. 54 and 55.

In this manner, the image stereoscopic vision jig 3200B shown in FIGS. 63 and 64 is used in a pair with the stereographic projector 3100C shown in FIGS. 60 to 62, and upon receipt of a radio wave carrying timing signals transmitted from the stereographic projector 3100C, the image stereoscopic vision jig 3200B controls open and close of the liquid crystal shutters 3201 and 3202.

Incidentally, in the event the stereographic projector 3100C shown in FIGS. 60 to 62 is provided with such an arrangement that the antenna 3132 is replaced by the infrared emitting unit 3133, and timing signals are generated in accordance with a infrared signal, the image stereoscopic vision jig 3200B shown in FIGS. 63 and 64 is also provided with such an arrangement that the antenna 3232 is replaced by the infrared sensor 3233, in addition the receiving circuit 3231 is replaced by an equivalence suitable for the infrared sensor 3233, and timing signals are generated by catching infrared transmitted through an infrared communication (IRDA).

Figure 65:
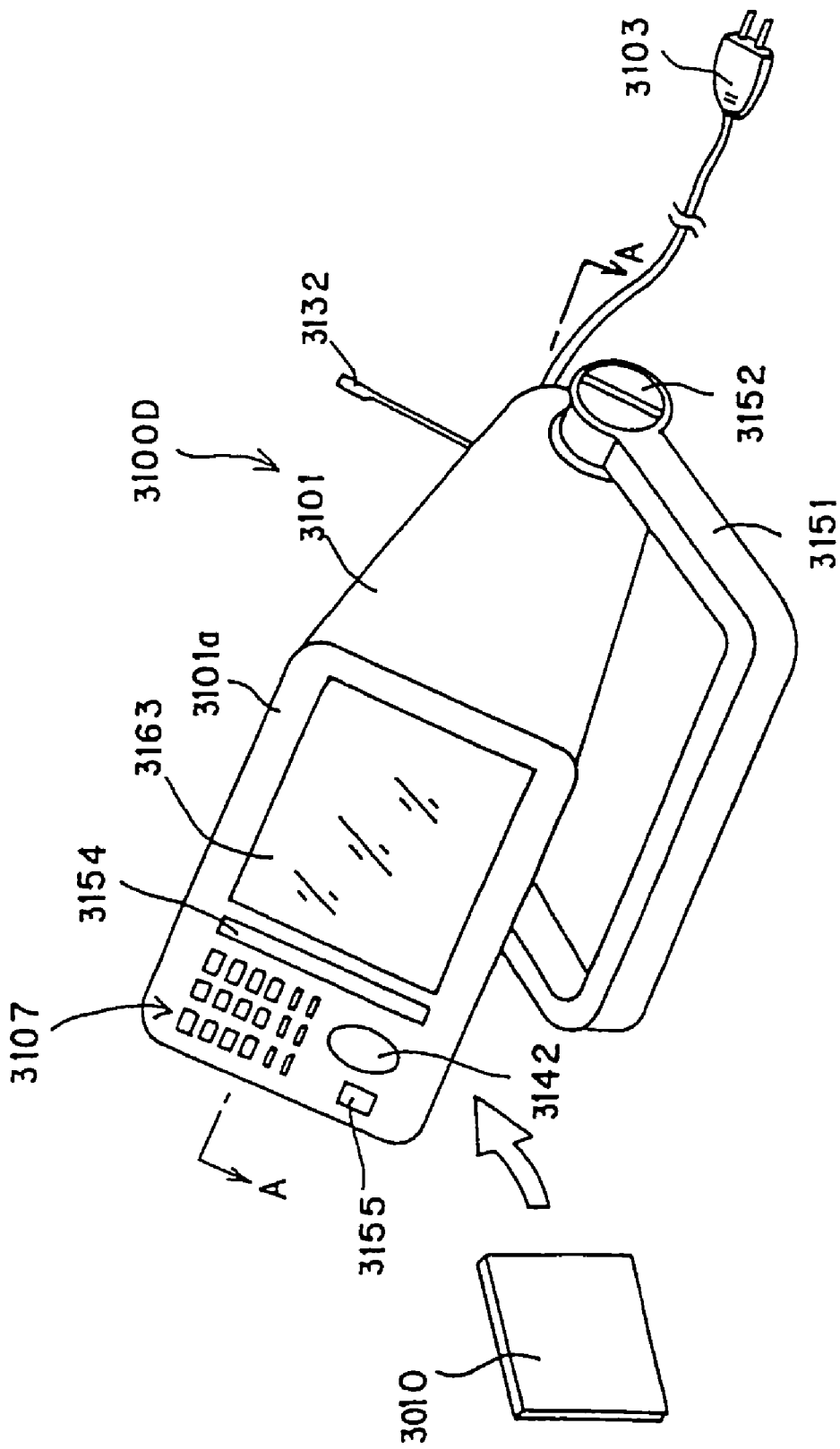
FIG. 65 is a perspective view showing appearance of a fourth embodiment of a stereographic projector according to the present invention.
Figure 66:
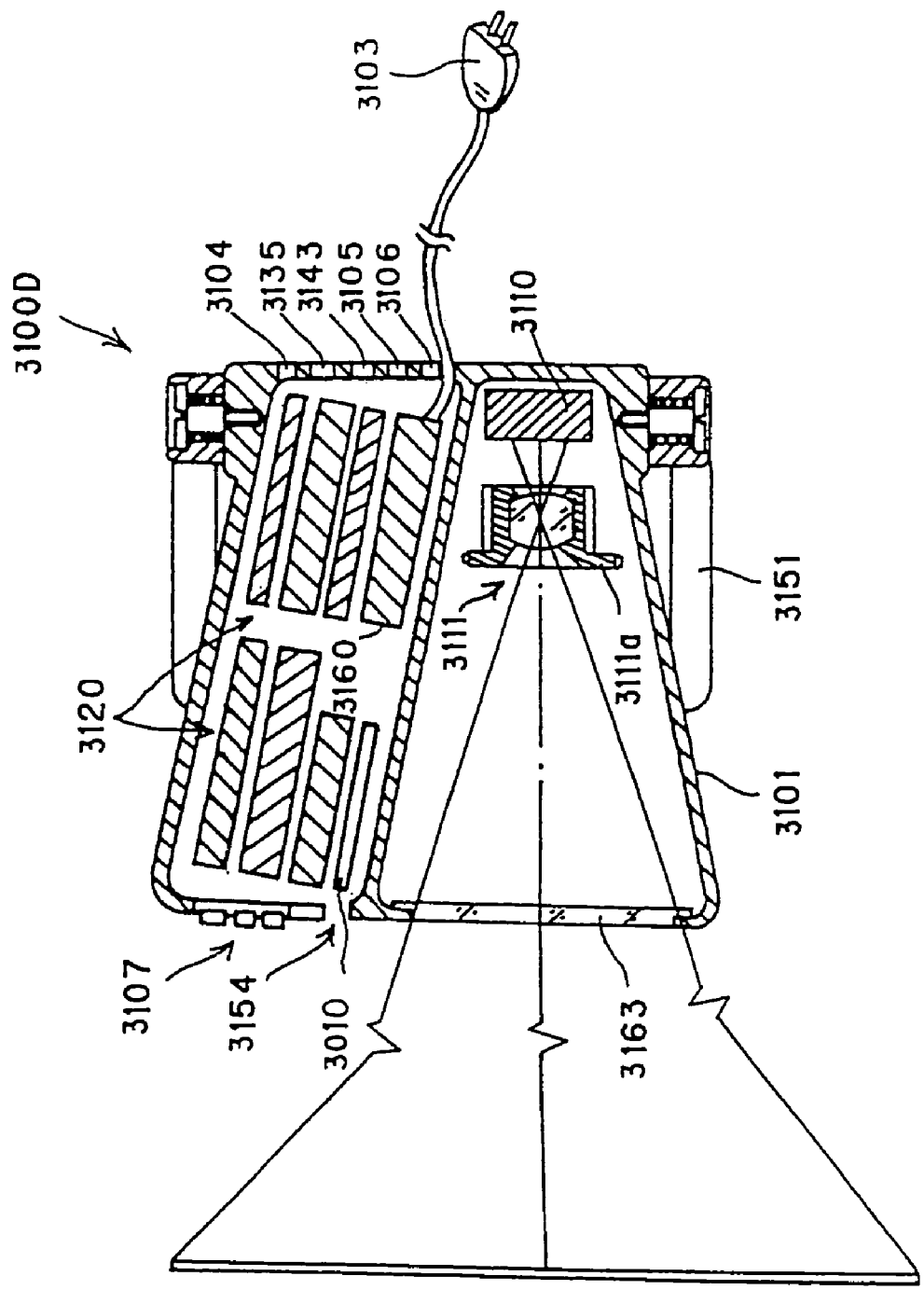
FIG. 66 shows a sectional view taken along the line A-A of FIG. 65.
Figure 67:
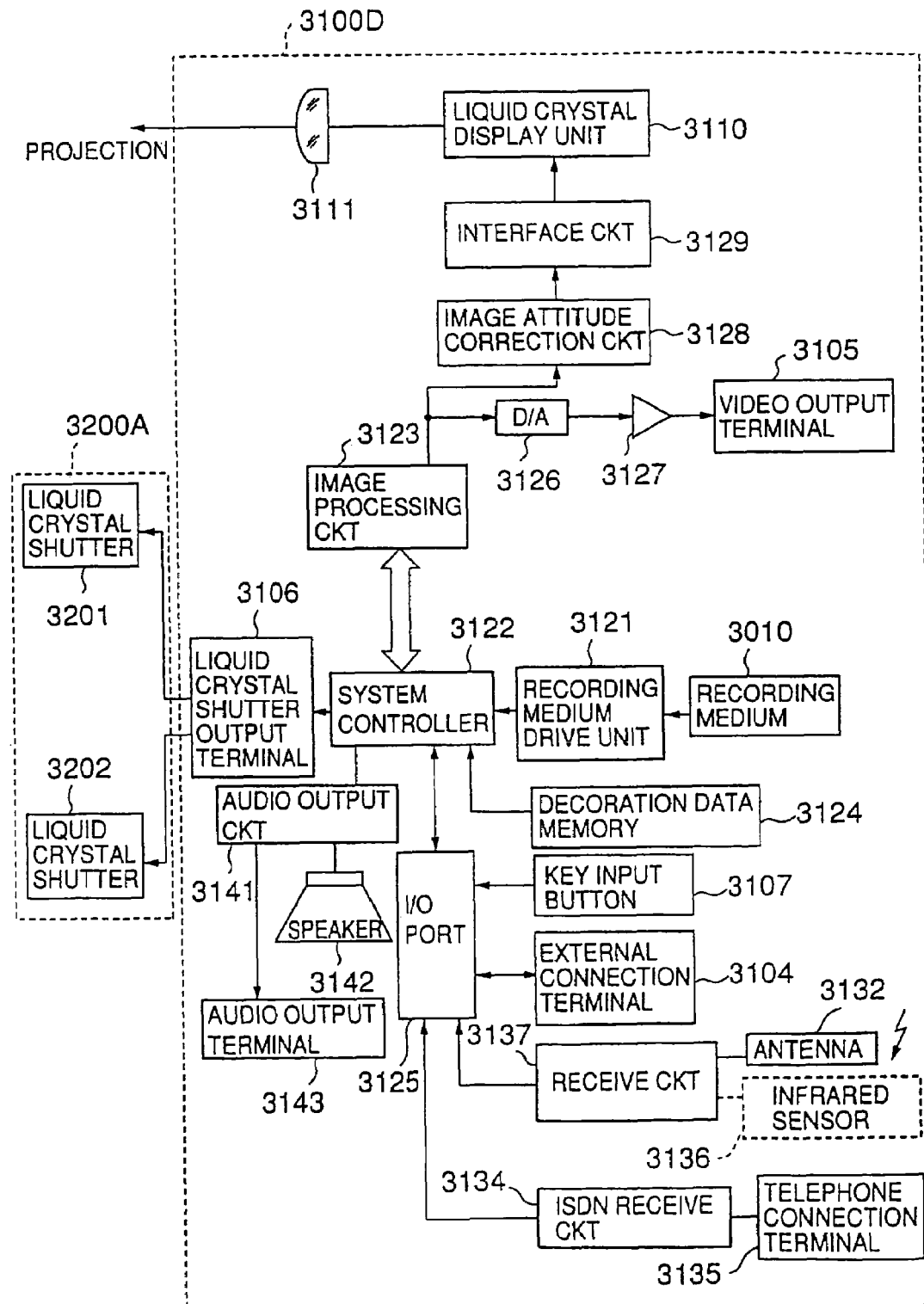
FIG. 67 is a block diagram of a circuit structure of the stereographic projector shown in FIGS. 65 and 66.

FIG. 65 is a perspective view showing appearance of a fourth embodiment of a stereographic projector according to the present invention. FIG. 66 shows a sectional view taken along the line A-A of FIG. 65. FIG. 67 is a block diagram of a circuit structure of the stereographic projector shown in FIGS. 65 and 66. Different points of the fourth embodiment from the third embodiment shown in FIGS. 60 to 62 will be described hereinafter.

A stereographic projector 3100D is provided with a power source plug 3103 for connection with a commercial power source and a power source 3160 for conversion of a commercial power into a DC power. According to the third embodiment, the stereographic projector is driven by the battery 3156 (cf. FIG. 61). On the contrary, the stereographic projector 3100D according to the fourth embodiment is driven by a commercial power. It is also acceptable that those powers are used together or optionally selected.

Further, according to the third embodiment, the screen 3153 is mounted on the cover member 3101, and an image is projected onto the screen 3153. On the other hand, according to the fourth embodiment, instead of the screen 3153 in the third embodiment, a transparent glass 3163 is mounted. A beam of light carrying image information, which is emitted from the liquid crystal display unit, is emitted via the projection lens unit 3111 and then via the transparent glass 3163 to the exterior of the stereographic projector 3100D, so that an image is projected onto a screen, for example, a wall of a room.

According to the fourth embodiment, a projection lens unit 3111 is provided with a focus control knob 3111a. When the focus control knob 3111a turns, a projection lens moves in an optical axis direction, so that a focused image can be formed on a screen (for example, a wall of a room) regardless of a distance of the projection lens to the screen.

According to the fourth embodiment, in a similar fashion to that of the above-mentioned first and second embodiments (cf. FIGS. 44 to 45 and FIGS. 57 to 58), there is formed, on the screen such as a wall of a room, an image which is an erect image with respect to the right and left, but a reverse image with respect to the top and bottom, as compared with an image formed on the liquid crystal plate 1101 (cf. FIG. 50 to FIG. 53). For this reason, according to the present embodiment, an image attitude correction circuit 3128 shown in FIG. 67 converts an image into a reverse image only with respect to the top and bottom, so that the reverse image only with respect to the top and bottom is formed on the liquid crystal plate 1101.

Further, according to the fourth embodiment, as shown in FIGS. 66 and 67, there is a liquid crystal shutter output terminal 3016. The stereographic projector 3100D of the fourth embodiment is used in combination with the image stereoscopic vision jig 3200A shown in FIG. 46.

In a similar fashion to that of the third embodiment (FIGS. 60 to 62), the stereographic projector 3100D of the fourth embodiment is provided with an antenna 3132. However, the stereographic projector 3100D of the fourth embodiment is provided with, as seen from FIG. 67, a receiving circuit 3137 instead of the transmitting circuit 3131 (cf. FIG. 62) in the third embodiment. That is, the antenna 3132 receives image signal and audio signal transmitted in the form of a radio wave. The image signal and the audio signal received by the receiving circuit 3137 are transmitted via the I/O port 3125 to the system controller 3122. Further, the image signal is transmitted to the image processing circuit 3123, and the audio signal is transmitted to the audio output circuit 3141.

Alternatively, it is acceptable that instead of the antenna 3132, an infrared sensor 3136 shown in FIG. 67 with a block depicted by a broken line is provided, and as the receiving circuit 3137, a receiving circuit suitable for the infrared sensor 3136 is provided, so that infrared carrying image information and audio information is detected through an infrared communication (IRDA), and thereby obtaining image signal and audio signal.

Other structural portions of the fourth embodiment are the similar to that of the third embodiment shown in FIGS. 60 to 62.

Figure 68:
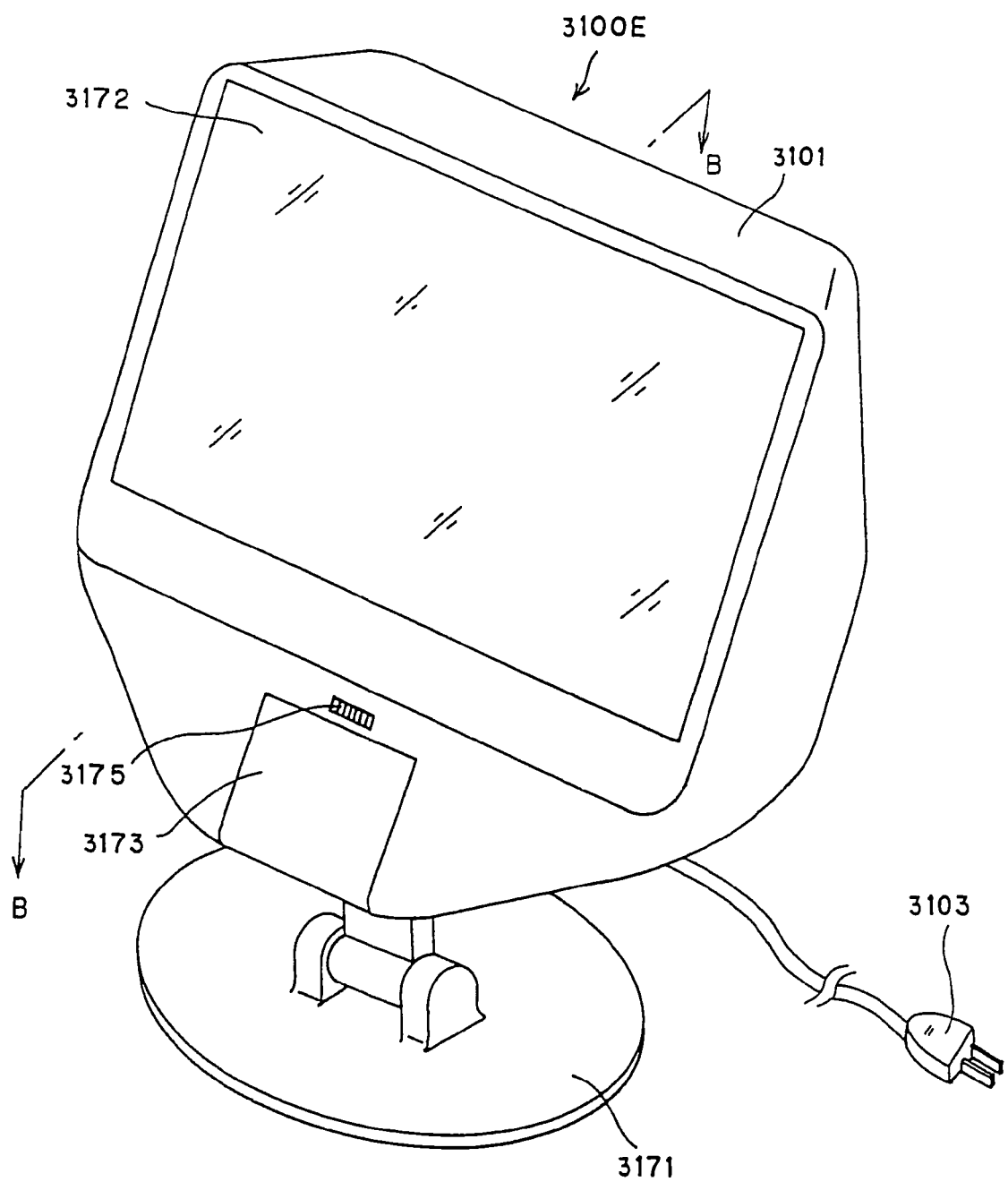
FIG. 68 is a perspective view showing appearance of a fifth embodiment of a stereographic projector according to the present invention.
Figure 69:
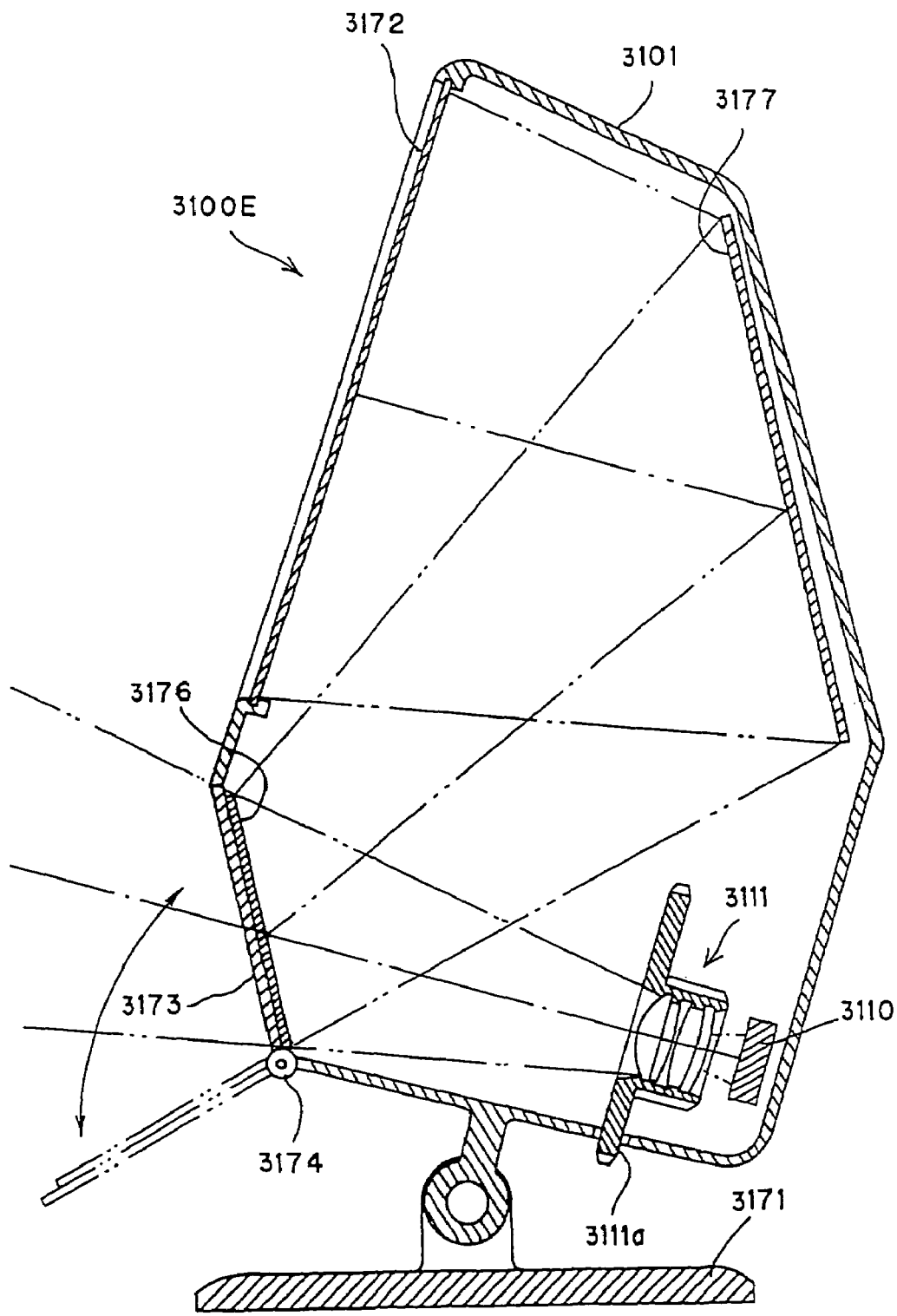
FIG. 69 shows a sectional view taken along the line B-B of FIG. 68.

FIG. 68 is a perspective view showing appearance of a fifth embodiment of a stereographic projector according to the present invention. FIG. 69 shows a sectional view taken along the line B-B of FIG. 68.

FIG. 68 shows a stereographic projector 3100E comprising a cover member 3101 and a supporting member 3171 for supporting the cover member 3101 on a desk. The supporting member 3171 supports the cover member 3101 in such a manner that an angle of elevation of the cover member 3101 can be adjusted.

In the front of the cover member 3101, a large scale of screen 3172 on which an image is projected is fixed, and there is provided a closing cover 3173. The closing cover 3173 is movably opened on a hinge 3174 as seen from FIG. 69. An operation of a knob 3175 shown in FIG. 68 makes it possible to open the closing cover 3173. Inside the closing cover 3173, a mirror 3176 is fixed. In a state that the closing cover 3173 is closed, a beam of light emitted from the liquid crystal display unit 3110 is reflected on a mirror 3176 via a projection lens unit 3111, and then reflected on a further mirror 3177 to irradiate the screen 3172 so that an image is projected on the screen 3172.

On the other hand, in a state that the closing cover 3173 is opened, a beam of light transmitted through the projection lens unit 3111 emerges through an aperture, which is formed when the closing cover 3173 is opened, to the exterior to irradiate an external screen, for example, a wall of a room, so that an image is projected on the external screen. According to a stereographic projector 3100E of the fifth embodiment, as shown in FIG. 69, the projection lens unit 3111 is provided with a focus control knob 3111a. When the focus control knob 3111a turns, a projection lens moves in an optical axis direction, so that a focused image can be formed on anyone of the screen 3172 fixed on the cover member 3101 and the exterior screen, for example, a wall of a room.

Between a case where an image is projected onto the screen 3172 fixed on the cover member 3101 and a case where an image is projected onto the exterior screen, for example, a wall of a room, those images are mutually reversed with respect to the right and left. For this reason, according to the stereographic projector 3100E of the fifth embodiment, as shown in FIG. 67, the image attitude correction circuit 3128 has an image attitude correction function of reversing an image with respect to the right and left between a case where the closing cover 3173 is opened and a case where the closing cover 3173 is closed. Incidentally, according to the present embodiment, when the closing cover 3173 is closed, there is formed on the screen 3172 an image which is reversed with respect to both the top and bottom and the right and left as compared with an image formed on the liquid crystal plate 1101 (cf. FIG. 50 to FIG. 53). For this reason, according to the fifth embodiment, also in this respect, an image attitude is corrected in such a manner that both an image projected onto the screen 3172 when the closing cover 3173 is closed and an image projected onto the exterior screen when the closing cover 3173 is opened are observed in the form of an erect image.

While the image attitude is corrected by the image attitude correction circuit 3128 referring to FIGS. 68 and 69, it is acceptable that instead of correction on the image signal, an optical system for an image attitude correction, which is included or extruded in or from an optical path in accordance with open and close of the closing cover, is used to correct the image attitude.

Figure 70:
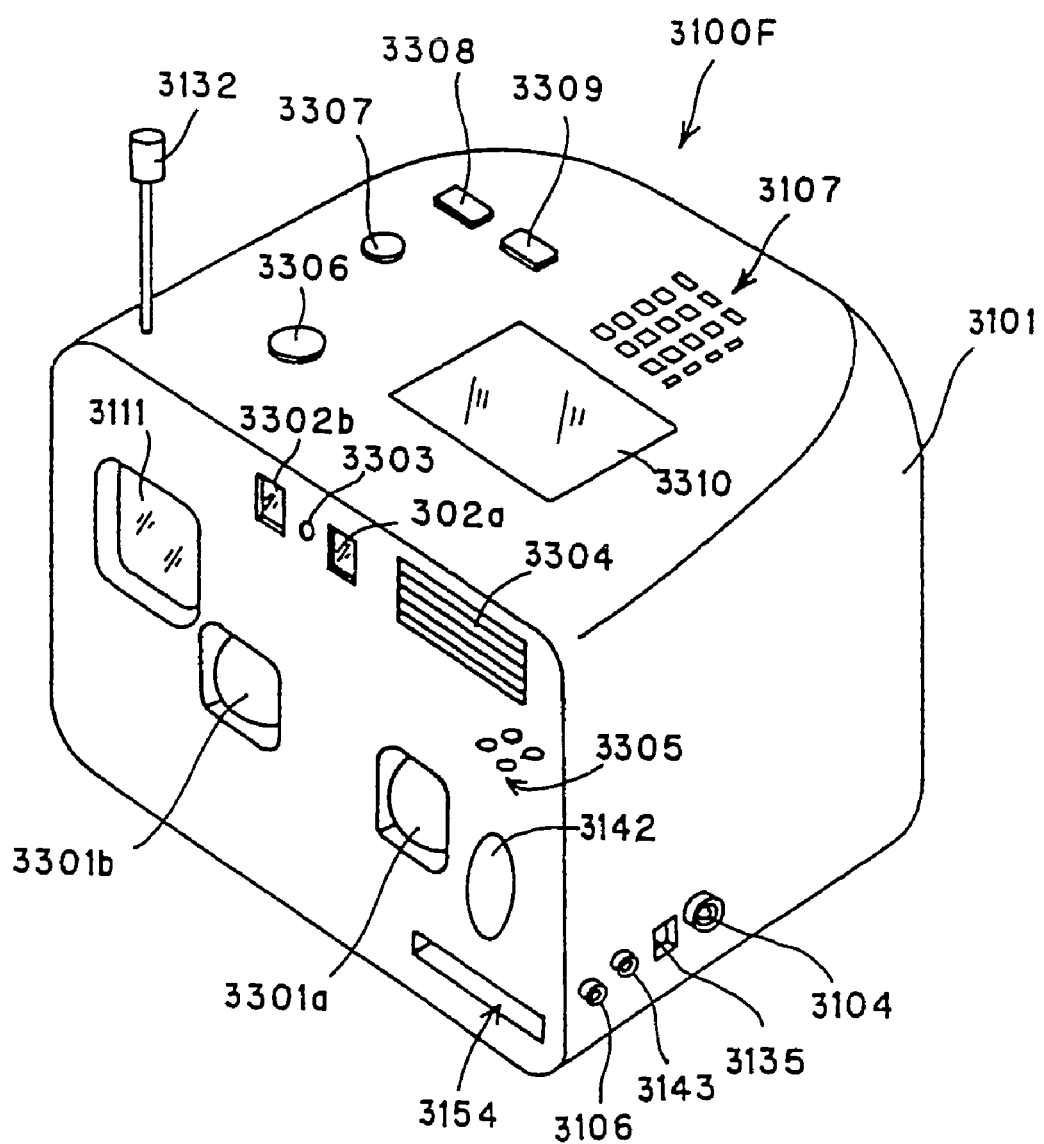
FIG. 70 is a perspective view showing appearance of a fifth embodiment of a stereographic projector according to the present invention.
Figure 71:
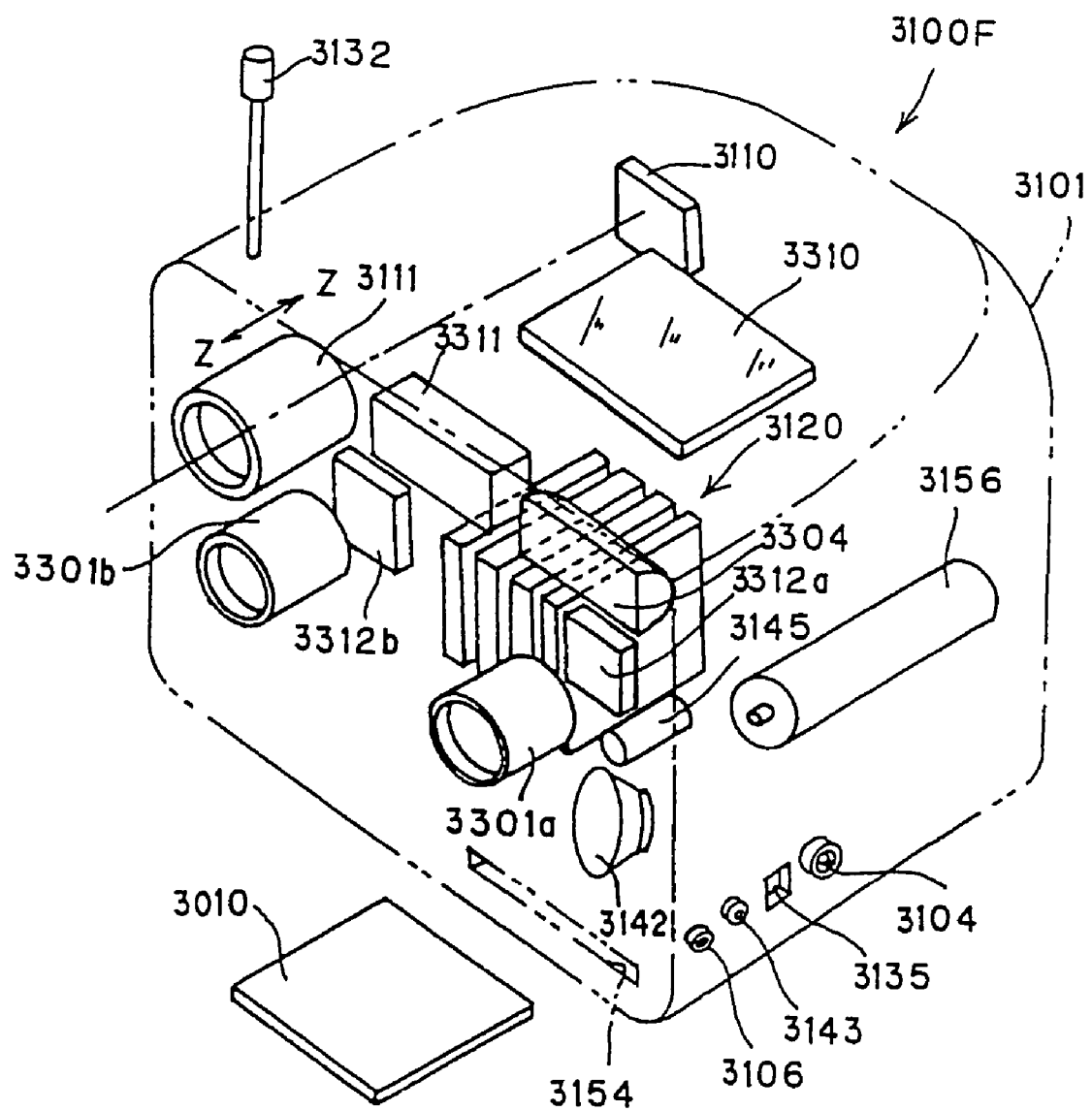
FIG. 71 is a typical illustration showing a main internal structure of a stereographic projector shown in FIG. 70.
Figure 72:
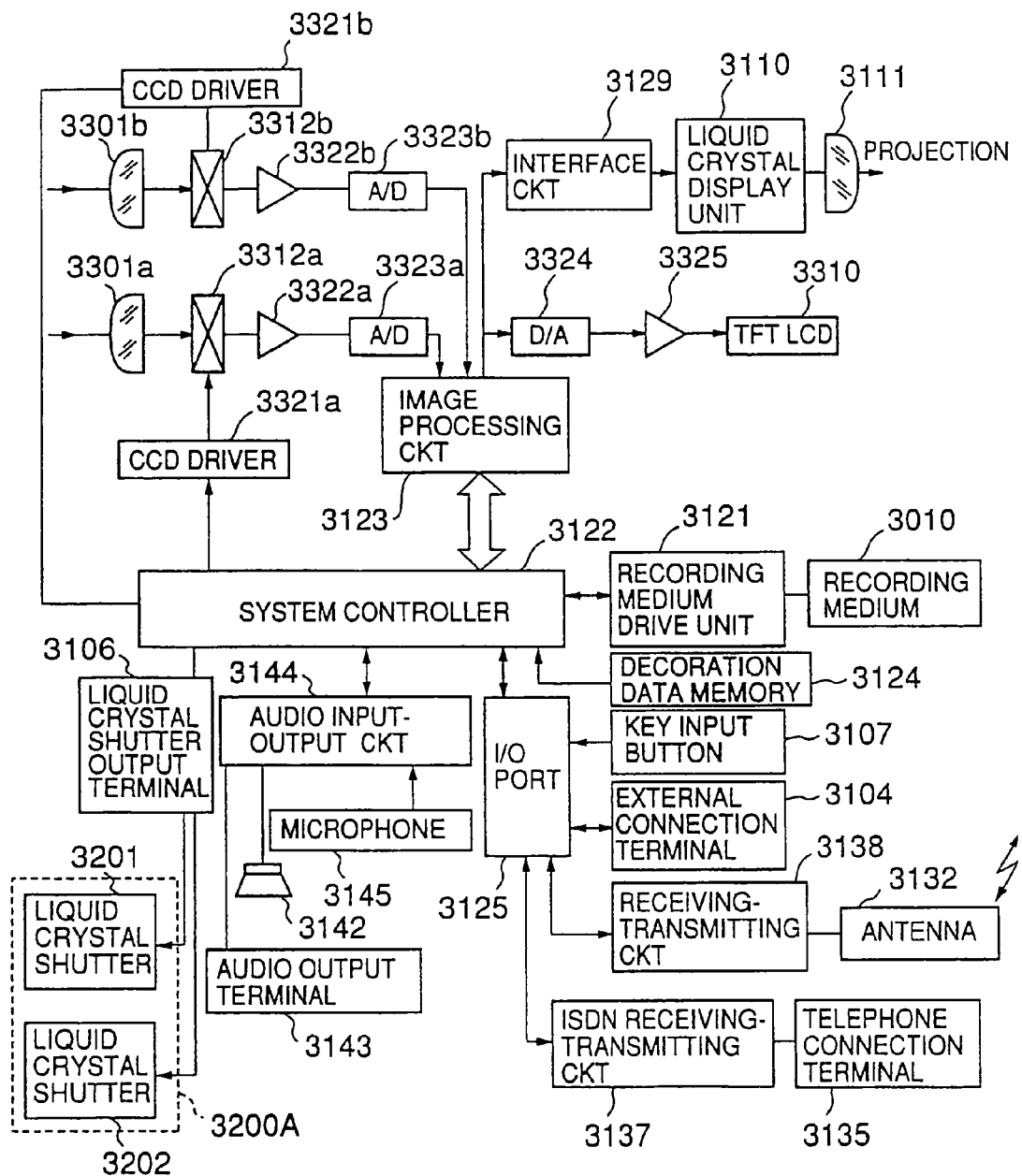
FIG. 72 is a block diagram of a circuit structure of the stereographic projector shown in FIGS. 70 and 71.

FIG. 70 is a perspective view showing appearance of a fifth embodiment of a stereographic projector according to the present invention. FIG. 71 is a typical illustration showing a main internal structure of a stereographic projector shown in FIG. 70. FIG. 72 is a block diagram of a circuit structure of the stereographic projector shown in FIGS. 70 and 71.

A stereographic projector 3100F has a function of a stereographic photography, and is available as both a video photography apparatus and a still photography apparatus through switching of a key operation.

In front of the stereographic projector 3100F, as shown in FIG. 70, there are disposed a pair of image taking lenses 3301a and 3301b, an AF (Auto Focus) light projecting window 3302a and an AF light receiving window 3302b for use in a measurement of a distance to a camera subject (not illustrated), an AE window 3303 for use in a measurement of a luminance of a camera subject, an electronic flash emitter unit 3304, apertures 3305 for picking up voice with an internal microphone, a speaker 3142 for outputting voice, a slot 3154 into which the portable recording medium 3010 as shown in FIG. 71 is detachably inserted, and a projection lens unit 3111 for projecting an image on the external screen. On the top of the stereographic projector 3100F, there are disposed a shutter button 3306, a power switch 3307, a key input button 3107, a photographic mode selection button 3308, a reproduction mode selection button 3309, an antenna 3132, and a liquid crystal display 3310.

The liquid crystal display 3310 is the conventional TFT type liquid crystal display onto which an image of the camera subject is projected while an image quality is not so good. In this case, on the liquid crystal display 3310, there may be displayed various types of information such as residual time available for recording (in case of a video photography), the number of frames of a film available for a photography (in case of a still photography), a degree of dissipation of a battery, etc.

Further, on the side of the stereographic projector 3100F, there are disposed an external output terminal 3104, a telephone connection terminal 3135, an audio output terminal 3143 and a liquid crystal output terminal 3106.

Furthermore, as shown in FIG. 71, inside the stereographic projector 3100F, there are disposed AF and AE unit 3311 for focusing and photometry in the internal portion of the AF light projecting window 3302a, the AF light receiving window 3302b and the AE window 3303, and a microphone 3114 in the internal portion of the apertures 3305. In the back portions of the pair of image taking lenses 3301a, 3301b, there are disposed CCD image receiving devices 3312a and 3312b for receiving images formed through the image taking lenses 3301a and 3301b, respectively. Further, inside the stereographic projector 3100F, there are disposed a liquid crystal display unit 3110 as an element for the image reproduction, and the above-mentioned projection lens unit 3110. Still furthermore, inside the stereographic projector 3100F, there are disposed circuit blocks 3120 comprising various types of circuits for operating the stereographic projector 3100F, and a battery 3156. When the power switch 3307 turns on, an electric power is supplied from the battery 3156 to the circuit blocks 3120 and the like. The battery 3156 is exchangeable. The circuit blocks 3120 comprise various types of circuits which will be described hereinafter in conjunction with FIG. 72.

When the photographic mode selection button 3308 shown in FIG. 70 is depressed, the stereographic projector 3100F serves as a stereographic photography apparatus, and operates as follows.

The CCD image receiving devices 3312a and 3312b are driven by CCD drivers 3321a and 3321b shown in FIG. 72 to generate image signals associated with images formed through the image taking lenses 3301a and 3301b, respectively. The image signals generated in the CCD image receiving devices 3312a and 3312b are amplified by amplifiers 3322a and 3322b, and then converted into digital image signals by A/D converters 3323a and 3323b, respectively. The digital image signals thus converted are fed to an image processing circuit 3123. The image processing circuit 3123 performs in addition to the same processing as that of the image processing circuit in the above-mentioned various types of embodiments, for example, a gray level processing and a filtering processing. One of the image signals subjected to the image processing in the image processing circuit 3123 is fed to a D/A converter 3124 to be converted into an analog signal. The analog signal thus converted is displayed on a liquid crystal display unit 3110.

Another of the image signals derived from the image processing circuit 3123 is fed to a system controller 3122 and then a recording medium driving unit 3121 so that image information associated with the image signal is stored in the recording medium 3010. As mentioned above, the stereographic projector 3100F is so arranged that a photographing mode is selectable between the video photography and the still photography in accordance with a button operation of the key input button 3107. In the event that the video photography is performed, a recording of image information onto the recording medium 3010 is continued while a shutter button 3306 is depressed. In the event that the still photography is performed, whenever the shutter button 3306 is depressed, total two frames of image information as to right and left frames of images obtained through the CCD image receiving devices 3312a and 3312b of right and left are recorded on the recording medium 3010. In the event that the video photography is performed, in order to obtain a dynamic image smooth in a movement, an image is received in the form of three-dimensional image at speed higher than $1/16$ sec per frame (two frames in a case where each of images obtained through the CCD image receiving devices 3312a and 3312b of right and left is counted as a frame of image) to be recorded on the recording medium 3010.

In the event that image information is recorded onto the recording medium 3010, it is acceptable that an audio signal picked up by the microphone 3145 is converted into a digital audio signal by an audio input and output circuit 3144, and then transmitted to the system controller 3122 so that the audio information is stored in the recording medium 3010 together with the image information.

As another transmission path of an image signal outputted from the image processing circuit 3123, there is a route in which the image signal is transmitted to the system controller 3122, and then outputted from an external connection terminal 3104 via an I/O port 3125 to the exterior. The external connection terminal 3104 is connected, for example, to a personal computer (not illustrated) so that an image can be transmitted to the personal computer. This is a similar as to the matter of the audio signal picked up by the microphone 3145. That is, it is possible to output from the external connection terminal 3104 the audio signal together with the image signal.

Further, it is possible to receive from the external connection terminal 3104 the audio signal and the image signal. Specifically, it is possible to receive an image signal and an audio signal transmitted, for example, from the personal computer connected to the external connection terminal 3104, record the same on the recording medium 3010 via the I/O port 3125, the system controller 3122 and the recording medium driving unit 3121, and transmit the associated image signal to the image processing circuit 3123 so that an image is displayed on the liquid crystal display 3310 in accordance with the image signal.

Furthermore, according to the stereographic projector 3100F, it is possible to transmit an image signal and an audio signal in the form of a radio wave via a receive-transmit circuit 3138, and to receive an image signal and an audio signal transmitted in the form of a radio wave. Also it is possible to transmit an image signal and an audio signal via an ISDN receiving and transmitting circuit 3137 and a telephone connection terminal 3135 to a telephone circuit, and to receive an image signal and an audio signal transmitted through a telephone circuit.

A flow of the above-mentioned image signal and audio signal is controlled by the system controller 3122 upon receipt of an instruction through the button operation of the key input button 3107.

When the reproduction mode selection button 3309 is depressed, the stereographic projector 3100F serves as a primary stereographic projector for projecting a three-dimensional image on an external screen. An operation of the stereographic projector in the reproduction mode is the same as that in the above-mentioned various types of embodiments, and thus a redundant description will be omitted.

Figure 74:
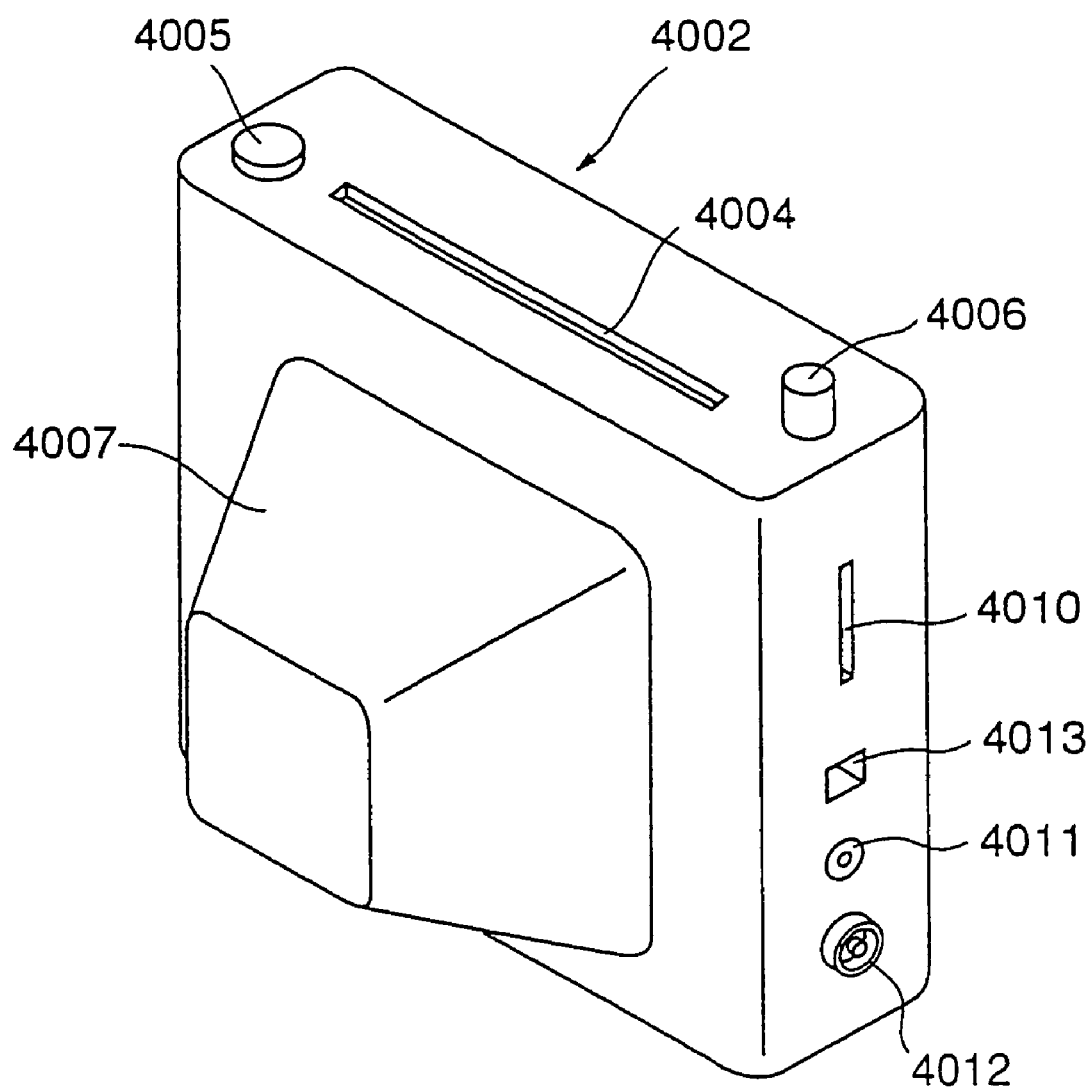
FIG. 74 is a perspective view showing appearance of the first embodiment of the printer according to the present invention looking from the front side.

FIG. 74 is a perspective view showing appearance of a first embodiment of a printer according to the present invention looking from the front side. A printer 4002 is a portable type of printer and is able to be driven by an internal battery as well as an AC power source. As a recording material for the printer 4002, a mono-sheet type of instant print film unit (referred to as a film unit) is used.

On the top of the printer 4002, there are provided a slit-like shaped discharge outlet 4004 through which a film unit after printed is discharged, a push button type of print switch 4005 for instructing a printing operation of the printer 4002, and an antenna 4006 useful for receiving image data transmitted from an external equipment and transmitting image data to the external equipment. In the front of the printer 4002, there is formed a projecting member 4007 inside which an optical path for image exposure to the film unit is provided.

On one side of the printer 4002, there are provided a memory slot 4010 through which a memory card 4009 (cf. FIG. 78) to be used as a data recording medium is inserted, an external output terminal 4011 for outputting information of an image to be printed to a display equipment such as an external monitor and the like, an external connection terminal 4012 to which an external equipment is to be connected, and an ISDN connection terminal 4013 for communication of image data via an ISDN line.

Figure 75:
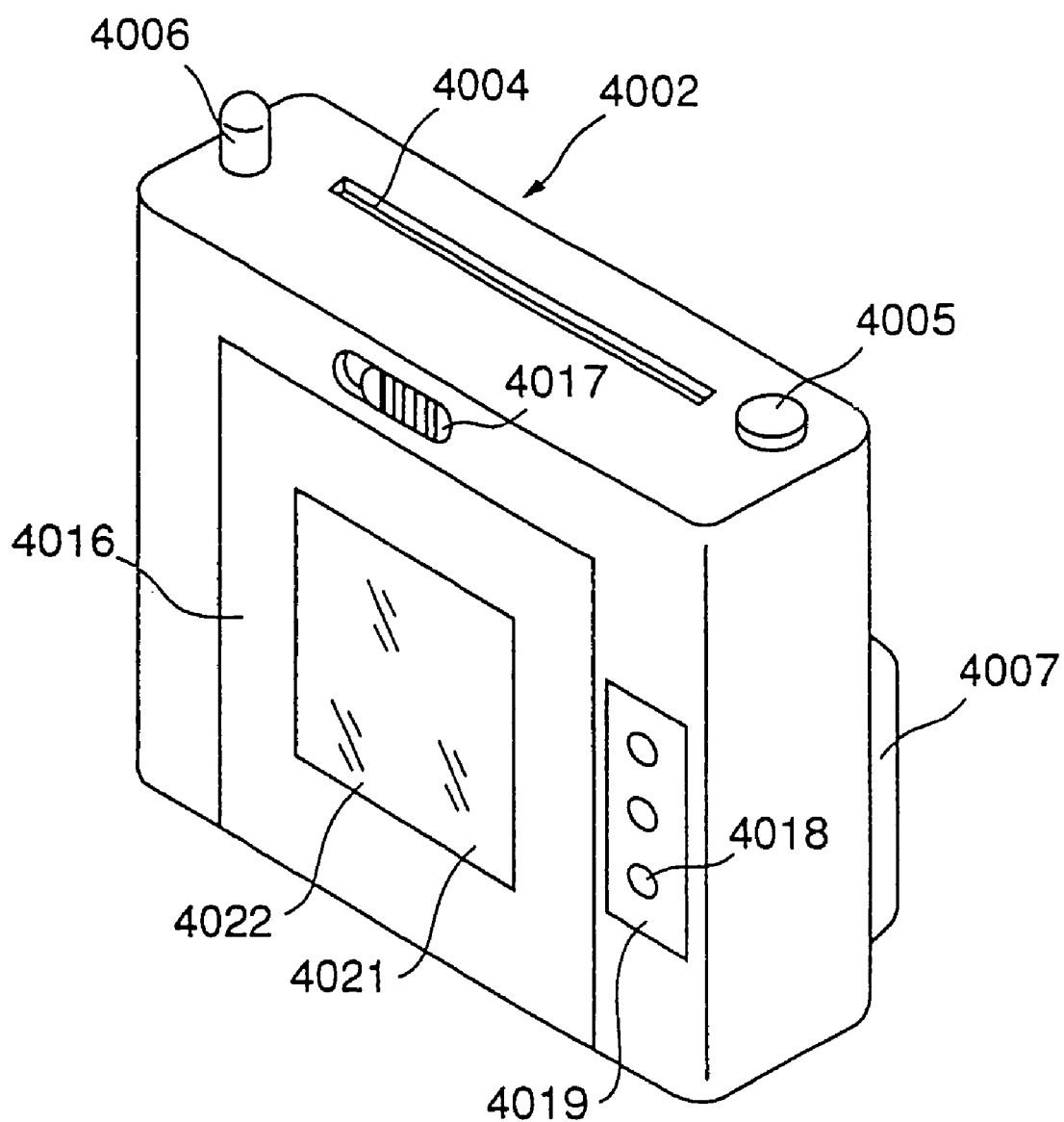
FIG. 75 is a perspective view showing appearance of the first embodiment of the printer according to the present invention looking from the back side.

FIG. 75 is a perspective view showing appearance of the first embodiment of the printer according to the present invention looking from the back side. On the back of the printer 4002, there are provided a back cover 4016, which is movable on a hinge portion 4015 (cf. FIG. 73) so as to be opened, and a release knob 4017 for releasing a lock when the back cover 4016 is opened. Inside the printer 4002, there is provided a pack chamber onto which a film pack accommodating a film units is loaded. The back cover 4016 serves to open and close the pack chamber. On one side of the back cover 4016, there are disposed a power switch 4018 of the printer 4002, and an operation panel 4019 on which various types of switches are provided.

At the substantial center of the back cover 4016, a transparent protection plate 4021 is engaged. On the back of the protection plate 4021, there is mounted an observing liquid crystal display unit 4022 (cf. FIG. 73) which is used for an image observation for a print.

Figure 73:
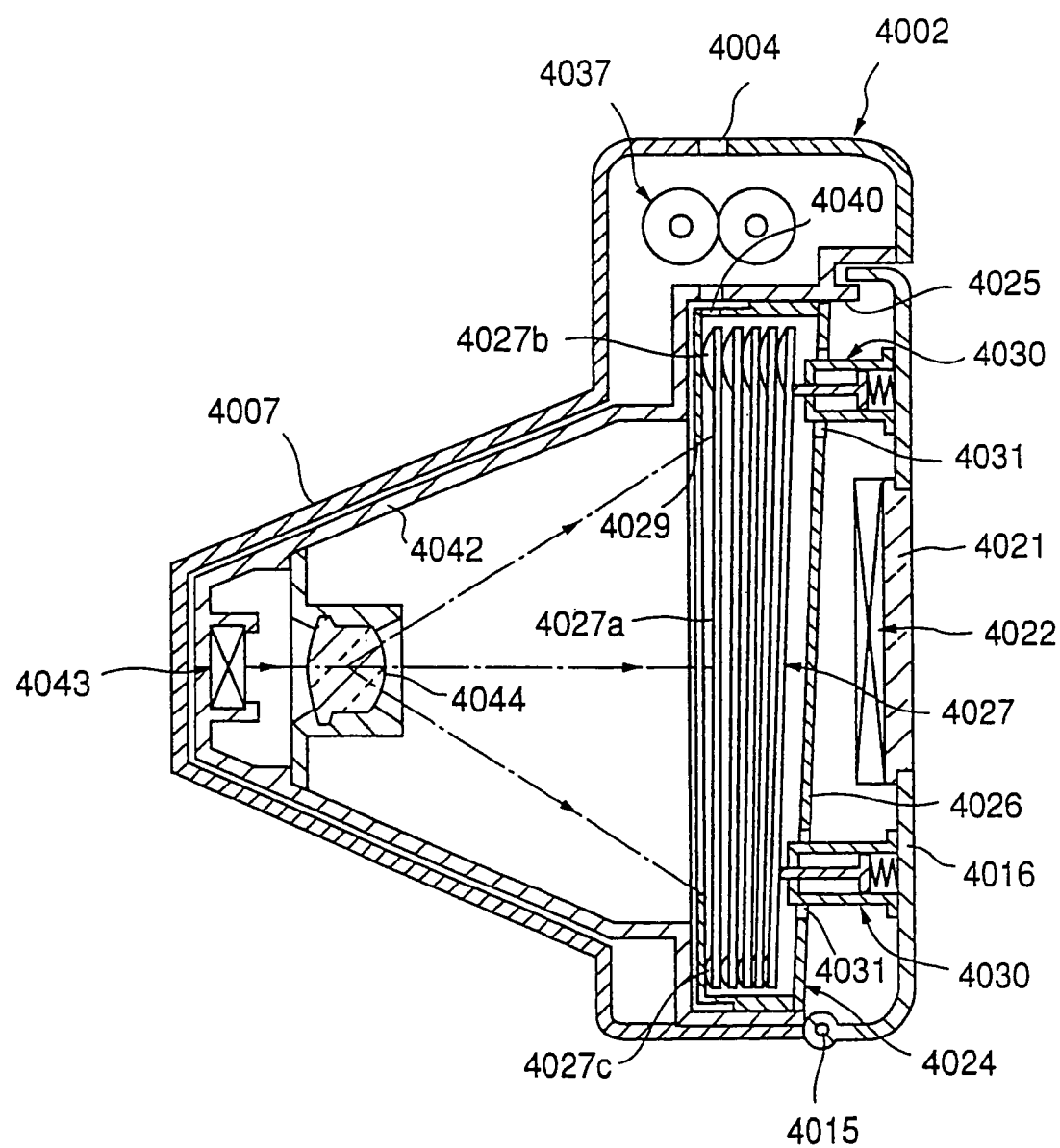
FIG. 73 is a sectional view of a first embodiment of a printer according to the present invention.

FIG. 73 is a sectional view of the first embodiment of a printer according to the present invention. As mentioned above, on the back inside the printer 4002, there is provided a pack chamber 4025 onto which a film pack 4024 is loaded. The film pack 4024 is one in which a plurality of film units 4027 are accommodated on a stack basis in a plastic case 4026, and is the same as that used for the general instant camera.

The film unit 4027 has a developer pot 4027b including developer at the upper portion of a sensitive surface 4027a and a trap member 4027c for absorbing residual of developer spread over the sensitive surface 4027a at the lower portion of the sensitive surface 4027a. After a latent image is photochemically formed by exposing the sensitive surface 4027a, the developer pot 4027b is exploded to pour developer into a sensitive layer inside the sensitive surface 4027a, thereby obtaining a print photograph promptly. The film unit 4027 is a transmission film unit in which an image is transferred through a reflection layer to a receiving layer opposed against the sensitive layer inside the sensitive surface 4027a to be subjected to exposure.

In the front of the case 4026, there is formed an exposure aperture 4029 for exposing the sensitive surface 4027a of the film unit 4027. In the back side of the case 4026, there are formed openings 4031 each for accepting a film pressing member 4030 provided on an inner wall of the back cover 4016. The film pressing member 4030 pushes the film unit 4027 accommodated in the case 4026 against the inner wall in the front of case 4026 by pressing the film unit 4027 from the back so that evenness property is provided for the sensitive surface 4027a, while it is not illustrated, the opening 4031 formed on the back of the case 4026 is covered by a flexible shielding sheet, and the film pressing member 4030 pushes the film unit 4027 through this shield sheet.

The observing liquid crystal display unit 4022 is mounted on an inner wall of the back cover 4016 in such a manner that it is disposed between a pair of film pressing members 4030. A space defined by a pair of film pressing members 4030 forms a dead space in which no main parts are incorporated thereinto, as in the instant camera using such pressing members. However, according to the printer 4002 of the present embodiment, the observing liquid crystal display unit 4022 is incorporated into such dead space formed between a pair of film pressing members 4030. This feature makes it possible to provide a compactness of the printer.

The observing liquid crystal display unit 4022 comprises a well known TFT type of transmission liquid crystal panel and a back light for illuminating this liquid crystal panel from the back. And It has such a degree of size that a printing image can be directly observed.

Figure 76:
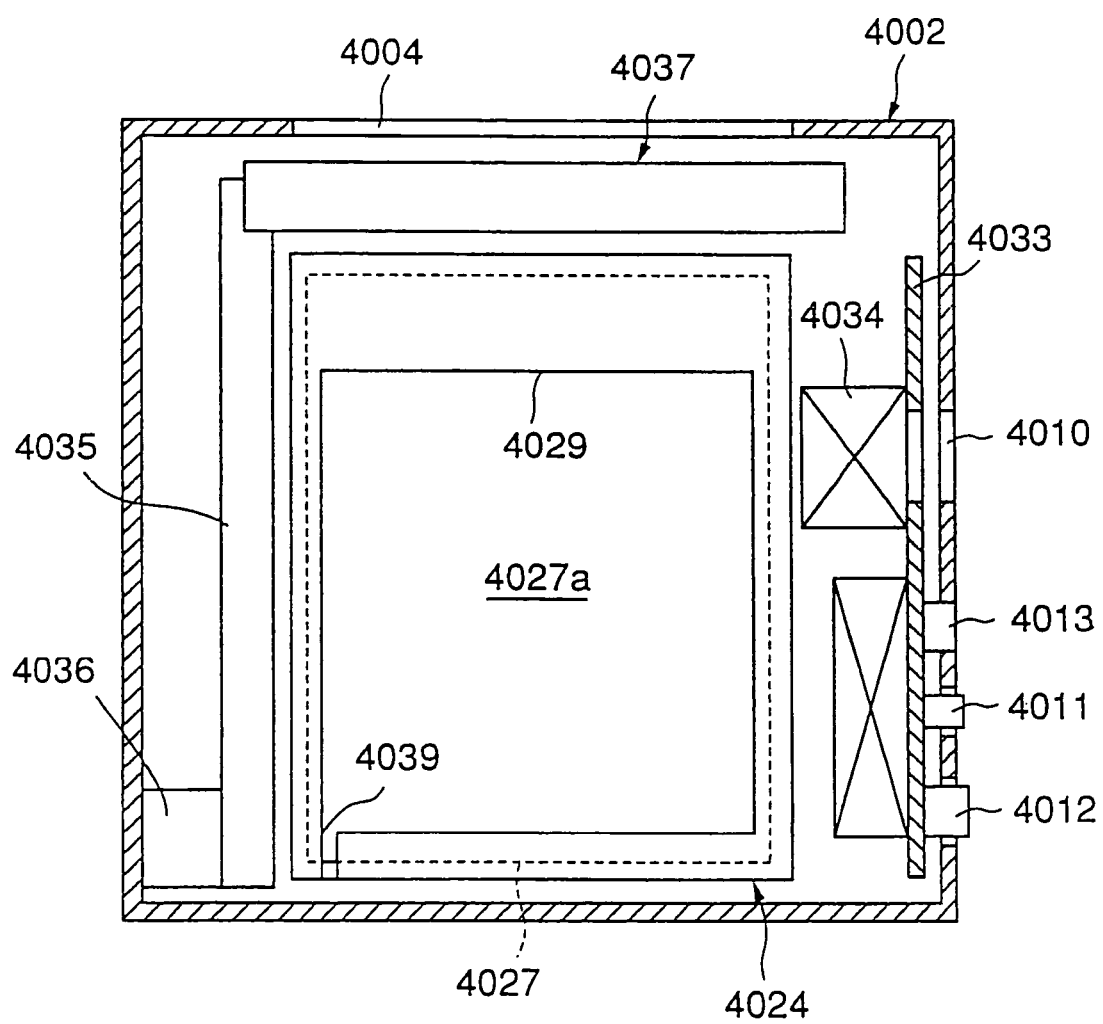
FIG. 76 is a sectional view schematically showing an internal arrangement of the first embodiment of the printer according to the present invention.

FIG. 76 is a sectional view schematically showing an internal arrangement of the printer 4002 according to the present invention. The film pack 4024 is disposed at the substantial center within the printer 4002. At the right of the film pack 4024, there are disposed a print substrate 4033 on which various types of circuits for controlling structural elements of the printer 4002 are formed and the above-mentioned various types of terminals are mounted, and a memory card drive unit for driving the memory card 4009. At the left of the film pack 4024, there are disposed a film transport mechanism 4035 for transporting the exposed film unit 4027 from the film pack 4024, the film transport mechanism 4035 serving also as developing means, and a driving motor 4036 for driving the film transport mechanism 4035. At the top of the film pack 4024, there is disposed a developing roller pair 4037 constituting the film transport mechanism 4035.

The film transport mechanism 4035 is used also in the general instant camera. The film transport mechanism 4035 comprises: a claw member for transporting the film unit 4027 upwards through a delivery outlet 4040 provided on the top of the case 4026 in such a manner that the claw member enters a groove 4039 formed in the front of the case 4026, and moves upwards while dipping up the lower end of the film unit 4027 located in the front row within the case 4026; a mechanism for driving the claw member; and the developing roller pair 4037.

The film unit 4027 transported from the case 4026 is fed between the developing rollers 4037. The developing rollers 4037 are also driven by the driving motor 4036 to rotate in mutually different directions so that the film unit 4027 is sandwiched between the developing rollers 4037 and is conveyed to a discharge outlet 4004 located upwards. The developing rollers 4037 are energized by springs and spacers (not illustrated) to make an approach to one another maintaining regular intervals so as to sandwich the film unit 4027 with strong power. Thus, the developer pot 4027b of the film unit 4027 is exploded so that developer flows into a sensitive layer inside the sensitive surface 4027a. The developing rollers 4037 uniformly spreads developer on the sensitive layer inside the sensitive surface 4027a, and discharges the film unit 4027 through the discharge outlet 4004.

As shown in FIG. 73, inside the projecting member 4007 provided in the front of the printer 4002, there is formed an exposure chamber 4042 which lies in the front of the pack chamber 4025. On the inner wall of the tip of the exposure chamber 4042, there is disposed an exposing liquid crystal display unit 4043 for displaying an image to be exposed on the film unit 4027. Between the exposing liquid crystal display unit 4043 and the film unit 4027, there is disposed an imaging lens 4044 as an exposing optical system in which an image displayed on the exposing liquid crystal display unit 4043 is projected with expansion onto the sensitive surface 4027a of the film unit 4027.

Figure 77:
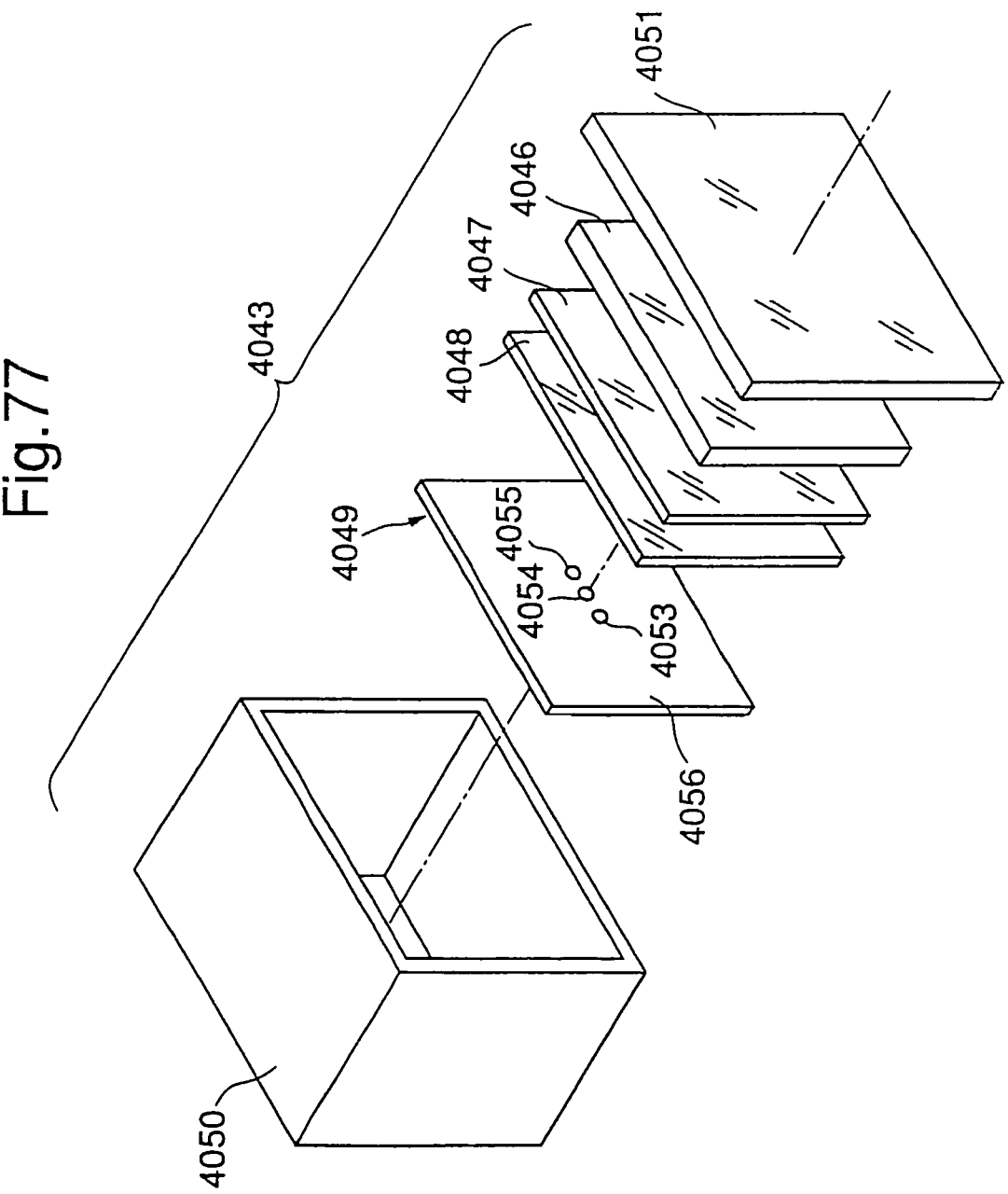
FIG. 77 is an exploded perspective view of a liquid crystal display unit for exposure.

FIG. 77 is an exploded perspective view of the exposing liquid crystal display unit 4043. The exposing liquid crystal display unit 4043 comprises: a transmission matrix drive type of liquid crystal panel 4046; a diffusing plate 4047 and a light amplifying plate 4048 which are disposed at the back of the liquid crystal panel 4046; an LED unit 4049, as a light source, disposed at the back of the diffusing plate 4047 and a light amplifying plate 4048; a cover member 4050 for accommodating those elements; and a transparent protection cover 4051 for protecting the liquid crystal panel 4046 and also for closing the cover member 4050.

On the liquid crystal panel 4046, a number of pixels (for example, length 240 pixels×breadth 320 pixels=total 76,800 pixels) are arranged on a two-dimensional basis. The liquid crystal panel 4046 per se has no coloring matter, and the whole pixels are used to form an image. The LED unit 4049 comprises a circuit substrate 4056 on which LED's 4053, 4054 and 4055, which emit beams of light of red (R), green(G)and blue(B), respectively, are mounted.

The exposing liquid crystal display unit 4043 sequentially displays images, which are obtained by color separation of a color image for three primary colors, on the liquid crystal panel 4046 at regular intervals, and in synchronism with this, sequentially turns on the LED's 4053, 4054 and 4055 for three primary colors provided on the LED unit 4049. Thus, it is possible to observe a color image by after-image phenomenon of display of the frame images and flashing of the LED's 4053, 4054 and 4055. According to the exposing liquid crystal display unit 4043, a color display can be performed by one pixel of the liquid crystal panel 4046. This feature makes it possible to display an enhanced color image with a compactness. Further, power dissipation is extremely small as compared with the conventional one such as the observing liquid crystal display unit 4022. Thus, it is possible to readily apply this printer to a portable printer which will be driven by a battery.

On the exposing liquid crystal display unit 4043, an color image is displayed in the form of an erect image with respect to both the top and bottom and the right and left. Accordingly, on the sensitive surface 4027a of the film unit 4027, an image, which is reversed in the top and bottom and the right and left, is exposed. However, an image is observed from the opposite side of the sensitive surface 4027a of the film unit 4027. Thus, a positive image formed on the film unit 4027 is the same image as that displayed on the exposing liquid crystal display unit 4043.

Figure 78:
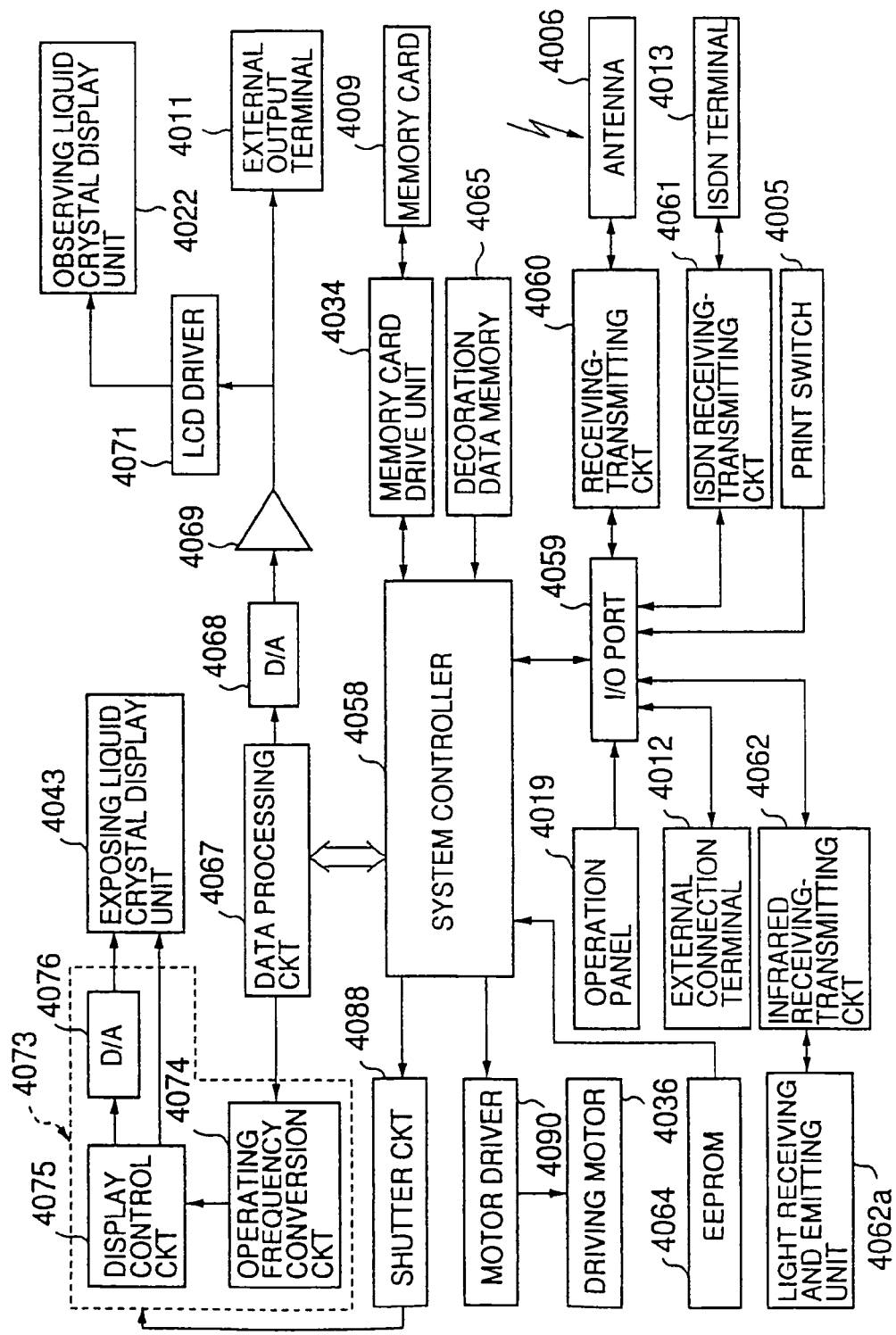
FIG. 78 is a block diagram showing an electric structure of the first embodiment of the printer according to the present invention.

FIG. 78 is a block diagram showing an electric structure of the first embodiment of the printer according to the present invention. The printer 4002 is controlled by a system controller 4058 including a microcomputer and the like. The system controller 4058 receives via the I/O port various types of signals from an operation panel 4019, an external connection terminals 4012, a receive-transmit circuit 4060 for receiving and transmitting image data via an antenna 4006, an ISDN receive-transmit circuit 4061 for receiving and transmitting image data via an ISDN terminal 4013, and an infrared receive-transmit circuit 4062 for receiving and transmitting image data in the form of infrared via a light receiving and emitting unit 4062a. Further, the system controller 4058 monitors signals inputted to perform a processing in accordance with an input signal.

An EEPROM 4064 connected to the system controller 4058 stores therein beforehand a sequence program of operating the printer 4002 in accordance with a predetermined sequence, and various control data to be referred to when the sequence program is executed. A decoration data memory 4065 stores therein a frame to be compounded with image data entered, a message, a character mark, etc.

As a memory card 4009, a DRAM (dynamic random access memory) is used, and stores therein image data through an electronic still camera, a personal computer, etc. The memory card 4009 inserted into the memory slot 4010 is set to a memory card drive unit 4034. The system controller 4058 reads out image data recorded in the memory card 4009 via the memory card drive unit 4034, and writes into the memory card 4009 composite image data in which image data and decoration data such as a frame surrounding the image data and a message are synthesized.

Image data read out from the memory card 4009 is fed to an image data processing circuit 4067. Upon receipt of the image data, the image data processing circuit 4067 performs a signal processing such as a white balance control and a gamma correction for the received image data. When the decoration data is selected, the image data processing circuit 4067 performs an image composition of image data and decoration data. The processed image data is converted into a video signal associated with a composite signal of an NTSC system, and then fed via a D/A converter 4068 and an amplifier 4069 to an external output terminal 4011 for a video signal. Thus, it is possible to observe an image through an external monitor connected to the external output terminal 4011.

The video signal outputted from the image data processing circuit 4067 is also fed to the LCD driver 4071. Then the LCD driver 4071 drives the observing liquid crystal display unit 4022 so that a printing image is displayed on the observing liquid crystal display unit 4022.

Further, in a route other than that for the video signal, the processed image data is converted into an electric color image signal and then fed to an interface circuit 4073. An entry of the image signal to the interface circuit 4073 is carried out in accordance with an operation of a print switch 4005. At that time, the system controller 4058 enables a shutter circuit 4088 to control a display time of an image on exposing liquid crystal display unit 4043.

Figure 79:
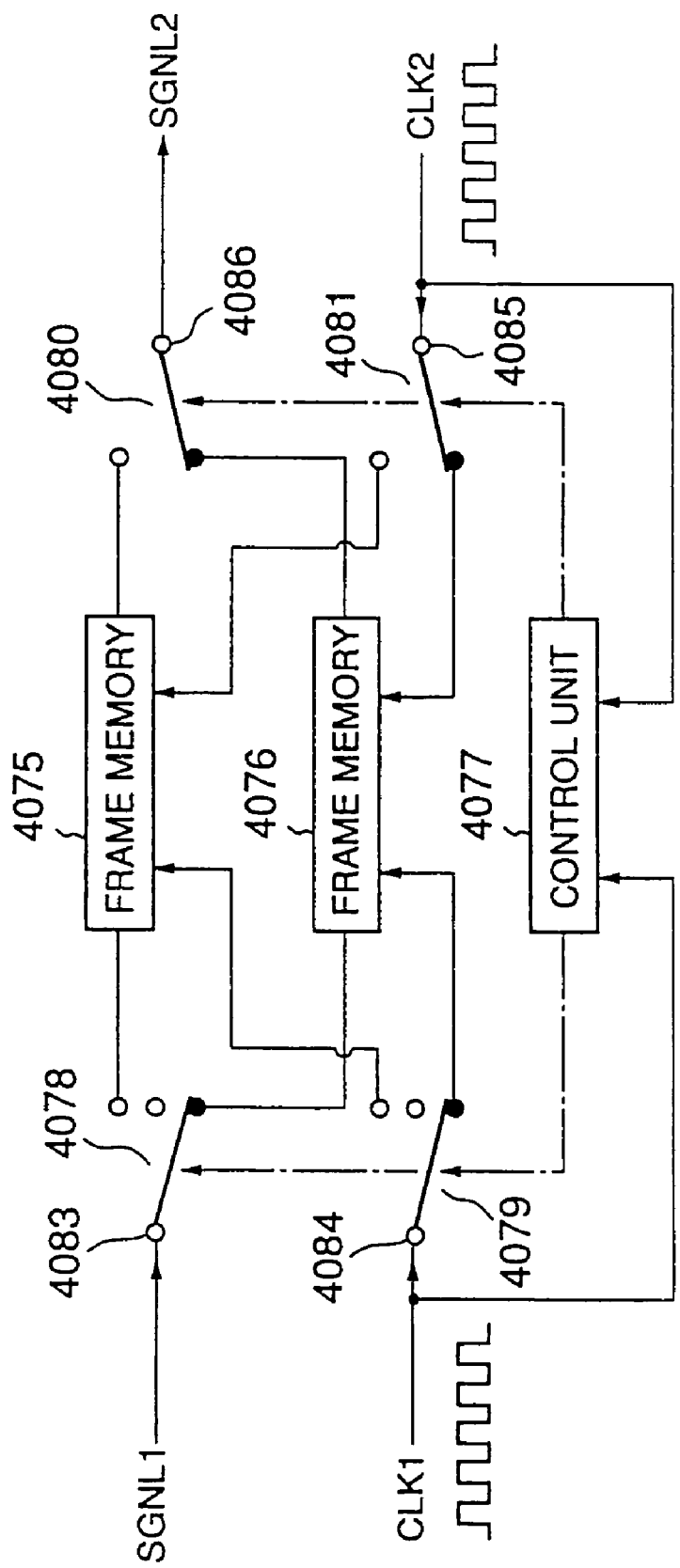
FIG. 79 is a block diagram of an operating frequency conversion circuit.

The interface circuit 4073 comprises an operating frequency conversion circuit 4074, a display control unit 4075, and an D/A converter 4076. A color image signal is first fed to the operating frequency conversion circuit 4074. As shown in FIG. 79, the operating frequency conversion circuit 4074 comprises two frame memories 4075 and 4076, a control unit 4077, and four switch circuits 4078, 4079, 4080 and 4081. Incidentally, an entry of an image signal from the image data processing circuit 4067 into the interface circuit 4073 is performed only when the print switch 4005 is operated.

A terminal 4083 of the operating frequency conversion circuit 4074 receives a color image signal SGNL 1 representative of a frame of color image data in synchronism with a clock CLK1 which is fed to a terminal 4084. The color image signal SGNL1 is stored in a frame memory 4075 or a frame memory 4076 in accordance with a selection state of switching circuits 4078 and 4079. The control unit 4077 monitors the clock CLK1, and switches the switching circuits 4078 and 4079 whenever a frame of color image signal is completely stored in one of the frame memories 4075 and 4076. Each of the switching circuits 4078 and 4079 has a neutral point which is not connected to any of the frame memories 4075 and 4076. The neutral points are used in accordance with a difference between operating frequencies in the writing end and the reading end.

On the other hand, in the event that color images are read out from the frame memories 4075 and 4076, the color image are read out in the form of a color image signal SGNL2 through a terminal 4086 in synchronism with a clock CLK2 which is fed to a terminal 4085. Also at that time, control unit 4077 monitors the clock CLK2, and switches the switching circuits 4080 and 4081 when a color image signal is completely read out from one of the frame memories 4075 and 4076, so that a color image signal is read out from another frame memory. The clock CLK2 synchronizes with the operating frequency of the exposing liquid crystal display unit 4043, so that the color image signal SGNL2 derived from the operating frequency conversion circuit 4074 drives the exposing liquid crystal display unit 4043 in synchronism, with the same.

In the event that the clock CLK1 and the clock CLK2 are equal to one another in frequency, it is possible to read and write color image signals from and in the frame memories 4075 and 4076 on an equivalent timing basis. However, in the event that the clock CLK1 and the clock CLK2 are not equal to one another in frequency, various problems will occur. For example, in the event that the frequency of the clock CLK1 is higher than the clock CLK2, read out of a color image signal from a frame memory becomes later as compared with writing of a color image signal into a frame memory. This involves such a problem that a subsequent frame of color image signal cannot be written into a frame memory.

In the event that the frequency of the clock CLK1 is lower than the clock CLK2, read out of a color image signal from a frame memory becomes faster as compared with writing of a color image signal into a frame memory. In this case, it is impossible to feed the subsequent color image signal to the exposing liquid crystal display unit 4043. These problems can be solved by changing the switching timing of the switching circuits 4078, 4079, 4080 and 4081, as will be described hereinafter.

In the event that the frequency of the clock CLK1 is higher than the clock CLK2, the switching circuits 4078 and 4079 are switched to the neutral points which are not connected to any of the frame memories 4075 and 4076, so that a color image signal is inhibited from being written into a frame memory until read out of a color image signal of either one of the frame memories 4075 and 4076 is completed.

In the event that the frequency of the clock CLK1 is lower than the clock CLK2, the control unit 4077 does not perform switching for the switching circuits 4080 and 4081 until writing into a frame memory in the writing side is completed. When writing of a color image signal into the frame memory in the writing side is completed, while the same color image signal is repeatedly read out from the same frame memory, the control unit 4077 switches the switching circuits 4080 and 4081.

In this manner, even in the event that an operating frequency of an entered color image signal is different from that of the exposing liquid crystal display unit 4043, the operating frequency conversion circuit 4074 can surely converts the operating frequency of an entered color image signal into the same frequency as the operating frequency of the exposing liquid crystal display unit 4043, thereby preventing an occurrence of a disturbance of an image due to the frequency shift on the exposing liquid crystal display unit 4043.

The color image signal read out from the operating frequency conversion circuit 4074 is fed to the display control unit 4075. The display control unit 4075 separates a color image signal to color image signals associated with three primary colors of R, G, and B, and sequentially outputs those signals. Each of the color image signals outputted from the display control unit 4075 is converted into an analog image signal by the D/A converter 4076 and then fed to the exposing liquid crystal display unit 4043. The display control unit 4075 feeds also to the exposing liquid crystal display unit 4043 a control signal to drive the LED unit 4049.

Figure 80:
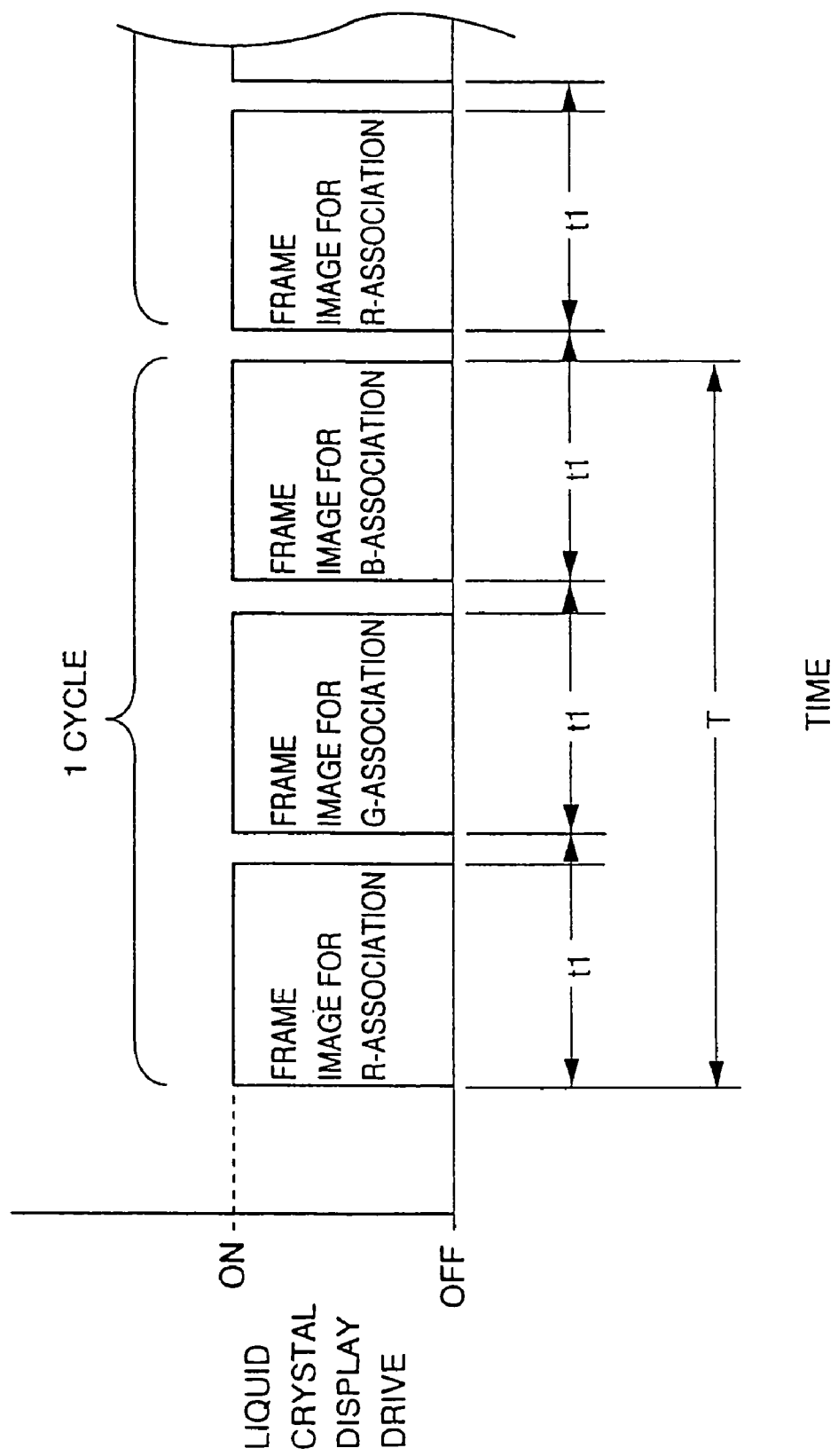
FIG. 80 is a graph useful for understanding an operating timing of a liquid crystal display unit for exposure.

As shown in FIG. 80, the display control unit 4075 sequentially forms on the liquid crystal panel 4046 of the exposing liquid crystal display unit 4043 at time t1 intervals a frame image for red-association, a frame image for green-association, and a frame image for blue-association, which are associated with each of the color image signals. Further, the display control unit 4075 drives the LED unit 4049 to sequentially turn on the LED's 4053, 4054 and 4055 in synchronism with the formation of the respective colors of frame images onto the liquid crystal panel 4046.

When an operating time T, which is necessary for display of a frame image for red-association, a frame image for green-association, and a frame image for blue-association onto the liquid crystal panel 4046, and turn on of the LED's 4053, 4054 and 4055, is expressed by one cycle, the operating time of one cycle is not more than $\frac{1}{16}$ sec. Thus, a display of full color is performed with one pixel of the liquid crystal panel 4046 by after-image phenomenon of display of these frame images and flashing of the LED's 4053, 4054 and 4055. Further, even if dynamic image data is inputted, it is possible to expect a smooth movement of an image.

In the event that the image data to be inputted is a dynamic image, the immediately subsequent frame image is inputted. On the other hand, in case of the still image, the same frame image is repeatedly fed to the display control unit 4075 by the operating frequency conversion circuit 4074 until an operation of switching an image is implemented, or until a time according to the set up content of the automatic image transport function elapses. Thus, a still image is continuously displayed on the exposing liquid crystal display unit 4043.

The shutter circuit 4088 controls the interface circuit 4073 so that the exposing liquid crystal display unit 4043 serves as a shutter, and specifically, causes the exposing liquid crystal display unit 4043 to display a full color image thereon by a predetermined time so that an exposure on the film unit 4027 is effected. It is acceptable that an exposure time is automatically controlled in accordance with sensitivity of the film unit 4027 and density of image data, or alternatively a user sets up.

When the exposure on the film unit 4027 is terminated, the system controller 4058 enables the driving motor 4036 via a motor driver 4090. Thus, the film transport mechanism 4035 operates, so that the claw member transports the film unit 4027 upwards through the delivery outlet 4040 provided on the top of the case 4026 in such a manner that the claw member enters the groove 4039 formed in the front of the film pack 4024, and moves upwards while dipping up the lower end of the film unit 4027 located in the front row within the case 4026.

The developing rollers 4037 are also driven by the driving motor 4036 to rotate in mutually different directions so that the film unit 4027 is sandwiched between the developing rollers 4037 and is conveyed to a discharge outlet 4004 located upwards. At that time, the developer pot 4027b of the film unit 4027 is exploded so that developer flows into a sensitive layer inside the sensitive surface 4027a. The developing rollers 4037 uniformly spreads developer on the sensitive layer inside the sensitive surface 4027a. Thus, a positive image is formed on the film unit 4027.

Figure 81:
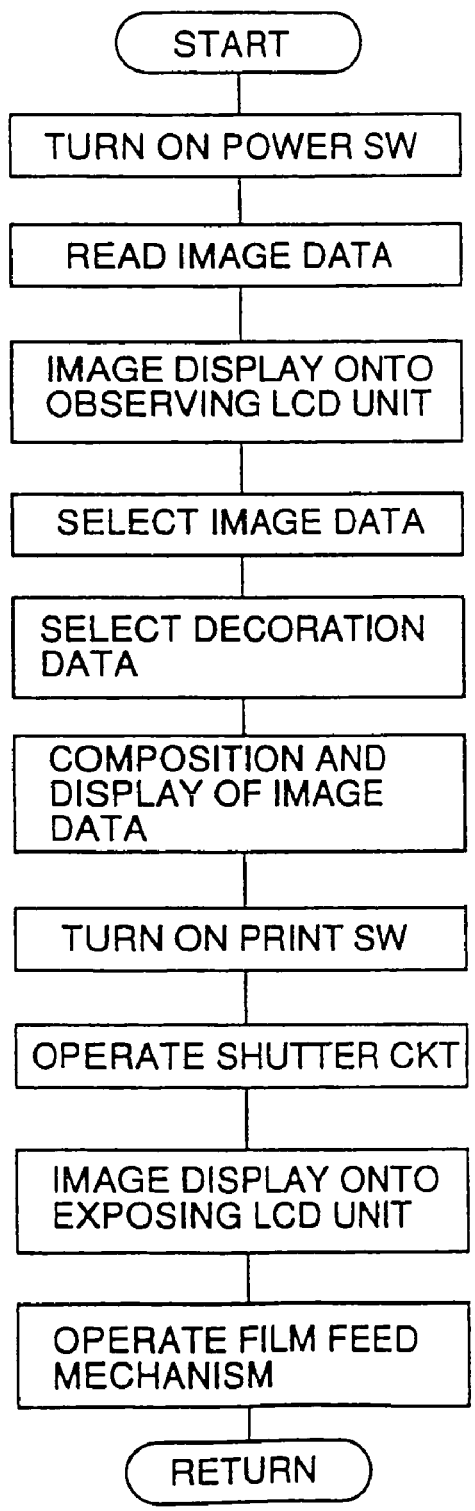
FIG. 81 is a flowchart useful for understanding an operating sequence of the first embodiment of the printer according to the present invention.

Next, there will be explained an effect of the first embodiment of the printer according to the present invention referring to FIG. 81.

When the printer 4002 is used, the power switch 4018 provided on the operation panel 4019 is operated to turn on the power source of the printer 4002. With respect to input ways of image data to the printer 4002, there are prepared a plurality of input methods, for example, a method in which image data is inputted through the memory card 4009 on which image data is recorded by an electronic still camera, a personal computer, etc.; a method in which the external connection terminal 4012 and the ISDN connection terminal 4013 are utilized to directly input image data through the external equipment such as an electronic still camera, a video camera, a video deck, a personal computer, etc.; a method in which the antenna 4006 is used to input image data through a radio wave from an external equipment; and a method in which image data is inputted through infrared by the light receiving and emitting unit 4062a. In the present embodiment, there will be explained by way of example the method in which image data is inputted through the memory card 4009.

In the event that image data is inputted through the memory card 4009, the memory card 4009 is inserted into the memory slot 4010 in a state that the power source of the printer 4002 is turned off, and then the power source of the printer 4002 is turned on. The reason why this is to do so is that data of the memory card 4009 is prevented from being destroyed by a detachable insertion of the memory card 4009 in the state that the power source of the printer 4002 is turned on. After turn on of the power source of the printer 4002, various switches of the operation panel 4019 are operated to select and determine a method of inputting image data, and then the input of the image data is carried out.

As shown in FIG. 78, when an operation of inputting of image data through the operation panel 4019 is made, an operation signal is fed via the I/O port 4059 to the system controller 4058. Upon receipt of the operation signal from the I/O port 4059, the system controller 4058 reads out image data from the memory card 4009 via the memory card drive unit 4034.

Image data read out from the memory card 4009 is fed to an image data processing circuit 4067 by the system controller 4058. Upon receipt of the image data, the image data processing circuit 4067 performs a signal processing such as a white balance control and a gamma correction for the received image data. The processed image data is converted into a video signal associated with a composite signal of an NTSC system, and then fed via a D/A converter 4068 and an amplifier 4069 to an external output terminal 4011 for a video signal. Thus, it is possible to observe an image through an external monitor connected to the external output terminal 4011.

The video signal is also fed to the LCD driver 4071. Then the LCD driver 4071 drives the observing liquid crystal display unit 4022 so that an image associated with the inputted video signal is displayed on the observing liquid crystal display unit 4022.

A user operates various switches of the operation panel 4019 to sequentially read image data recorded on the memory card 4009, and observes the same on the observing liquid crystal display unit 4022 so that an image to be printed is selected and decided among the observed image data.

Further, according to the printer 4002 of the present embodiment, it is possible to combine decoration data such as a frame, a message, a character mark, etc., with image data entered from the exterior into printing. When the operation panel 4019 is operated to issue an instruction that decoration data is used, the system controller 4058 sequentially read decoration data from the decoration data memory 4065. The decoration data thus read is combined with image data selected by the decoration data memory 4065. A composite image data of the image data with the decoration data is again displayed on the observing liquid crystal display unit 4022.

In the event that image data to be printed is determined, the print switch 4005 is depressed. The system controller 4058 receives a print signal from the print switch 4005 via the I/O port 4059. Upon receipt of the print signal, the system controller 4058 causes the image data processing circuit 4067 to convert image data into an electric color image signal and feed the signal thus converted to the interface circuit 4073. Further, the system controller 4058 enables the shutter circuit 4088 to control a display time of image data on the exposing liquid crystal display unit 4043 by the interface circuit 4073.

A color image signal entered the interface circuit 4073 is fed to the operating frequency conversion circuit 4074. As shown in FIG. 79, the terminal 4083 of the operating frequency conversion circuit 4074 receives the color image signal SGNL1 representative of a frame of color image data in synchronism with the clock CLK1 fed to the terminal 4084. The color image signal SGNL1 is stored in either of the frame memories 4075 and 4076 in accordance with the switching state of the switching circuits 4078, 4079. The control unit 4077 monitors the clock CLK1, and switches the switching circuits 4078 and 4079 whenever a frame of color image signal is completely stored in one of the frame memories 4075 and 4076.

On the other hand, color images stored in the frame memories 4075 and 4076 are read out in the form of a color image signal SGNL2 through a terminal 4086 in synchronism with a clock CLK2 which is fed to a terminal 4085. Also at that time, control unit 4077 monitors the clock CLK2, and switches the switching circuits 4080 and 4081 when a color image signal is completely read out from one of the frame memories 4075 and 4076, so that a color image signal is read out from another frame memory. The clock CLK2 synchronizes with the operating frequency of the exposing liquid crystal display unit 4043, so that the color image signal SGNL2 derived from the operating frequency conversion circuit 4074 drives the exposing liquid crystal display unit 4043 in synchronism with the same.

In the event that the frequency of the clock CLK1 is higher than the clock CLK2, the switching circuits 4078 and 4079 are switched to the neutral points which are not connected to any of the frame memories 4075 and 4076, so that a color image signal is inhibited from being written into a frame memory until read out of a color image signal of either one of the frame memories 4075 and 4076 is completed. This solves such a problem that a subsequent frame of color image signal cannot be written into a frame memory.

In the event that the frequency of the clock CLK1 is lower than the clock CLK2, the control unit 4077 does not perform switching for the switching circuits 4080 and 4081 until writing into a frame memory in the writing side is completed. When writing of a color image signal into the frame memory in the writing side is completed, while the same color image signal is repeatedly read out from the same frame memory, the control unit 4077 switches the switching circuits 4080 and 4081. This solves such a problem that the subsequent color image signal cannot be fed to the exposing liquid crystal display unit 4043.

In this manner, even in the event that an operating frequency of an entered color image signal is different from that of the exposing liquid crystal display unit 4043, the operating frequency conversion circuit 4074 can surely converts the operating frequency of an entered color image signal into the same frequency as the operating frequency of the exposing liquid crystal display unit 4043, thereby preventing an occurrence of a disturbance of an image due to the frequency shift on the exposing liquid crystal display unit 4043.

The color image signal read out from the operating frequency conversion circuit 4074 is fed to the display control unit 4075. The display control unit 4075 separates a color image signal to color image signals associated with three primary colors of R, G, and B, and sequentially outputs those signals. Each of the color image signals outputted from the display control unit 4075 is converted into an analog image signal by the D/A converter 4076 and then fed to the exposing liquid crystal display unit 4043. The display control unit 4075 feeds also to the exposing liquid crystal display unit 4043 a control signal to drive the LED unit 4049.

As shown in FIG. 80, the display control unit 4075 sequentially forms on the liquid crystal panel 4046 of the exposing liquid crystal display unit 4043 at time t1 intervals a frame image for red-association, a frame image for green-association, and a frame image for blue-association, which are associated with each of the color image signals. Further, the display control unit 4075 drives the LED unit 4049 to sequentially turn on the LED's 4053, 4054 and 4055 in synchronism with the formation of the respective colors of frame images onto the liquid crystal panel 4046.

When an operating time T, which is necessary for display of a frame image for red-association, a frame image for green-association, and a frame image for blue-association onto the liquid crystal panel 4046, and turn on of the LED's 4053, 4054 and 4055, is expressed by one cycle, the operating time of one cycle is not more than $\frac{1}{16}$ sec. Thus, a display of full color is performed with one pixel of the liquid crystal panel 4046 by after-image phenomenon of display of these frame images and flashing of the LED's 4053, 4054 and 4055. On the exposing liquid crystal display unit 4043, the same frame image is repeatedly formed until a predetermined time elapses.

An image displayed on the exposing liquid crystal display unit 4043 is projected by the imaging lens 4044 with expansion onto the sensitive surface 4027a of the film unit 4027. Thus, the image displayed on the exposing liquid crystal display unit 4043 is properly exposed on the film unit 4027.

It is acceptable that an exposure time by the exposing liquid crystal display unit 4043 is automatically controlled in accordance with sensitivity of the film unit 4027 and density of image data, or alternatively a user sets up. Further, it is also acceptable that instead of control of the exposure time, a drive current of driving LED's 4053, 4054 and 4055 of the LED unit 4049 is controlled to control an amount of light of the LED's 4053, 4054 and 4055 per se.

On the sensitive surface 4027a of the film unit 4027, an image, which is reversed in the top and bottom and the right and left with respect to an image displayed on the exposing liquid crystal display unit 4043, is exposed. However, an image is observed from the opposite side of the sensitive surface 4027a of the film unit 4027. Thus, an image to be observed is the same image as that displayed on the exposing liquid crystal display unit 4043.

When the exposure on the film unit 4027 is terminated, the system controller 4058 enables the driving motor 4036 by a motor driver 4090. The driving motor 4036, as shown in FIG. 76, drives the film transport mechanism 4035 and the developing roller pair 4037 as well.

In the film transport mechanism 4035, the claw member transports the film unit 4027 upwards through the delivery outlet 4040 provided on the top of the case 4026 in such a manner that the claw member enters a groove 4039 formed in the front of the case 4026, and moves upwards while dipping up the lower end of the film unit 4027 located in the front row within the case 4026. The film unit 4027 transported from the case 4026 is fed between the developing rollers 4037.

The developing rollers 4037 are also driven by the driving motor 4036 to rotate in mutually different directions so that the film unit 4027 is sandwiched between the developing rollers 4037 and is conveyed to a discharge outlet 4004 located upwards. The developing rollers 4037 are energized by springs and spacers (not illustrated) to make an approach to one another maintaining regular intervals so as to sandwich the film unit 4027 with strong power. Thus, the developer pot 4027b of the film unit 4027 is exploded so that developer flows into a sensitive layer inside the sensitive surface 4027a. The developing rollers 4037 uniformly spreads developer on the sensitive layer inside the sensitive surface 4027a, and discharges the film unit 4027 through the discharge outlet 4004. The discharged film unit 4027 can be observed in the form of a positive image after a predetermined time for developing and transfer processing on the film unit.

While a positive image formed on the observing surface of the film unit 4027 according to the first embodiment is an image which is reversed with respect to the top and bottom direction, reversing an image to be displayed on the exposing liquid crystal display unit 4043 with respect to the top and bottom direction makes it possible to form a positive image formed on the observing surface of the film unit 4027 in the form of an erect image. This is implemented by providing an image attitude correction function for correcting an attitude of an image for the image data processing circuit 4067. In case of the present embodiment, it is effective that a reversing processing as to the top and bottom direction is applied to only an image to be transmitted to the interface circuit 4073.

According to the present embodiment, while the transmission film unit has been described by way of example, it is possible to use a mirror image type of film unit in which a positive image is formed on an exposure surface for observation. In this case, when an erect image is displayed on the exposing liquid crystal display unit, an image formed on the observing surface of the mirror image type of film unit is an image which is reversed with respect to the top and bottom direction and right and left direction. However, as mentioned above, by providing an image attitude correction function for the image data processing circuit and displaying a reverse image on the exposing liquid crystal display unit, it is possible to obtain a positive image in the form of an erect image also in the mirror image type of film unit.

Incidentally, according to the first embodiment of a printer as mentioned above, the exposing liquid crystal display unit 4043 and the imaging lens 4044 are disposed in such a manner that they are opposing against the film units 4027 to provide a linear exposing optical path. However, the use of a reflecting mirror to bend the exposing optical path makes it possible to implement a compactness of a printer in its entirety. Hereinafter, there will be described a second embodiment of a printer according to the present invention in which two reflecting mirrors are used to provide a Z-like shaped exposing optical path. In the following figures, the same parts are denoted by the same reference numbers as those of the figures referred to the first embodiment of a printer, and the redundant description will be omitted.

Figure 82:
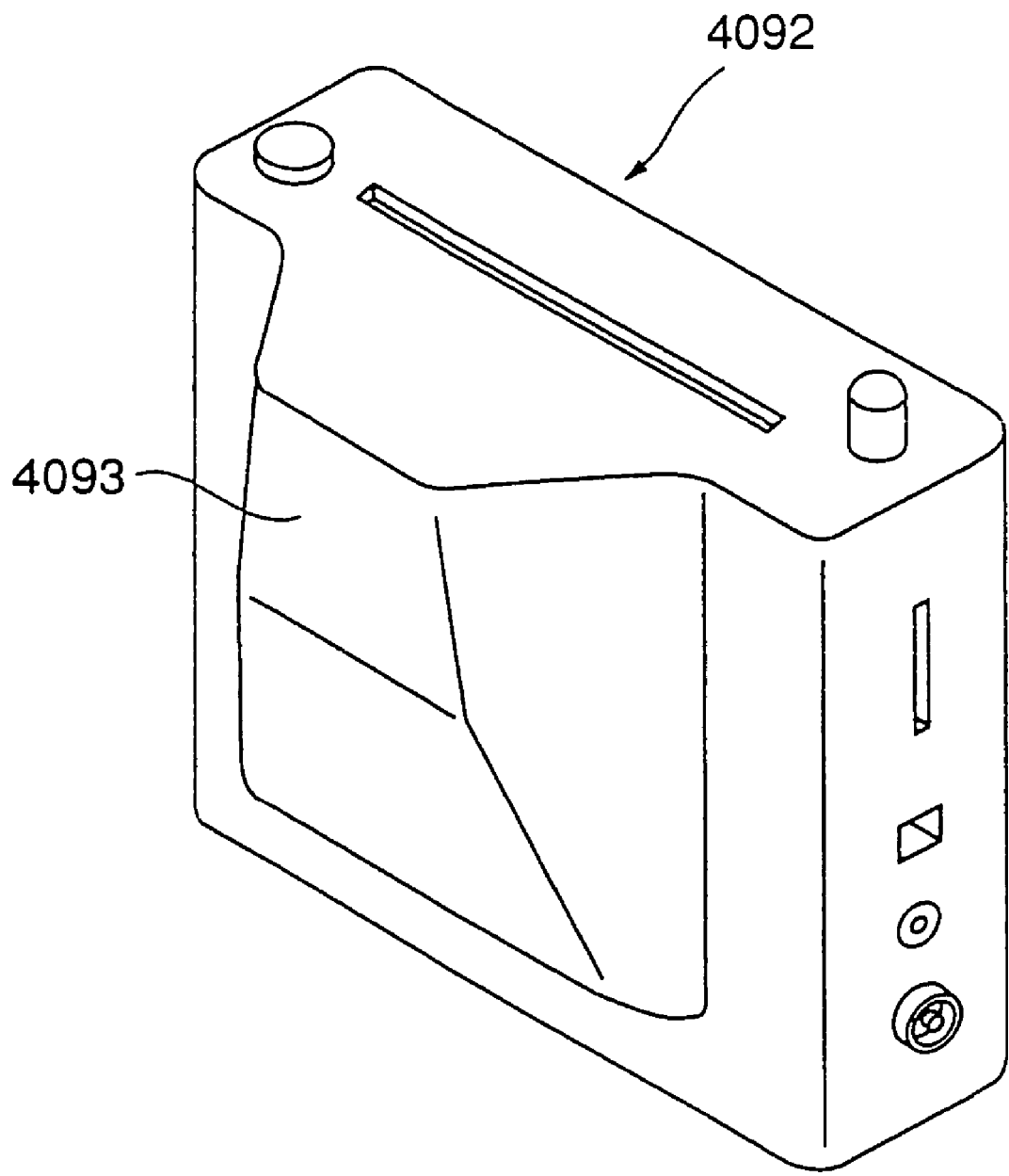
FIG. 82 is a perspective view showing appearance of a second embodiment of a printer according to the present invention looking from the front side.

FIG. 82 is a perspective view showing appearance of a second embodiment of a printer according to the present invention looking from the front side. Similar to the first embodiment of the printer 4002, a printer 4092 has a projecting member 4093 in the front of the printer 4092. Inside the projecting member 4093, there is provided an exposing optical path extending from the exposing liquid crystal display unit 4043 to the film units 4027. Here, two reflecting mirrors are used to bend the exposing optical path. Thus, the projecting member 4093 is small in projecting amount as compared with the printer 4002 of the first embodiment.

Figure 83:
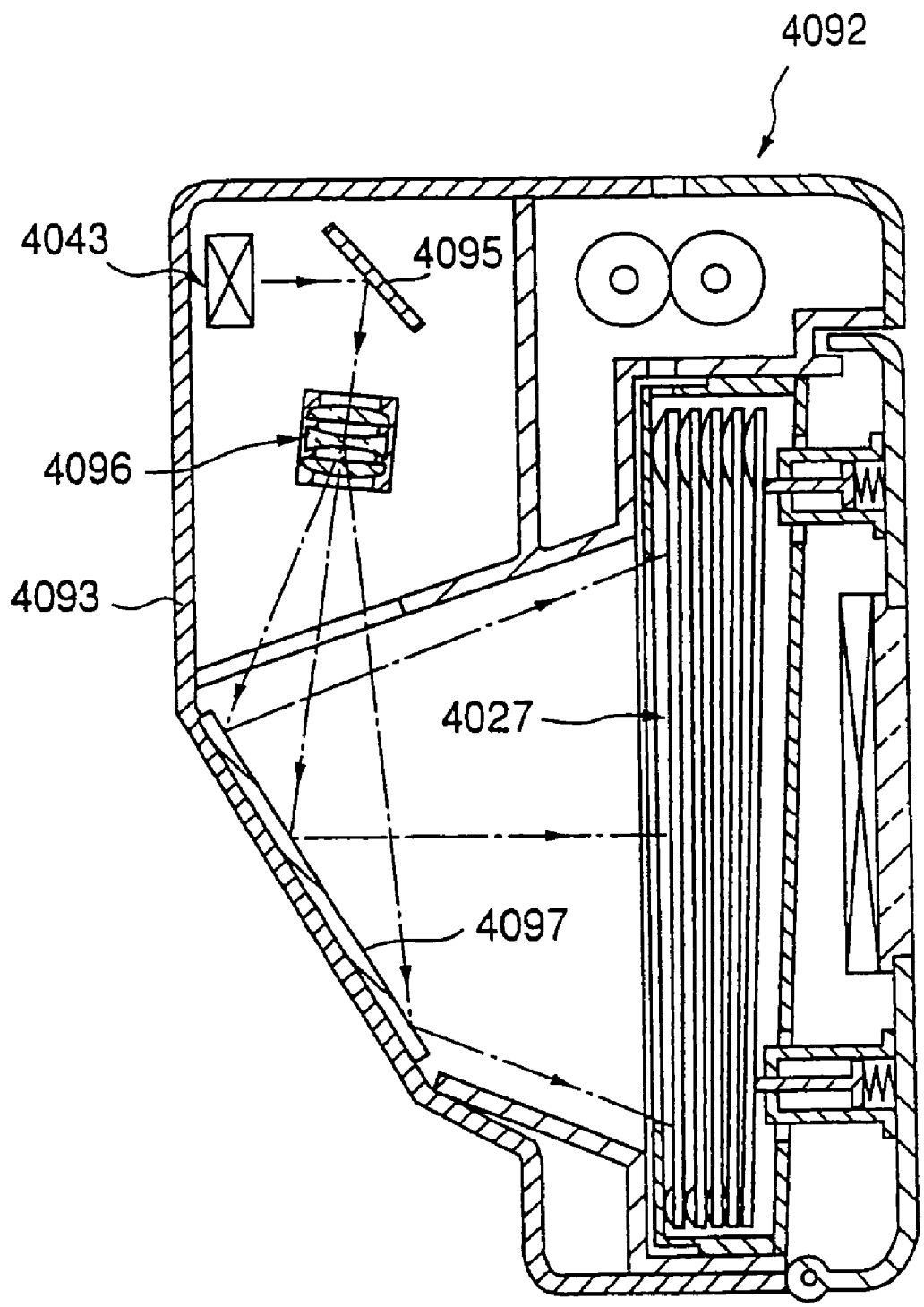
FIG. 83 is a sectional view of the second embodiment of the printer according to the present invention.

FIG. 83 is a sectional view of the second embodiment of the printer according to the present invention. Inside the projecting member 4093, there are incorporated an exposing liquid crystal display unit 4043, a first reflecting mirror 4095, an exposing optical system 4096 comprising a plurality of lenses and a lens barrel, and a second reflecting mirror 4097. An image displayed on the exposing liquid crystal display unit 4043 is reflected on the first reflecting mirror 4095 and is incident onto the exposing optical system 4096. The exposing optical system 4096 projects the incident light onto the second reflecting mirror 4097 with expansion. Beams of light incident onto the second reflecting mirror 4097 are imaged on the sensitive surface 4027a of the film unit 4027, and exposes a photosensitive layer inside the sensitive surface 4027a.

In this manner, by providing a Z-like shaped optical path, it is possible to reduce a size of the printer 4092 with respect to a front and back direction as compared with the printer 4002 using the linear exposing optical path, thereby implementing compactness and weight saving of the printer.

Incidentally, according to the Z-like shaped optical path, an image displayed on the exposing liquid crystal display unit 4043 is exposed on the film unit 4027 in a state that the image is reversed with respect to the top and bottom direction and the right and left direction. However, the film unit 4027 is observed from the opposite side of the sensitive surface 4027a. Thus, it is effective that an erect image is displayed on the exposing liquid crystal display unit 4043.

By providing an image attitude correction function for the image data processing circuit and displaying a reverse image on the exposing liquid crystal display unit, it is possible to form a positive image in the form of an erect image on the observing surface of the film unit 4027.

Also in the printer 4092 of the present embodiment, it is possible to use a mirror image type of film unit. In this case, by displaying a reverse image, which is reversed in the top and bottom direction and the right and left direction, on the exposing liquid crystal display unit, it is possible to obtain a positive image in the form of an erect image also in the mirror image type of film unit.

Figure 84:
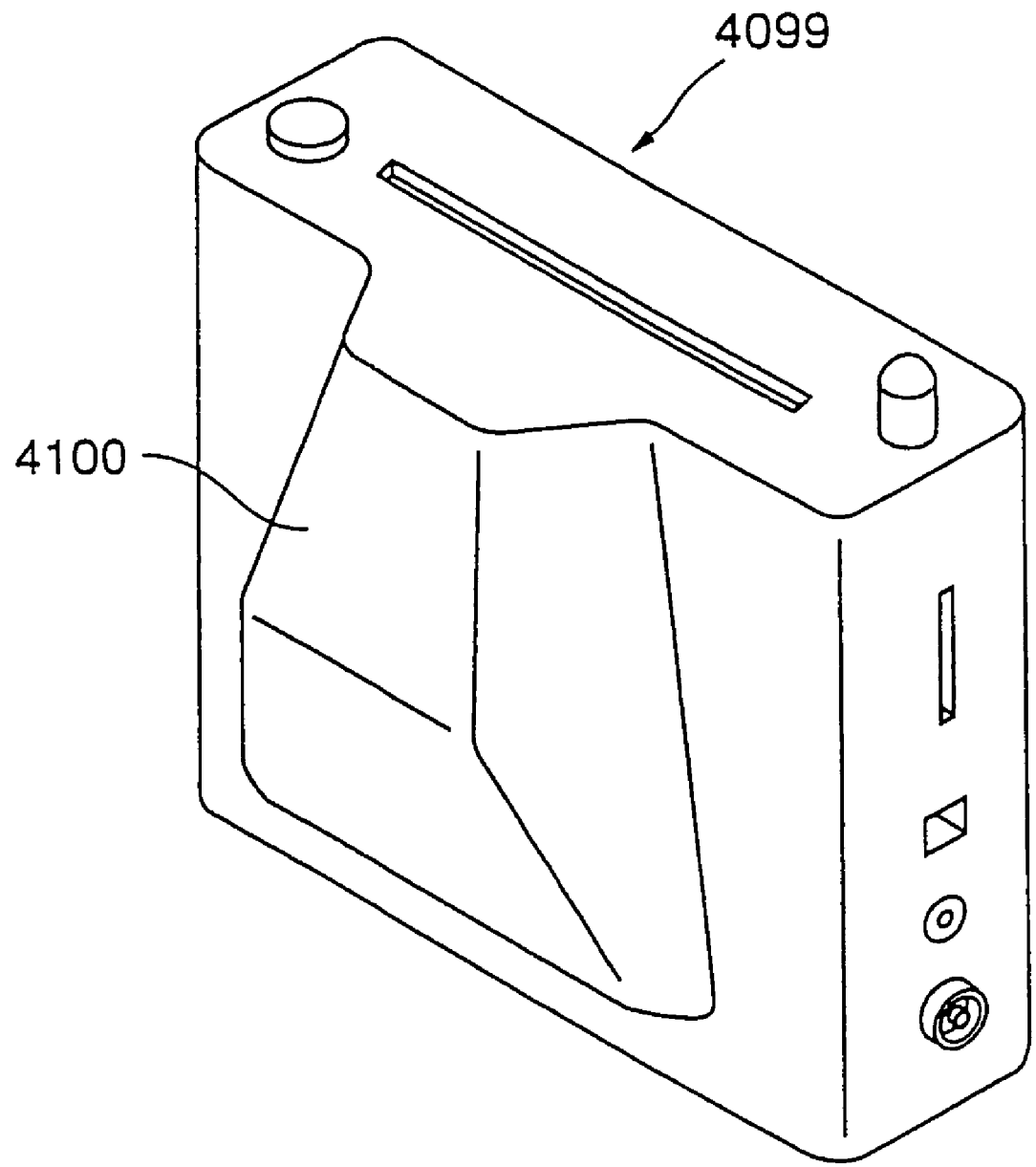
FIG. 84 is a perspective view showing appearance of a third embodiment of a printer according to the present invention looking from the front side.
Figure 85:
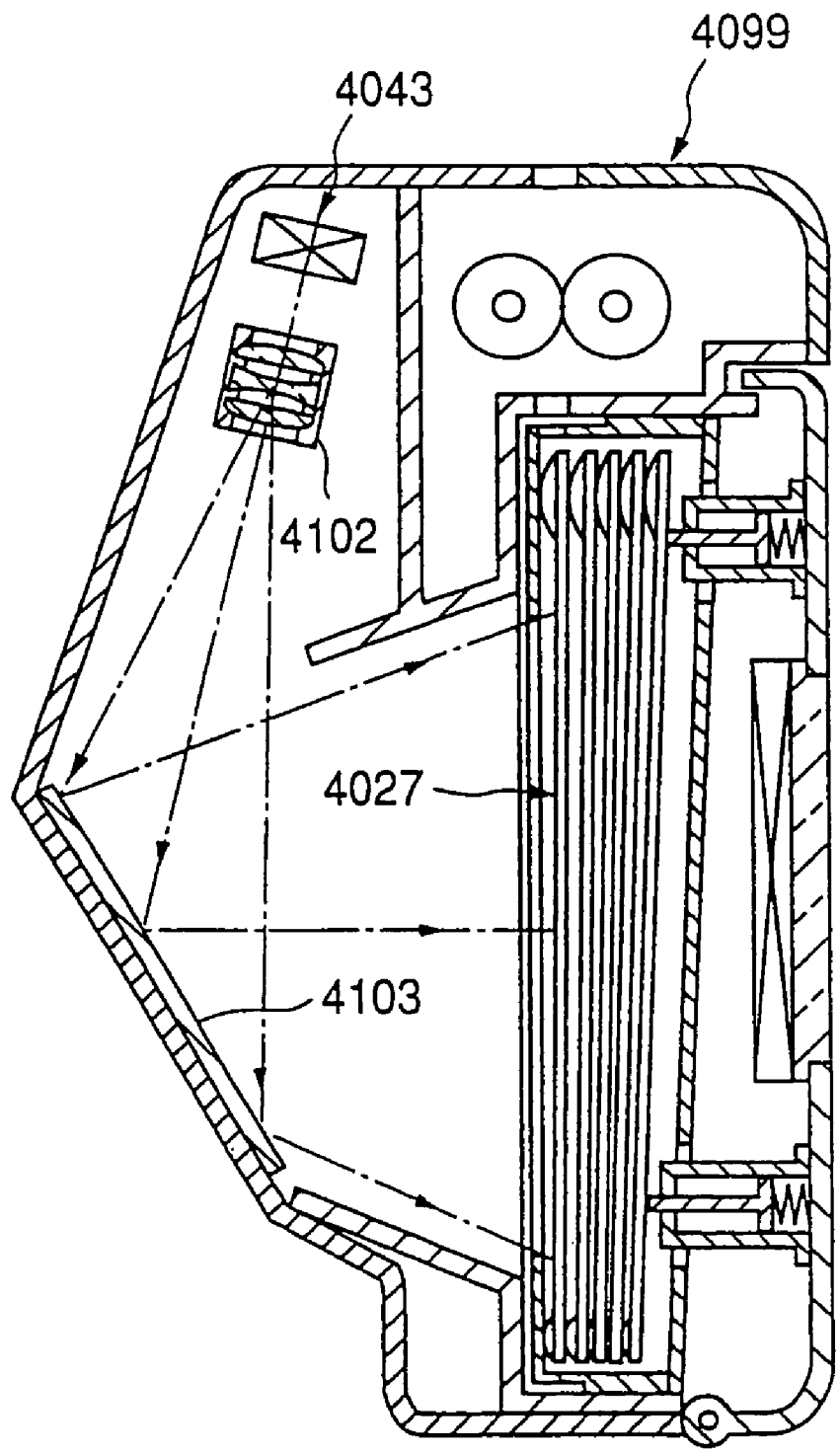
FIG. 85 is a sectional view of the third embodiment of the printer according to the present invention.

As shown in FIGS. 84 and 85, it is possible to provide a L-like shaped exposing optical path using one reflecting mirror. Hereinafter, there will be described a third embodiment of a printer according to the present invention. In the following figures, the same parts are denoted by the same reference numbers as those of the figures referred to the first and second embodiments of a printer, and the redundant description will be omitted.

FIG. 84 is a perspective view showing appearance of a third embodiment of a printer according to the present invention looking from the front side. Similar to the first and second embodiments of the printer, a printer 4099 has a projecting member 4100 in the front of the printer 4099. Inside the projecting member 4100, there is provided an exposing optical path extending from the exposing liquid crystal display unit 4043 to the film units 4027. Here, one reflecting mirror is used to bend the exposing optical path. Thus, the projecting member 4100 is small in projecting amount as compared with the printers of the first and second embodiments.

FIG. 85 is a sectional view of the second embodiment of the printer 4099 according to the present invention. Inside the projecting member 4100, there are incorporated an exposing liquid crystal display unit 4043, an exposing optical system 4102 comprising a plurality of lenses and a lens barrel, and a reflecting mirror 4103. An image displayed on the exposing liquid crystal display unit 4043 is incident onto the exposing optical system 4102. Beams of light emitted from the exposing optical system 4102 are reflected on the reflecting mirror 4103 and are imaged on the sensitive surface 4027a of the film unit 4027, and exposes a photosensitive layer inside the sensitive surface 4027a.

In this manner, by providing a L-like shaped optical path, it is possible to reduce a size of the printer 4099 with respect to a front and back direction as compared with the printer 4002 using the linear exposing optical path, and the printer 4092 using the Z-like shaped optical path, thereby providing compactness and weight saving of the printer.

Figure 86:
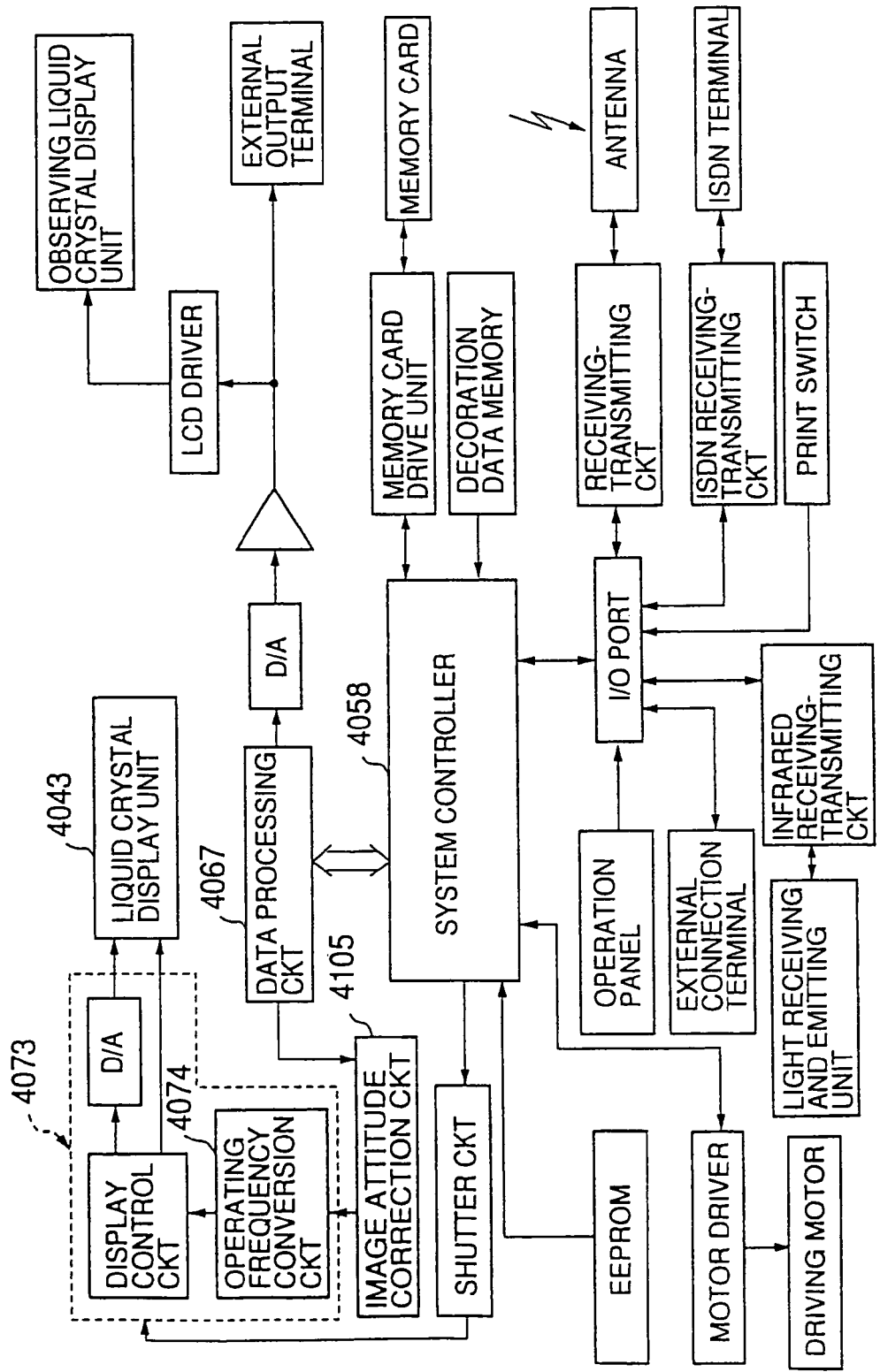
FIG. 86 is a block diagram showing an electric structure of the third embodiment of the printer according to the present invention.

Incidentally, according to the L-like shaped optical path, an image displayed on the exposing liquid crystal display unit 4043 is exposed on the sensitive surface 4027a of the film unit 4027 in a state that the image is reversed with respect to the top and bottom direction. For this reason, according to the present embodiment, as shown in FIG. 86, between image data processing circuit 4067 and the interface circuit 4073, there is provided an image attitude correction circuit 4105 for reversing image data with respect to the right and left direction. In this manner, a positive image, which is reversed with respect to the top and bottom direction, is formed on the film unit 4027. Regarding the reverse of the film unit 4027 as to the top and bottom direction, there is no need to correct it by the image attitude correction circuit 4105, since there is no problem if the film unit 4027 is inverted when observed.

By inverting an image to be displayed on the exposing liquid crystal display unit 4043 with respect to the top and bottom direction and the right and left direction by the image attitude correction circuit 4105, it is possible to form a positive image in the form of an erect image on the observing plane of the film unit 4027.

Further, also in the printer 4099 of the present embodiment, it is possible to use a mirror image type of film unit. In this case, by displaying a reverse image, which is reversed in the top and bottom direction, on the exposing liquid crystal display unit 4043, it is possible to obtain a positive image in the form of an erect image also in the mirror image type of film unit.

It is possible to provide a compactness of a printer using a linear exposing optical path too. Hereinafter, there will be described a fourth embodiment of a printer according to the present invention in which an exposing liquid crystal display unit and an exposing optical system are movable to sink and rise in and from the printer. In the following figures, the same parts are denoted by the same reference numbers as those of the figures referred to the first embodiment of a printer, and the redundant description will be omitted.

Figure 87:
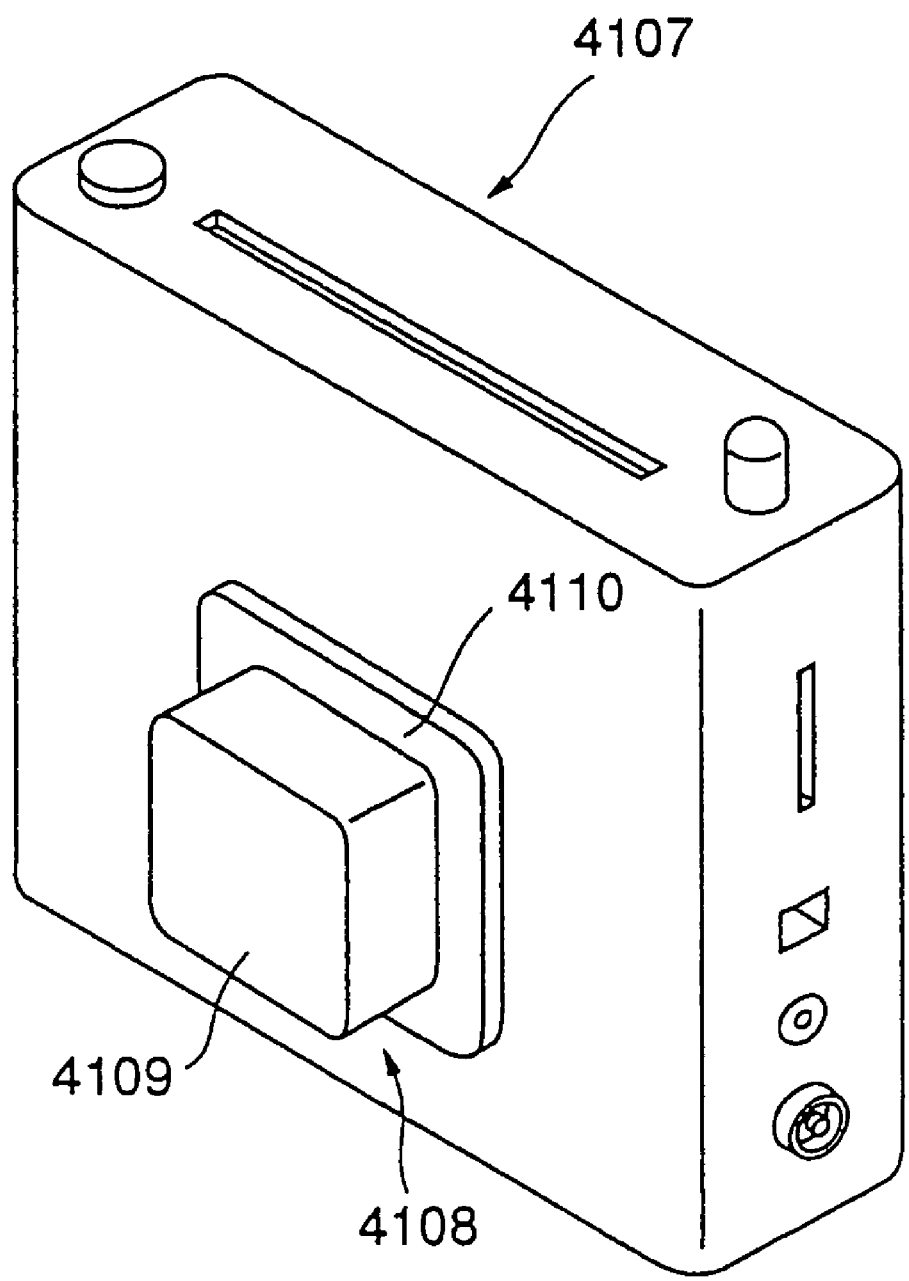
FIG. 87 is a perspective view showing appearance of a fourth embodiment of a printer according to the present invention in the state of nonuse looking from the front side.
Figure 88:
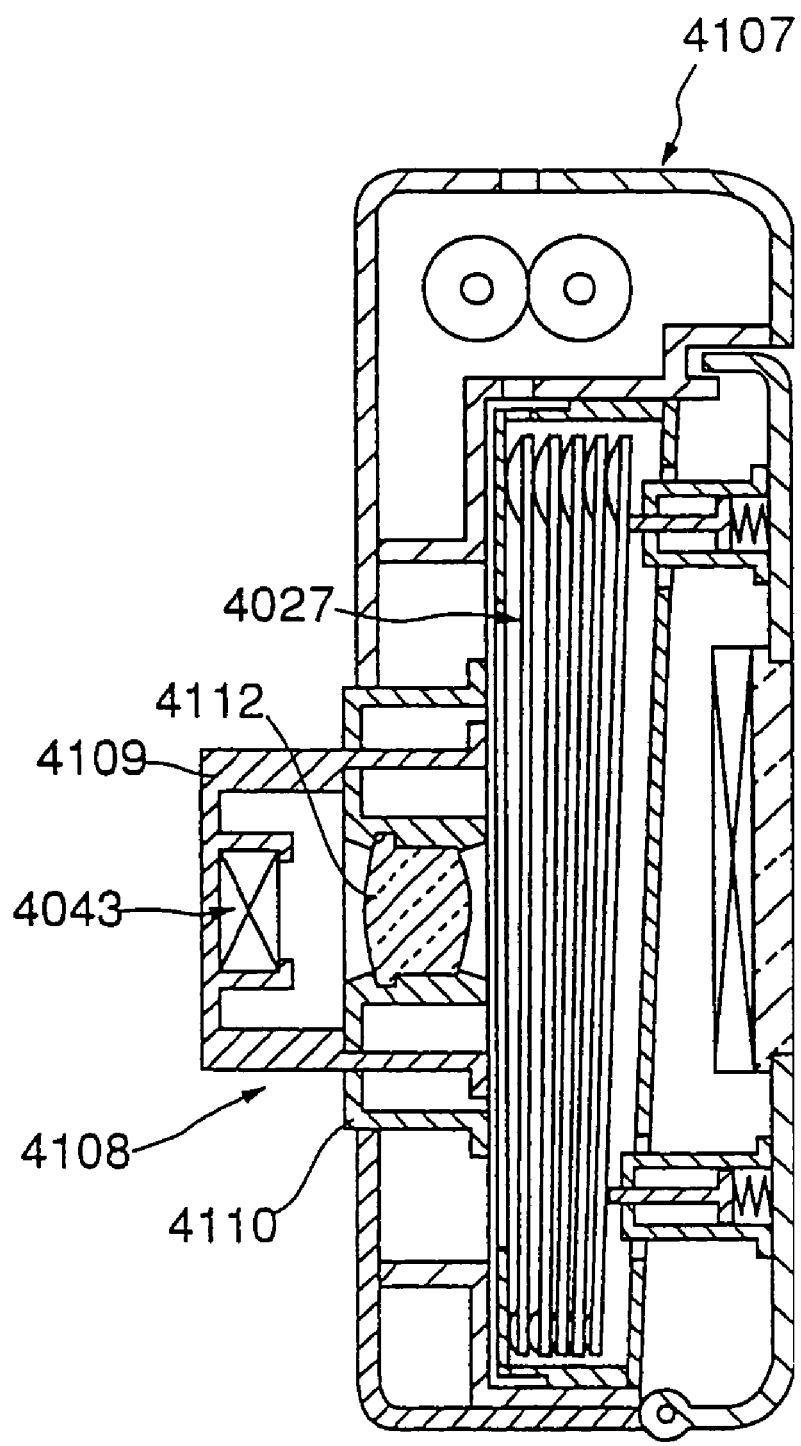
FIG. 88 is a sectional view of the fourth embodiment of the printer according to the present invention in the state of nonuse.

As shown in FIG. 87, in the front of a printer 4107, there is provided an exposure unit 4108 which is movable to sink and rise in and from the printer 4107 in accordance with the using state. The exposure unit 4108 comprises a box-like shaped inner holder section 4109 and an outer holding member 4110 for holding the inner holder section 4109. As shown in FIG. 88, into the inner holder section 4109 of the exposure unit 4108, there are incorporated the exposing liquid crystal display unit 4043 and an imaging lens 4112 as an exposing optical system in which an image displayed on the exposing liquid crystal display unit 4043 is projected with expansion onto the sensitive surface 4027a of the film unit 4027.

Figure 89:
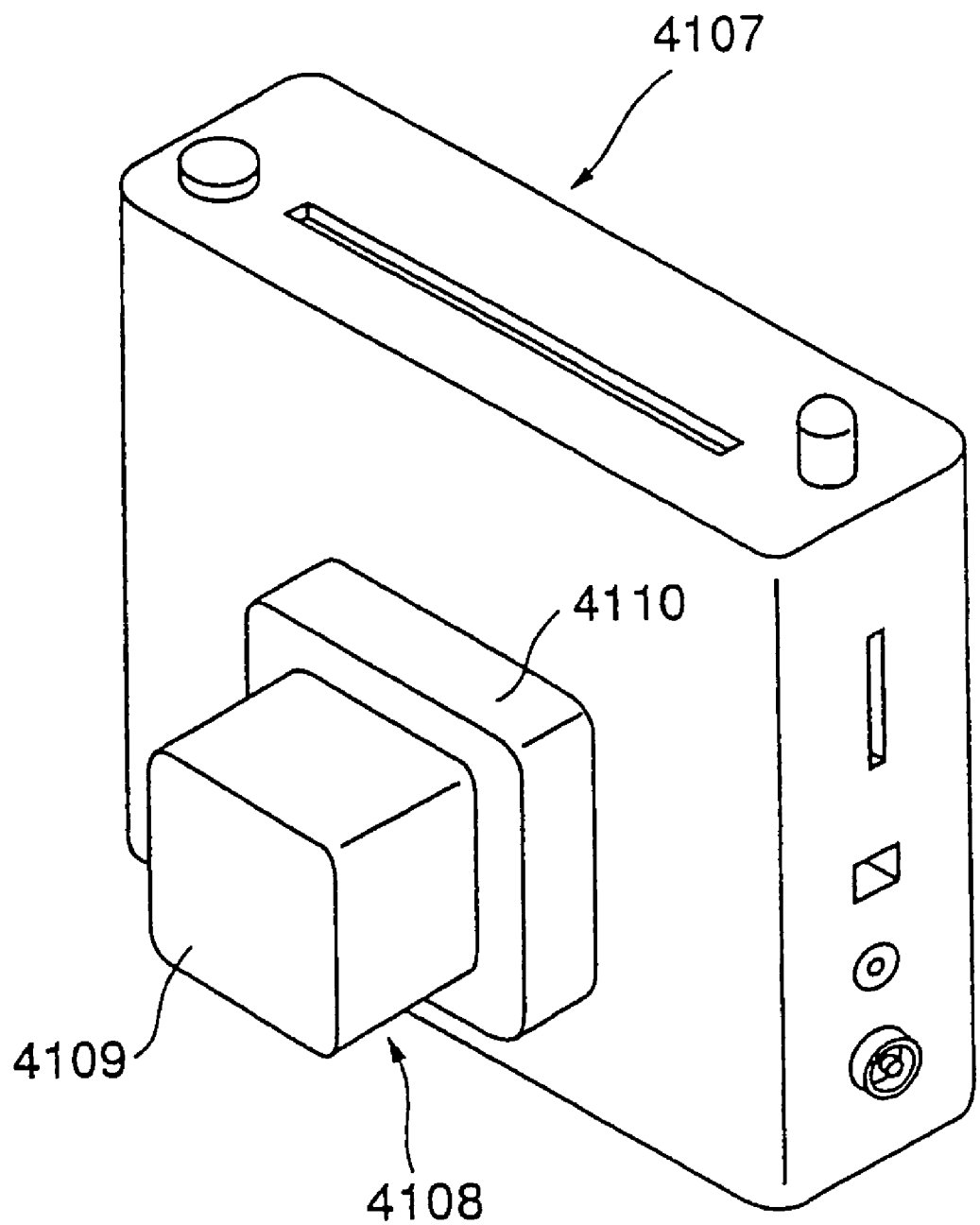
FIG. 89 is a perspective view showing appearance of a fourth embodiment of a printer according to the present invention in the state of use looking from the front side.
Figure 90:
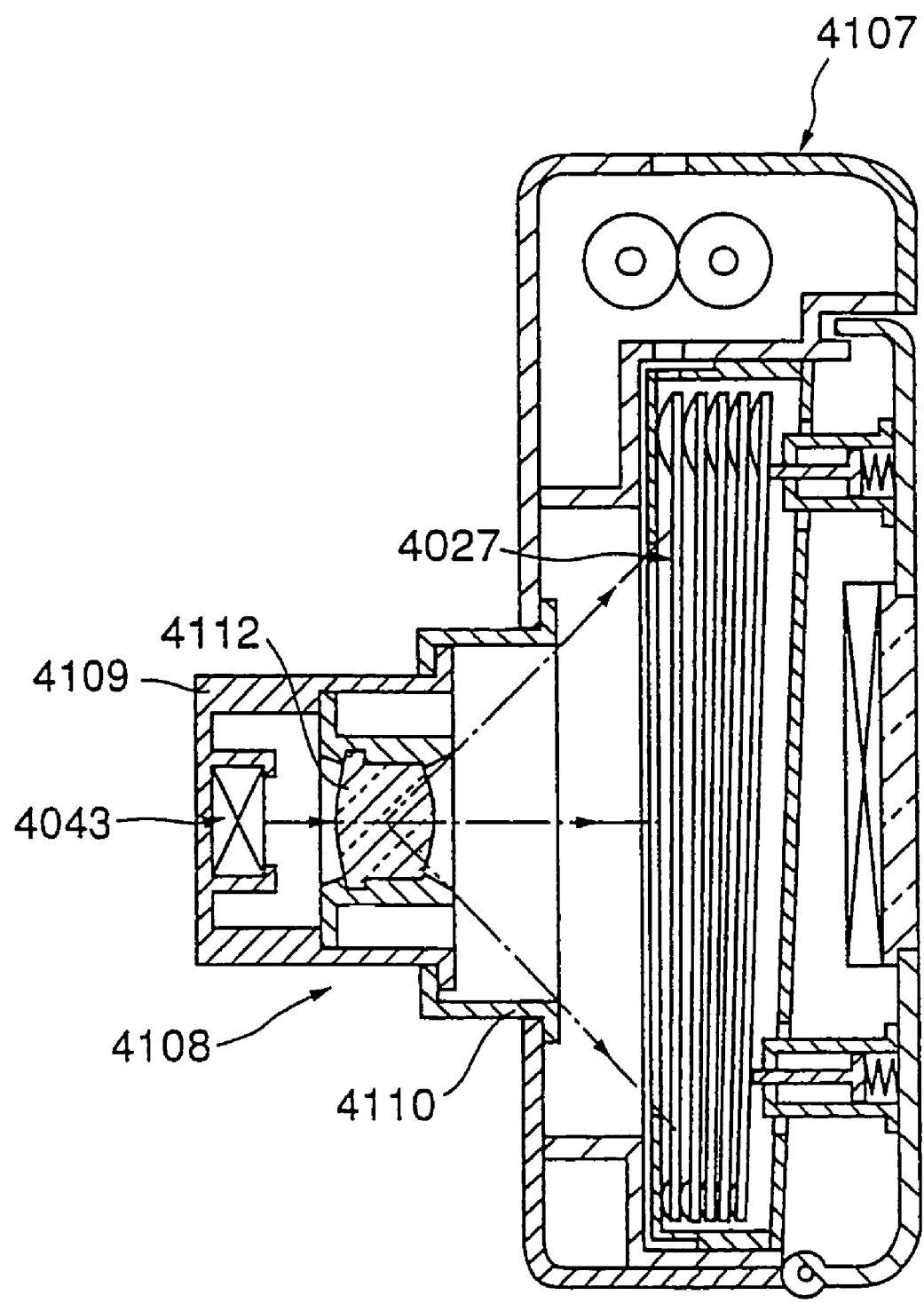
FIG. 90 is a sectional view of the fourth embodiment of the printer according to the present invention in the state of use.

When the printer 4107 is not used, as shown in FIGS. 87 and 88, the exposure unit 4108 sinks in the printer 4107. Thus, it is possible to implement a compactness of the printer 4107, and thereby improving a portability of the printer 4107. When the printer 4107 is used, as shown in FIGS. 89 and 90, the inner holder section 4109 and the outer holding member 4110 of the exposure unit 4108 rise in the front of the printer 4107. The sink and rise of the inner holder section 4109 and the outer holding member 4110 of the exposure unit 4108 is performed by the use of a cam, a link mechanism, a solenoid, etc.

When the exposure unit 4108 rises in the front of the printer 4107, the imaging lens 4112 may image an image displayed on the exposing liquid crystal display unit 4043 onto the sensitive surface 4027a of the film unit 4027 through an expansion projection. According to the printer 4107 of the present embodiment, in a similar fashion to that of the printer 4002 of the first embodiment, an erect image is displayed on the exposing liquid crystal display unit 4043, so that a positive image can be formed on the film unit 4043 in the form of an erect image. Further, according to the printer 4107 of the present embodiment, in a similar fashion to that of the printer 4002 of the first embodiment, it is also possible to use a mirror image type of film unit. It is acceptable that cylindrical inner and outer holding members are used, and as in a zoom lens, a helicoid gear is used to sink and rise the exposing unit.

According to the above-mentioned various embodiments related to a printer, as the observing liquid crystal display unit, there is used a conventional type of liquid crystal display unit which is different from the exposing liquid crystal display unit in a display scheme. It is noted, however, that as the observing liquid crystal display unit, the same type of one as the exposing liquid crystal display unit can be used. Hereinafter, there will be described a fifth embodiment of a printer according to the present invention in which as the observing liquid crystal display unit, the same type of one as the exposing liquid crystal display unit is used. In the following figures, the same parts are denoted by the same reference numbers as those of the figures referred to the first embodiment of a printer, and the redundant description will be omitted.

Figure 91:
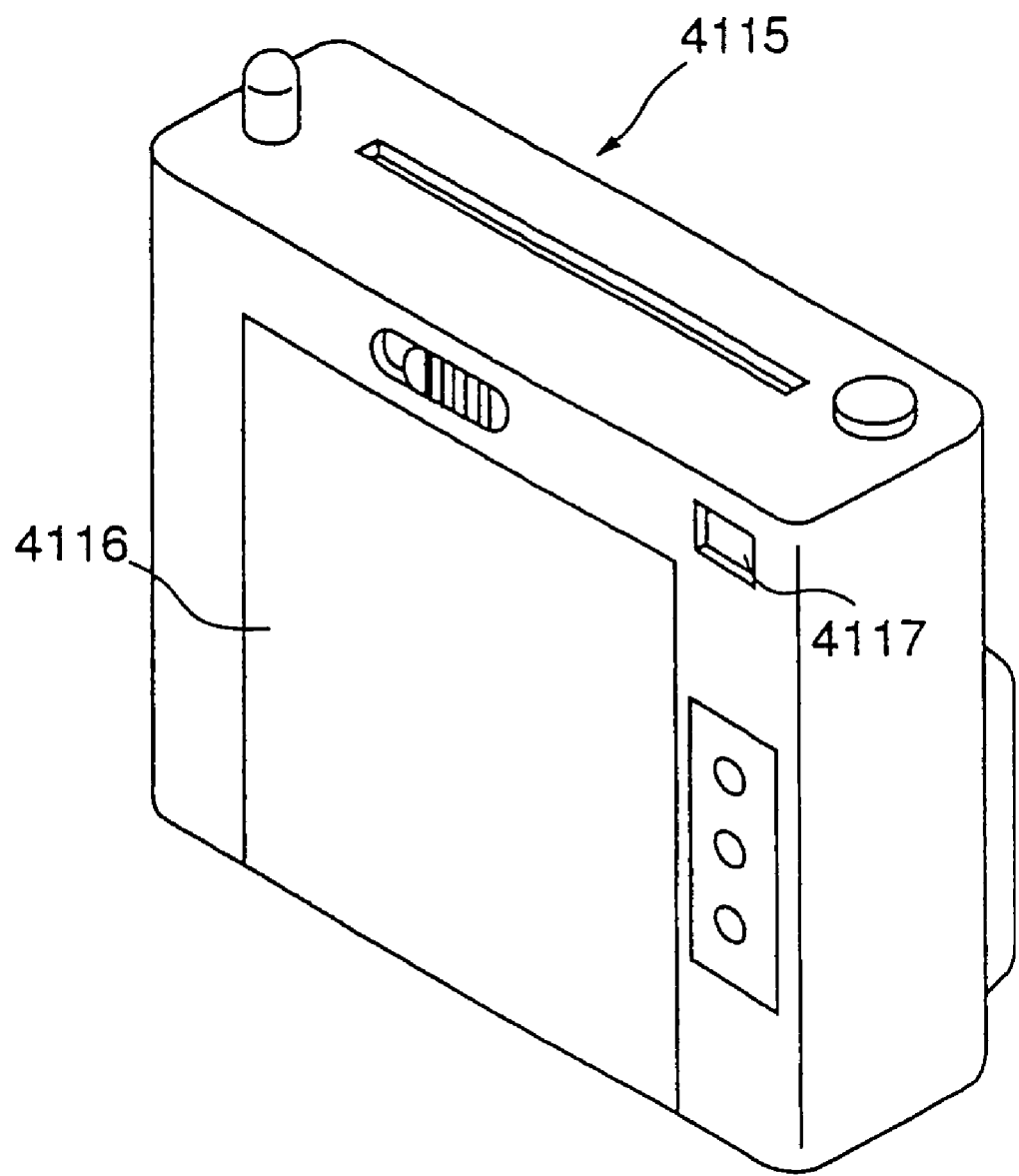
FIG. 91 is a perspective view showing appearance of a fifth embodiment of a printer according to the present invention looking from the back side.

FIG. 91 is a perspective view showing appearance of a fifth embodiment of a printer 4115 according to the present invention looking from the back side. The printer 4115 has, similar to the printer 4002 shown in FIGS. 73 and 74, a linear exposing optical path. And thus, an explanation of the exposing optical path will be omitted. In the back of the printer 4115, upwards a back cover 4116, there is formed an eyepiece window 4117 for observing an image for printing.

Figure 92:
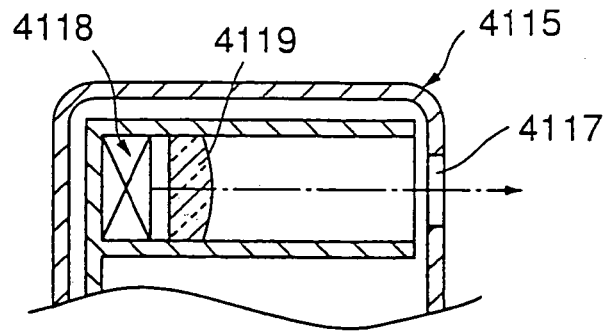
FIG. 92 is a sectional view of an observing optical system of the fifth embodiment of the printer according to the present invention.
Figure 93:
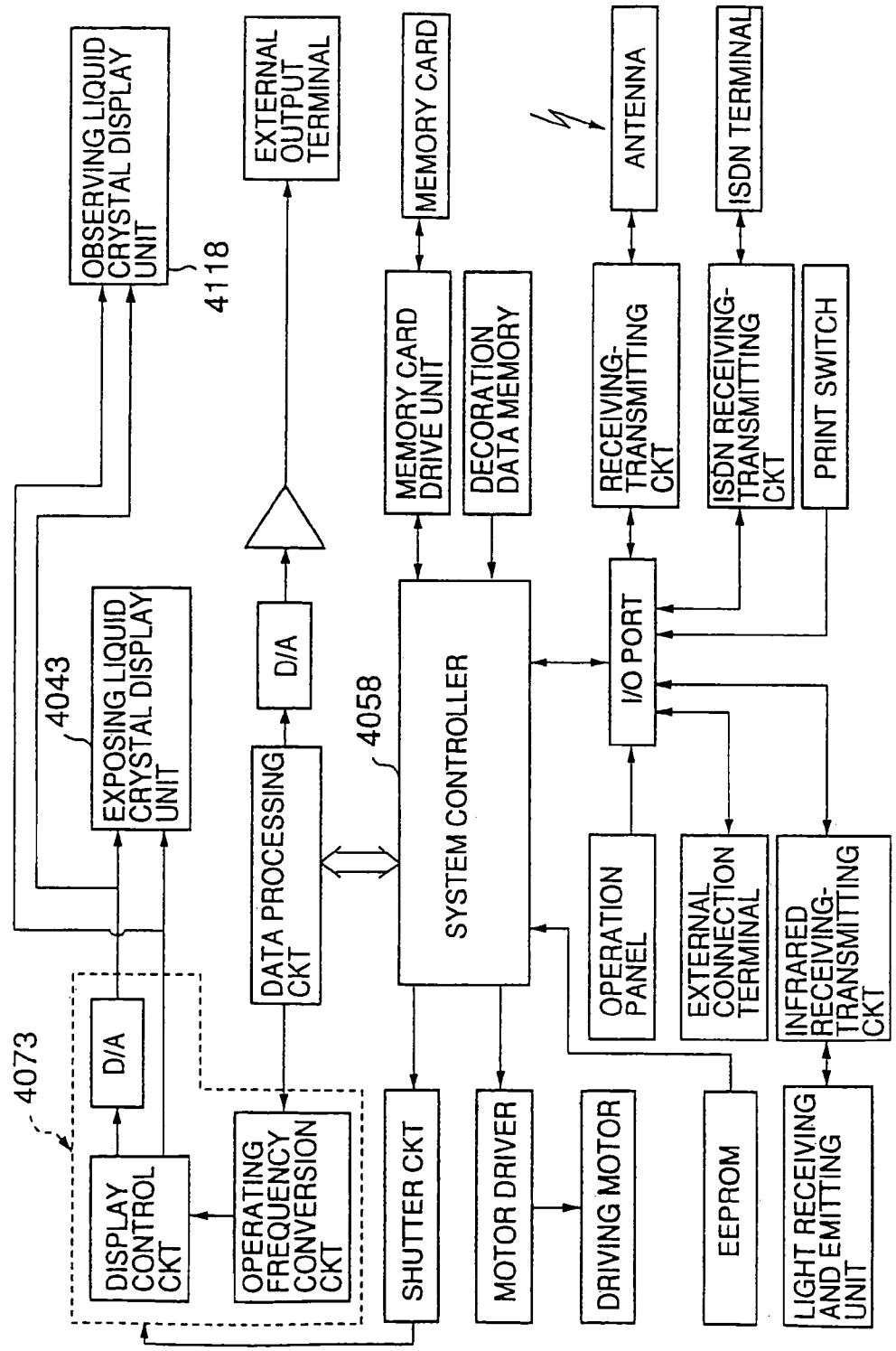
FIG. 93 is a block diagram showing an electric structure of the fifth embodiment of the printer according to the present invention.

As shown in FIG. 92, into the eyepiece window 4117, there are incorporated an observing liquid crystal display unit 4118 which is the same type of one as the exposing liquid crystal display unit 4043 shown in FIG. 78, and a magnifying lens 4119 for magnifying an image displayed on the observing liquid crystal display unit 4118. As shown in FIG. 93, the observing liquid crystal display unit 4118 is connected to the interface circuit 4073 in parallel with the exposing liquid crystal display unit 4043. Thus, the observing liquid crystal display unit 4118 and the exposing liquid crystal display unit 4043 display the same image.

An image displayed on the observing liquid crystal display unit 4118 is magnified by the magnifying lens 4119, and emitted from the eyepiece window 4117. In order to see the image on the observing liquid crystal display unit 4118, an observer looks through the eyepiece window 4117 with his single eye. This brings about such an advantage that the image is prevented from being seen by another person. Further, according to the print of the present embodiment, it is possible to reduce a power dissipation as compared with the liquid crystal display using the back light used in the above-mentioned various types of embodiments, thereby improving the function as a portable type of printer driven by a battery.

Figure 94:
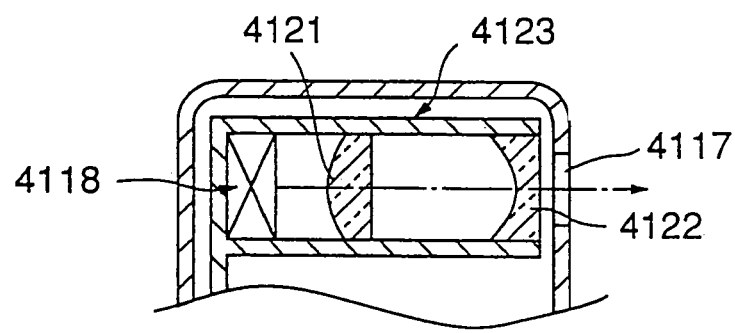
FIG. 94 is a sectional view of a printer in which a Galilean optical system is used for a magnifying lens.
Figure 95:
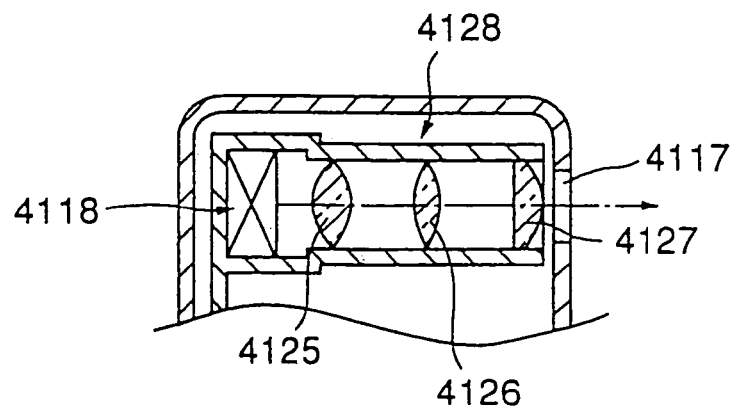
FIG. 95 is a sectional view of a printer in which a Galilean optical system is used for a magnifying lens.

As the magnifying lens 4119 for magnifying an image displayed on the observing liquid crystal display unit 4118 and emitting the same from the eyepiece window 4117, as shown in FIG. 94, Galilean optical system 4123 comprising ⌒lens 4121 and ⌒lens 4122 can be used. The use of the Galilean optical system 4123 makes it possible to perform an image display at higher ratio of magnification. In the event that an image display is performed at further higher ratio of magnification, as shown in FIG. 95, it is acceptable to use Keplerian optical system 4128 comprising an objective lens 4125, an intermediate lens 4126 and an eyepiece lens 4127.

Further, the observing liquid crystal display unit 4118 can be used in the printer having a Z-like shaped exposing optical path, the printer having an L-like shaped exposing optical path, the printer having a sink type of exposing unit, and the printer using a mirror image type of film unit, which have been explained above as to the various types of embodiments of a printer. However, in the printer having an L-like shaped exposing optical path and the printer using a mirror image type of film unit, an image displayed on the exposing liquid crystal display unit 4043 is not an erect image. For this reason, there is a need for these printers to invert the image by an image attitude correction circuit only at the time of printing or to use inherent interface circuits for the observing liquid crystal display unit 4118 and the exposing liquid crystal display unit 4043.

Figure 96:
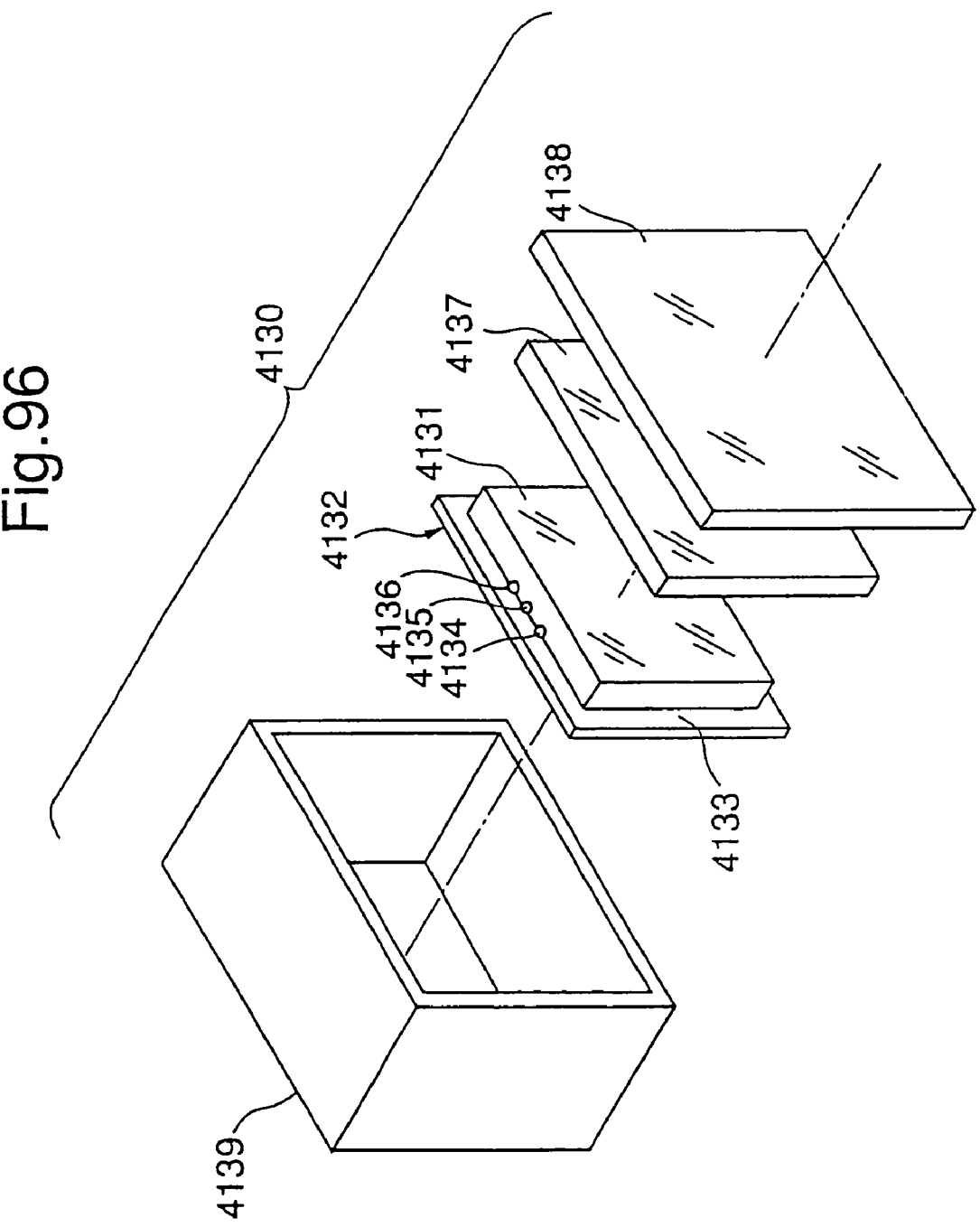
FIG. 96 is an exploded perspective view of a liquid crystal display unit according to alternative embodiment.

According to the observing liquid crystal display unit 4118 and the exposing liquid crystal display unit 4043, which have been explained above as to the various types of embodiments of a printer, as shown in FIG. 77, the diffusing plate 4047 and the light amplifying plate 4048 are disposed between the liquid crystal panel 4046 and the LED unit 4049. It is acceptable, however, that as in a liquid crystal display unit 4130 shown in FIG. 96, a diffusing plate 4131 is mounted on a circuit substrate 4133 of an LED unit 4132, LED's 4134, 4135 and 4136 for three primary colors are disposed at the side of the diffusing plate 4131 so that beams of light are radiated into the diffusing plate 4131. According to this arrangement, it is possible to thin a thickness size in a front and back direction of a cover member 4139 in which the LED unit 4132 and a liquid crystal panel 4137 are accommodated, and on which a protection cover 4138 is mounted, and thereby contributing to compactness and weight saving of the printer.

According to the various types of embodiments of a printer as mentioned above, while there is provided an observing liquid crystal display unit, it is acceptable for a printer, such as a stationary printer, which is often used through a connection with an external monitor, to provide no observing liquid crystal display unit.

Display of the respective frame images to the liquid crystal panel of the exposing liquid crystal display unit and flashing of the respective LED's are performed in operating time and timing in which a color image is displayed through human eyes. However, at the time of exposure, it is acceptable that the turn-on time of the LED's is relatively extended so that an exposure is controlled by display of the respective LED's. Alternatively, a quantity of light of each of the respective LED's is increased per se by increasing a driving current for driving the associated LED, so that an exposure is controlled. This makes it possible to increase an exposure, and thereby reducing an exposure time and providing an optimum exposure for a sensitivity of a film.

Further, According to the various types of embodiments of a printer as mentioned above, while a film unit is discharged from the top of a printer, it is acceptable that a film unit is discharged from the bottom of a printer. Further, while a printer is arranged on a vertical basis, it is acceptable that a printer is arranged on a horizontal basis. In this case, it is acceptable that a film unit is discharged from a side of a printer.

According to the above-mentioned embodiments, while the transmission instant film unit has been described by way of example, it is possible to use a mirror image type of instant film unit. In this case, by altering an optical path or correcting attitude of an image displayed on the exposing liquid crystal display unit by the image attitude correction means, a positive image is formed in the form of an erect image on the film unit.

It is acceptable to use both the transmission film unit and the mirror image type of film unit. In this case, it is effective that the image attitude correction circuit corrects attitude of an image displayed on the exposing liquid crystal display unit in accordance with a type of a film unit setting. With respect to a discrimination of the film type, it is either acceptable that a user instructs it or a printer discriminates it.

A sensitive material to be used as a recording material is not restricted to the instant film unit, and it is acceptable to use a general photographic film such as 135 type, 120 type, and a silver salt type of sheet film, and the like.

While the image attitude correction circuit is additionally provided, it is acceptable to correct attitude of an image by the image data processing circuit.

While it has been described that the LED's are turned on in the order of red, green and blue, this order is not restricted. It is acceptable to interchange the order, for example, to blue, green and red.

While a memory card is used as an external storage medium for inputting image data, it is acceptable to use a floppy disk, and a removable media such as a magneto-optic disc, and a CD-ROM.

It is acceptable that a image taking lens and an image sensing device are incorporated so that a dynamic image and a still image can be photographed, and the photographed image can be immediately printed.

Figure 98:
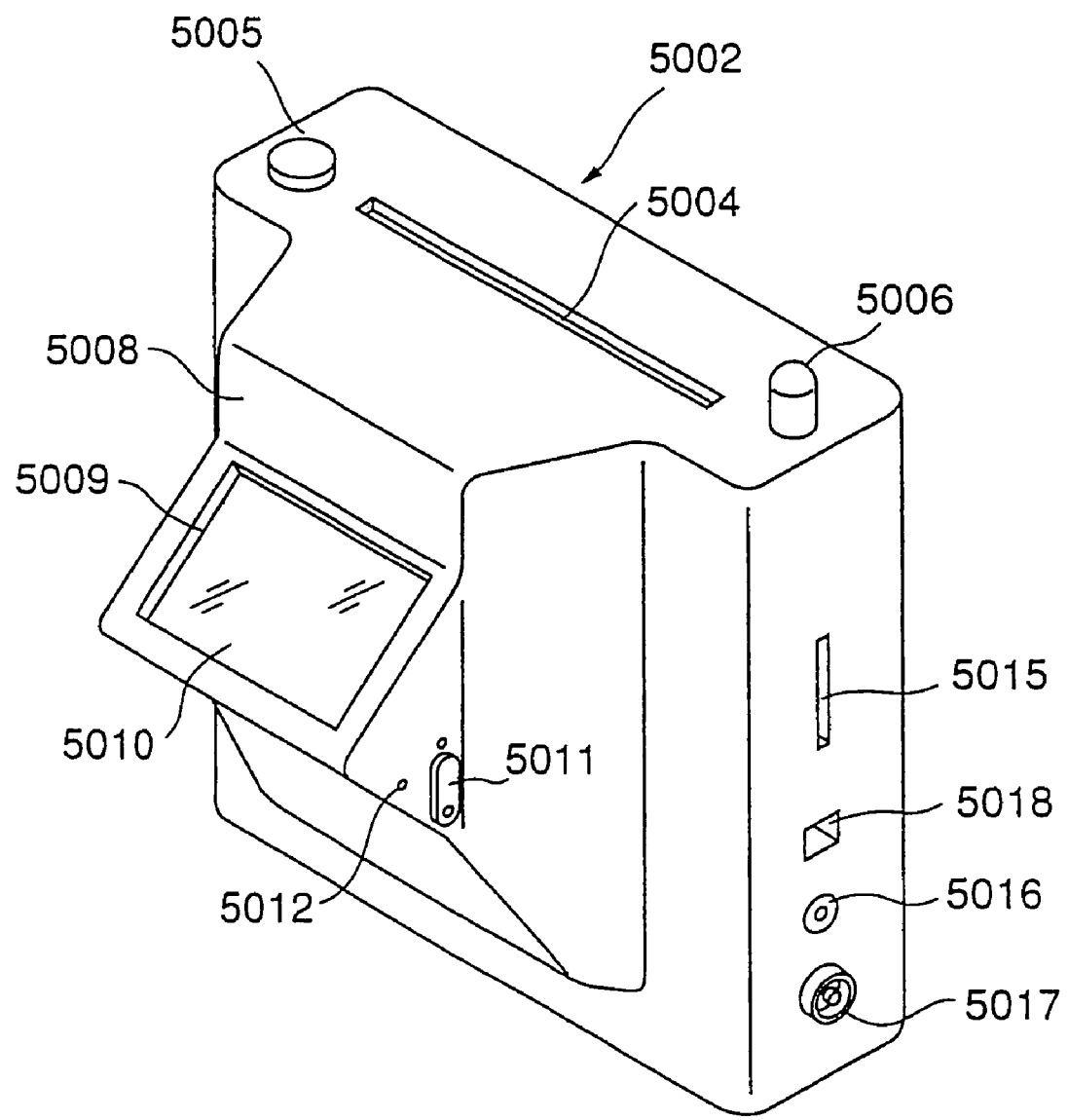
FIG. 98 is a perspective view showing appearance of the sixth embodiment of the printer according to the present invention looking from the front side.

FIG. 98 is a perspective view showing appearance of a first embodiment of a printer according to the present invention looking from the front side. A printer 5002 is a portable type of printer and is able to be driven by an internal battery as well as an AC power source. As a recording material for the printer 5002, a mono-sheet type of instant print film unit (referred to as a film unit) is used.

On the top of the printer 5002, there are provided a slit-like shaped discharge outlet 5004 through which a film unit after printed is discharged, a push button type of print switch 5005 for instructing a printing operation of the printer 5002, and an antenna 5006 useful for receiving image data transmitted from an external equipment and transmitting image data to the external equipment.

In the front of the printer 5002, there is formed a projecting member 5008 inside which an optical path for image exposure to the film unit is provided. On an inclined upper portion of the projecting member 5008, there is provided an observation window 5009 capable of observing an image to be printed. An observing screen 5010, on which an image is displayed, is set into the observation window 5009.

On the end of the projecting member 5008, there is rotatably mounted a selection lever 5011 constituting an optical path selecting means for switching between an observing optical path for projecting an image onto the observing screen 5010 and an exposing optical path for exposing an image on a film unit. The selection lever 5011 performs not only a switching for optical path, but also a switching between an image observation mode for observing an image at the time of print and a print mode for printing. FIG. 98 shows a state that the printer 5002 is in the image observation mode. When the selection lever 5011 rotates to meet an indicator 5012, the observing optical path is selected, and also an operation of the printer 5002 is switched to the image observation mode. Incidentally, a position of the selection lever 5011 is detected by a detection sensor which will be described later, and is utilized for a control of the printer 5002.

On one side of the printer 5002, there are provided a memory slot 5015 through which a memory card 5014 (cf. FIG. 103) to be used as a data recording medium is inserted, an external output terminal 5016 for outputting information of an image to be printed to a display equipment such as an external monitor and the like, an external connection terminal 5017 to which an external equipment is to be connected, and an ISDN connection terminal 5018 for communication of image data via an ISDN line.

Figure 99:
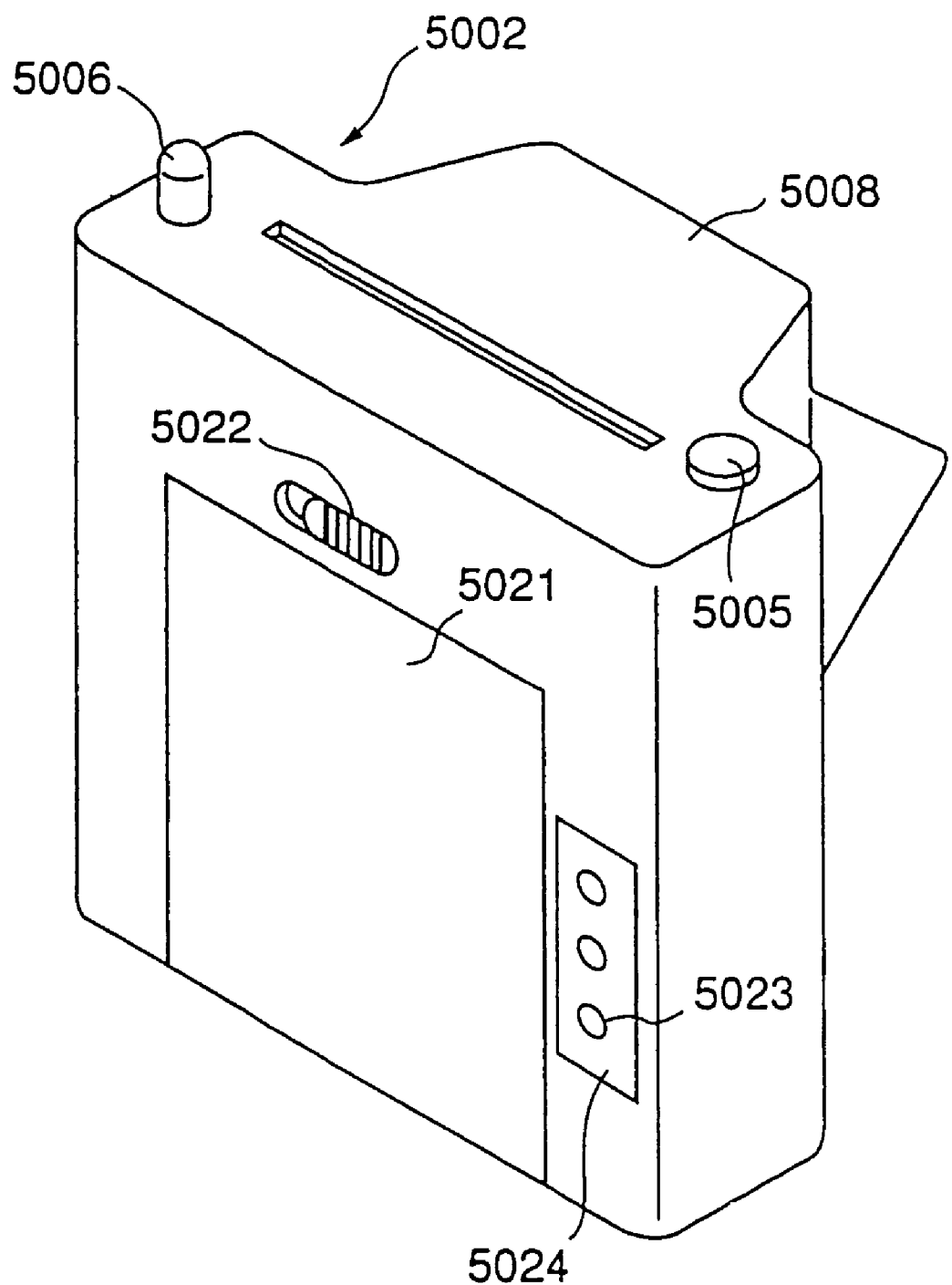
FIG. 99 is a perspective view showing appearance of the sixth embodiment of the printer according to the present invention looking from the back side.

FIG. 99 is a perspective view showing appearance of the first embodiment of the printer according to the present invention looking from the back side. On the back of the printer 5002, there are provided a back cover 5021, which is movable on a hinge portion 5020 (cf. FIG. 97) so as to be opened, and a release knob 5022 for releasing a lock when the back cover 5021 is opened. Inside the printer 5002, there is provided a pack chamber onto which a film pack accommodating a film units is loaded. The back cover 5021 serves to open and close the pack chamber. On one side of the back cover 5021, there are disposed a power switch 5023 of the printer 5002, and an operation panel 5024 on which various types of switches are provided.

Figure 97:
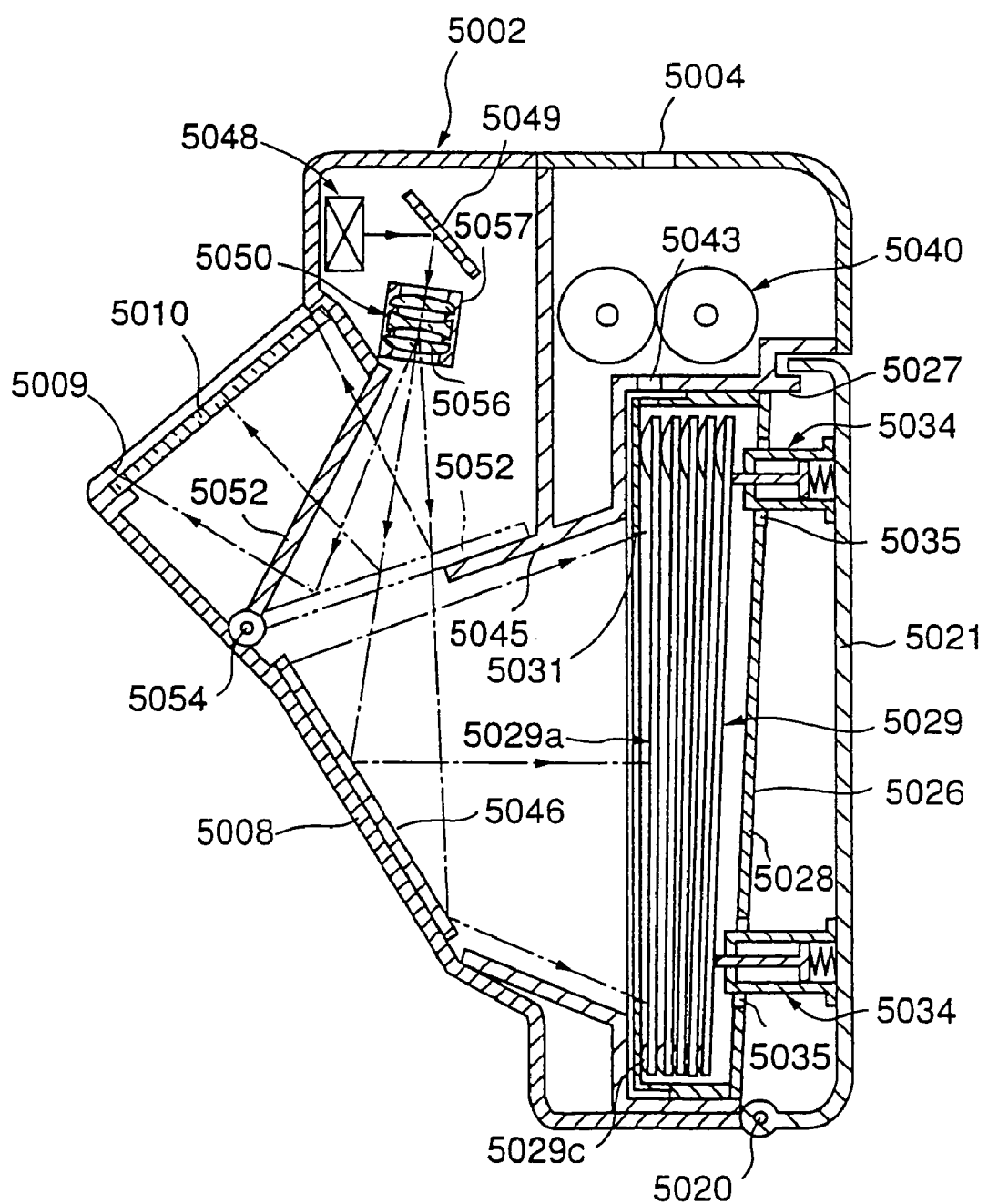
FIG. 97 is a sectional view of a sixth embodiment of a printer according to the present invention in a state of a print mode.

FIG. 97 is a sectional view of the first embodiment of a printer according to the present invention. As mentioned above, on the back inside the printer 5002, there is provided a pack chamber 5027 onto which a film pack 5026 is loaded. The film pack 5026 is one in which a plurality of film units 5029 are accommodated on a stack basis in a plastic case 5028, and is the same as that used for the general instant camera.

The film unit 5029 has a developer pot 5029b including developer at the upper portion of a sensitive surface 5029a and a trap member 5029c for absorbing residual of developer spread over the sensitive surface 5029a at the lower portion of the sensitive surface 5029a. After a latent image is photochemically formed by exposing the sensitive surface 5029a, the developer pot 5029b is exploded to pour developer into a sensitive layer inside the sensitive surface 5029a, thereby obtaining a print photograph promptly. The film unit 5029 is a transmission film unit in which an image is transferred through a reflection layer to a receiving layer opposed against the sensitive layer inside the sensitive surface 5029a to be subjected to exposure.

In the front of the case 5028, there is formed an exposure aperture 5031 for exposing the sensitive surface 5029a of the film unit 5029. In the back side of the case 5028, there are formed openings 5035 each for accepting a film pressing member 5034 provided on an inner wall of the back cover 5021. The film pressing member 5034 pushes the film unit 5029 accommodated in the case 5028 against the inner wall in the front of case 5028 by pressing the film unit 5029 from the back so that evenness property is provided for the sensitive surface 5029a, while it is not illustrated, the opening 5035 formed on the back of the case 5028 is covered by a flexible shielding sheet, and the film pressing member 5034 pushes the film unit 5029 through this shield sheet.

Figure 100:
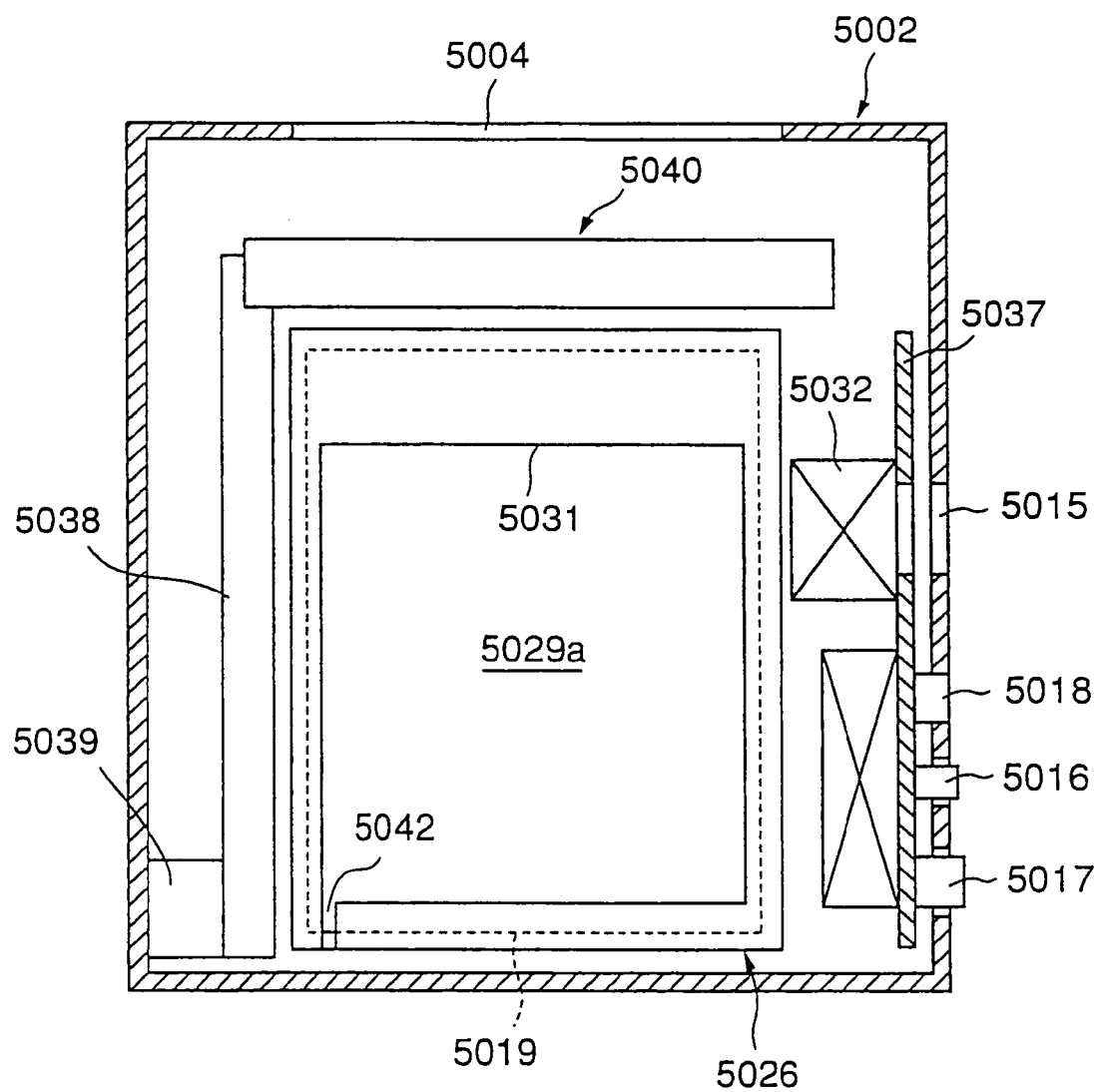
FIG. 100 is a sectional view schematically showing an internal arrangement of the sixth embodiment of the printer according to the present invention.

FIG. 100 is a sectional view schematically showing an internal arrangement of the printer 5002 according to the present invention. The film pack 5026 is disposed at the substantial center within the printer 5002. At the right of the film pack 5026, there are disposed a print substrate 5037 on which various types of circuits for controlling structural elements of the printer 5002 are formed and the above-mentioned various types of terminals are mounted, and a memory card drive unit for driving the memory card 5014. At the left of the film pack 5026, there are disposed a film transport mechanism 5038 for transporting the exposed film unit 5029 from the film pack 5026, the film transport mechanism 5038 serving also as developing means, and a driving motor 5039 for driving the film transport mechanism 5038. At the top of the film pack 5026, there is disposed a developing roller pair 5040 constituting the film transport mechanism 5038.

The film transport mechanism 5038 is used also in the general instant camera. The film transport mechanism 5038 comprises: a claw member for transporting the film unit 5029 upwards through a delivery outlet 5043 provided on the top of the case 5028 in such a manner that the claw member enters a groove 5042 formed in the front of the case 5028, and moves upwards while dipping up the lower end of the film unit 5029 located in the front row within the case 5028; a mechanism for driving the claw member; and the developing roller pair 5040.

The film unit 5029 transported from the case 5028 is fed between the developing rollers 5040. The developing rollers 5040 are also driven by the driving motor 5039 to rotate in mutually different directions so that the film unit 5029 is sandwiched between the developing rollers 5040 and is conveyed to a discharge outlet 4004 located upwards. The developing rollers 5040 are energized by springs and spacers (not illustrated) to make an approach to one another maintaining regular intervals so as to sandwich the film unit 5029 with strong power. Thus, the developer pot 5029b of the film unit 5029 is exploded so that developer flows into a sensitive layer inside the sensitive surface 5029a. The developing rollers 5040 uniformly spreads developer on the sensitive layer inside the sensitive surface 5029a, and discharges the film unit 5029 through the discharge outlet 5004.

As shown in FIG. 97, inside the projecting member 5008 provided in the front of the printer 5002, there is formed a shading chamber 5045 which lies in the front of the pack chamber 5027. A portion opposing against an aperture 5032 on the inner wall of the projecting member 5008 is formed with an inclined plane. On the inclined plane, there is mounted a second reflecting mirror 5046 for reflecting a full color image for exposure on the sensitive surface 5029a of the film unit 5029.

Above the second reflecting mirror 5046, there are disposed a liquid crystal display unit 5048 for displaying an image to be exposed on the film unit 5029, a first reflecting mirror 5049 for reflecting an image to be displayed on the liquid crystal display unit 5048, and an exposing optical system 5050 in which an image reflected on the first reflecting mirror 5049 is magnified and projected. An image magnified and projected by the exposing optical system 5050 is reflected on the second reflecting mirror 5046 to expose a sensitive layer inside the sensitive surface 5029a of the film unit 5029. The exposing optical path is formed with a Z-like configuration by the two reflecting mirrors 5049 and 5056. Thus, it is possible to miniaturize the printer.

Figure 101:
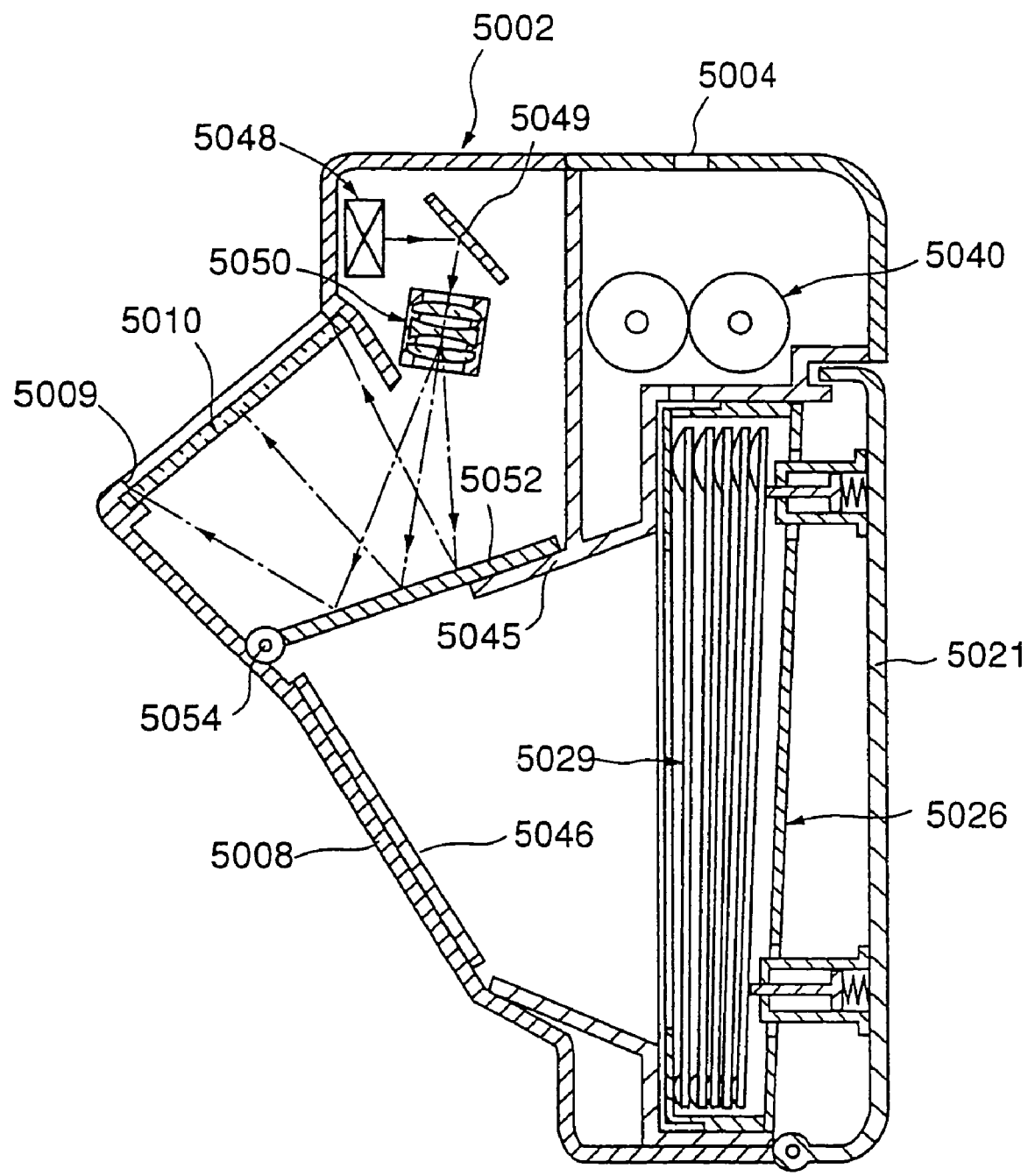
FIG. 101 is a sectional view of the sixth embodiment of the printer according to the present invention in the state of an image observation mode.

As shown in FIG. 97, between the exposing optical system 5050 and the second reflecting mirror 5046, there is disposed a switching reflecting mirror 5052 which is rotatably mounted between a position wherein the exposing optical path between the exposing optical system 5050 and the second reflecting mirror 5046 is released, and as shown in FIG. 101, a position wherein the exposing optical path between the exposing optical system 5050 and the second reflecting mirror 5046 is closed and an image displayed on the liquid crystal display unit 5048 is reflected toward the back of an observing screen 5010. The switching reflecting mirror 5052 constitutes optical path switching means together with the selection lever 5011 provided on the side of the projecting member 5008.

One end of the switching reflecting mirror 5052 is mounted on a rotary shaft 5054 supported inside the printer 5002. The selection lever 5011 provided outside the printer 5002 is mounted on one end of the rotary shaft 5054. Thus, an operation of the selection lever 5011 makes it possible to rotate the switching reflecting mirror 5052 between a position forming the exposing optical path and a position forming the observing optical path. While it is not illustrated in detail, in order to prevent the switching reflecting mirror 5052 from being rotatively moved unintentionally owing to a vibration of the printer 5002 for example, there is a need to provide a mechanism for stopping the switching reflecting mirror 5052 at the two positions. As such a mechanism, it is either acceptable that the selection lever 5011 is locked at the two positions per, or alternatively that the rotary shaft 5054 and the switching reflecting mirror 5052 are stopped at the associated positions, respectively.

The exposing optical system 5050 comprises three imaging lenses 5056, a lens barrel 5057 for holding those three imaging lenses 5056. The exposing optical system 5050 is disposed at the place where the exposing optical path and the observing optical path are overlapping. The exposing optical system 5050 is used also when the an image of the liquid crystal display unit 5048, which is reflected on the first reflecting mirror 5049, is magnified, and is projected to the sensitive surface 5029a of the film unit 5029 and the observing screen 5010, and thus serves as the observing optical system.

A length from the exposing optical system 5050 to the sensitive surface 5029a of the film unit 5029 is different from a length from the exposing optical system 5050 to the observing screen 5010. For this reason, there is provided such an arrangement that the exposing optical system 5050 is movable along the optical path between the first reflecting mirror 5049 and the second reflecting mirror 5046, so that a focus is switched between a case of imaging on the film unit 5029 and a case of imaging on the observing screen 5010. The exposing optical system 5050 is translated by a focus selection mechanism 5058 (cf. FIG. 103) which operates together with a rotative movement of the switching reflecting mirror 5052. As the focus selection mechanism 5058, it is possible to use, for example, a cam and a link mechanism, which operates together with a rotative movement of the rotary shaft 5054.

Figure 102:
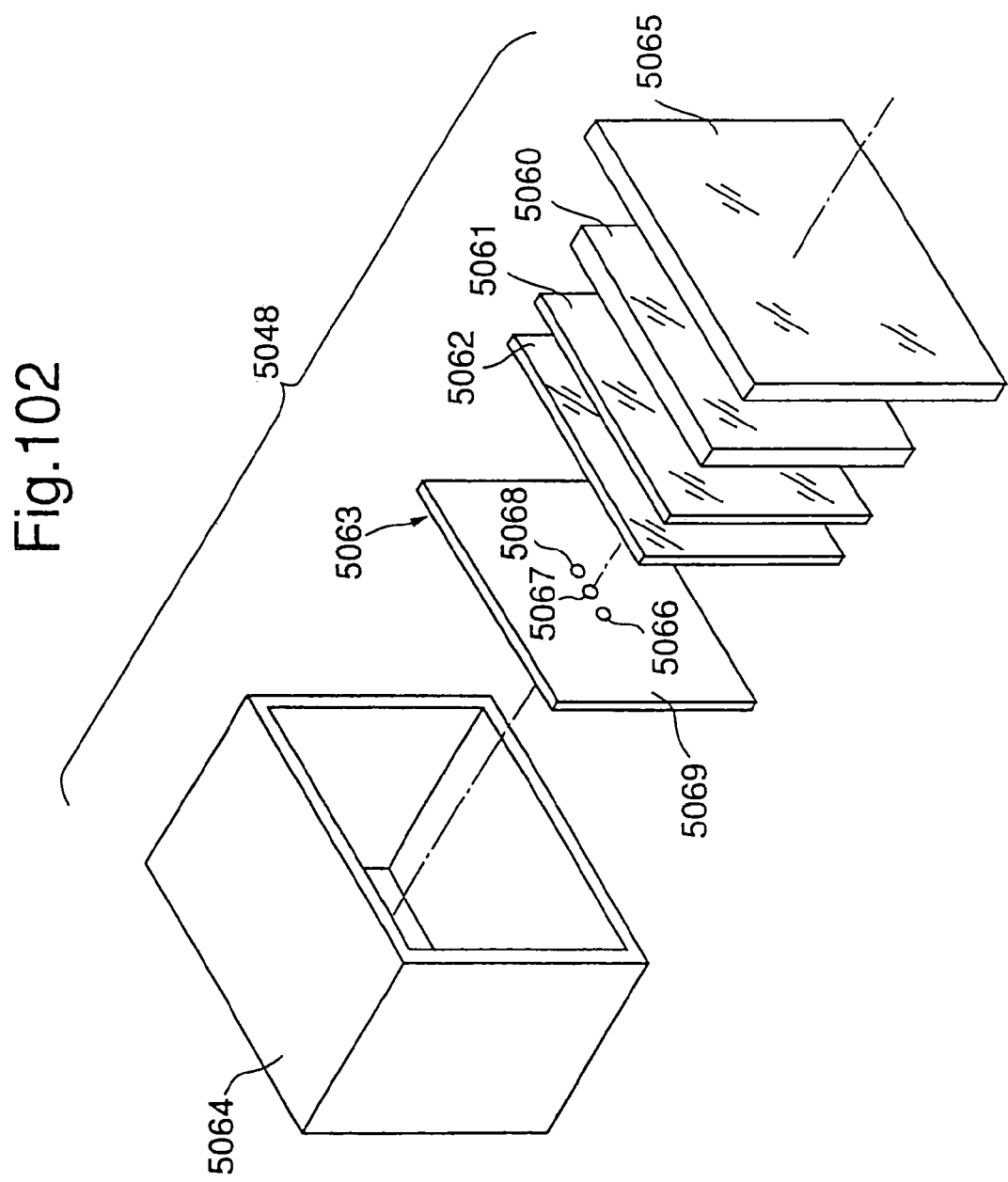
FIG. 102 is an exploded perspective view of a liquid crystal display unit.

FIG. 102 is an exploded perspective view of the liquid crystal display unit 5048. The liquid crystal display unit 5048 comprises: a transmission matrix drive type of liquid crystal panel 5060; a diffusing plate 5061 and a light amplifying plate 5062 which are disposed at the back of the liquid crystal panel 5060; an LED unit 5063, as a light source, disposed at the back of the diffusing plate 5061 and a light amplifying plate 5062; a cover member 5064 for accommodating those elements; and a transparent protection cover 5065 for protecting the liquid crystal panel 5060 and also for closing the cover member 5064.

On the liquid crystal panel 5060, a number of pixels (for example, length 240 pixels×breadth 320 pixels=total 76,800 pixels) are arranged on a two-dimensional basis. The liquid crystal panel 5060 per se has no coloring matter, and the whole pixels are used to form an image. The LED unit 5063 comprises a circuit substrate 5069 on which LED's 5066, 5067 and 5068, which emit beams of light of red (R), green(G) and blue(B), respectively, are mounted.

The liquid crystal display unit 5048 sequentially displays images, which are obtained by color separation of a color image for three primary colors, on the liquid crystal panel 5060 at regular intervals, and in synchronism with this, sequentially turns on the LED's 5066, 5067 and 5068 for three primary colors provided on the LED unit 5063. Thus, it is possible to observe a color image by after-image phenomenon of display of the frame images and flashing of the LED's 5066, 5067 and 5068. According to the liquid crystal display unit 5048, a color display can be performed by one pixel of the liquid crystal panel 5060. This feature makes it possible to display an enhanced color image with a compactness. Further, power dissipation is extremely small as compared with the conventional liquid crystal display unit. Thus, it is possible to readily apply this printer to a portable printer which will be driven by a battery.

On the liquid crystal display unit 5048, an color image is displayed in the form of an erect image with respect to both the top and bottom and the right and left. Accordingly, onto the back of the observing screen 5010, an image, which is reversed with respect to the right and left is projected. However, an image is observed from the opposite side of the projecting plane. Thus, an image to be observed is the same image as that displayed on the liquid crystal display unit 5048. Further, on the sensitive surface 5029a of the film unit 5029, an image, which is reversed in the top and bottom and the right and left, is exposed. However, an image is observed from the opposite side of the sensitive surface 5029a of the film unit 5029. Thus, an image formed on the film unit 5029 is the same image as that displayed on the liquid crystal display unit 5048. In this manner, when the liquid crystal display unit 5048 is used both as an exposing liquid crystal display unit and an observing liquid crystal display unit, this contributes to the cost down of the printer.

Figure 103:
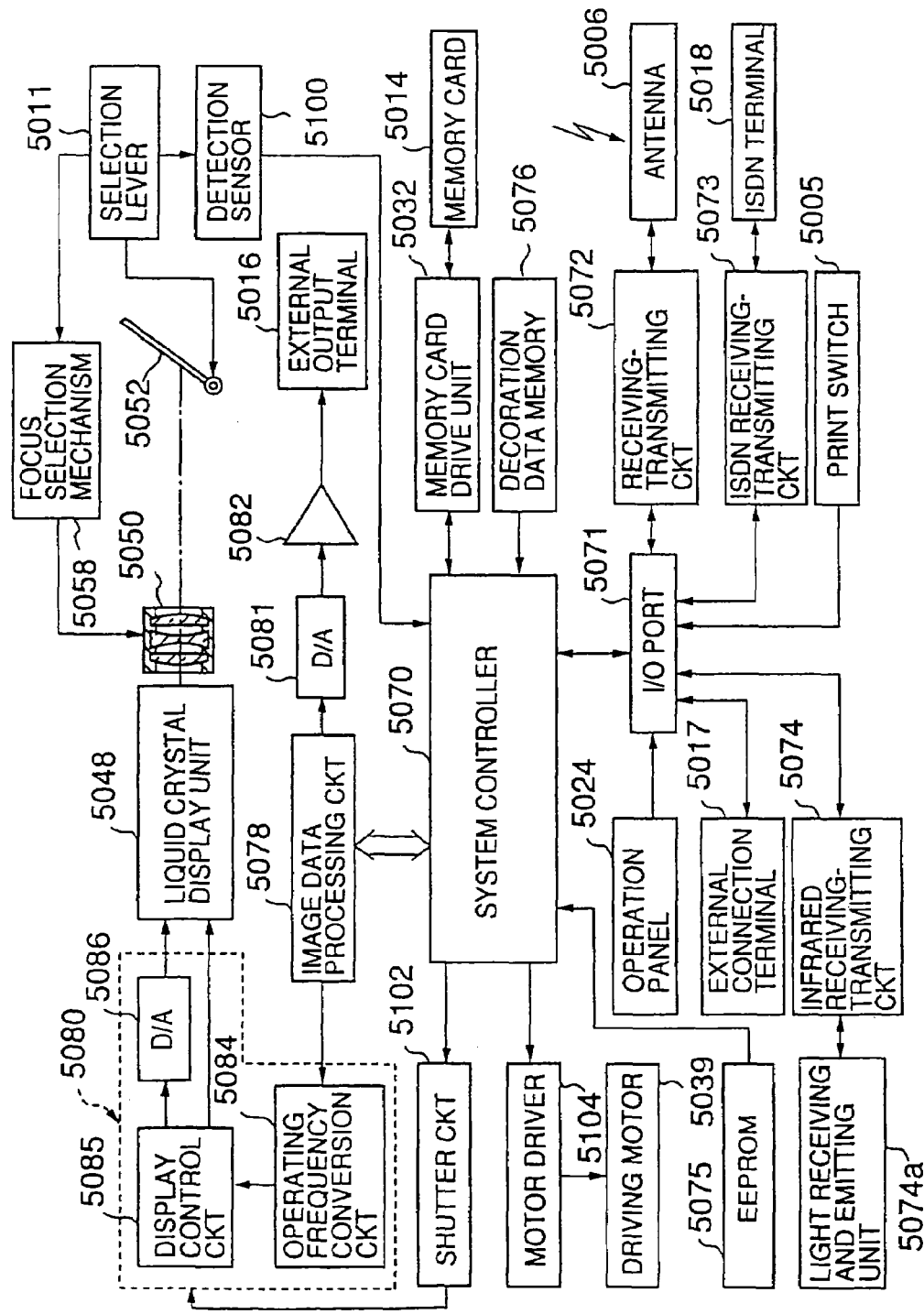
FIG. 103 is a block diagram showing an electric structure of the sixth embodiment of the printer according to the present invention.

FIG. 103 is a block diagram showing an electric structure of the first embodiment of the printer according to the present invention. The printer 5002 is controlled by a system controller 5070 including a microcomputer and the like. The system controller 5070 receives via the I/O port various types of signals from an operation panel 5024, an external connection terminals 5017, a receive-transmit circuit 5072 for receiving and transmitting image data via an antenna 5006, an ISDN receive-transmit circuit 5073 for receiving and transmitting image data via an ISDN terminal 5018, and an infrared receive-transmit circuit 5074 for receiving and transmitting image data in the form of infrared via a light receiving and emitting unit 5074a. Further, the system controller 5070 monitors signals inputted to perform a processing in accordance with an input signal.

An EEPROM 5070 connected to the system controller 5070 stores therein beforehand a sequence program of operating the printer 5002 in accordance with a predetermined sequence, and various control data to be referred to when the sequence program is executed. A decoration data memory 5076 stores therein a frame to be compounded with image data entered, a message, a character mark, etc.

As a memory card 5014, a DRAM (dynamic random access memory) is used, and stores therein image data through an electronic still camera, a personal computer, etc. The memory card 5014 inserted into the memory slot 5015 is set to a memory card drive unit 5032. The system controller 5070 reads out image data recorded in the memory card 5014 via the memory card drive unit 5032, and writes into the memory card 5014 composite image data in which image data and decoration data such as a frame surrounding the image data and a message are synthesized.

Image data read out from the memory card 5014 is fed to an image data processing circuit 5078. Upon receipt of the image data, the image data processing circuit 5078 performs a signal processing such as a white balance control and a gamma correction for the received image data. When the decoration data is selected, the image data processing circuit 5078 performs an image composition of image data and decoration data. The processed image data is converted into a video signal associated with a composite signal of an NTSC system, and then fed via a D/A converter 5081 and an amplifier 5082 to an external output terminal 5016 for a video signal. Thus, it is possible to observe an image through an external monitor connected to the external output terminal 5016.

Figure 104:
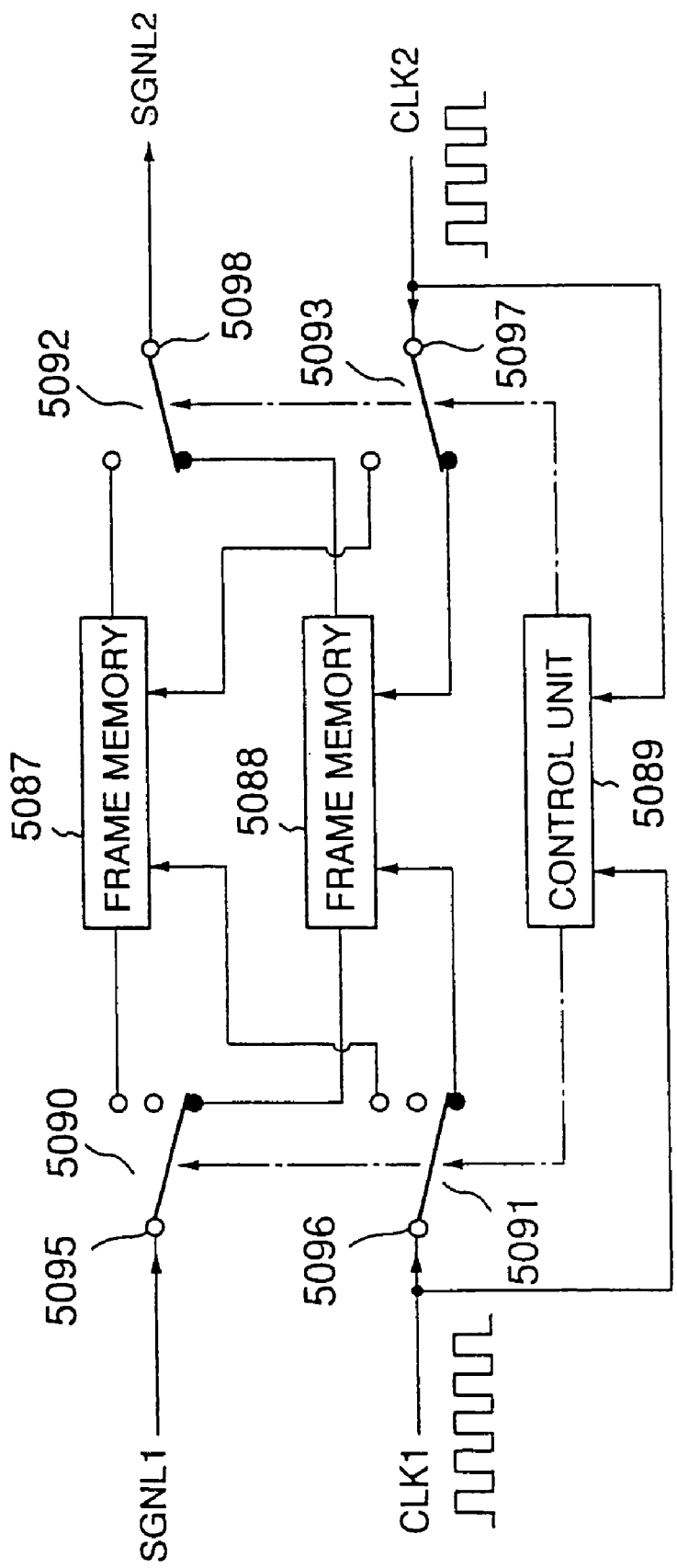
FIG. 104 is a graph useful for understanding an operating timing of a liquid crystal display unit for exposure.

Further, in a route other than that for the video signal, the processed image data is converted into an electric color image signal and then fed to an interface circuit 5080. The interface circuit 5080 comprises an operating frequency conversion circuit 5084, a display control unit 5085, and an D/A converter 5086. A color image signal is first fed to the operating frequency conversion circuit 5084. As shown in FIG. 104, the operating frequency conversion circuit 5084 comprises two frame memories 5087 and 5088, a control unit 5089, and four switch circuits 5090, 5091, 5092 and 5093.

A terminal 5095 of the operating frequency conversion circuit 5084 receives a color image signal SGNL 1 representative of a frame of color image data in synchronism with a clock CLK1 which is fed to a terminal 5096. The color image signal SGNL1 is stored in a frame memory 5087 or a frame memory 5088 in accordance with a selection state of switching circuits 5090 and 5091. The control unit 5089 monitors the clock CLK1, and switches the switching circuits 5090 and 5091 whenever a frame of color image signal is completely stored in one of the frame memories 5087 and 5088. Each of the switching circuits 5090 and 5091 has a neutral point which is not connected to any of the frame memories 5087 and 5088. The neutral points are used in accordance with a difference between operating frequencies in the writing end and the reading end.

On the other hand, in the event that color images are read out from the frame memories 5087 and 5088, the color image are read out in the form of a color image signal SGNL2 through a terminal 5098 in synchronism with a clock CLK2 which is fed to a terminal 5097. Also at that time, control unit 5089 monitors the clock CLK2, and switches the switching circuits 5092 and 5093 when a color image signal is completely read out from one of the frame memories 5087 and 5088, so that a color image signal is read out from another frame memory. The clock CLK2 synchronizes with the operating frequency of the liquid crystal display unit 5048, so that the color image signal SGNL2 derived from the operating frequency conversion circuit 5084 drives the liquid crystal display unit 5048 in synchronism with the same.

In the event that the clock CLK1 and the clock CLK2 are equal to one another in frequency, it is possible to read and write color image signals from and in the frame memories 5087 and 5088 on an equivalent timing basis. However, in the event that the clock CLK1 and the clock CLK2 are not equal to one another in frequency, various problems will occur. For example, in the event that the frequency of the clock CLK1 is higher than the clock CLK2, read out of a color image signal from a frame memory becomes later as compared with writing of a color image signal into a frame memory. This involves such a problem that a subsequent frame of color image signal cannot be written into a frame memory.

In the event that the frequency of the clock CLK1 is lower than the clock CLK2, read out of a color image signal from a frame memory becomes faster as compared with writing of a color image signal into a frame memory. In this case, it is impossible to feed the subsequent color image signal to the liquid crystal display unit 5048. These problems can be solved by changing the switching timing of the switching circuits 5090, 5091, 5092 and 5093, as will be described hereinafter.

In the event that the frequency of the clock CLK1 is higher than the clock CLK2, the switching circuits 5090 and 5091 are switched to the neutral points which are not connected to any of the frame memories 5087 and 5088, so that a color image signal is inhibited from being written into a frame memory until read out of a color image signal of either one of the frame memories 5087 and 5088 is completed.

In the event that the frequency of the clock CLK1 is lower than the clock CLK2, the control unit 5089 does not perform switching for the switching circuits 5092 and 5093 until writing into a frame memory in the writing side is completed. When writing of a color image signal into the frame memory in the writing side is completed, while the same color image signal is repeatedly read out from the same frame memory, the control unit 5089 switches the switching circuits 5092 and 5093.

In this manner, even in the event that an operating frequency of an entered color image signal is different from that of the liquid crystal display unit 5048, the operating frequency conversion circuit 5084 can surely converts the operating frequency of an entered color image signal into the same frequency as the operating frequency of the liquid crystal display unit 5048, thereby preventing an occurrence of a disturbance of an image due to the frequency shift on the liquid crystal display unit 5048.

The color image signal read out from the operating frequency conversion circuit 5084 is fed to the display control unit 5085. The display control unit 5085 separates a color image signal to color image signals associated with three primary colors of R, G, and B, and sequentially outputs those signals. Each of the color image signals outputted from the display control unit 5085 is converted into an analog image signal by the D/A converter 5086 and then fed to the liquid crystal display unit 5048. The display control unit 5085 feeds also to the liquid crystal display unit 5048 a control signal to drive the LED unit 5063.

Figure 105:
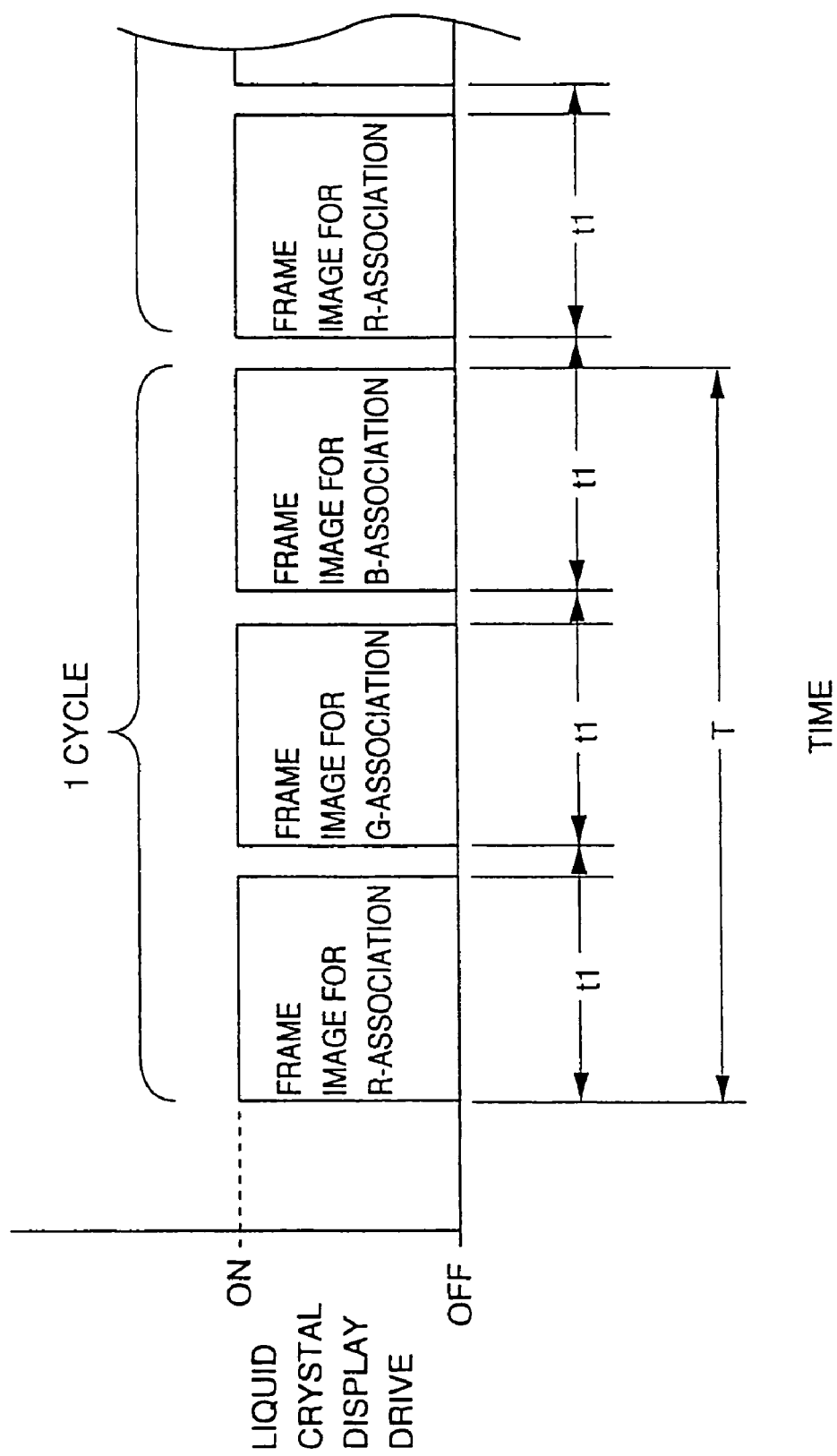
FIG. 105 is a block diagram of an operating frequency conversion circuit.

As shown in FIG. 105, the display control unit 5085 sequentially forms on the liquid crystal panel 5060 of the liquid crystal display unit 5048 at time t1 intervals a frame image for red-association, a frame image for green-association, and a frame image for blue-association, which are associated with each of the color image signals. Further, the display control unit 5085 drives the LED unit 5063 to sequentially turn on the LED's 5066, 5067 and 5068 in synchronism with the formation of the respective colors of frame images onto the liquid crystal panel 5060.

When an operating time T, which is necessary for display of a frame image for red-association, a frame image for green-association, and a frame image for blue-association onto the liquid crystal panel 5060, and turn on of the LED's 5066, 5067 and 5068, is expressed by one cycle, the operating time of one cycle is not more than $\frac{1}{16}$ sec. Thus, a display of full color is performed with one pixel of the liquid crystal panel 5060 by after-image phenomenon of display of these frame images and flashing of the LED's 5066, 5067 and 5068. Further, even if dynamic image data is inputted, it is possible to expect a smooth movement of an image.

In the event that the image data to be inputted is a dynamic image, the immediately subsequent frame image is inputted. On the other hand, in case of the still image, the same frame image is repeatedly fed to the display control unit 5085 by the operating frequency conversion circuit 5084 until an operation of switching an image is implemented, or until a time according to the set up content of the automatic image transport function elapses. Thus, a still image is continuously displayed on the liquid crystal display unit 5048.

The system controller 5070 receives a detection signal from a detection sensor 5100 which detects that the selection lever 5011 is located at the position indicating the image observation mode. When the selection lever 5011 is located at the position indicating the print mode, the system controller 5070 inhibits image data read out from the memory card 5014 from being displayed on the liquid crystal display unit 5048. In the event that an image is displayed on the liquid crystal display unit 5048, when a mode is switched from the image observing mode to the print mode, a display of the liquid crystal display unit 5048 is stopped. This feature makes it possible to prevent that an exposure is unintentionally performed on the film unit 5029.

Further, in the event that the selection lever 5011 is located at the position indicating the image observation mode, when the print switch 5005 is operated, the system controller 5070 holds the print instruction, so that printing on the film unit 5029 is performed when a mode is switched by the selection lever 5011 to the print mode.

When the print switch 5005 is operated, the system controller 5070 receives a print signal via an I/O port 5071. The system controller 5070 enables the shutter circuit 5102 in accordance with the print signal. The shutter circuit 5102 controls the interface circuit 5080 so that the liquid crystal display unit 5048 serves as a shutter, and specifically, causes the liquid crystal display unit 5048 to display a full color image thereon by a predetermined time so that an exposure on the film unit 5029 is effected. It is acceptable that an exposure time is automatically controlled in accordance with sensitivity of the film unit 5029 and density of image data, or alternatively a user sets up.

When the exposure on the film unit 5029 is terminated, the system controller 5070 enables the driving motor 5039 via a motor driver 5104. Thus, the film transport mechanism 5038 operates, so that the claw member transports the film unit 5029 upwards through the delivery outlet 5043 provided on the top of the case 5028 in such a manner that the claw member enters the groove 5042 formed in the front of the film pack 5026, and moves upwards while dipping up the lower end of the film unit 5029 located in the front row within the case 5028.

The developing rollers 5040 are also driven by the driving motor 5039 to rotate in mutually different directions so that the film unit 5029 is sandwiched between the developing rollers 5040 and is conveyed to a discharge outlet 4004 located upwards. At that time, the developer pot 5029*b* of the film unit 5029 is exploded so that developer flows into a sensitive layer inside the sensitive surface 5029*a*. The developing rollers 5040 uniformly spreads developer on the sensitive layer inside the sensitive surface 5029*a*. Thus, a positive image is formed on the film unit 5029.

Figure 106:
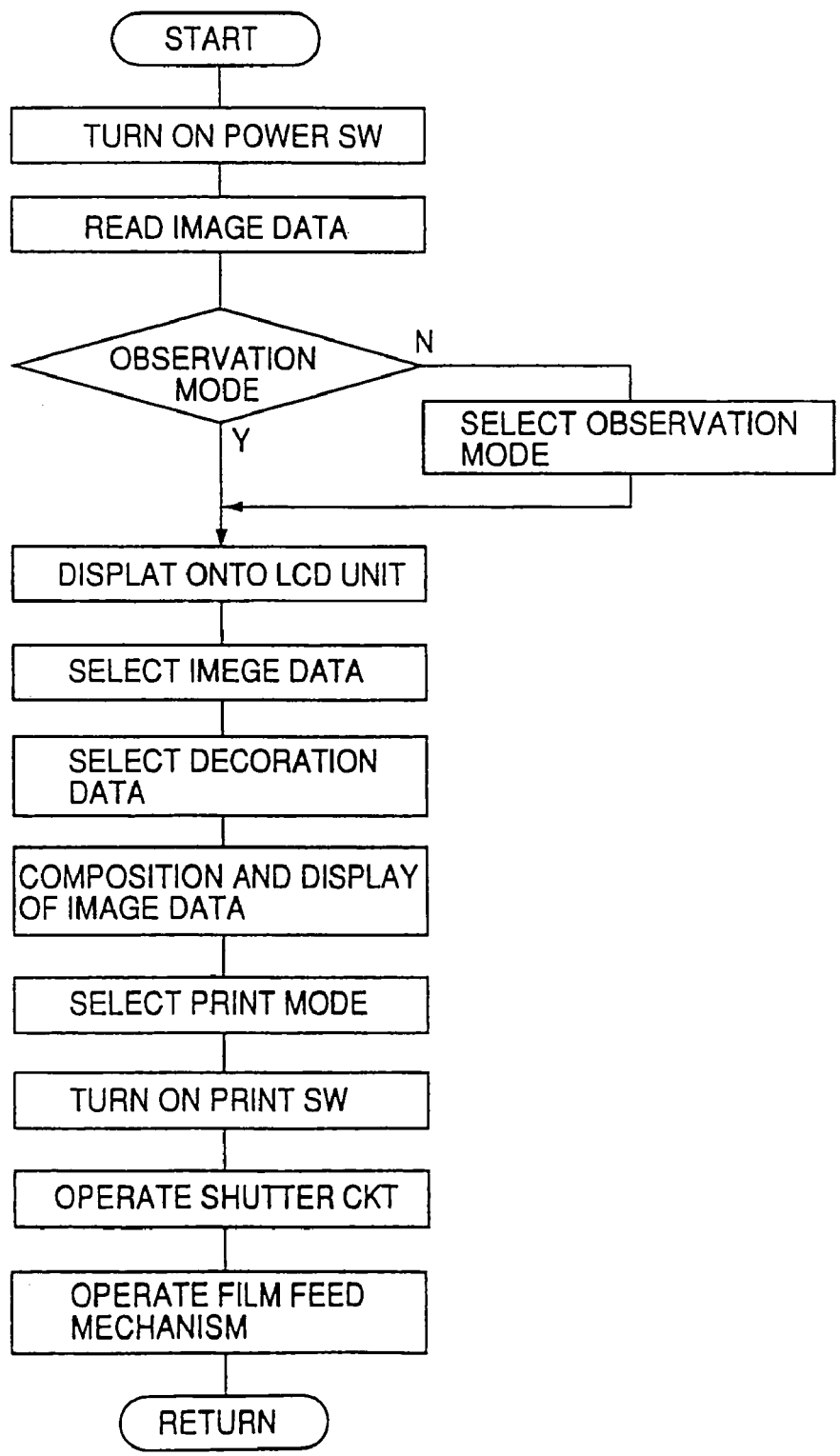
FIG. 106 is a flowchart useful for understanding an operating sequence of the sixth embodiment of the printer according to the present invention.

Next, there will be explained an effect of the sixth embodiment of the printer according to the present invention referring to FIG. 106.

When the printer 5002 is used, the power switch 5023 provided on the operation panel 5024 is operated to turn on the power source of the printer 5002. With respect to input ways of image data to the printer 5002, there are prepared a plurality of input methods, for example, a method in which image data is inputted through the memory card 5014 on which image data is recorded by an electronic still camera, a personal computer, etc.; a method in which the external connection terminal 5017 and the ISDN connection terminal 5018 are utilized to directly input image data through the external equipment such as an electronic still camera, a video camera, a video deck, a personal computer, etc.; a method in which the antenna 5006 is used to input image data through a radio wave from an external equipment; and a method in which image data is inputted through infrared by the light receiving and emitting unit 5074*a*. In the present embodiment, there will be explained by way of example the method in which image data is inputted through the memory card 5014.

In the event that image data is inputted through the memory card 5014, the memory card 5014 is inserted into the memory slot 5015 in a state that the power source of the printer 5002 is turned off, and then the power source of the printer 5002 is turned on. The reason why this is to do so is that data of the memory card 5014 is prevented from being destroyed by a detachable insertion of the memory card 5014 in the state that the power source of the printer 5002 is turned on. After turn on of the power source of the printer 5002, various switches of the operation panel 5024 are operated to select and determine a method of inputting image data, and then the input of the image data is carried out.

As shown in FIG. 103, when an operation of inputting of image data through the operation panel 5024 is made, an operation signal is fed via the I/O port 5071 to the system controller 5070. Upon receipt of the operation signal from the I/O port 5071, the system controller 5070 reads out image data from the memory card 5014 via the memory card drive unit 5032.

Image data read out from the memory card 5014 is fed to an image data processing circuit 5078 by the system controller 5070. Upon receipt of the image data, the image data processing circuit 5078 performs a signal processing such as a white balance control and a gamma correction for the received image data. The processed image data is converted into a video signal associated with a composite signal of an NTSC system, and then fed via a D/A converter 5081 and an amplifier 5082 to an external output terminal 5016 for a video signal. Thus, it is possible to observe an image through an external monitor connected to the external output terminal 5016.

The system controller 5070 always discriminates a position of the selection lever 5011 in accordance with the detection signal of the detection sensor 5100. Thus, in the event that the printer 5002 is set to the print mode at the time of input of image data, the system controller 5070 inhibits image data from being displayed on the liquid crystal display unit 5048, in order to prevent that an exposure is unintentionally performed on the film unit 5029. For this reason, when a user confirms that an image is not displayed on the liquid crystal display unit 5048 by an observation through an observation window 5009, the user operates the selection lever 5011 to switch the printer 5002 to the image observation mode. In the event that the printer 5002 is in the print mode at the time of input of the image data, it is acceptable that this state is informed a user by light, sound, etc.

When the selection lever 5011 meets an indicator 5012 shown in FIG. 98, and the mode of the printer 5002 is switched to the image observation mode, the system controller 5070 receives a detection signal from the detection sensor 5100. Upon receipt of the detection signal, the system controller 5070 enables the image data processing circuit 5078 and the interface circuit 5080.

In the event that the printer 5002 is in the image observation mode, the system controller 5070 causes the image data processing circuit 5078 to convert image data into an electric color image signal and feed the signal thus converted to the interface circuit 5080. A color image signal entered the interface circuit 5080 is fed to the operating frequency conversion circuit 5084.

As shown in FIG. 104, the terminal 5095 of the operating frequency conversion circuit 5084 receives the color image signal SGNL1 representative of a frame of color image data in synchronism with the clock CLK1 fed to the terminal 5096. The color image signal SGNL1 is stored in either of the frame memories 5087 and 5088 in accordance with the switching state of the switching circuits 5090, 5091. The control unit 5089 monitors the clock CLK1, and switches the switching circuits 5090 and 5091 whenever a frame of color image signal is completely stored in one of the frame memories 5087 and 5088.

On the other hand, color images stored in the frame memories 5087 and 5088 are read out in the form of a color image signal SGNL2 through a terminal 5098 in synchronism with a clock CLK2 which is fed to a terminal 5097. Also at that time, control unit 5089 monitors the clock CLK2, and switches the switching circuits 5092 and 5093 when a color image signal is completely read out from one of the frame memories 5087 and 5088, so that a color image signal is read out from another frame memory. The clock CLK2 synchronizes with the operating frequency of the liquid crystal display unit 5048, so that the color image signal SGNL2 derived from the operating frequency conversion circuit 5084 drives the liquid crystal display unit 5048 in synchronism with the same.

In the event that the frequency of the clock CLK1 is higher than the clock CLK2, the switching circuits 5090 and 5091 are switched to the neutral points which are not connected to any of the frame memories 5087 and 5088, so that a color image signal is inhibited from being written into a frame memory until read out of a color image signal of either one of the frame memories 5087 and 5088 is completed. This solves such a problem that a subsequent frame of color image signal cannot be written into a frame memory.

In the event that the frequency of the clock CLK1 is lower than the clock CLK2, the control unit 5089 does not perform switching for the switching circuits 5092 and 5093 until writing into a frame memory in the writing side is completed. When writing of a color image signal into the frame memory in the writing side is completed, while the same color image signal is repeatedly read out from the same frame memory, the control unit 5089 switches the switching circuits 5092 and 5093. This solves such a problem that the subsequent color image signal cannot be fed to the liquid crystal display unit 5048.

In this manner, even in the event that an operating frequency of an entered color image signal is different from that of the liquid crystal display unit 5048, the operating frequency conversion circuit 5084 can surely converts the operating frequency of an entered color image signal into the same frequency as the operating frequency of the liquid crystal display unit 5048, thereby preventing an occurrence of a disturbance of an image due to the frequency shift on the liquid crystal display unit 5048.

The color image signal read out from the operating frequency conversion circuit 5084 is fed to the display control unit 5085. The display control unit 5085 separates a color image signal to color image signals associated with three primary colors of R, G, and B, and sequentially outputs those signals. Each of the color image signals outputted from the display control unit 5085 is converted into an analog image signal by the D/A converter 5086 and then fed to the liquid crystal display unit 5048. The display control unit 5085 feeds also to the liquid crystal display unit 5048 a control signal to drive the LED unit 5063. As shown in FIG. 105, the display control unit 5085 sequentially forms on the liquid crystal panel 5060 of the liquid crystal display unit 5048 at time t1 intervals a frame image for red-association, a frame image for green-association, and a frame image for blue-association, which are associated with each of the color image signals. Further, the display control unit 5085 drives the LED unit 5063 to sequentially turn on the LED's 5066, 5067 and 5068 in synchronism with the formation of the respective colors of frame images onto the liquid crystal panel 5060. Thus, it looks like that a color image is formed on the liquid crystal display unit 5048 by after-image phenomenon.

When an operating time T, which is necessary for display of a frame image for red-association, a frame image for green-association, and a frame image for blue-association onto the liquid crystal panel 5060, and turn on of the LED's 5066, 5067 and 5068, is expressed by one cycle, the operating time of one cycle is not more than $1/16$ sec. Thus, a display of full color is performed with one pixel of the liquid crystal panel 5060 by after-image phenomenon of display of these frame images and flashing of the LED's 5066, 5067 and 5068. On the liquid crystal display unit 5048, the same frame image is repeatedly formed until a predetermined time elapses.

In the event that the printer 5002 is set to the image observation mode, as shown in FIG. 101, the switching reflecting mirror 5052 is rotatively translated to a position to close the exposing optical path between the first reflecting mirror 5049 and the second reflecting mirror 5046. Thus, an image displayed on the liquid crystal display unit 5048 is incident onto the first reflecting mirror 5049 and reflected, and then incident onto the exposing optical system 5050. An image transmitted through the exposing optical system 5050 is reflected on the switching reflecting mirror 5052, and then is magnified and projected on the back of the observing screen 5010. An image displayed on the liquid crystal display unit 5048 is projected on the back of the observing screen 5010. Thus, an image to be displayed on the observing screen 5010 is the same image as that displayed on the liquid crystal display unit 5048.

The focus selection mechanism 5058 operates together with a mode selection of the printer 5002 by the selection lever 5011. According to the focus selection mechanism 5058, the exposing optical system 5050 moves along the optical path between the first reflecting mirror 5049 and the second reflecting mirror 5046. Thus, an image to be projected onto the observing screen 5010 is surely focused.

A user operates various switches of the operation panel 5024 to sequentially read image data recorded on the memory card 5014, and observes the same on the observing liquid crystal display unit 4022 so that an image to be printed is selected and decided among the observed image data.

Further, according to the printer 5002 of the present embodiment, it is possible to combine decoration data such as a frame, a message, a character mark, etc., with image data entered from the exterior into printing. When the operation panel 5024 is operated to issue an instruction that decoration data is used, the system controller 5070 sequentially read decoration data from the decoration data memory 5076. The decoration data thus read is combined with image data selected by the decoration data memory 5076. A composite image data of the image data with the decoration data is displayed on an external monitor through the external output terminal 5016, and also on the observing liquid crystal display unit 5048 through the interface circuit 5080, and then projected onto the observing screen 5010.

In the event that image data to be printed is determined, the selection lever 5011 is operated to switch the printer 5002 to the print mode. When the printer 5002 is switched to the print mode, the system controller 5070 stops the image display of the liquid crystal display unit 5048, and thereby preventing unintentional exposure on the film unit 5029.

As shown in FIG. 97, when the selection lever 5011 is operated, the switching reflecting mirror 5052 rotatively moves so that the exposing optical path between the exposing optical system 5050 and the second reflecting mirror 5046 is released, and the observing optical path extending to the observing screen 5010 is closed. The exposing optical system 5050 is translated by the focus selection mechanism 5058 along the optical axis between the first reflecting mirror 5049 and the second reflecting mirror 5046, so that an image to be displayed on the liquid crystal display unit 5048 is focused on the sensitive surface 5029*a* of the film unit 5029.

When the print switch 5005 is depressed, the system controller 5070 receives a print signal via an I/O port 5071. The system controller 5070 enables the shutter circuit 5102 in accordance with the print signal. The shutter circuit 5102 controls the interface circuit 5080 so that the liquid crystal display unit 5048 serves as a shutter, and specifically, causes the liquid crystal display unit 5048 to display a full color image thereon by a predetermined time so that a suitable exposure on the film unit 5029 is effected. It is acceptable that an exposure time is automatically controlled in accordance with sensitivity of the film unit 5029 and density of image data, or alternatively a user sets up. Further, it is also acceptable that instead of control of the exposure time, a drive current of driving LED's 5066, 5067 and 5068 of the LED unit 5063 is controlled to control an amount of light of the LED's 5066, 5067 and 5068 per se.

An image displayed on the liquid crystal display unit 5048 is reflected on the first reflecting mirror 5049 and is incident onto the exposing optical system 5050. An image transmitted through the exposing optical system 5050 is reflected on the second reflecting mirror 5046 and is imaged on the sensitive surface 5029*a* of the film unit 5029. Thus, the image displayed on the liquid crystal display unit 5048 is exposed on the sensitive surface 5029*a* of the film unit 5029. In this manner, it is possible to easily utilize the liquid crystal display unit 5048, which can be used for exposure, for a portable printer driven by a battery and the like, since the power dissipation is small. Further, since the liquid crystal display unit 5048 can be commonly used for both exposure and image observation, it is possible to reduce the cost of the printer 5002 and also to provide a portable printer which is small in power dissipation.

On the sensitive surface 5029*a* of the film unit 5029, an image, which is reversed in the top and bottom and the right and left with respect to an image displayed on the liquid crystal display unit 5048, is exposed. However, an image is observed from the opposite side of the sensitive surface 5029*a* of the film unit 5029. Thus, an image to be observed is the same image as that displayed on the liquid crystal display unit 5048.

When the exposure on the film unit 5029 is terminated, the system controller 5070 enables the driving motor 5039 by a motor driver 5104. The driving motor 5039, as shown in FIG. 100, drives the film transport mechanism 5038 and the developing roller pair 5040 as well.

In the film transport mechanism 5038, the claw member transports the film unit 5029 upwards through the delivery outlet 5043 provided on the top of the case 5028 in such a manner that the claw member enters a groove 5042 formed in the front of the case 5028, and moves upwards while dipping up the lower end of the film unit 5029 located in the front row within the case 5028. The film unit 5029 transported from the case 5028 is fed between the developing rollers 5040.

The developing rollers 5040 are also driven by the driving motor 5039 to rotate in mutually different directions so that the film unit 5029 is sandwiched between the developing rollers 5040 and is conveyed to a discharge outlet 5004 located upwards. The developing rollers 5040 are energized by springs and spacers (not illustrated) to make an approach to one another maintaining regular intervals so as to sandwich the film unit 5029 with strong power. Thus, the developer pot 5029*b* of the film unit 5029 is exploded so that developer flows into a sensitive layer inside the sensitive surface 5029*a*. The developing rollers 5040 uniformly spreads developer on the sensitive layer inside the sensitive surface 5029*a*, and discharges the film unit 5029 through the discharge outlet 5004. The discharged film unit 5029 can be observed in the form of a positive image after a predetermined time for developing and transfer processing on the film unit.

While a positive image formed on the observing surface of the film unit 5029 according to the sixth embodiment is an image which is reversed with respect to the top and bottom direction, reversing an image to be displayed on the liquid crystal display unit 5048 with respect to the top and bottom direction makes it possible to form a positive image formed on the observing surface of the film unit 5029 in the form of an erect image. This is implemented by providing an image attitude correction function for correcting an attitude of an image for the image data processing circuit 5078. In case of the present embodiment, it is effective that when the printer 5002 is in the image observation mode, an erect image is displayed on the liquid crystal display unit 5048, and when the printer 5002 is in the print mode, an image, which is reversed in the top and bottom direction, is displayed on the liquid crystal display unit 5048.

According to the present embodiment, while the transmission film unit has been described by way of example, it is possible to use a mirror image type of film unit in which a positive image is formed on an exposure surface for observation. In this case, when an erect image is displayed on the exposing liquid crystal display unit, an image formed on the observing surface of the mirror image type of film unit is an image which is reversed with respect to the top and bottom direction and right and left direction. However, as mentioned above, by providing an image attitude correction function for the image data processing circuit and displaying an erect image on the liquid crystal display unit when the printer 5002 is in the image observation mode, and displaying an image, which is reversed in the top and bottom direction and the right and left direction, on the liquid crystal display unit 5048, it is possible to obtain a positive image in the form of an erect image also in the mirror image type of film unit.

Incidentally, according to the sixth embodiment of a printer as mentioned above, while two reflecting mirrors are used to provide a Z-like shaped exposing optical path and image observing optical path, it is acceptable that a single reflecting mirror is used to provide a L-like shaped exposing optical path and image observing optical path. Hereinafter, there will be described a seventh embodiment of a printer according to the present invention in which a single reflecting mirror is used to provide a L-like shaped exposing optical path and observing optical path. In the following figures, the same parts are denoted by the same reference numbers as those of the figures referred to the first embodiment of a printer, and the redundant description will be omitted.

Figure 107:
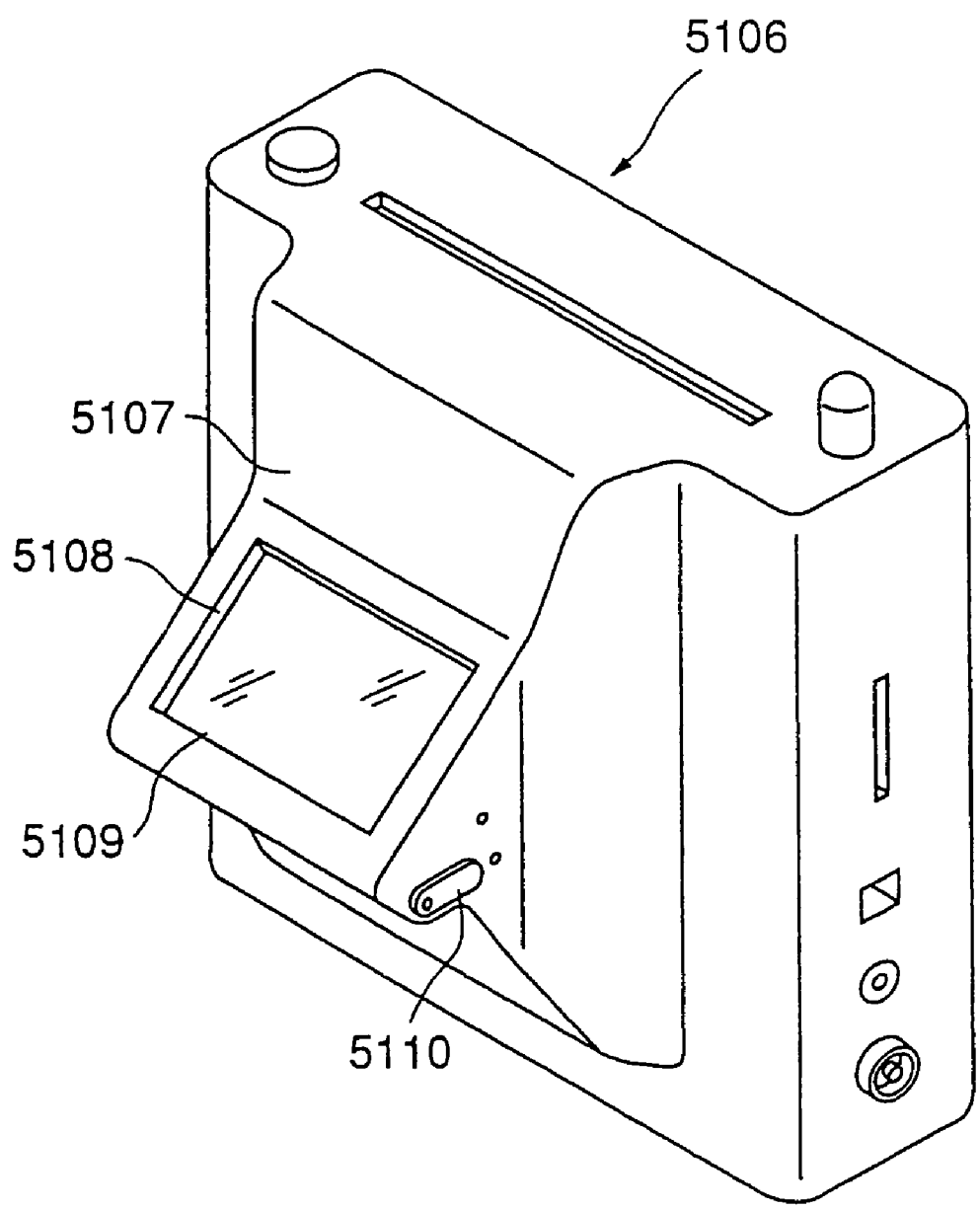
FIG. 107 is a perspective view showing appearance of a seventh embodiment of a printer according to the present invention looking from the front side.

FIG. 107 is a perspective view showing appearance of a seventh embodiment of a printer according to the present invention looking from the front side. Similar to the first embodiment of the printer 5002, the printer 5106 has an observation window 5108 on an inclined upper portion of a projecting member 5107 formed in the front of the printer 5106. An observing screen 5109 is set to the observation window 5108. On the side of the projecting member 5107, there is rotatably mounted, as optical path switching means for switching between the exposing optical path and the image observing optical path, a selection lever 5110 for performing a mode selection of the printer 5106. FIG. 107 shows the printer 5106 which is in the image observation mode.

Figure 108:
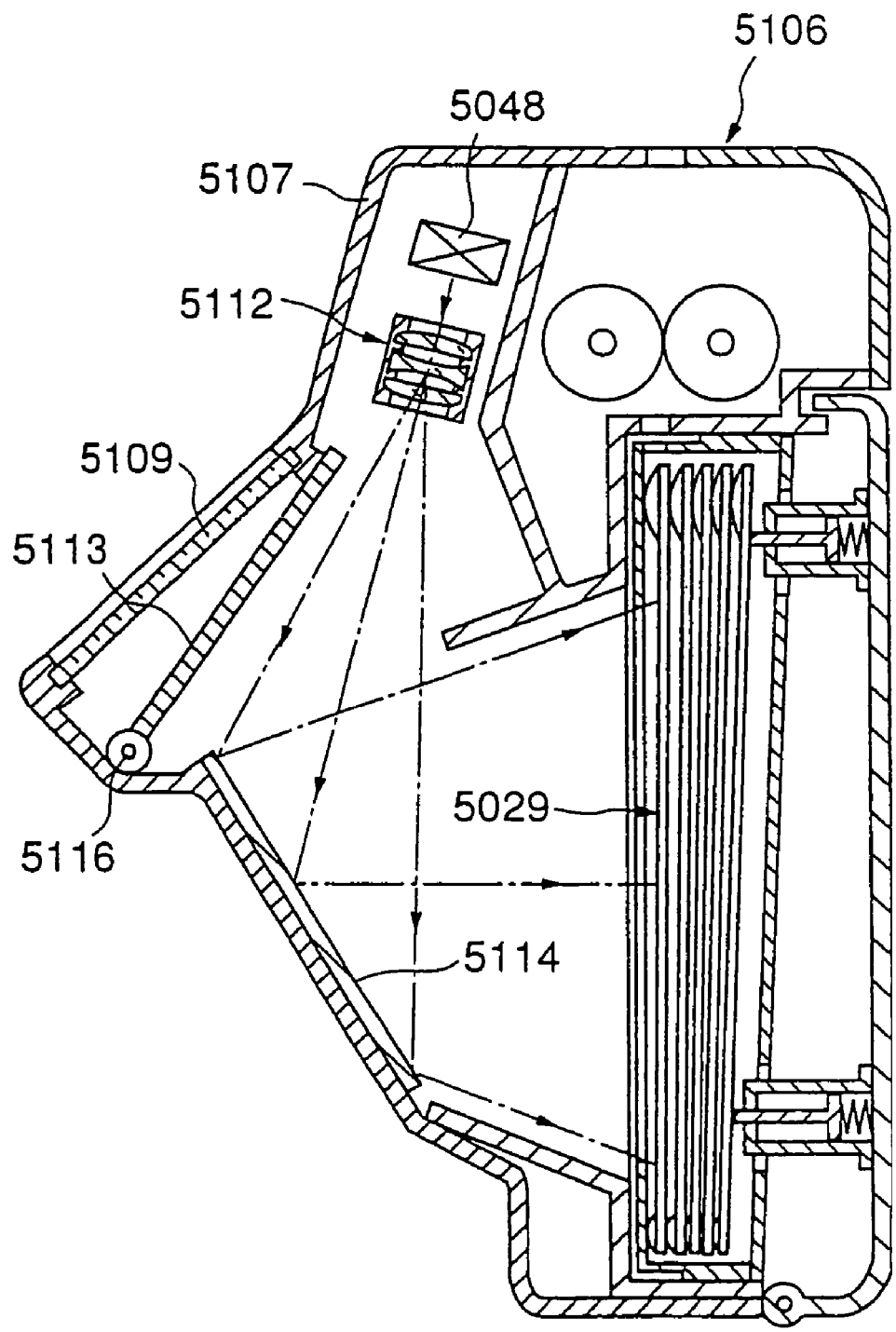
FIG. 108 is a sectional view of a seventh embodiment of a printer according to the present invention in the state of a print mode.

FIG. 108 is a sectional view of the seventh embodiment of the printer according to the present invention. Into the projecting member 5107, there are incorporated an liquid crystal display unit 5048, an exposing optical system 5112 serving as the observation optical system, a switching reflecting mirror 5113 constituting the optical path switching means, and a reflecting mirror 5114.

Figure 109:
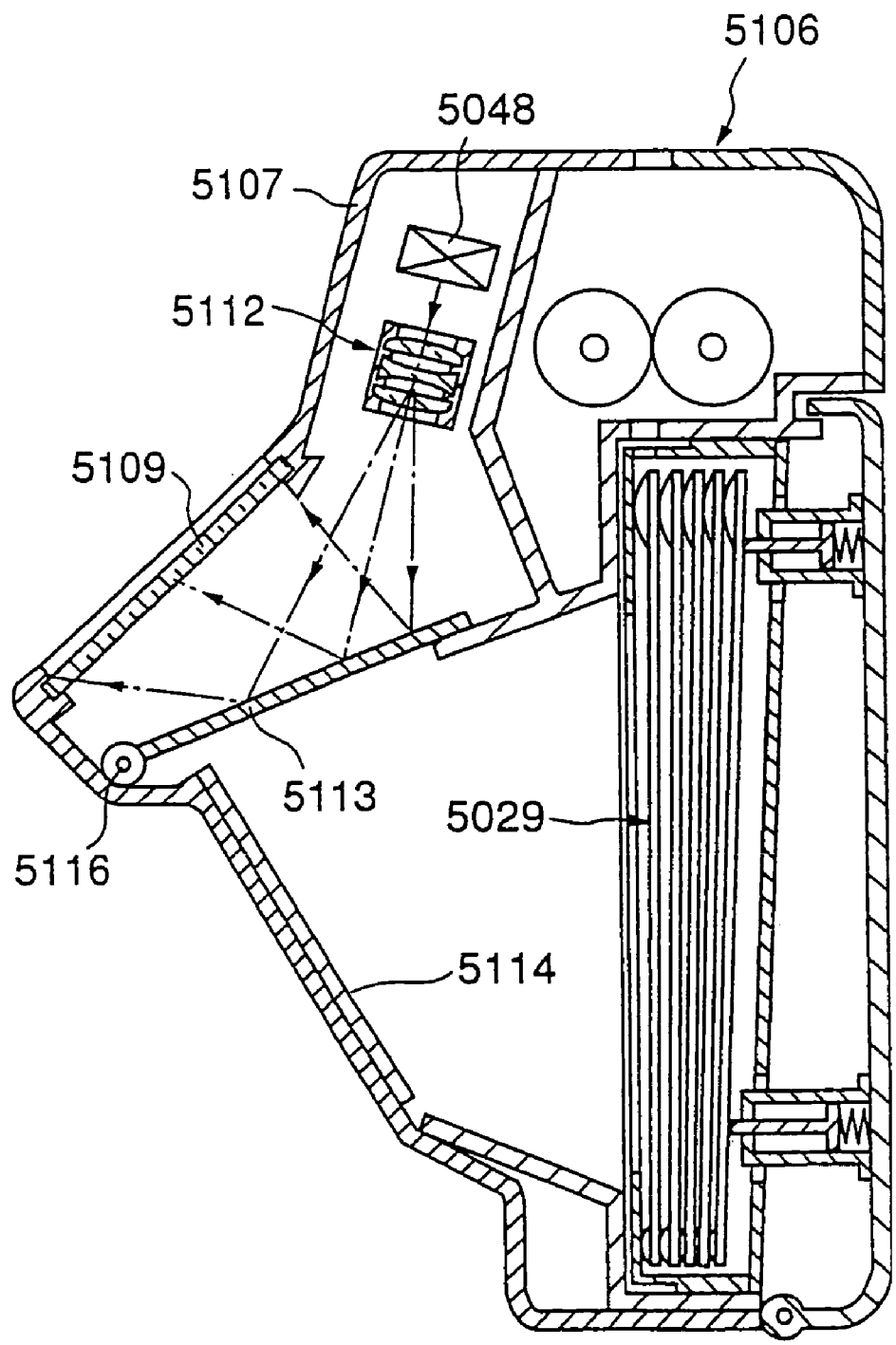
FIG. 109 is a sectional view of the seventh embodiment of the printer according to the present invention in the state of an image observation mode.
Figure 110:
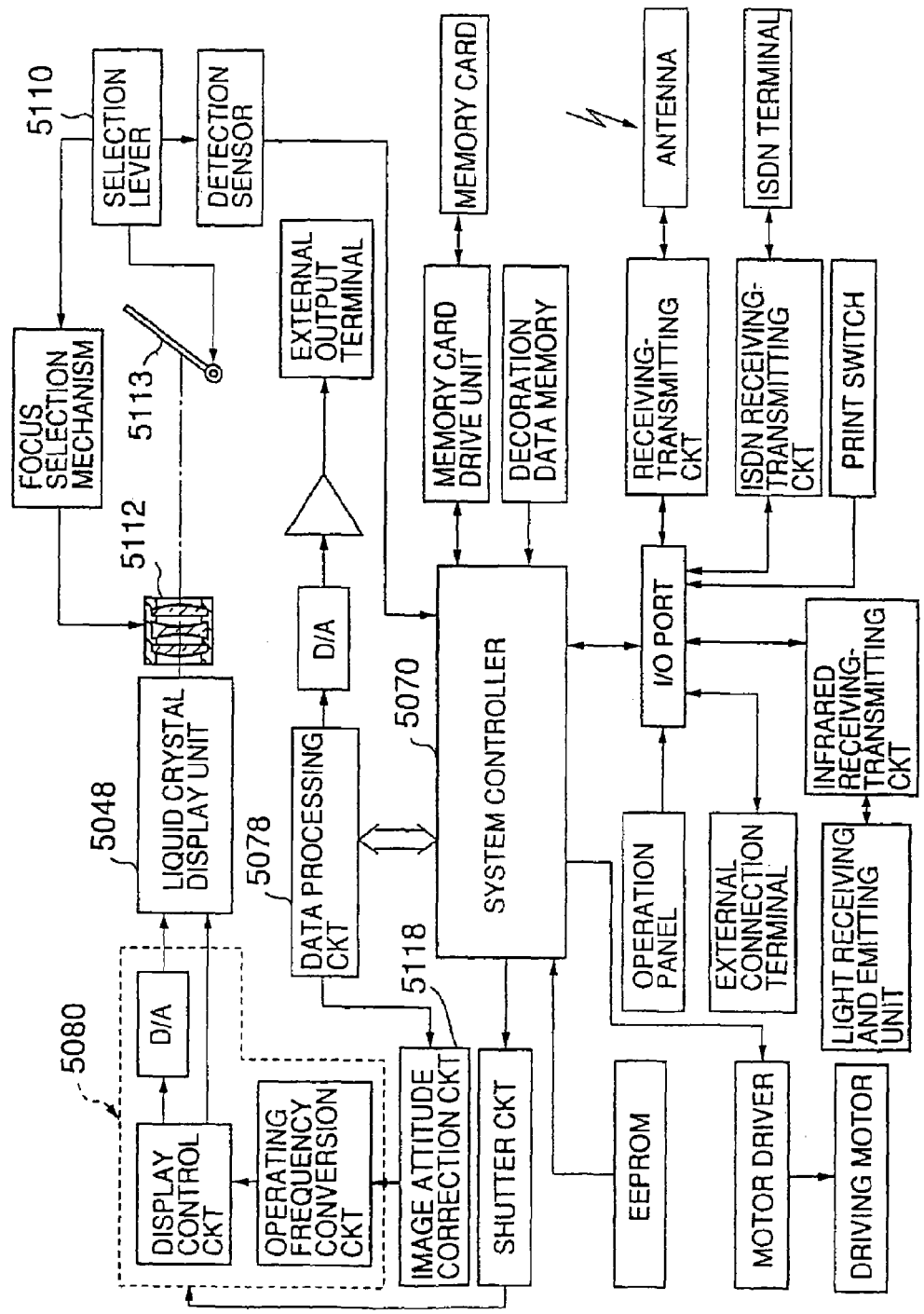
FIG. 110 is a block diagram showing an electric structure of the seventh embodiment of the printer according to the present invention.

Between the exposing optical system 5112 and the second reflecting mirror 5114, there is disposed a switching reflecting mirror 5113 which is rotatably mounted between a position wherein the exposing optical path between the exposing optical system 5112 and the second reflecting mirror 5114 is released to form a L-like shaped exposing optical path, and as shown in FIG. 109, a position wherein the exposing optical path between the exposing optical system 5112 and the second reflecting mirror 5114 is closed to form a L-like shaped observing optical path in which an image displayed on the liquid crystal display unit 5048 is reflected toward the back of an observing screen 5109.

One end of the switching reflecting mirror 5113 is mounted on a rotary shaft 5116 supported inside the printer 5106. The selection lever 5110 provided outside the printer 5106 is mounted on one end of the rotary shaft 5116. Thus, an operation of the selection lever 5110 makes it possible to rotate the switching reflecting mirror 5113 between a position forming the exposing optical path and a position forming the observing optical path.

In this manner, by providing an L-like shaped optical path, it is possible to reduce a size of the printer 5106 with respect to a front and back direction as compared with the printer having a Z-like shaped optical path, thereby implementing compactness and weight saving of the printer. Further, since a single reflecting mirror can be used, it is possible to reduce an attenuation of exposing light quantity, and thereby reducing a print time and obtaining an enhanced print.

Incidentally, according to the L-like shaped optical path, an image displayed on the liquid crystal display unit 5048 is exposed on the observing screen 5109 in a state that the image is reversed with respect to the right and left direction, and on the film unit 5029 in a state that the image is reversed with respect to the top and bottom direction and the right and left. For this reason, according to the present embodiment, as shown in FIG. 109, between image data processing circuit 5078 and the interface circuit 5080, there is provided as image attitude correcting means an image attitude correction circuit 5118 for reversing image data with respect to the right and left direction. In this manner, an image is displayed on the observing screen 5019 in the form of an erect image, and a positive image, which is reversed with respect to the top and bottom direction, is formed on the film unit 5029. Regarding the reverse of the film unit 5029 as to the top and bottom direction, there is no need to correct it by the image attitude correction circuit 5118, since there is no problem if the film unit 5029 is inverted when observed.

When the printer 5106 is in the image observation mode, an image, which is reversed with respect to the right and left direction, is displayed on the liquid crystal display unit 5048, and when the printer 5106 is in the print mode, an image, which is reversed in the top and bottom direction and the right and left direction, is displayed on the liquid crystal display unit 5048. This feature makes it possible to form a positive image in the form of an erect image on the film unit 5029.

Further, also in the printer 5106 of the seventh embodiment, it is possible to use a mirror image type of film unit in which a positive image is formed on the exposure plane. In the event that the mirror image type of film unit is used in the printer 5106, when the printer 5106 is in the image observation mode, an image, which is reversed with respect to the right and left direction, is displayed on the liquid crystal display unit 5048, and when the printer 5106 is in the print mode, an erect image is displayed on the liquid crystal display unit 5048. Thus, it is possible to form a positive image in the form of an erect image on the film unit 5029.

According to the sixth and seventh embodiments of the printer as mentioned above, while the exposing optical system is also used as the observing optical system, the exposing optical system and the observing optical system are provided individually. Hereinafter, there will be described an eighth embodiment of a printer according to the present invention in which the exposing optical system and the observing optical system are provided individually. In the following figures, the same parts are denoted by the same reference numbers as those of the figures referred to the sixth and seventh embodiments of a printer, and the redundant description will be omitted.

Figure 111:
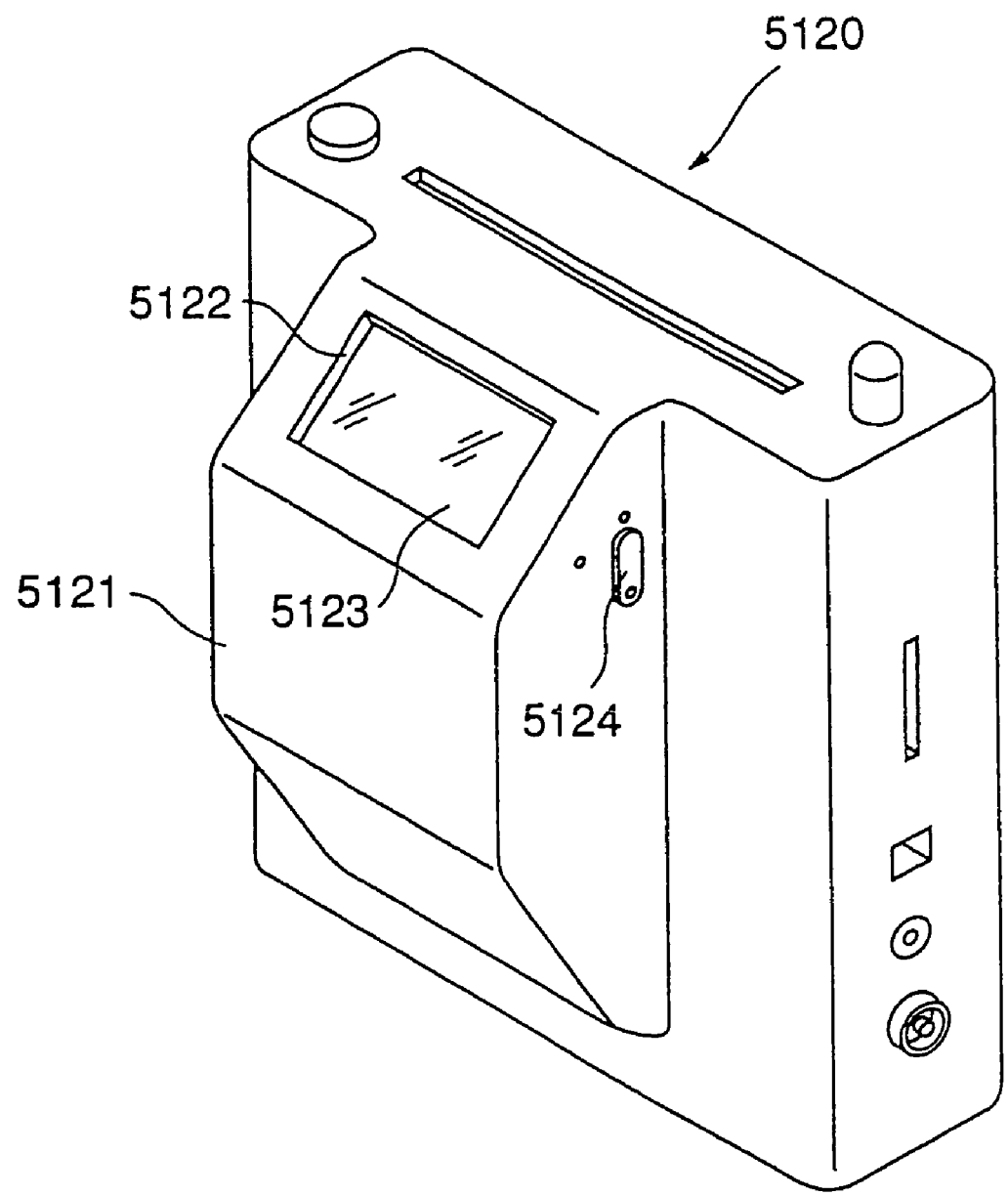
FIG. 111 is a perspective view showing appearance of an eighth embodiment of a printer according to the present invention looking from the front side.

FIG. 111 is a perspective view showing appearance of an eighth embodiment of a printer according to the present invention looking from the front side. Similar to the sixth and seventh embodiments of the printer, a printer 5120 has an observation window 5122 on an inclined upper portion of a projecting member 5121 formed in the front of the printer 5120. An observing screen 5123 is set to the observation window 5122. On the side of the projecting member 5121, there is rotatably mounted, as optical path switching means for switching between the exposing optical path and the image observing optical path, a selection lever 5124 for performing a mode selection of the printer 5120. FIG. 111 shows the printer 5120 which is in the print mode.

Figure 112:
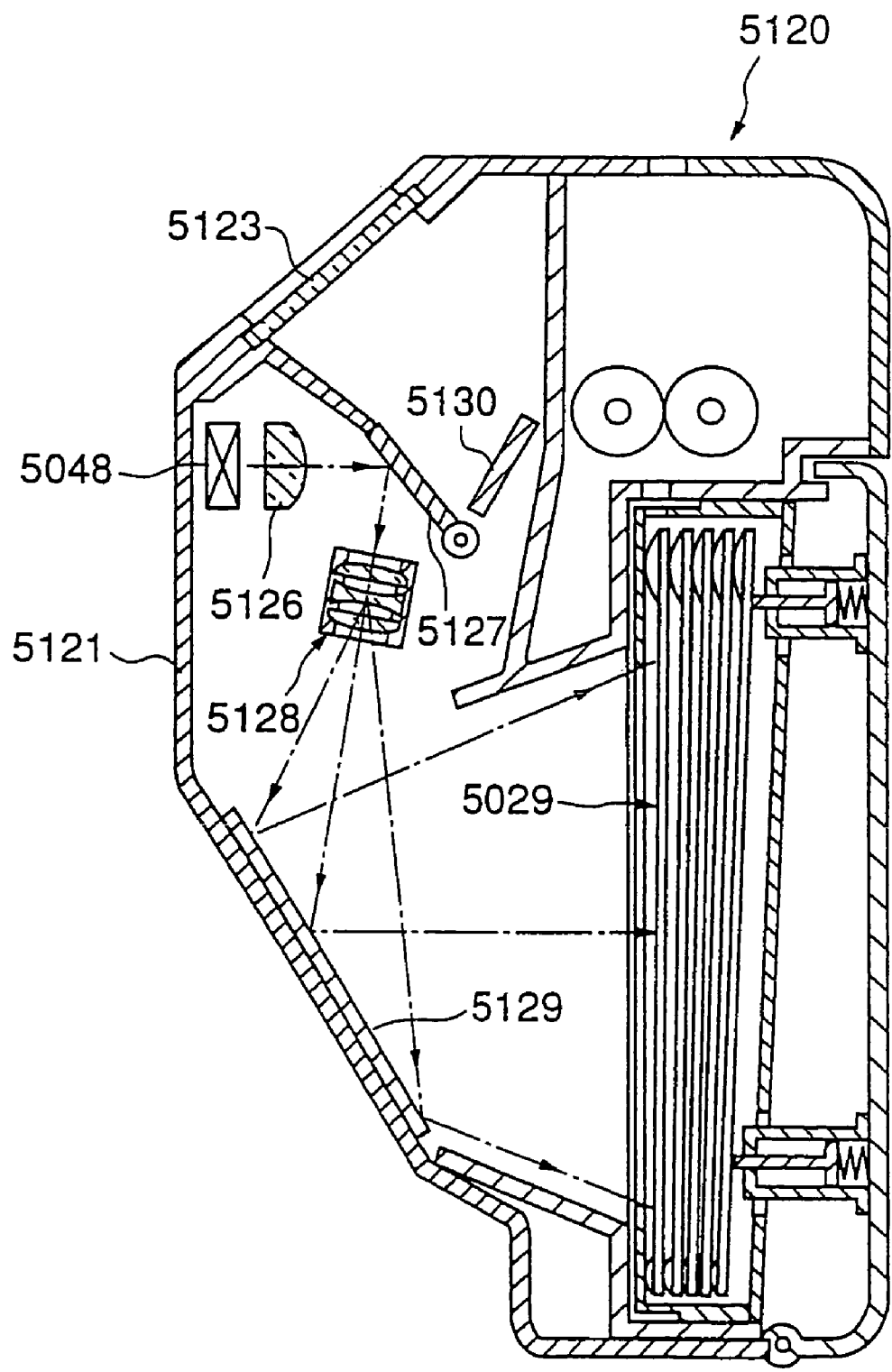
FIG. 112 is a sectional view of the eighth embodiment of the printer according to the present invention in the state of a print mode.

FIG. 112 is a sectional view of the eighth embodiment of the printer according to the present invention. Into the projecting member 5121, there are incorporated an liquid crystal display unit 5048, a magnifying lens 5126 serving as the observation optical system, a switching reflecting mirror 5127, an exposing optical system 5128, an exposing reflecting mirror 5129, and an observing reflecting mirror 5130.

Figure 113:
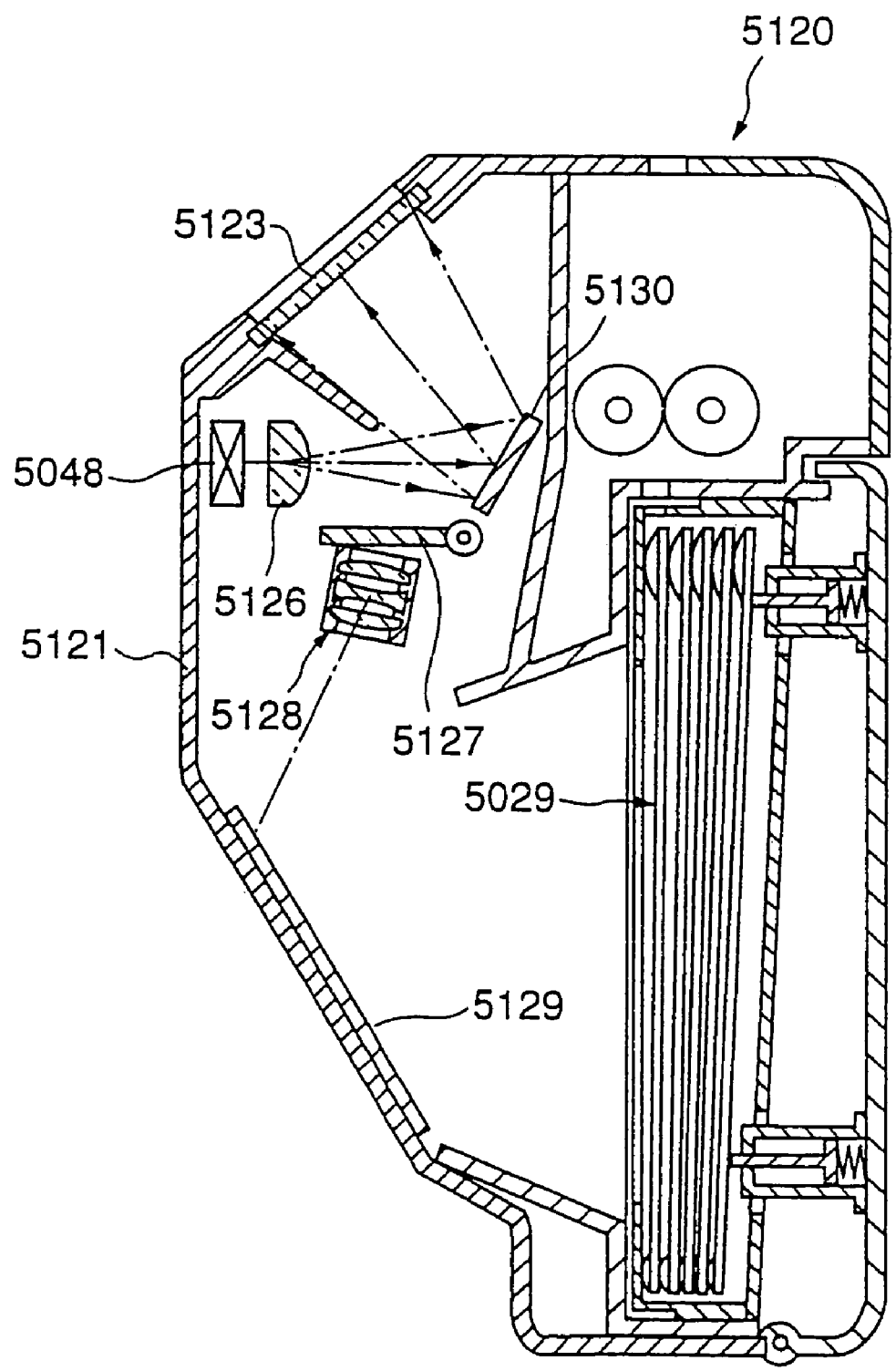
FIG. 113 is a sectional view of the eighth embodiment of the printer according to the present invention in the state of an image observation mode.

Between the magnifying lens 5126 and the exposing optical system 5128 and the observing reflecting mirror 5130, there is disposed a switching reflecting mirror 5127 which is rotatably mounted between a position wherein the observing optical path between the magnifying lens 5126 and the observing reflecting mirror 5130 is closed to form a Z-like shaped exposing optical path, and as shown in FIG. 113, a position wherein an upper portion of the exposing optical system 5128 is closed and a path between the magnifying lens 5126 and the observing reflecting mirror 5130 is released to form a L-like shaped observing optical path. One end of the switching reflecting mirror 5127 is mounted on a rotary shaft 5132 supported inside the printer 5120. The selection lever 5124 provided outside the printer 5120 is mounted on one end of the rotary shaft 5132. Thus, an operation of the selection lever 5124 makes it possible to rotate the switching reflecting mirror 5127 between a position forming the exposing optical path and a position forming the observing optical path.

In the event that the observing optical path has been formed through the switching operation of the switching reflecting mirror 5127, an image displayed on the liquid crystal display unit 5048 is magnified by the magnifying lens 5126 and projected onto the observing screen 5123. In the event that the exposing optical path has been formed, the magnifying lens 5126 and the exposing optical system 5128 are used for a magnified projection and imaging of an image for exposure. This feature makes it possible to reduce the number of parts and thereby contributing to compactness, weight saving, and low cost, since there is no need to provide a focus switching mechanism for focusing through a translation of the exposing optical system, as in the sixth and seventh embodiments.

Figure 114:
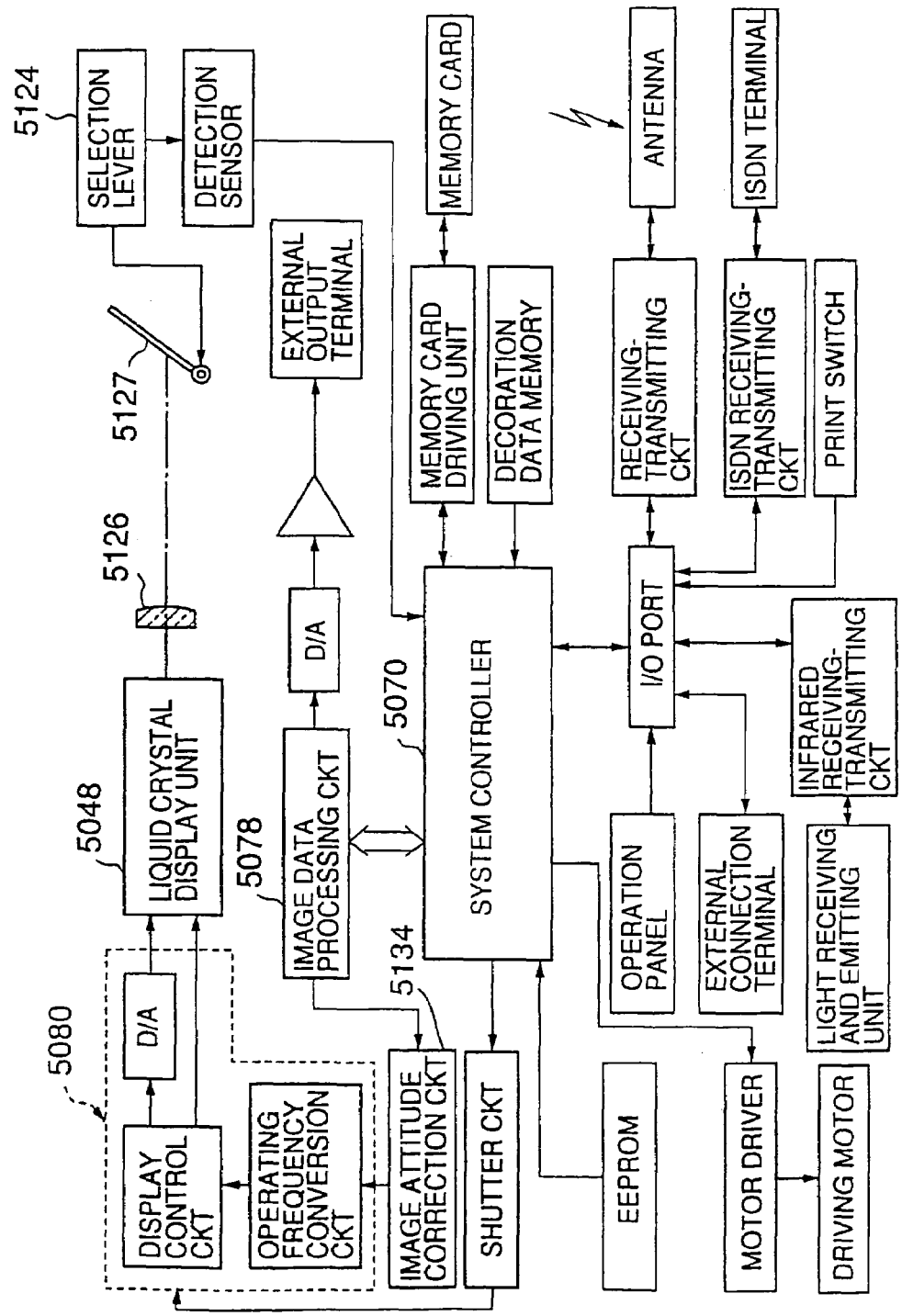
FIG. 114 is a block diagram showing an electric structure of the eighth embodiment of the printer according to the present invention.

According to the printer 5120, the exposing optical path and the observing optical path are different in the number of reflecting mirror. Accordingly, an erect image displayed on the liquid crystal display unit 5048 is exposed on the film unit 5029 in a state that the image is reversed with respect to the top and bottom direction, and is displayed on the observing screen 5123 in a state that the image is reversed with respect to the right and left direction. For this reason, according to the present embodiment, as shown in FIG. 114, in the event that the printer 5120 is in the image observation mode, between image data processing circuit 5078 and the interface circuit 5080, there is provided an image attitude correction circuit 5134 for reversing image data with respect to the right and left direction as image attitude correction. In this manner, an image is displayed on the observing screen 5123 in the form of an erect image. And thus, it is possible to observe a proper image.

In the event that the printer 5120 is in the print mode, it is acceptable that an image inverted with respect to the top and bottom direction by the image attitude correction circuit 5134 is displayed on the liquid crystal display unit 5048. Thus, it is possible to form a positive image in the form of an erect image on the film unit 5029.

Further, also in the printer 5120 of the present embodiment, it is possible to use a mirror image type of film unit in which a positive image is formed on an exposure plane. In the even that the mirror image type of film unit id used in the printer 5120, when the printer 5120 is in the print mode, by displaying a reverse image, which is reversed in the top and bottom direction and the right and left direction, on the liquid crystal display unit 5048, it is possible to obtain a positive image in the form of an erect image.

According to the above-mentioned sixth to eighth embodiments related to a printer, an image displayed on the liquid crystal display unit is projected onto the screen for the purpose of observations. It is possible, however, to directly observe the image displayed on the liquid crystal display unit through magnification by a lens. Hereinafter, there will be described a ninth embodiment of a printer according to the present invention in which the image displayed on the liquid crystal display unit is directly observed. In the following figures, the same parts are denoted by the same reference numbers as those of the figures referred to the sixth to eighth embodiments of a printer, and the redundant description will be omitted.

Figure 115:
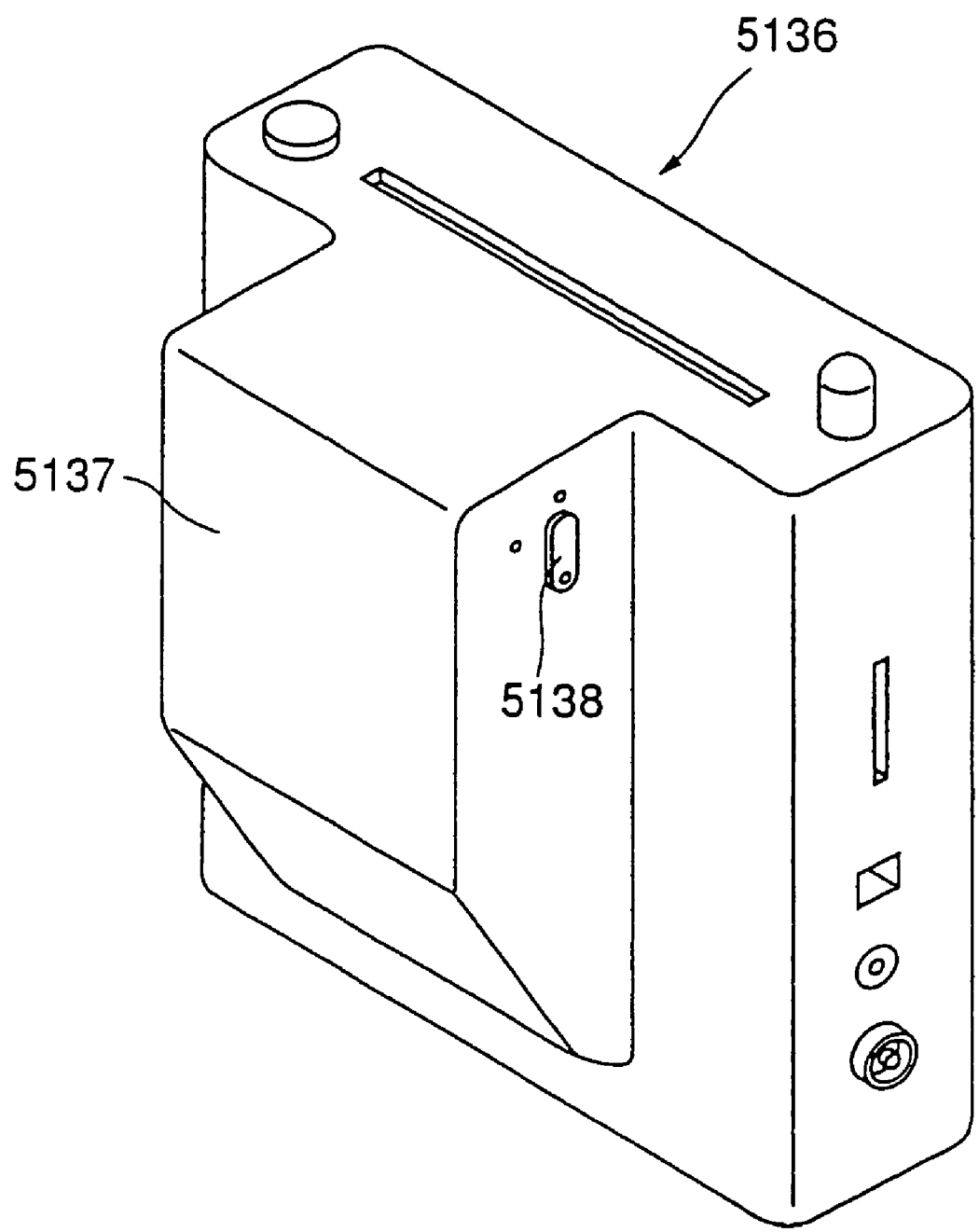
FIG. 115 is a perspective view showing appearance of a ninth embodiment of a printer according to the present invention looking from the front side.
Figure 116:
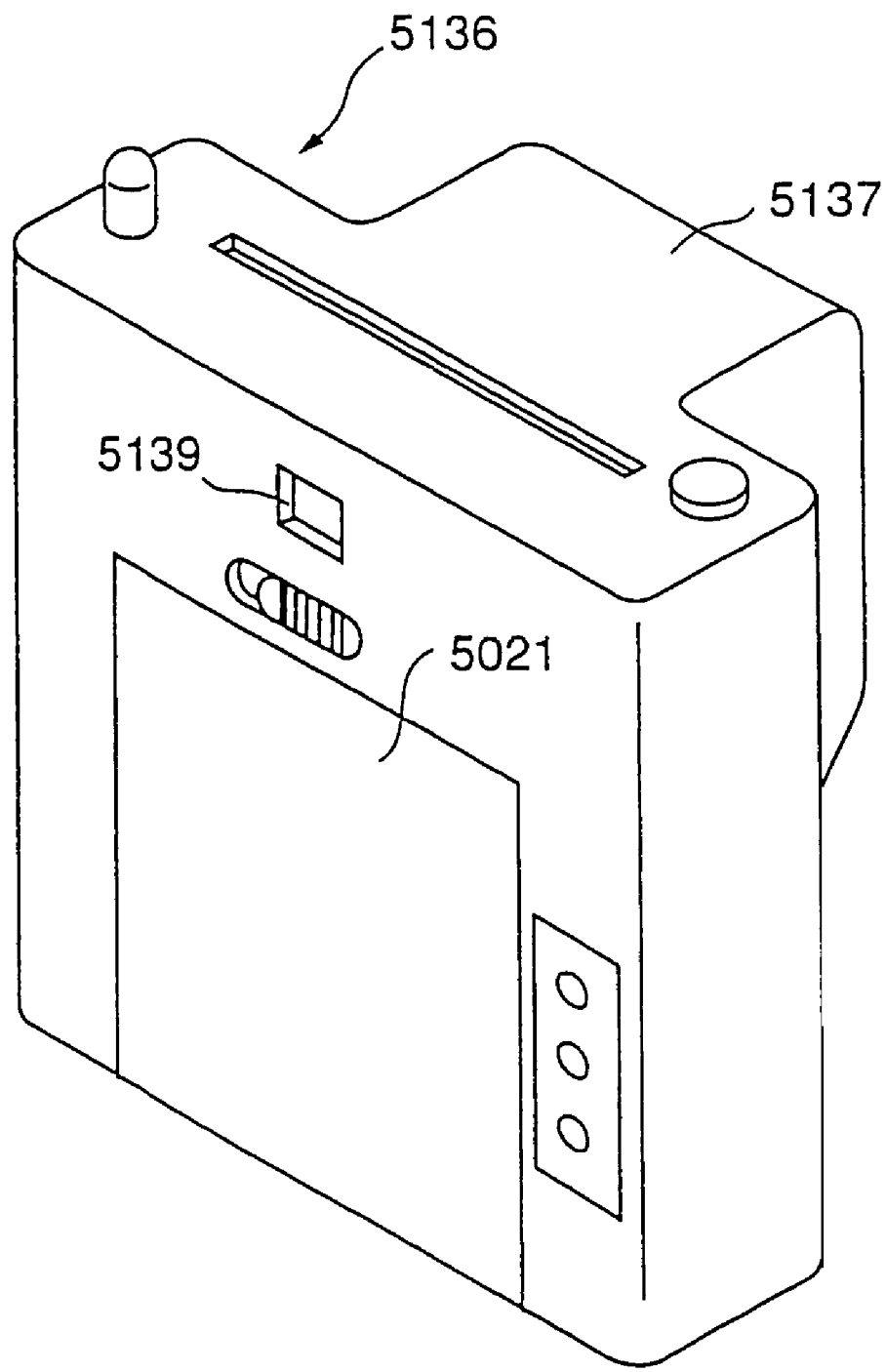
FIG. 116 is a perspective view showing appearance of a ninth embodiment of a printer according to the present invention looking from the back side.

FIG. 115 is a perspective view showing appearance of a ninth embodiment of a printer according to the present invention looking from the front side. The printer 5136 has, similar to the sixth to eighth embodiments of a printer, a projecting member 5137 in the front of the printer 5136. Inside the projecting member 5137, there is not provided an observation window to which the observing screen is set. On the side of the projecting member 5137, there is rotatably mounted a selection lever 5138 for performing a switching between the exposing optical path and the observing optical path and also performing a mode switching of the printer 5136. The printer 5136 shown in FIG. 115 is in the print mode. FIG. 116 is a perspective view showing appearance of a ninth embodiment of a printer according to the present invention looking from the back side. As shown in FIG. 116, above the back cover 5021 there is formed an eyepiece window 5139 for observing an image.

Figure 117:
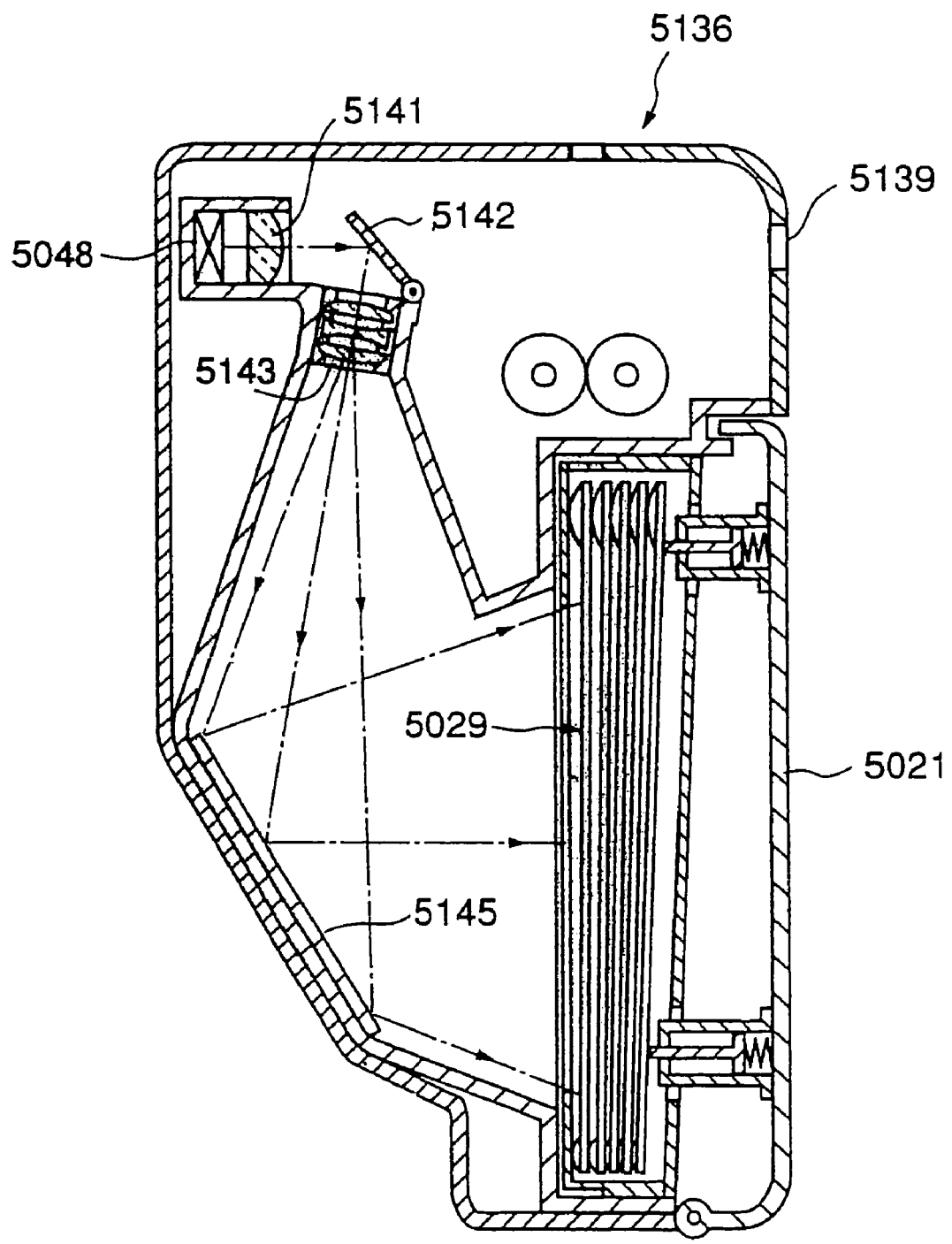
FIG. 117 is a sectional view of the ninth embodiment of the printer according to the present invention in the state of a print mode.

FIG. 117 is a sectional view of the ninth embodiment of the printer according to the present invention in the state of a print mode. As shown in FIG. 117, into the projecting member 5137, there are incorporated an liquid crystal display unit 5048, a magnifying lens 5141 serving as the observing optical system, a switching reflecting mirror 5142, an exposing optical system 5143, and an exposing mirror 5145.

Figure 118:
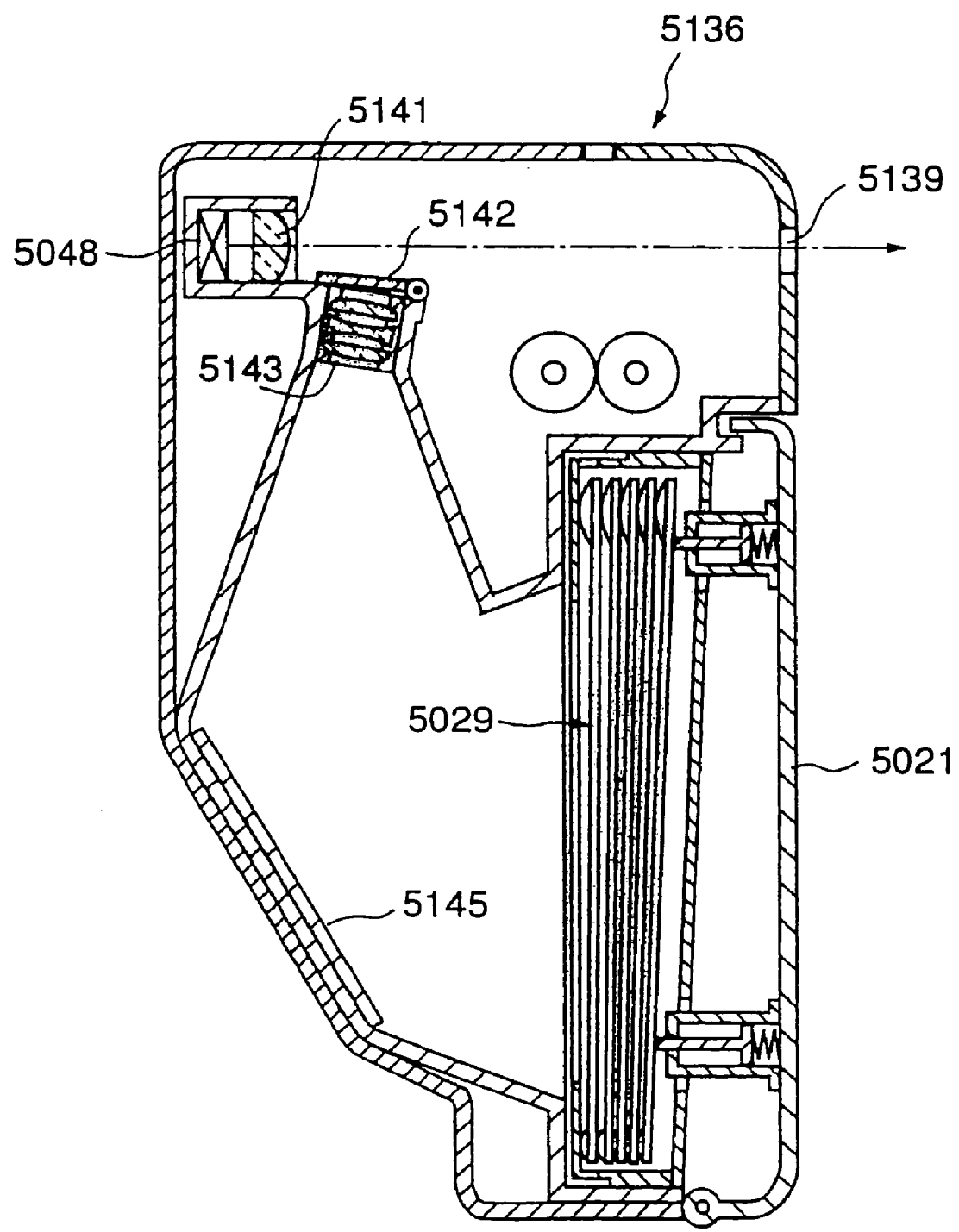
FIG. 118 is a sectional view of the ninth embodiment of the printer according to the present invention in the state of an image observation mode.

Between the magnifying lens 5141 and the exposing optical system 5143 and the eyepiece window 5139, there is disposed the switching reflecting mirror 5142 which is rotatably mounted between a position wherein the observing optical path between the magnifying lens 5141 and the eyepiece window 5139 is closed to form a Z-like shaped exposing optical path, and as shown in FIG. 118, a position wherein an upper portion of the exposing optical system 5143 is closed and the observing optical path between the magnifying lens 5126 and the eyepiece window 5139 is released.

As shown in FIG. 118, in the event that the observing optical path is formed by the switching reflecting mirror 5142, an image displayed on the observing liquid crystal display unit 5048 is magnified by the magnifying lens 5141, and emitted from the eyepiece window 5239. In order to see the image on the liquid crystal display unit 5048, an observer looks through the eyepiece window 5139 with his single eye. This brings about such an advantage that the image is prevented from being seen by another person.

Further, according to the print 5136 of the present embodiment, there is no need to move the exposing optical system 5143 for focusing in two ways. Thus, the printer 5136 does not have to have a focus switching mechanism which works together with the selection lever 5138. This feature makes it possible to reduce the number of parts, and thereby contributing to compactness, weight saving, and low cost.

Figure 119:
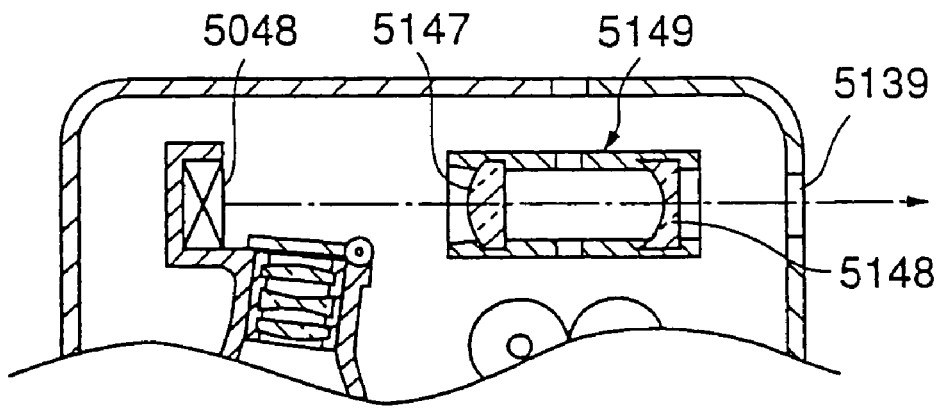
FIG. 119 is a sectional view of a printer in which a Galilean optical system is used for a magnifying lens.
Figure 120:
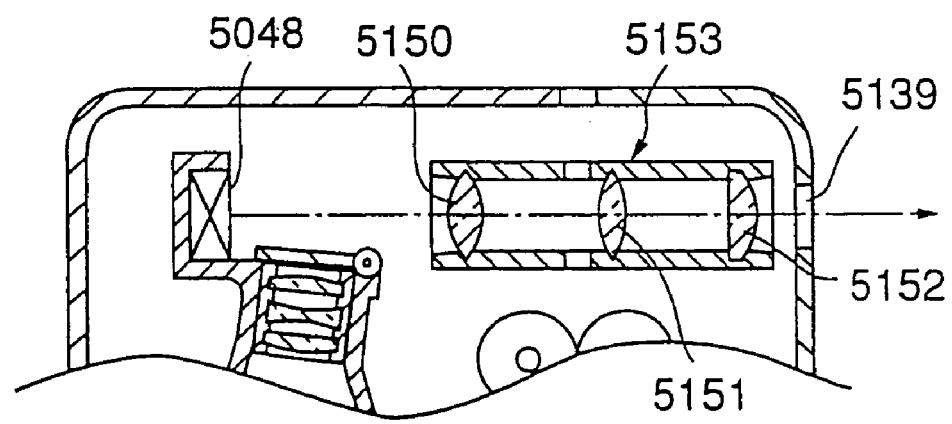

As the magnifying lens for magnifying an image displayed on the liquid crystal display unit 5048 and emitting the same from the eyepiece window 5139, as shown in FIG. 119, Galilean optical system 5149 comprising ⌒lens 5147 and ⌴lens 5148 can be used. The use of the Galilean optical system 5149 makes it possible to perform an image display at higher ratio of magnification. In the event that an image display is performed at further higher ratio of magnification, as shown in FIG. 120, it is acceptable to use Keplerian optical system 5153 comprising an objective lens 5150, an intermediate lens 5151 and an eyepiece lens 5152.

Further, also in the printer 5136 of the present embodiment, it is possible to use a mirror image type of film unit. In this case, in the event that the printer 5136 is in the image observation mode, an erect image is displayed on the liquid crystal display unit 5048. And in the event that the printer 5136 is in the print mode, a reverse image, which is reversed in the top and bottom direction and the right and left direction, is displayed on the liquid crystal display unit 5048. Thus, it is possible to obtain a positive image in the form of an erect image also in the mirror image type of film unit.

According to the liquid crystal display unit 5048, which have been explained above as to the sixth to ninth embodiments of a printer, as shown in FIG. 102, the diffusing plate 5061 and the light amplifying plate 5062 are disposed between the liquid crystal panel 5060 and the LED unit 5063. It is acceptable, however, that as in a liquid crystal display unit 5155 shown in FIG. 121, a diffusing plate 5156 is mounted on a circuit substrate 5158 of an LED unit 5157, LED's 4519, 5160 and 5161 for three primary colors of red, green and blue are disposed at the side of the diffusing plate 5156 so that beams of light are radiated into the diffusing plate 5156. According to this arrangement, it is possible to further thin, as compared with the liquid crystal display unit 5048, a thickness size in a front and back direction of a cover member 5164 in which the LED unit 5157 and a liquid crystal panel 5162 are accommodated, and on which a protection cover 5163 is mounted, and thereby contributing to compactness and weight saving of the printer.

With respect to the shutter circuit, display of the respective frame images to the liquid crystal panel of the liquid crystal display unit and flashing of the respective LED's are performed in operating time and timing which are the same as those at the time of the observation. However, at the time of exposure, it is acceptable that the turn-on time of the LED's is relatively extended so that an exposure is controlled by display of the respective LED's. Alternatively, a quantity of light of each of the respective LED's is increased per se by increasing a driving current for driving the associated LED, so that an exposure is controlled. This makes it possible to increase an exposure, and thereby reducing an exposure time and providing an optimum exposure for a sensitivity of a film.

Further, According to the sixth to ninth embodiments of a printer as mentioned above, while a film unit is discharged from the top of a printer, it is acceptable that a film unit is discharged from the bottom of a printer. Further, while a printer is arranged on a vertical basis, it is acceptable that a printer is arranged on a horizontal basis. In this case, it is acceptable that a film unit is discharged from a side of a printer.

According to the above-mentioned embodiments, while the transmission instant film unit has been described by way of example, it is possible to use a mirror image type of instant film unit. In this case, by altering an optical path or correcting attitude of an image displayed on the liquid crystal display unit by the image attitude correction means at the time of observation and exposure, a positive image is formed in the form of an erect image on the film unit.

It is acceptable to use both the transmission film unit and the mirror image type of film unit. In this case, it is effective that the image attitude correction circuit corrects at the time of observation and exposure attitude of an image displayed on the liquid crystal display unit in accordance with a type of a film unit setting. With respect to a discrimination of the film type, it is either acceptable that a user instructs it or a printer discriminates it.

A sensitive material to be used as a recording material is not restricted to the instant film unit, and it is acceptable to use a general photographic film such as 135 type, 120 type, and a silver salt type of sheet film, and the like.

While the image attitude correction circuit is additionally provided, it is acceptable to correct attitude of an image by the image data processing circuit.

While it has been described that the LED's are turned on in the order of red, green and blue, this order is not restricted. It is acceptable to interchange the order, for example, to blue, green and red.

While a memory card is used as an external storage medium for inputting image data, it is acceptable to use a floppy disk, and a removable media such as a magneto-optic disc, and a CD-ROM.

It is acceptable that a image taking lens and an image sensing device are incorporated so that a dynamic image and a still image can be photographed, and the photographed image can be immediately printed.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A printer comprising:
An exposing liquid crystal display unit having a transmissive liquid crystal panel having a number of pixels arranged on a two-dimensional basis, on which an image is formed, and a light source unit emitting beams of light of a plurality of luminescent colors for irradiating said liquid crystal panel from back;
an interface circuit for separating an entered color image signal to a plurality of color image signals associated with a plurality of luminescent colors of said light source unit, respectively, to sequentially form on said liquid crystal panel a plurality of separation images associated with the plurality of color image signals, said interface circuit causing said light source unit to flash with a luminescent color associated with a separation image formed on said liquid crystal panel in synchronism with a sequential formation of the separation images onto said liquid crystal panel; and
an exposing optical system for magnifying and projecting an image formed on said exposing liquid crystal display unit to provide imaging on a sensitive plane of a sensitive material.

2. A printer according to claim 1, wherein said sensitive material is an instant film unit, and said printer has means for developing the instant film unit and discharging the same.

3. A printer according to claim 1, wherein said printer has an observing liquid crystal display unit for observing an image, in addition to said exposing liquid crystal display unit.

4. A printer according to claim 3, wherein said observing liquid crystal display unit is of a same type as said exposing liquid crystal display unit, wherein an observation is performed through an observing optical system.

5. A printer according to claim 3, wherein said observing liquid crystal display unit is of a different type from said exposing liquid crystal display unit, wherein an observation is performed directly or through an observing optical system.

6. A printer according to claim 3, wherein said observing liquid crystal display unit is of a different type from said exposing liquid crystal display unit, and is disposed between a pair of pressing members which press an instant film unit to an exposure position.

7. A printer according to claim 4, wherein said observing optical system comprises a magnifying lens for ejecting from an eyepiece window an image magnified from an image formed on the observing liquid crystal display unit.

8. A printer according to claim 5, wherein said observing optical system comprises a magnifying lens for ejecting from an eyepiece window an image magnified from an image formed on the observing liquid crystal display unit.

9. A printer according to claim 6, wherein said observing optical system comprises a magnifying lens for ejecting from an eyepiece window an image magnified from an image formed on the observing liquid crystal display unit.

10. A printer according to claim 7, wherein said magnifying lens is a Galilean optical system.

11. A printer according to claim 8, wherein said magnifying lens is a Galilean optical system.

12. A printer according to claim 9, wherein said magnifying lens is a Galilean optical system.

13. A printer according to claim 10, wherein said magnifying lens is a Keplerian optical system.

14. A printer according to claim 11, wherein said magnifying lens is a Keplerian optical system.

15. A printer according to claim 12, wherein said magnifying lens is a Keplerian optical system.

16. A printer according to claim 1, wherein two reflective mirrors are disposed between said liquid crystal display unit and the sensitive plane, and an exposing optical path is shaped as a Z-like.

17. A printer according to claim 1, wherein a reflective mirror is disposed between said liquid crystal display unit and the sensitive plane, and an exposing optical path is shaped as a L-like.

18. A printer according to claim 1, wherein said interface circuit has an operating frequency conversion unit for converting an inputted image signal into an image signal synchronized with an operating frequency of said exposing liquid crystal display unit.

19. A printer according to claim 1, wherein said interface circuit causes said light source unit to flash with a luminescent time shorter than a time for an image associated with the color image signal.

20. A printer according to claim 1, wherein said interface circuit repeatedly forms a frame of color images on said exposing liquid crystal display unit so that a frame of color images is continuously displayed.

21. A printer according to claim 1, wherein said printer further comprises image attitude correction means for correcting attitude of an image displayed on said exposing liquid crystal display unit so that an image formed on the sensitive material is observed in form of an erect image.

22. A printer comprising:
An liquid crystal display unit having a transmissive liquid crystal panel having a number of pixels arranged on a two-dimensional basis, on which an image is formed, and a light source unit emitting beams of light of a plurality of luminescent colors for irradiating said liquid crystal panel from back;
an interface circuit for separating an entered color image signal to a plurality of color image signals associated with a plurality of luminescent colors of said light source unit, respectively, to sequentially form on said liquid crystal panel a plurality of separation images associated with the plurality of color image signals, said interface circuit causing said light source unit to flash with a luminescent color associated with a separation image formed on said liquid crystal panel in synchronism with a sequential formation of the separation images onto said liquid crystal panel;
optical path switching means for switching between an exposing optical path for transmitting light of said light source unit transmitted through said liquid crystal panel to a sensitive plane of a sensitive material as a recording material and an observing optical path for transmitting light of said light source unit transmitted through said liquid crystal panel to an external observation window;
an exposing optical system for magnifying and projecting an image formed on said liquid crystal display unit to provide imaging on a sensitive plane of a sensitive material; and an observing optical system for magnifying and projecting an image formed on said liquid crystal display unit onto the observation window through an observing optical path.

23. A printer according to claim 22, wherein said exposing optical system and said observing optical system are commonly used by a single imaging optical system disposed within an optical path in which the exposing optical path and the observing optical path are partially overlapped, and said imaging optical system is translated, operating together a switching operation of said optical path switching means, between a position in which an image formed on said liquid crystal display unit is imaged on the sensitive plane of the sensitive material and a position in which an image formed on said liquid crystal display unit is imaged on an observing screen provided on the observation window.

24. A printer according to claim 22, wherein said observing optical system is disposed within an optical path in which the exposing optical path and the observing optical path are partially overlapped, and at time of exposure onto the sensitive material said exposing optical system and said observing optical system are used to image an image formed on said liquid crystal display unit on the sensitive plane, and at time of projection of the image onto the observation window with magnification only said observing optical system is used.

25. A printer according to claim 22, wherein said observation window is an eyepiece window which is used for an observation in a state of eyepiece state, and said observing optical system comprises a magnifying lens for ejecting from an eyepiece window an image magnified from an image formed on the observing liquid crystal display unit.

26. A printer according to claim 25, wherein said magnifying lens is a Galilean optical system.

27. A printer according to claim 25, wherein said magnifying lens is a Keplerian optical system.

28. A printer according to claim 22, wherein two reflective mirrors are disposed between said liquid crystal display unit and the sensitive plane, and an exposing optical path is shaped as a Z-like.

29. A printer according to claim 22, wherein a reflective mirror is disposed between said liquid crystal display unit and the sensitive plane, and an exposing optical path is shaped as a L-like.

30. A printer according to claim 22, wherein said optical path switching means comprises a switching reflecting mirror disposed opposing against said liquid crystal display unit and movable a position in which light of said light source unit transmitted through said liquid crystal panel is reflected toward the exposing optical path and a position in which light of said light source unit transmitted through said liquid crystal panel is reflected toward the observing optical path.

31. A printer according to claim 30, wherein between said liquid crystal display unit and the sensitive plane said switching reflecting mirror and an exposing reflecting mirror are disposed to form a Z-like shaped exposing optical path, and between said liquid crystal display unit and the observation window said switching reflecting mirror and an observing reflecting mirror are disposed to form a L-like shaped observing optical path.

32. A printer according to claim 22, wherein said sensitive material is an instant film unit, and said printer has means for developing the instant film unit and discharging the same.

33. A printer according to claim 22, wherein said interface circuit has an operating frequency conversion unit for converting an inputted image signal into an image signal synchronized with an operating frequency of said exposing liquid crystal display unit.

34. A printer according to claim 22, wherein said interface circuit causes said light source unit to flash with a luminescent time shorter than a time for an image associated with the color image signal.

35. A printer according to claim 22, wherein said interface circuit repeatedly forms a frame of color images on said exposing liquid crystal display unit so that a frame of color images is continuously displayed.

36. A printer according to claim 22, wherein said printer further comprises image attitude correction means for correcting attitude of an image displayed on said exposing liquid crystal display unit so that an image formed on the sensitive material is observed in form of an erect image.

37. A printer according to claim 36, wherein said image attitude correction means operates or stops in operation working together an switching operation of said optical path switching means.

* * * * *